US012789540B2

(12) United States Patent
Fan et al.

(10) Patent No.: US 12,789,540 B2
(45) Date of Patent: Nov. 10, 2026

(54) PORTABLE INKJET PHOTO PRINTER

(71) Applicant: ZHUHAI YINJING TECHNOLOGY CO., LTD., Zhuhai (CN)

(72) Inventors: Jinshi Fan, Zhuhai (CN); Liang Lu, Zhuhai (CN)

(73) Assignee: ZHUHAI YINJING TECHNOLOGY CO., LTD., Zhuhai (CN)

( * ) Notice: Subject to any disclaimer, the term of this patent is extended or adjusted under 35 U.S.C. 154(b) by 0 days.

(21) Appl. No.: 19/539,386

(22) Filed: Feb. 13, 2026

(65) Prior Publication Data

US 2026/0175602 A1 Jun. 25, 2026

Related U.S. Application Data

(63) Continuation-in-part of application No. PCT/CN2025/131872, filed on Oct. 31, 2025.

(30) Foreign Application Priority Data

Nov. 1, 2024 (CN) ........................ 202422672269.6
Nov. 2, 2024 (CN) ........................ 202422677517.6
(Continued)

(51) Int. Cl.
*B41J 3/36* (2006.01)
*B41J 2/175* (2006.01)
(Continued)

(52) U.S. Cl.
CPC ......... *B41J 15/042* (2013.01); *B41J 2/17513* (2013.01); *B41J 13/103* (2013.01); *B41J 15/044* (2013.01)

(58) Field of Classification Search
CPC ... B41J 3/36; B41J 3/39; B41J 11/0035; B41J 11/005; B41J 13/0027; B41J 13/0063; B41J 13/10; B41J 13/14
See application file for complete search history.

(56) References Cited

U.S. PATENT DOCUMENTS 5,215,395 A 6/1993 Grimm et al.
6,336,756 B1 * 1/2002 Toyama .................. B41J 19/16 400/279
(Continued)

FOREIGN PATENT DOCUMENTS

CN 103481673 A 1/2014
CN 109795901 A 5/2019
(Continued)

OTHER PUBLICATIONS

International Search Report and Written Opinion issued in corresponding PCT Application No. PCT/CN2025/131872, dated Feb. 14, 2026.

*Primary Examiner* — Scott A Richmond
(74) *Attorney, Agent, or Firm* — Westbridge IP LLC

(57) ABSTRACT

A portable inkjet photo printer includes: a housing assembly having a paper outlet; a paper cassette located inside the housing assembly for storing a printing medium; a printing mechanism configured to eject printing fluid onto the printing medium in a printing area to form an image; a printing carriage configured to install the printing mechanism; a driving assembly configured to drive the printing carriage and the printing mechanism to move along an arcuate trajectory; and a paper feeding mechanism configured to transport the printing medium toward the paper outlet along a paper feeding direction. The housing assembly includes a first housing and a cover member, an operating opening
(Continued)

through which the printing mechanism is replaced is disposed on the first housing; along an up-down direction, at least a part of the operating opening overlaps with the cover member.

18 Claims, 87 Drawing Sheets

(30) Foreign Application Priority Data

| | | |
|---|---|---|
| Nov. 2, 2024 | (CN) | 202422677549.6 |
| Nov. 5, 2024 | (CN) | 202422695255.6 |
| Nov. 15, 2024 | (CN) | 202422801825.5 |
| Dec. 5, 2024 | (CN) | 202423009041.5 |
| Dec. 20, 2024 | (CN) | 202423166485.X |
| Jan. 10, 2025 | (CN) | 202520069764.X |
| Feb. 12, 2025 | (CN) | 202520224241.8 |
| Mar. 3, 2025 | (CN) | 202520359206.7 |
| Apr. 3, 2025 | (CN) | 202520631134.7 |
| Apr. 18, 2025 | (CN) | 202520755150.7 |
| Apr. 30, 2025 | (CN) | 202520863313.3 |
| Jun. 19, 2025 | (CN) | 202521267436.7 |
| Jul. 15, 2025 | (CN) | 202521486616.4 |
| Aug. 1, 2025 | (CN) | 202521642573.4 |
| Aug. 12, 2025 | (CN) | 202521715206.2 |
| Aug. 15, 2025 | (CN) | 202521750098.2 |
| Aug. 17, 2025 | (CN) | 202521756921.0 |
| Sep. 11, 2025 | (CN) | 202521966369.8 |
| Sep. 29, 2025 | (CN) | 202522112092.9 |
| Oct. 17, 2025 | (CN) | 202522212111.5 |
| Oct. 29, 2025 | (CN) | 202522294089.3 |
| Dec. 26, 2025 | (CN) | 202522783465.5 |

(51) Int. Cl.

| | |
|---|---|
| ***B41J 3/39*** | (2006.01) |
| ***B41J 13/10*** | (2006.01) |
| ***B41J 15/04*** | (2006.01) |

(56) References Cited

U.S. PATENT DOCUMENTS

| | | | | |
|---|---|---|---|---|
| 6,568,776 | B1 * | 5/2003 | Kato | B41J 11/007 347/8 |
| 7,377,617 | B2 * | 5/2008 | Clarke | B41J 2/435 347/38 |
| 2004/0239720 | A1 * | 12/2004 | Clarke | B41J 19/16 347/37 |
| 2022/0111671 | A1 * | 4/2022 | Tokuyama | B41J 2/17509 |

FOREIGN PATENT DOCUMENTS

| | | | |
|---|---|---|---|
| CN | 216683786 | U | 6/2022 |
| CN | 116373474 | A | 7/2023 |
| CN | 219969226 | U | 11/2023 |
| JP | 2000218886 | A | 8/2000 |
| JP | 2001096735 | A | 4/2001 |
| JP | 2001150663 | A | 6/2001 |
| JP | 3548059 | B2 | 7/2004 |
| JP | 3814436 | B2 | 8/2006 |
| WO | 2004108421 | A1 | 12/2004 |

* cited by examiner

PORTABLE INKJET PHOTO PRINTER

CROSS-REFERENCE TO RELATED APPLICATIONS

This application is a continuation-in-part of International Application No. PCT/CN2025/131872, filed on Oct. 31, 2025, which claims priority to Chinese Patent Application No. CN202422672269.6, filed on Nov. 1, 2024, Chinese Patent Application No. CN202422677549.6, filed on Nov. 2, 2024, Chinese Patent Application No. CN202422677517.6, filed on Nov. 2, 2024, Chinese Patent Application No. CN202422695255.6, filed on Nov. 5, 2024, Chinese Patent Application No. CN202422801825.5, filed on Nov. 15, 2024, Chinese Patent Application No. CN202423009041.5, filed on Dec. 5, 2024, Chinese Patent Application No. CN202423166485.X, filed on Dec. 20, 2024, Chinese Patent Application No. CN202520069764.X, filed on Jan. 10, 2025, Chinese Patent Application No. CN202520224241.8, filed on Feb. 12, 2025, Chinese Patent Application No. CN202520359206.7, filed on Mar. 3, 2025, Chinese Patent Application No. CN202520631134.7, filed on Apr. 3, 2025, Chinese Patent Application No. CN202520755150.7, filed on Apr. 18, 2025, Chinese Patent Application No. CN202520863313.3, filed on Apr. 30, 2025, Chinese Patent Application No. CN202521267436.7, filed on Jun. 19, 2025, Chinese Patent Application No. CN202521486616.4, filed on Jul. 15, 2025, Chinese Patent Application No. CN202521642573.4, filed on Aug. 1, 2025, Chinese Patent Application No. CN202521715206.2, filed on Aug. 12, 2025, Chinese Patent Application No. CN202521750098.2, filed on Aug. 15, 2025, Chinese Patent Application No. CN202521756921.0, filed on Aug. 17, 2025, Chinese Patent Application No. CN202521966369.8, filed on Sep. 11, 2025, Chinese Patent Application No. CN202522112092.9, filed on Sep. 29, 2025, Chinese Patent Application No. CN202522212111.5, filed on Oct. 17, 2025, and Chinese Patent Application No. CN202522294089.3, filed on Oct. 29, 2025. This application also claims priority to Chinese Patent Application No. CN202522783465.5, filed on Dec. 26, 2025. The disclosures of the above-mentioned applications are hereby incorporated by reference in their entireties.

TECHNICAL FIELD

The present disclosure relates to the technical field of inkjet printers, and more particularly to a portable inkjet photo printer.

BACKGROUND

With the continuous improvement of living standards, photo printers designed to capture precious moments have emerged. Currently, most photo printers on the market are based on dye-sublimation technology and ZINK zero-ink printing technology. Among them, dye-sublimation photo printers require multi-color ribbons, which makes them bulkier and difficult to carry. Moreover, dye-sublimation printing is highly susceptible to environmental temperature changes; operating in low or high-temperature environments may compromise color accuracy. In addition, although dye-sublimation printing produces high-quality photos, they may still be inferior to inkjet printing in terms of color depth and dynamic range.

ZINK zero-ink printing requires specialized inkless paper, which is expensive. Printed photos are prone to fading during storage, are highly sensitive to light and temperature, are unsuitable for long-term preservation, and lack durability. Traditional inkjet printers are typically desktop or industrial printers that lack portability. Therefore, there is a compelling need for a portable inkjet printer.

SUMMARY

The present disclosure provides a portable inkjet photo printer, including: a housing assembly having a paper outlet; a paper cassette located inside the housing assembly for storing a printing medium; a printing mechanism configured to eject printing fluid onto the printing medium in a printing area to form an image; a printing carriage configured to install the printing mechanism; a driving assembly configured to drive the printing carriage and the printing mechanism to move along an arcuate trajectory; and a paper feeding mechanism configured to transport the printing medium toward the paper outlet along a paper feeding direction; the housing assembly includes a first housing and a cover member, an operating opening is disposed on the first housing, the printing mechanism is replaced through the operating opening; along an up-down direction, at least a part of the operating opening overlaps with the cover member.

With such a configuration, the internal space of the printer can be effectively reduced, which is conducive to the miniaturized design of the printer.

BRIEF DESCRIPTION OF THE DRAWINGS

To more clearly illustrate the technical solutions in the specific embodiments of the present disclosure or in the prior art, the drawings required for the description of the specific embodiments or the prior art will be briefly described below. Obviously, the drawings in the following description are some embodiments of the present disclosure, and for those of ordinary skill in the art, other drawings may also be obtained based on these drawings without creative efforts.

FIG. 102 is a schematic view of a portable inkjet photo printer according to the present disclosure, taken along line F2-F2 in FIG. 70.

FIG. 103 is an exploded schematic view of some components of a portable inkjet photo printer according to the present disclosure.

FIG. 104 is a schematic view of a portable inkjet photo printer according to the present disclosure with some components hidden.

FIG. 105A and FIG. 105B are structural schematic views of a portable inkjet photo printer according to the present disclosure with some components hidden.

FIG. 106 and FIG. 107 are structural schematic views of a portable inkjet photo printer according to the present disclosure with some components hidden.

FIG. 108 is a cross-sectional view of a portable inkjet photo printer according to the present disclosure taken along a cutting plane perpendicular to the left-right direction, observed from left to right.

FIG. 109 is a schematic view of a fifth embodiment of a paper cassette in a portable inkjet photo printer according to the present disclosure, with some components hidden.

FIG. 110 is a schematic view of a portable inkjet photo printer according to the present disclosure, taken along line H6-H6 in FIG. 109, observed from left to right.

FIG. 111 is a perspective view of a portable inkjet photo printer according to the present disclosure.

FIG. 112A and FIG. 112B are structural schematic views of a portable inkjet photo printer according to the present disclosure with some components hidden.

FIG. 113 is a cross-sectional view of a portable inkjet photo printer according to the present disclosure taken along a cutting plane perpendicular to the left-right direction, observed from left to right.

FIG. 114 is a schematic view of a first housing and a cover member in a portable inkjet photo printer according to the present disclosure.

Figure 115:
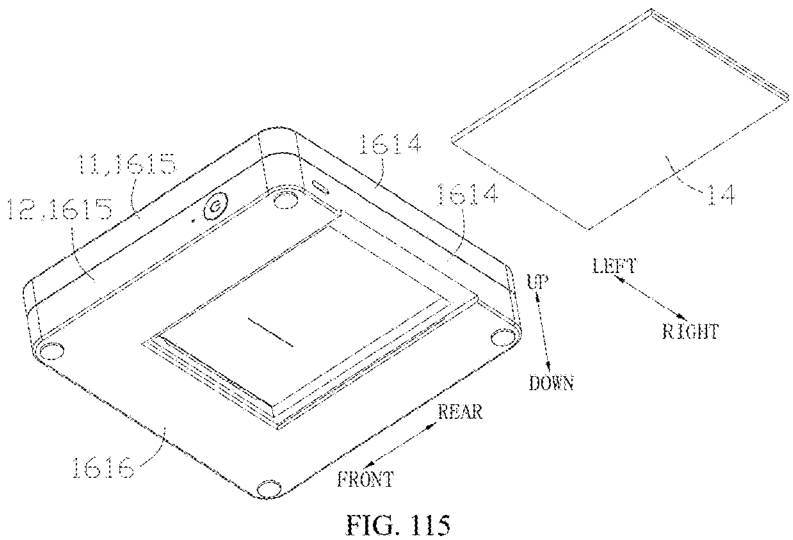

FIG. 115 is an exploded schematic view of some components in a portable inkjet photo printer according to the present disclosure.

Figure 116:
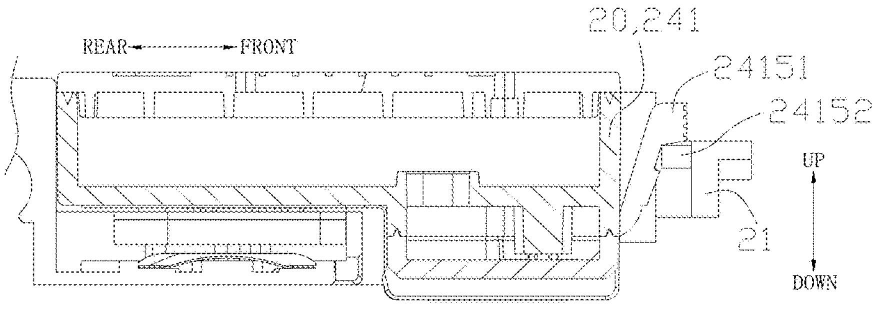

FIG. 116 is a cross-sectional view of a portable inkjet photo printer according to the present disclosure taken along a cutting plane perpendicular to the left-right direction, observed from left to right.

Figure 117:
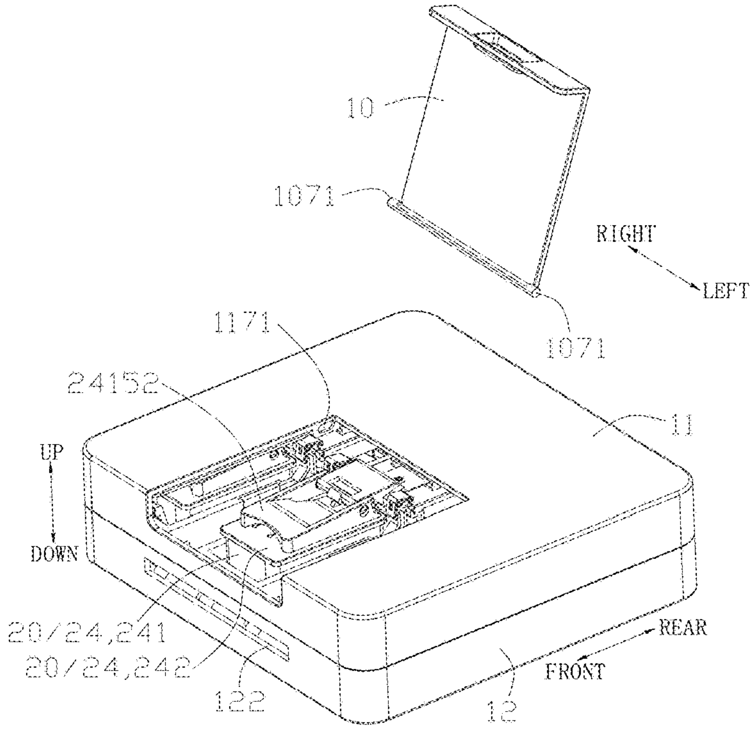

FIG. 117 is a schematic view of a first housing and a cover member in a portable inkjet photo printer according to the present disclosure.

Figure 118:
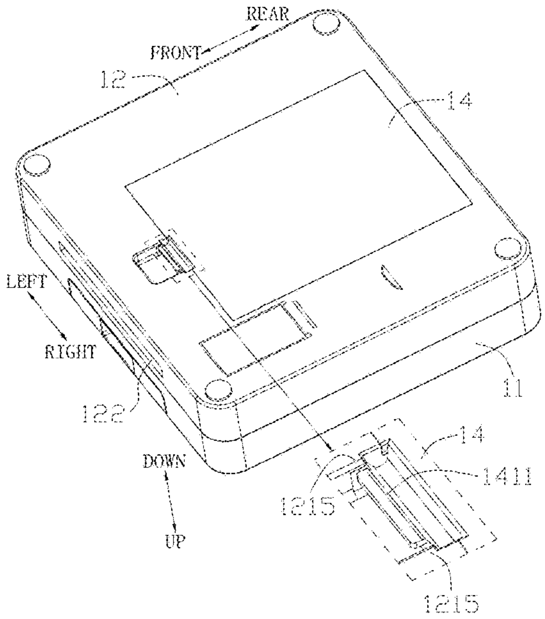

FIG. 118 is a perspective view of a portable inkjet photo printer according to the present disclosure.

Figure 119:
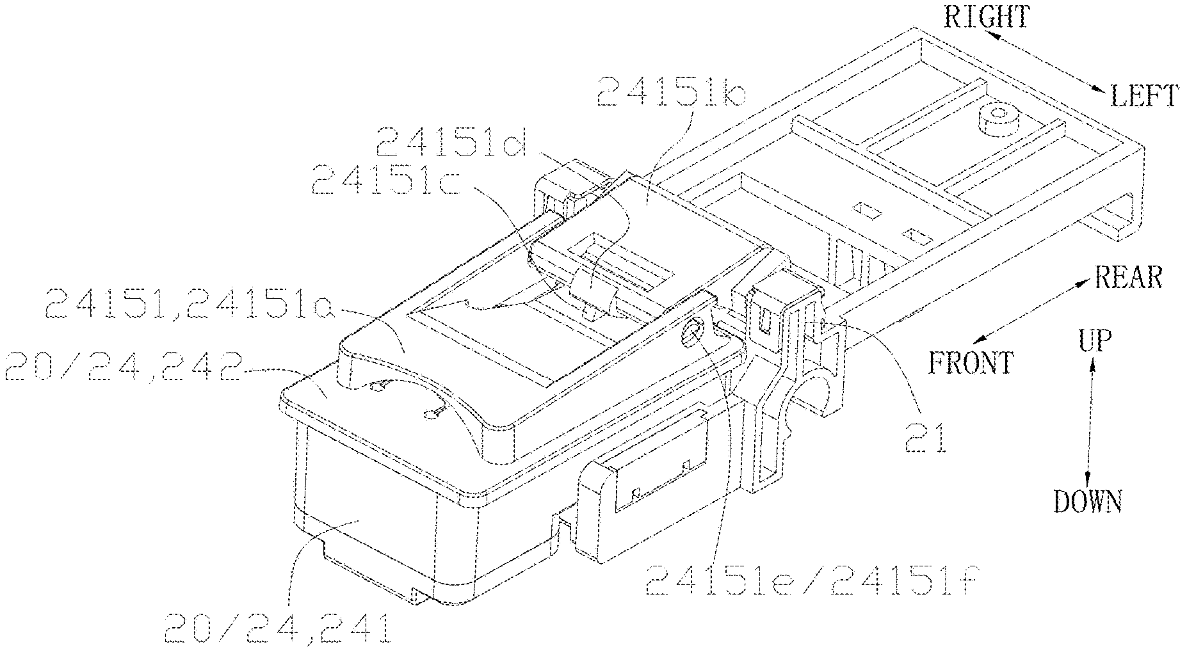

FIG. 119 is a schematic view of a portable inkjet photo printer according to the present disclosure with some components hidden.

Figure 120:
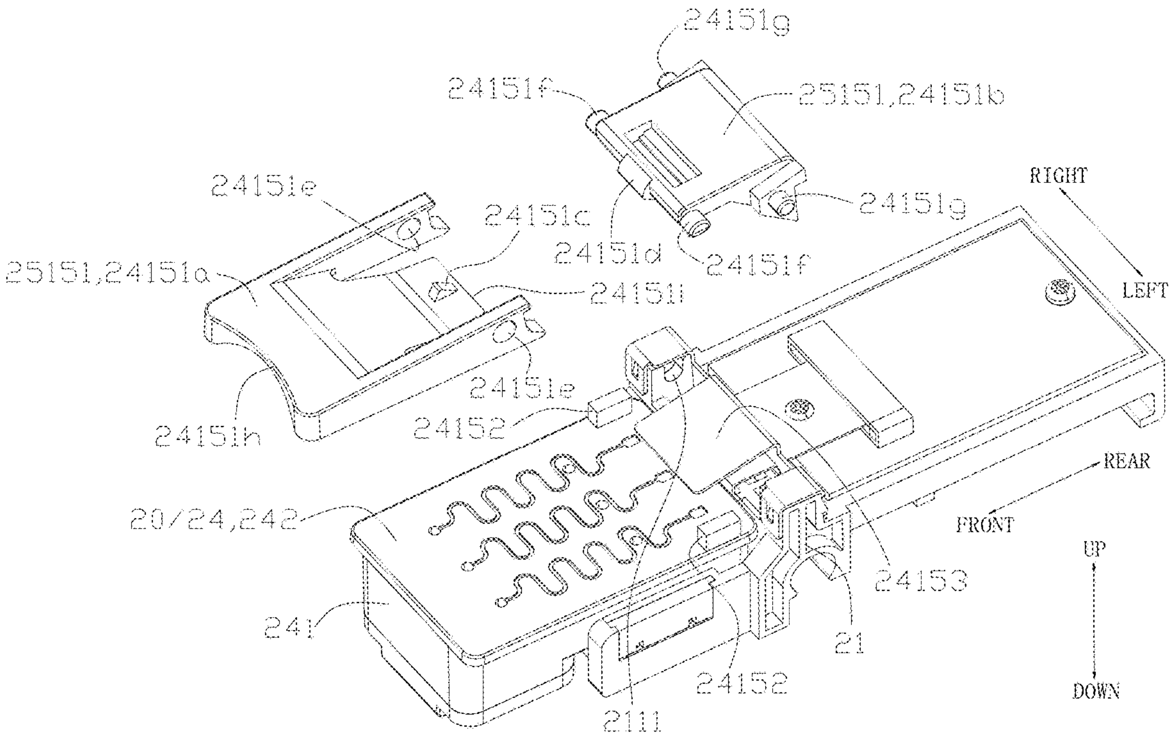

FIG. 120 is an exploded schematic view of a portable inkjet photo printer according to the present disclosure with some components hidden.

Figure 121A:
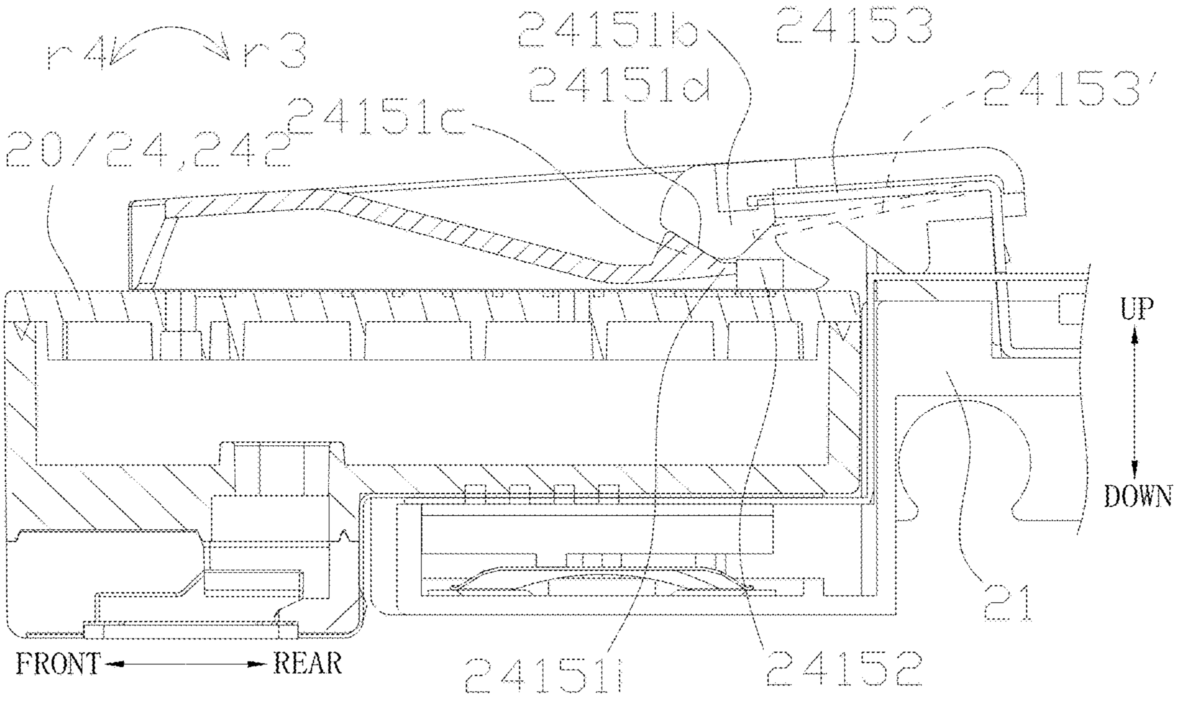

FIG. 121A is a cross-sectional view of a portable inkjet photo printer according to the present disclosure before unlocking the printing mechanism, taken along a cutting plane perpendicular to the left-right direction, observed from left to right.

Figure 121B:
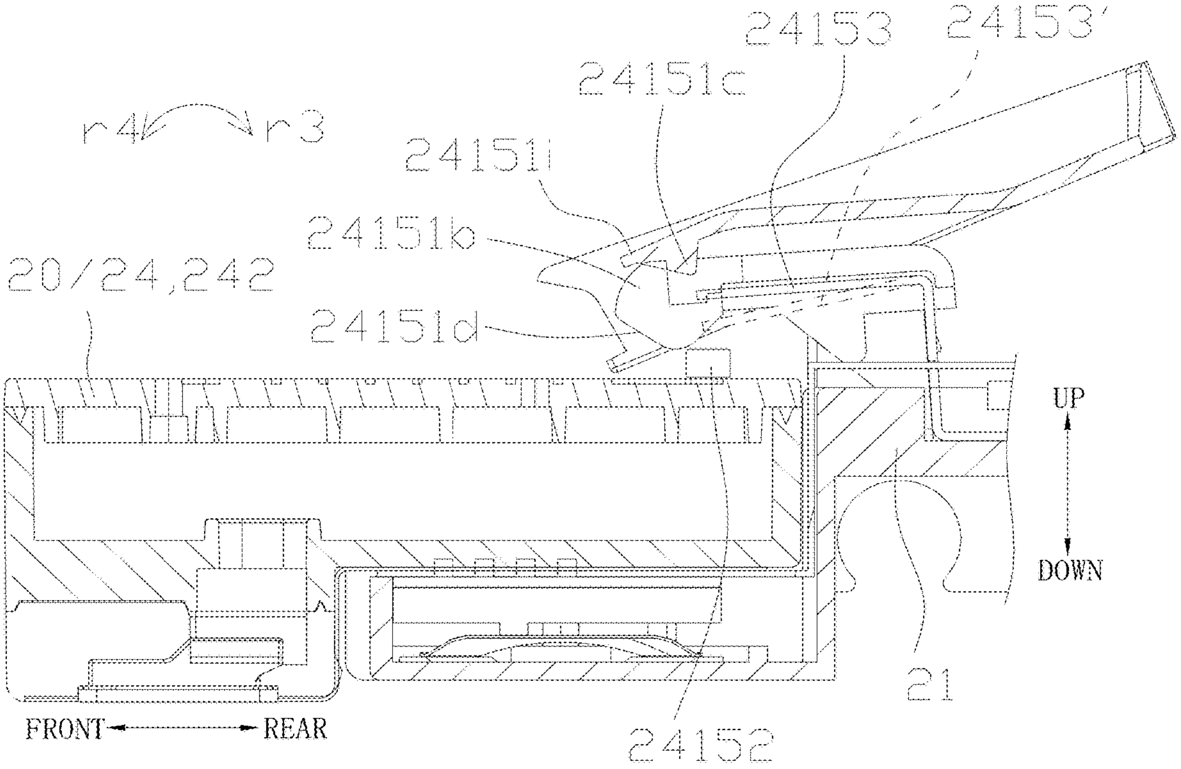

FIG. 121B is a cross-sectional view of a portable inkjet photo printer according to the present disclosure after unlocking the printing mechanism, taken along a cutting plane perpendicular to the left-right direction, observed from left to right.

Figure 122:
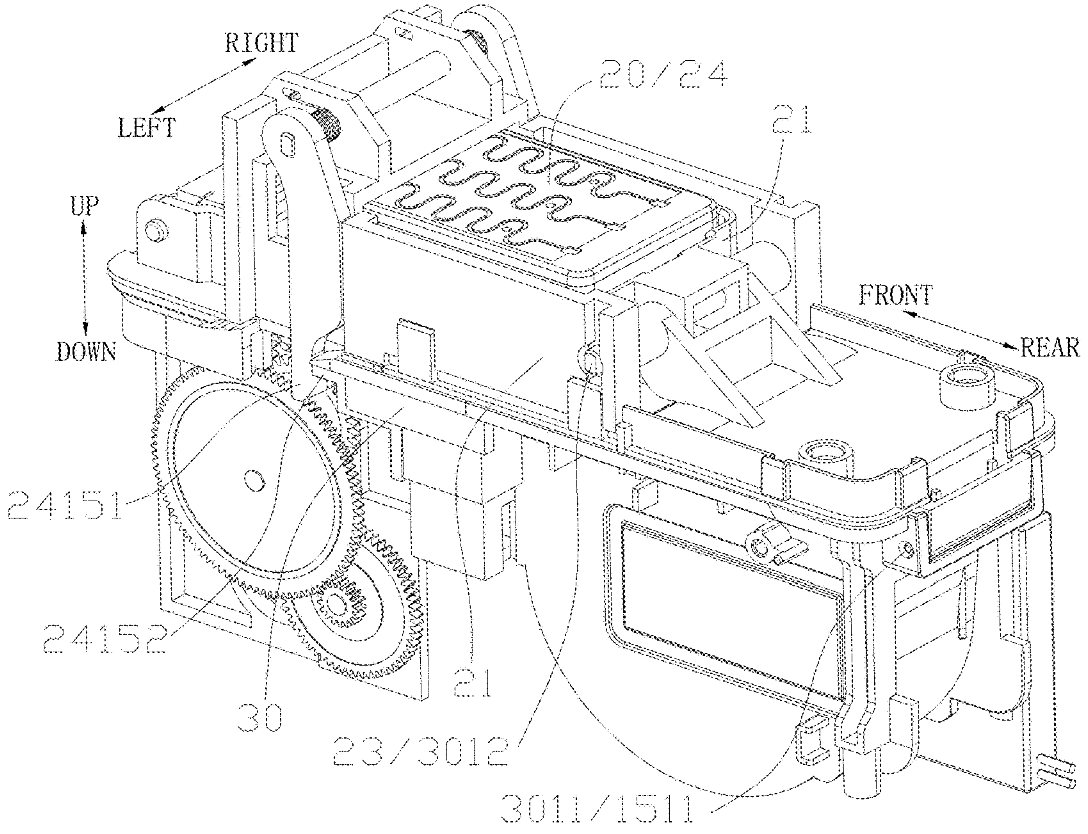

FIG. 122 is a schematic view of a portable inkjet photo printer according to the present disclosure with some components hidden.

Figure 123:
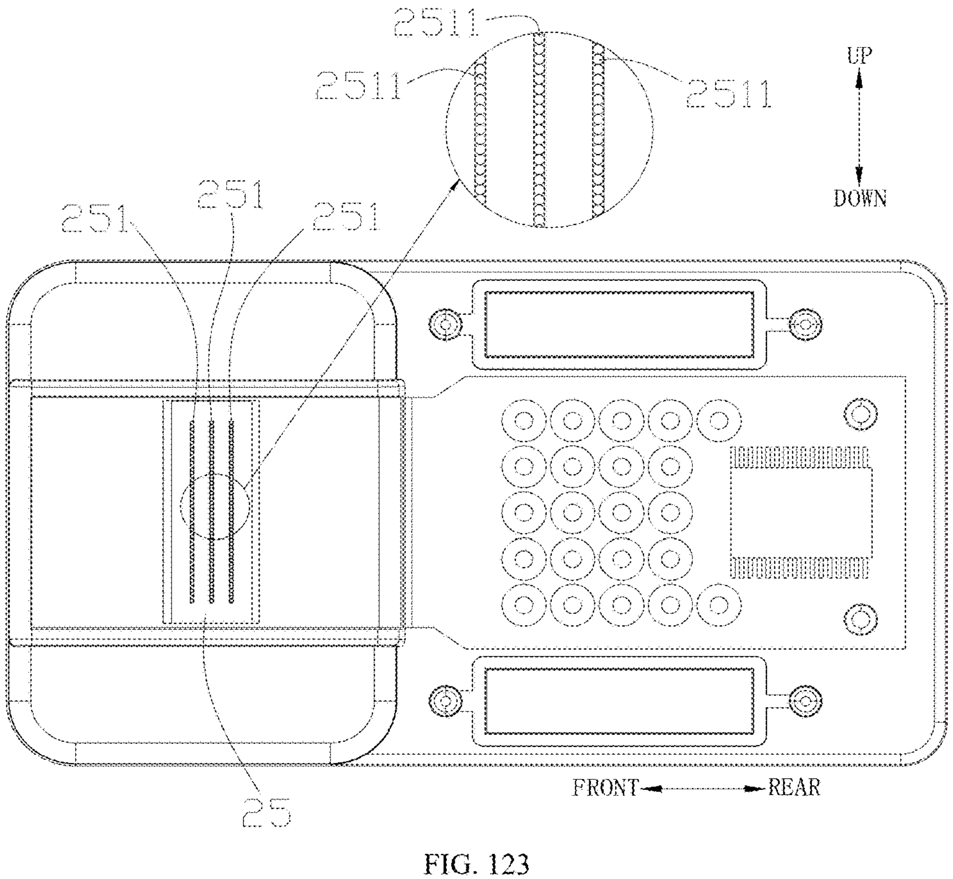

FIG. 123 is a schematic view of a printing mechanism in a portable inkjet photo printer according to the present disclosure, observed along an up-down direction.

Figure 124:
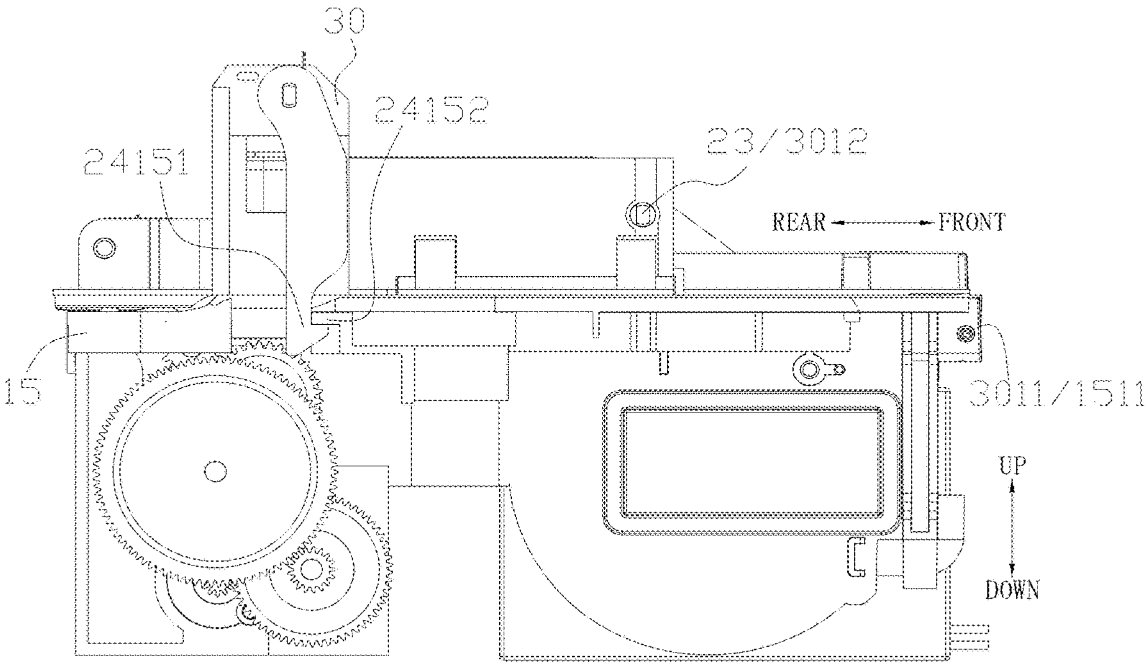

FIG. 124 is a schematic view of a portable inkjet photo printer according to the present disclosure with some components hidden, observed along the left-right direction.

Figure 125:
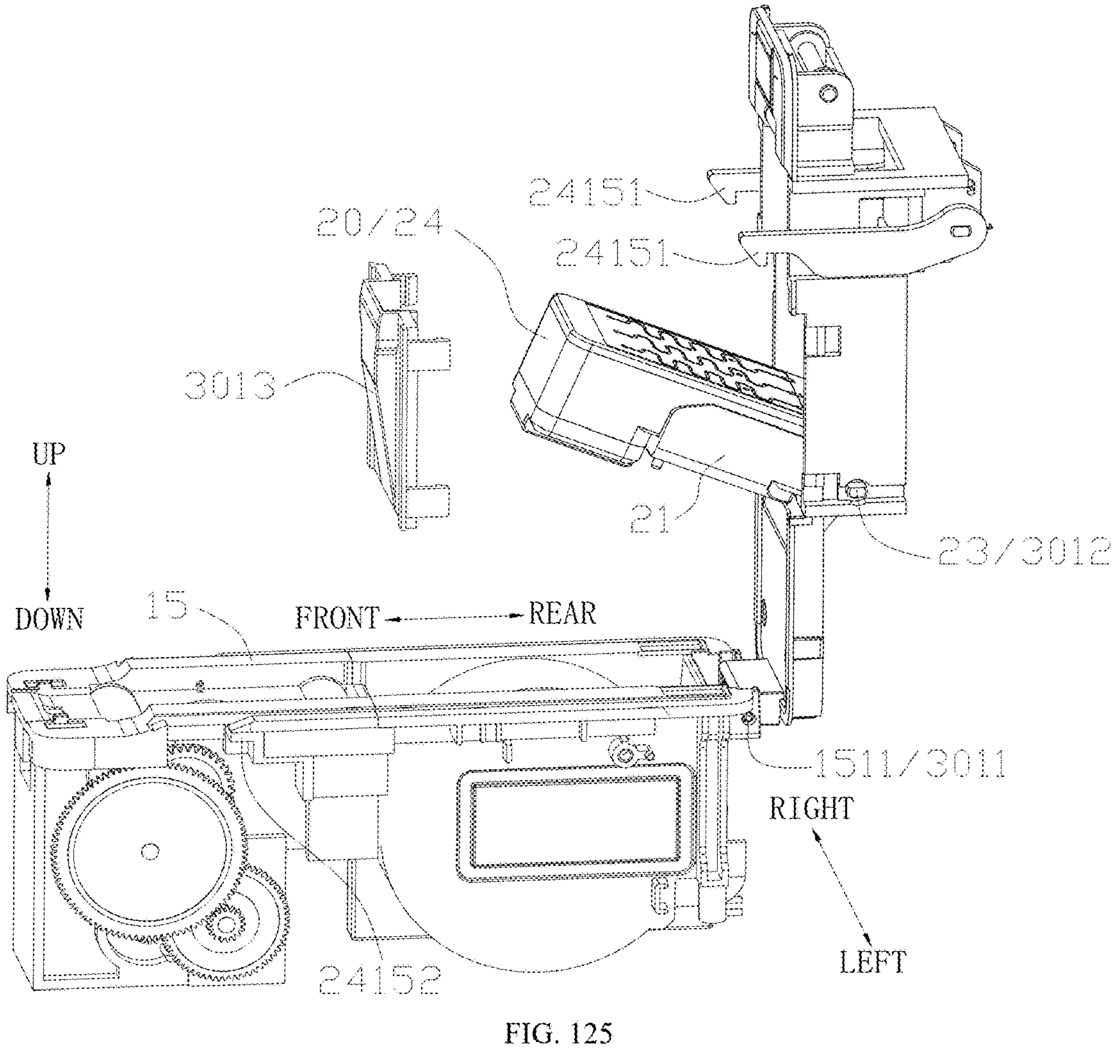

FIG. 125 is a schematic view of a printing mechanism in a portable inkjet photo printer according to the present disclosure after unlocking.

Figure 126:
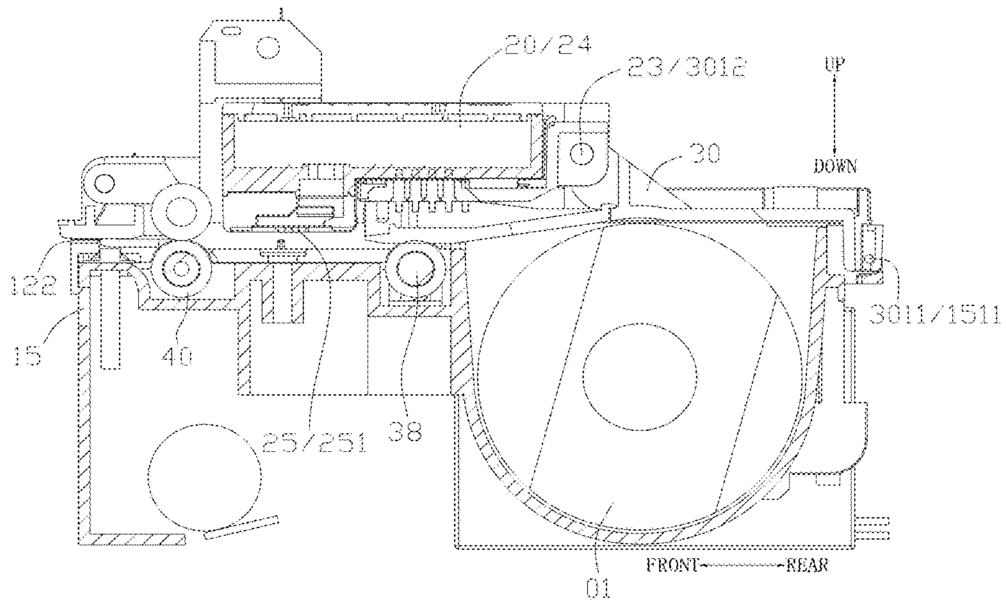

FIG. 126 is a cross-sectional view of a portable inkjet photo printer according to the present disclosure with some components hidden, taken along a cutting plane perpendicular to the left-right direction, observed from left to right.

Figure 127:
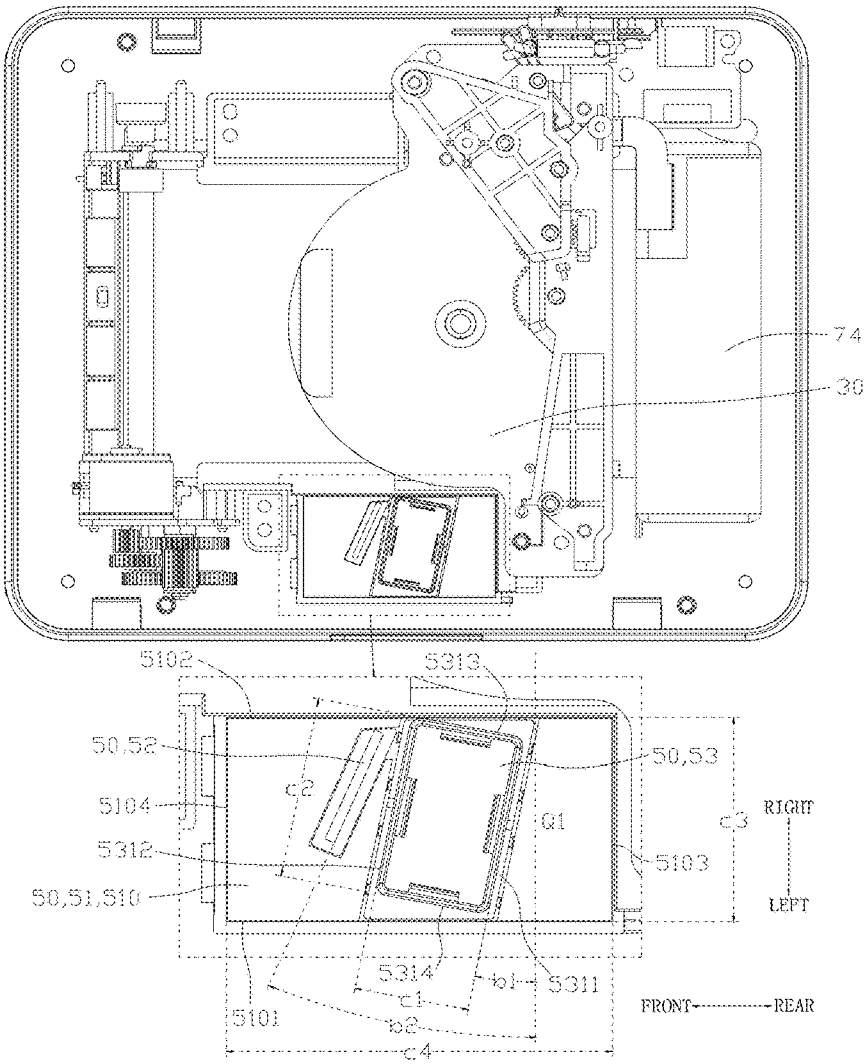

FIG. 127 is a schematic view of a portable inkjet photo printer according to the present disclosure with some components hidden, when a cleaning mechanism observed along the up-down direction.

Figure 128:
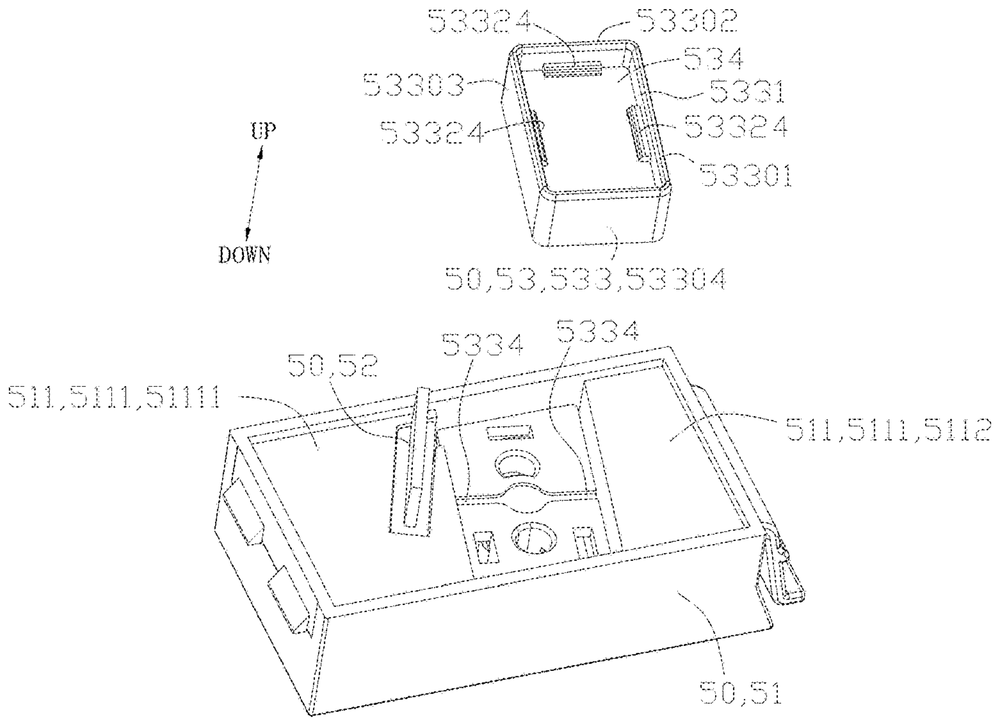

FIG. 128 is an exploded view of some components of a cleaning mechanism in a portable inkjet photo printer according to the present disclosure.

FIG. 129A-FIG. 129E are schematic views of another structure of the fifth embodiment of the paper cassette in a portable inkjet photo printer according to the present disclosure.

Figure 130:
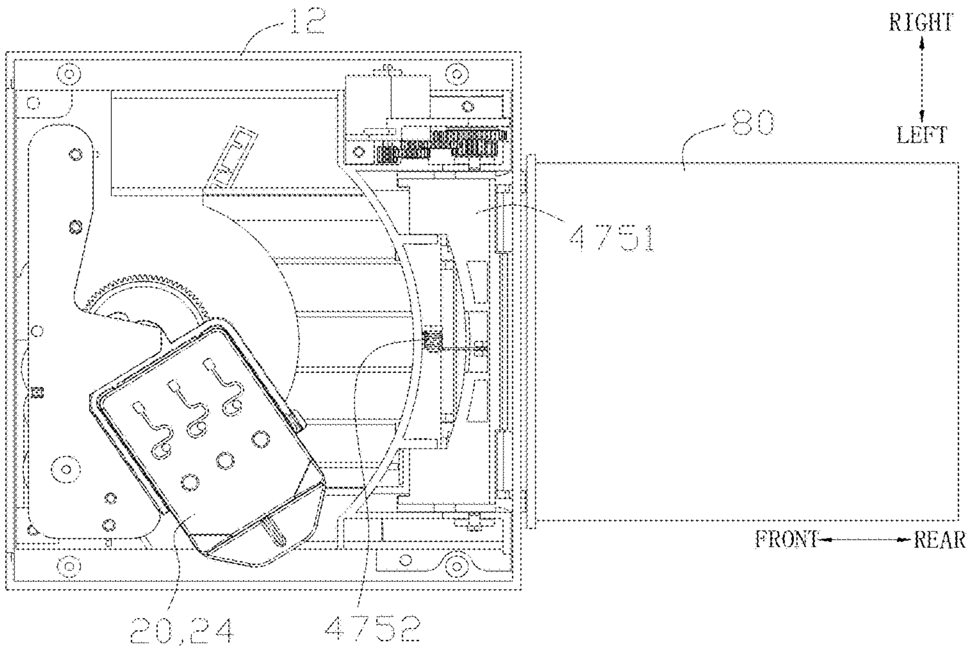

FIG. 130 is a schematic view of a portable inkjet photo printer according to the present disclosure with some components hidden, observed from top to bottom along the up-down direction.

Figure 129A:
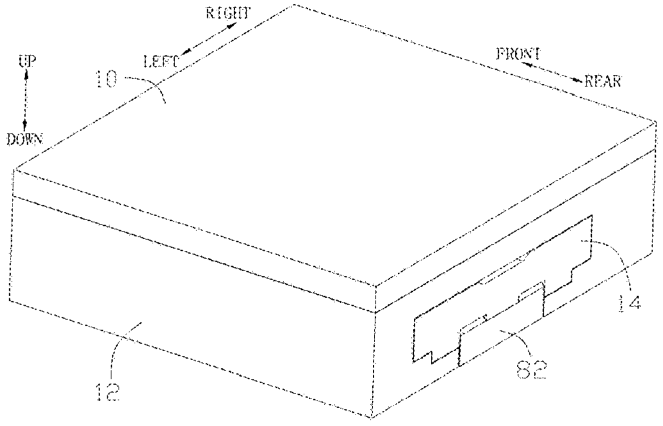
Figure 129B:
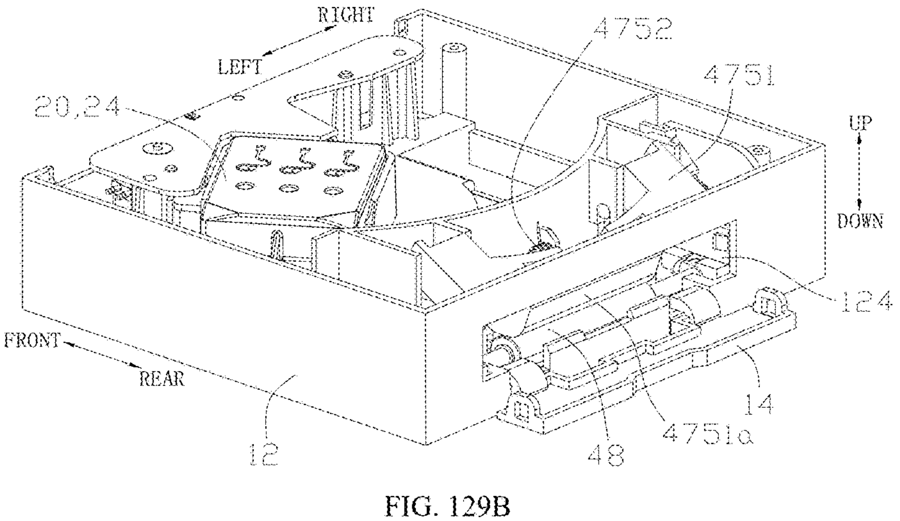
Figure 129C:
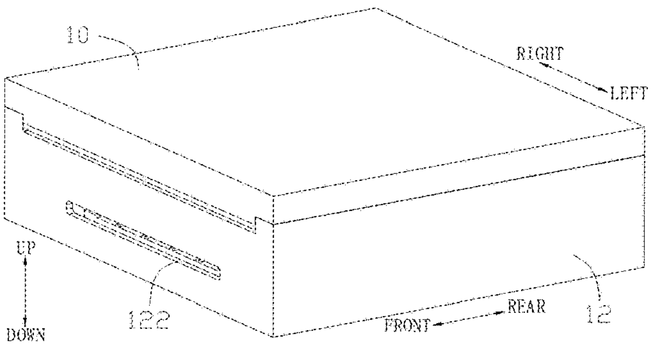
Figure 131:
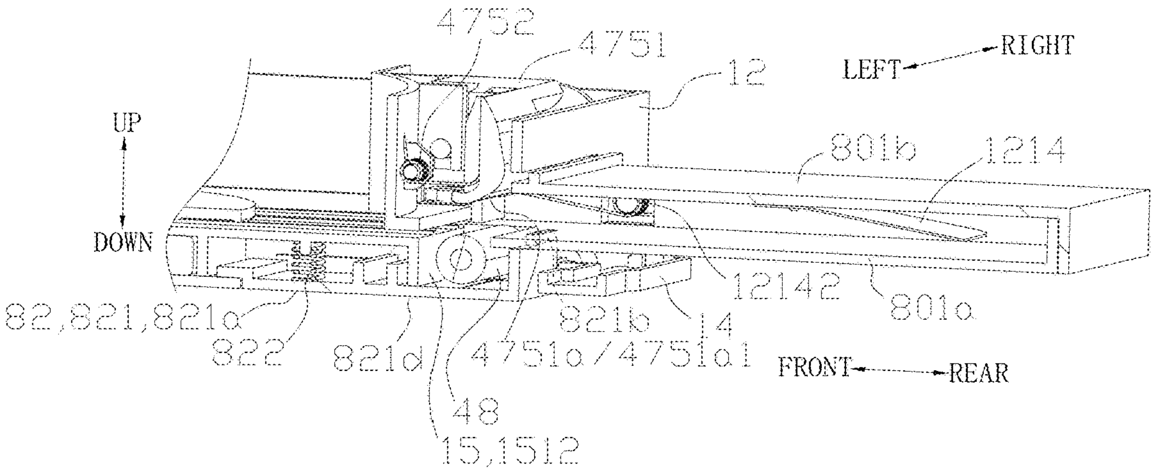

FIG. 131 is a cross-sectional view of a portable inkjet photo printer according to the present disclosure with some components hidden, taken along line H7-H7 in FIG. 129C, observed from left to right.

Figure 132:
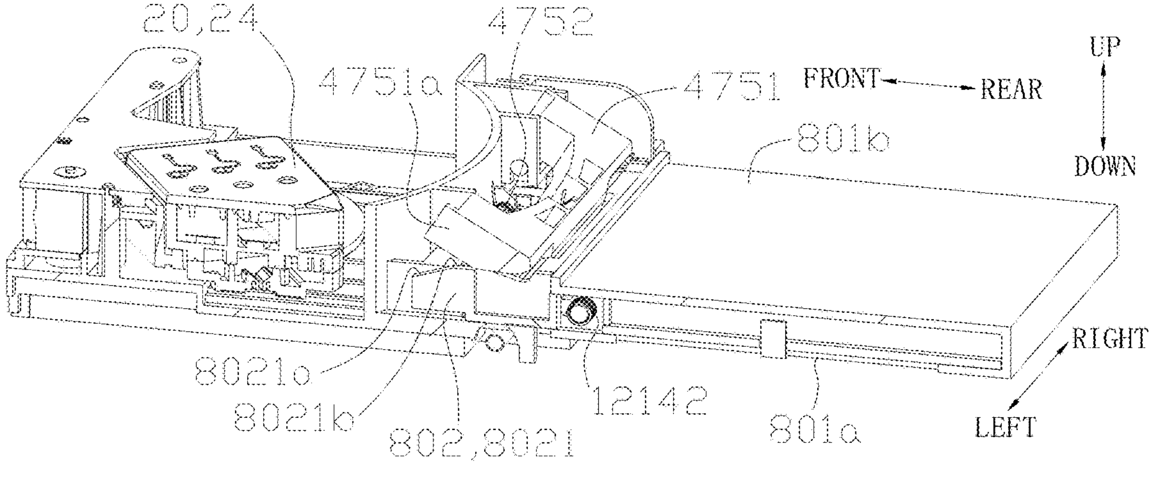

FIG. 132 is a cross-sectional view of a portable inkjet photo printer according to the present disclosure with some components hidden, taken along line H8-H8 in FIG. 129C, observed from left to right.

Figure 133A:
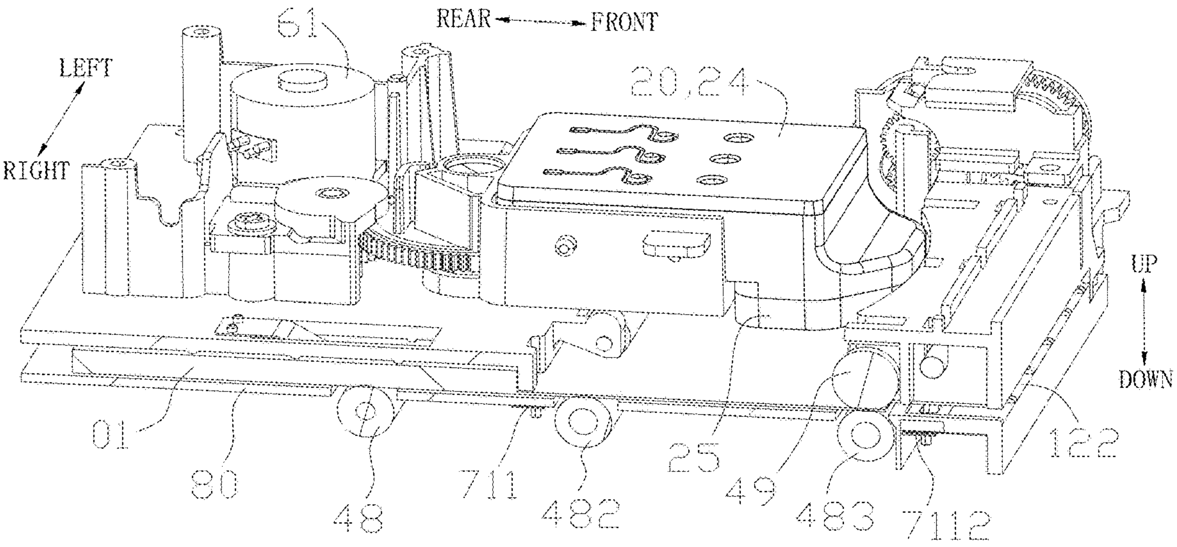
Figure 133B:
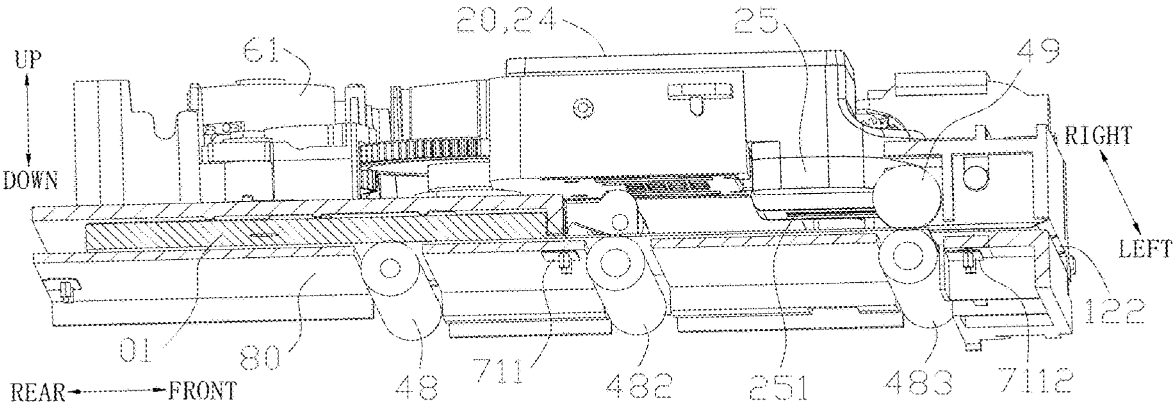

FIG. 133A and FIG. 133B are cross-sectional views of a portable inkjet photo printer according to the present disclosure with some components hidden, taken along a cutting plane perpendicular to the left-right direction.

Figure 134A:
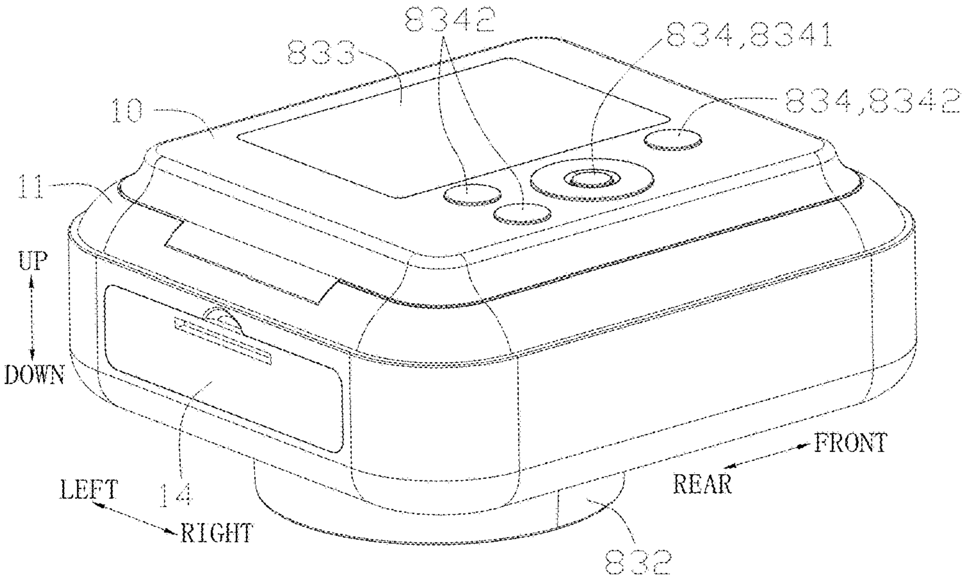
Figure 134B:
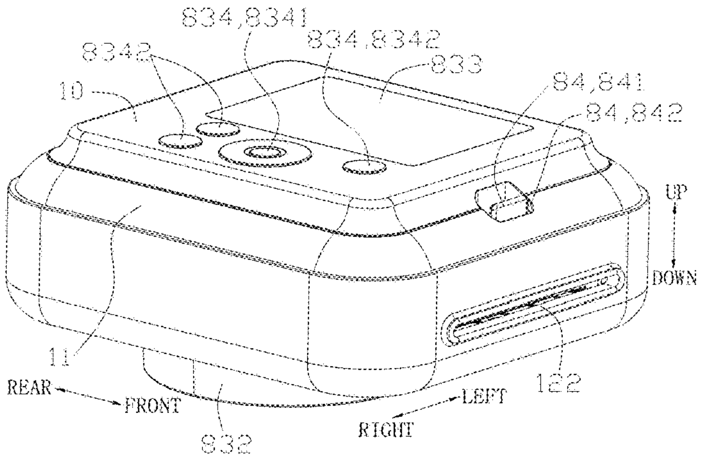
Figure 134C:
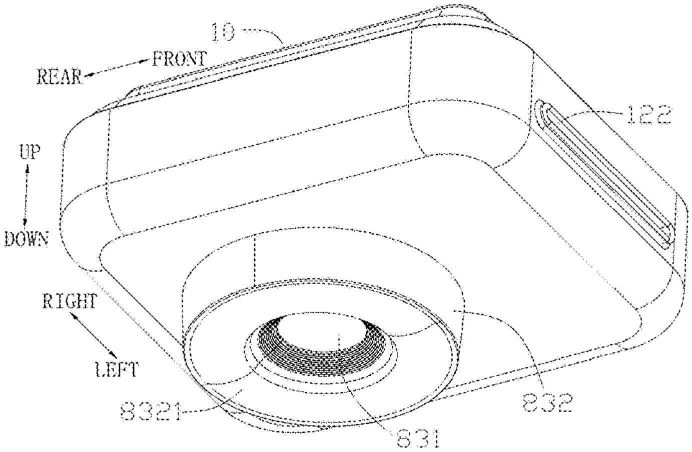

FIG. 134A-FIG. 134C are perspective views of a portable inkjet photo printer according to the present disclosure.

Figure 135:
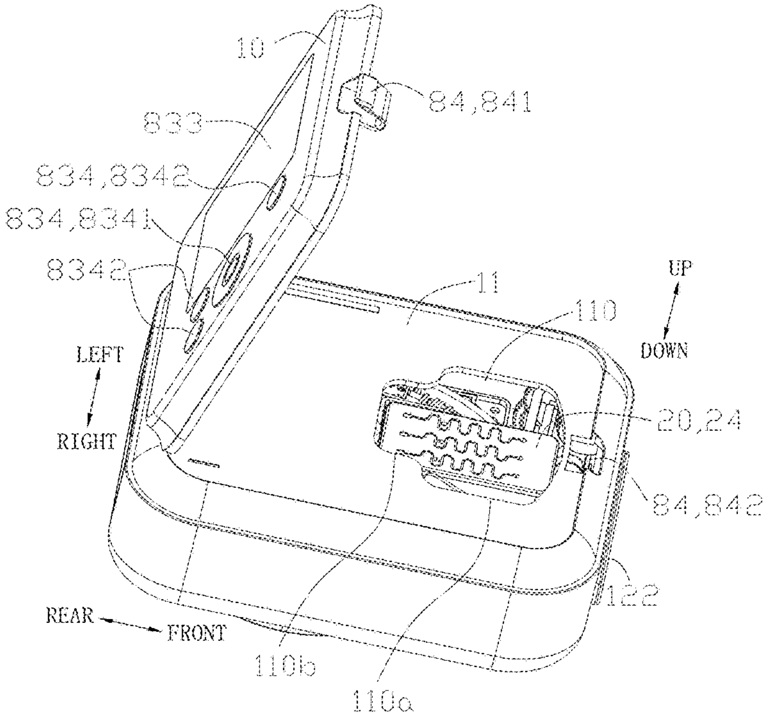

FIG. 135 is a perspective view of a portable inkjet photo printer according to the present disclosure when a cover member is opened.

Figure 136:
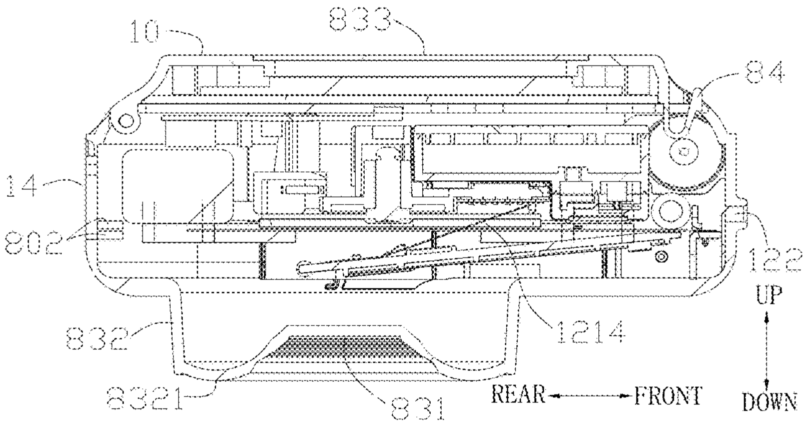
Figure 137:
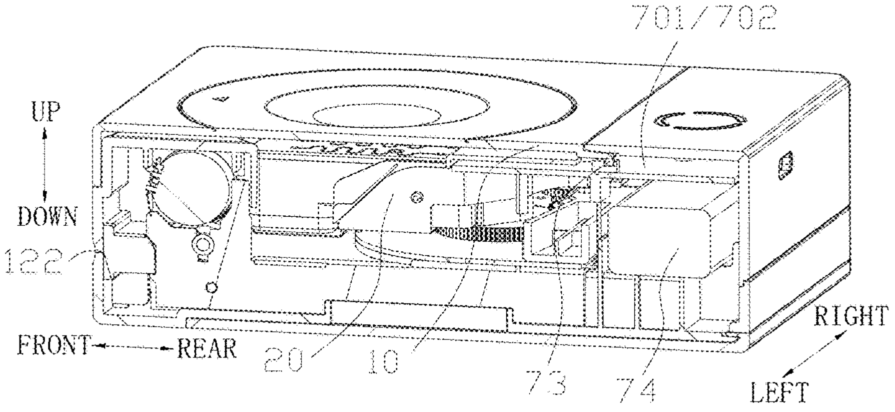

FIG. 136 and FIG. 137 are cross-sectional views of a portable inkjet photo printer according to the present disclosure, taken along a cutting plane perpendicular to the left-right direction, observed from right to left.

Figure 138:
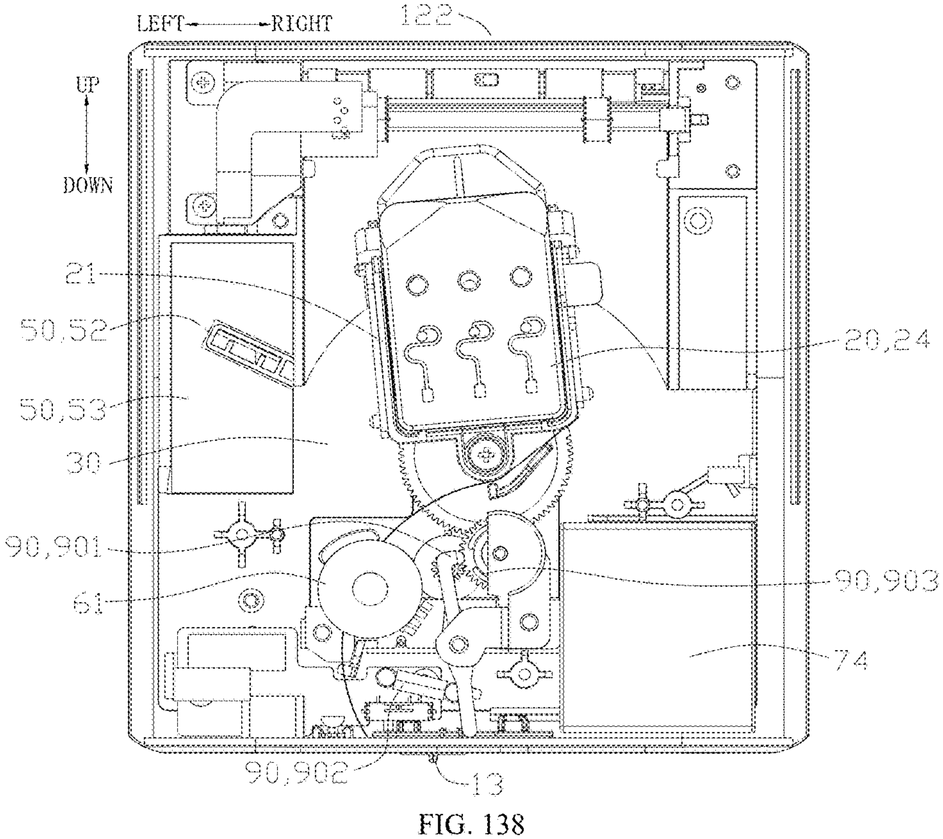

FIG. 138 is a schematic view of a portable inkjet photo printer according to the present disclosure with some components hidden, observed from top to bottom along the up-down direction.

Figure 139A:
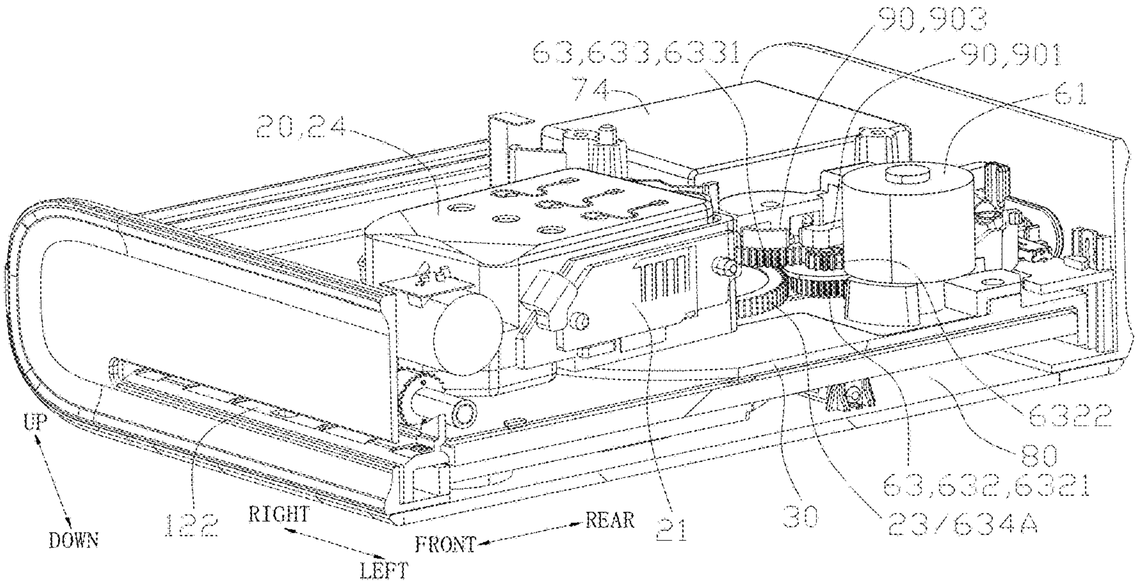
Figure 139B:
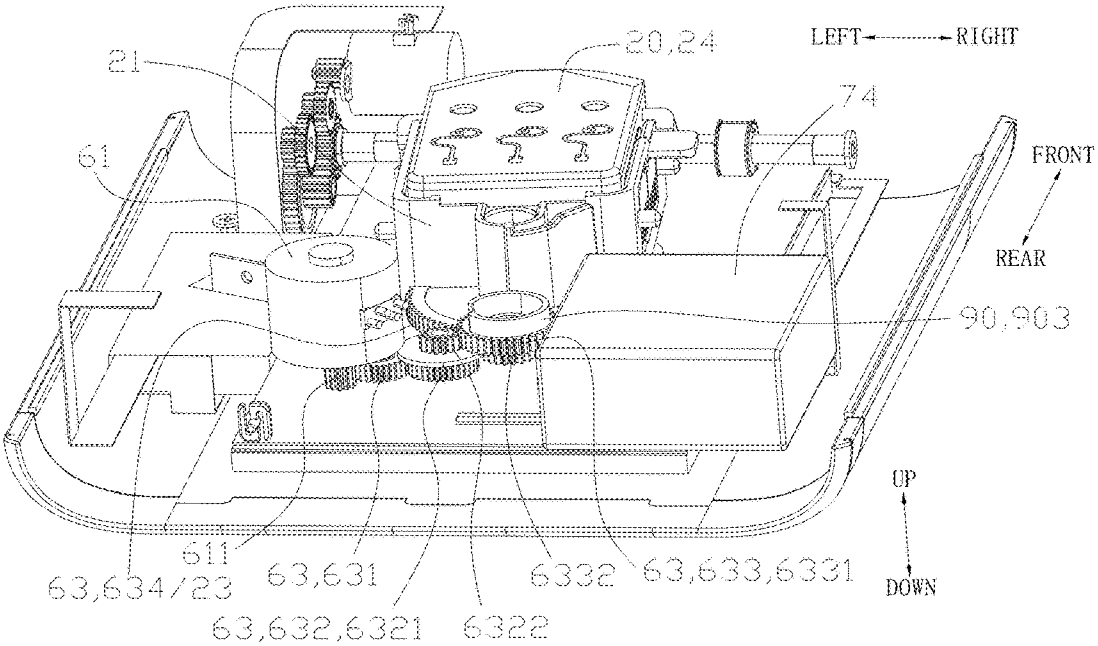

FIG. 139A and FIG. 139B are perspective views of a portable inkjet photo printer according to the present disclosure with some components hidden.

Figure 140:
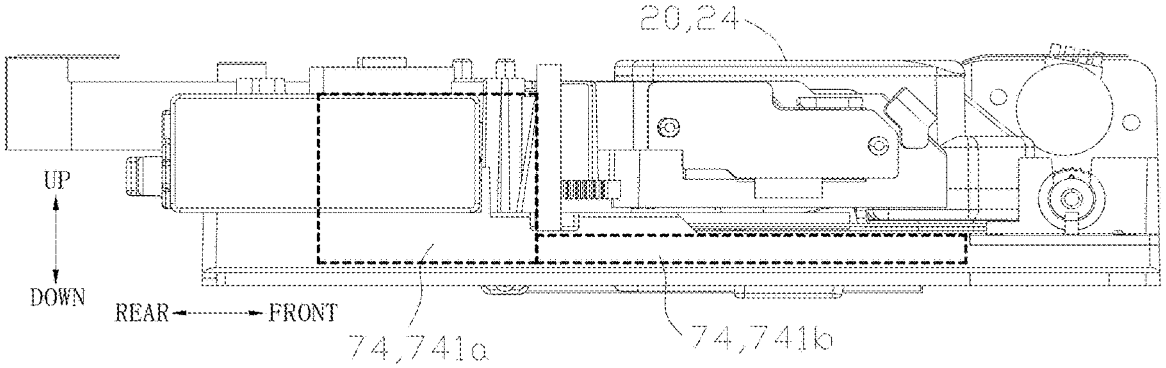

FIG. 140 is a perspective view of a portable inkjet photo printer according to the present disclosure with some components hidden, observed from right to left.

Figure 141A:
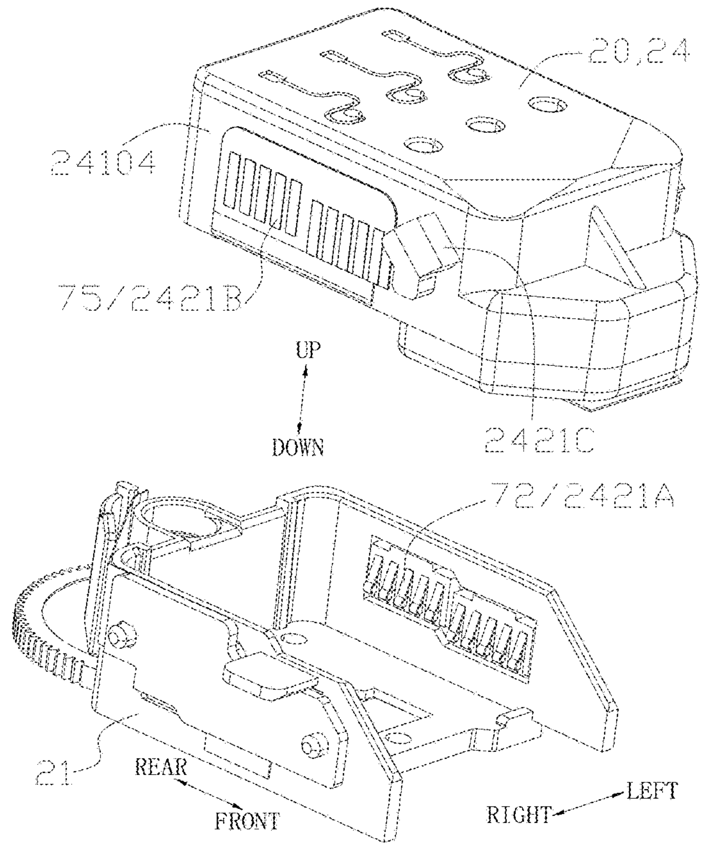
Figure 141B:
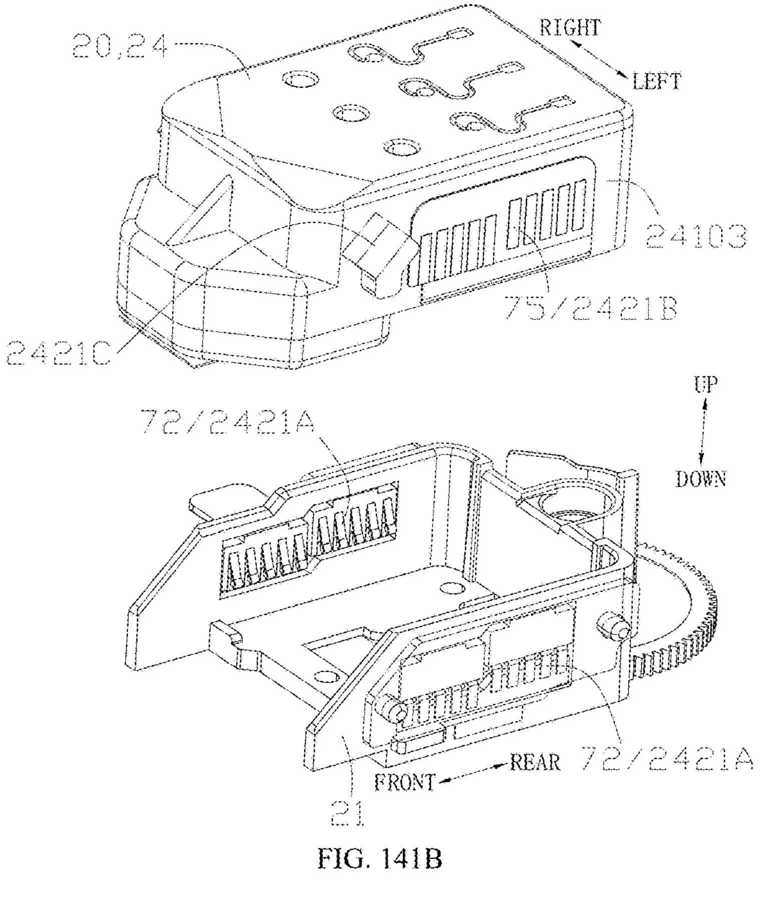

FIG. 141A and FIG. 141B are exploded schematic views of some components of a printing mechanism in a portable inkjet photo printer according to the present disclosure.

Figure 141C:
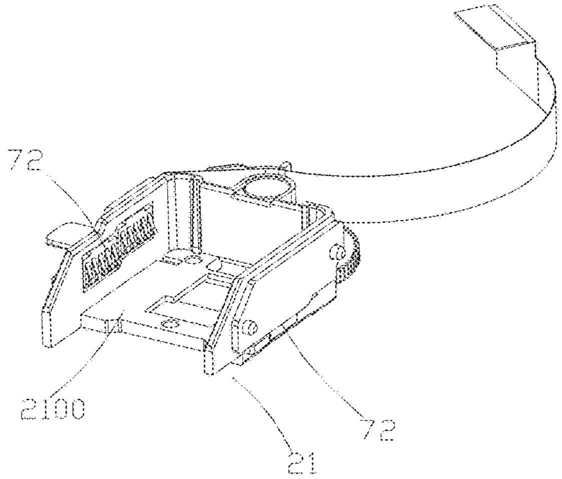
Figure 141D:
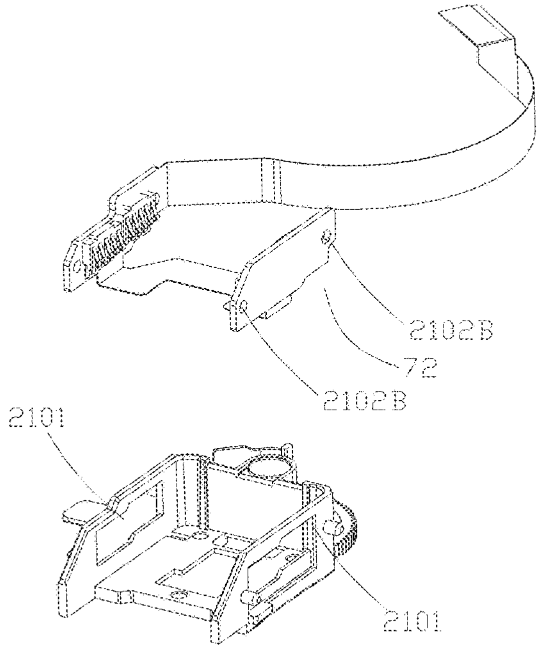

FIG. 141C and FIG. 141D are exploded schematic views of a modification of partial components of the printing mechanism in a portable inkjet photo printer according to the present disclosure.

Figure 142:
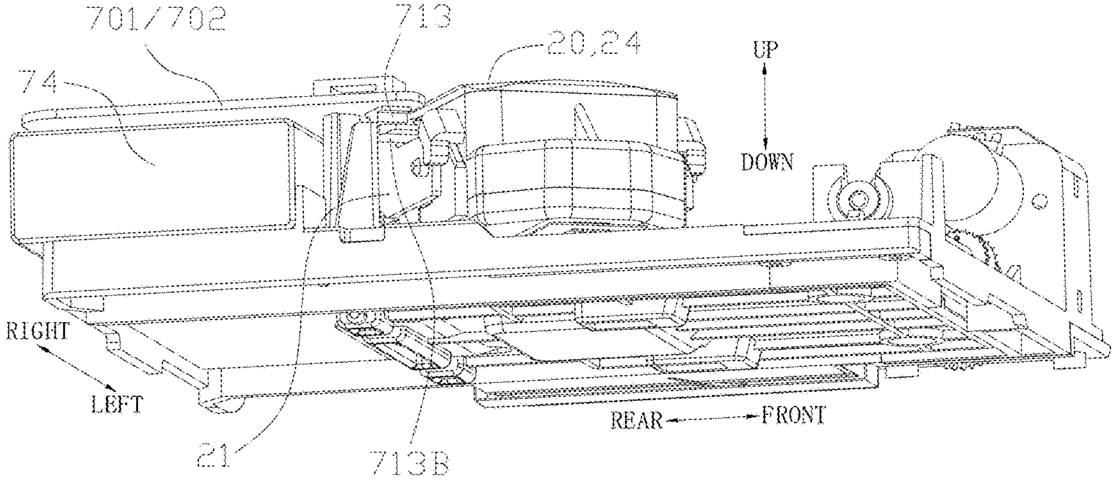

FIG. 142 is a perspective view of a portable inkjet photo printer according to the present disclosure with some components hidden.

Figure 143:
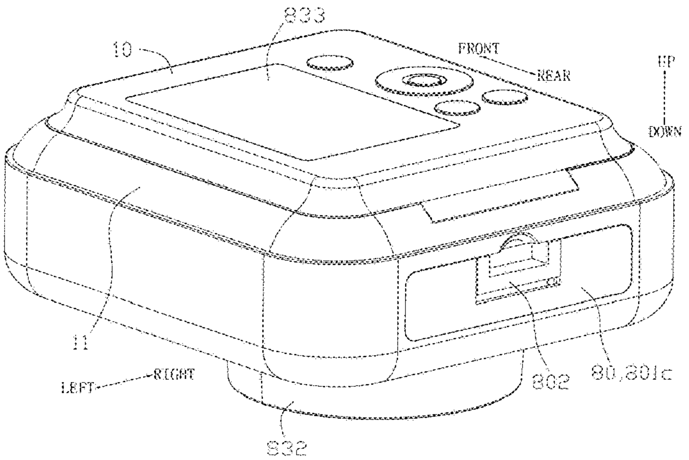

FIG. 143 is a perspective view of a portable inkjet photo printer according to the present disclosure.

Figure 144A:
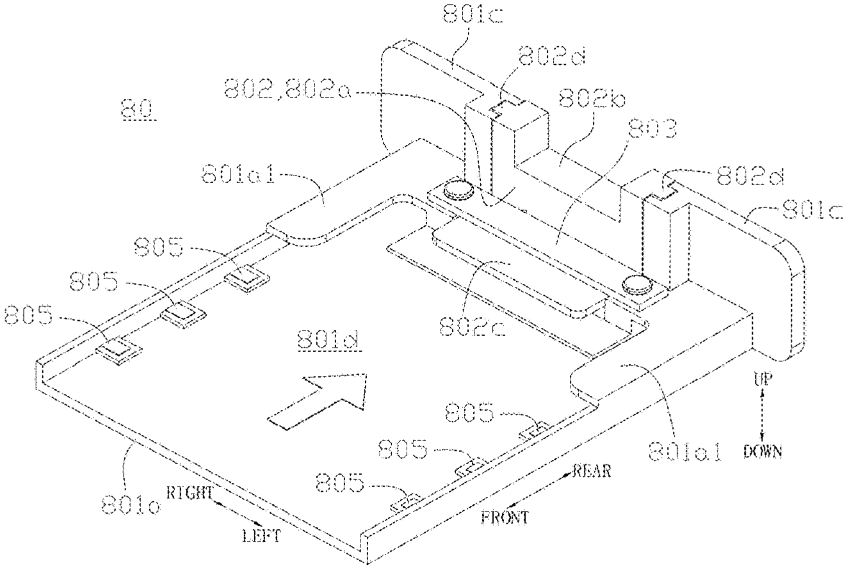
Figure 144B:
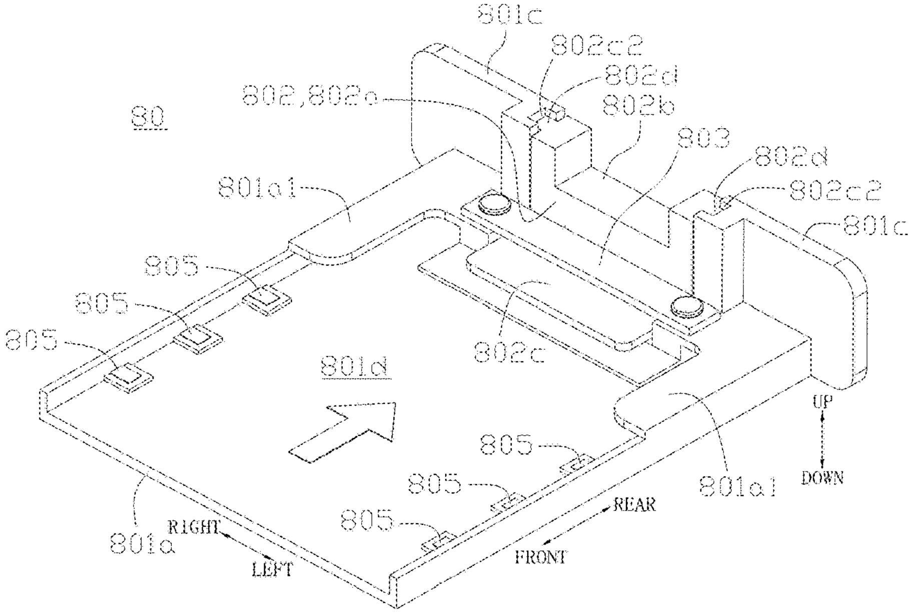

FIG. 144A and FIG. 144B are perspective views of a first embodiment of a detachable paper cassette in a portable inkjet photo printer according to the present disclosure.

Figure 144C:
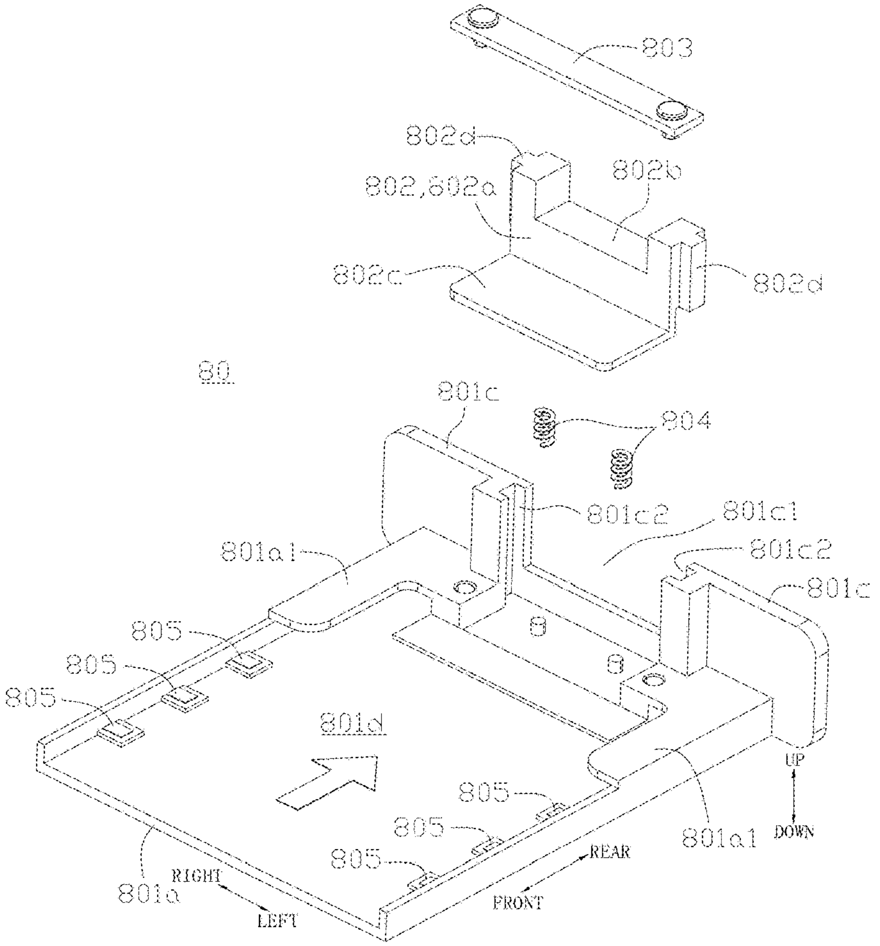

FIG. 144C is an exploded view of the first embodiment of the detachable paper cassette in a portable inkjet photo printer according to the present disclosure.

Figure 145A:
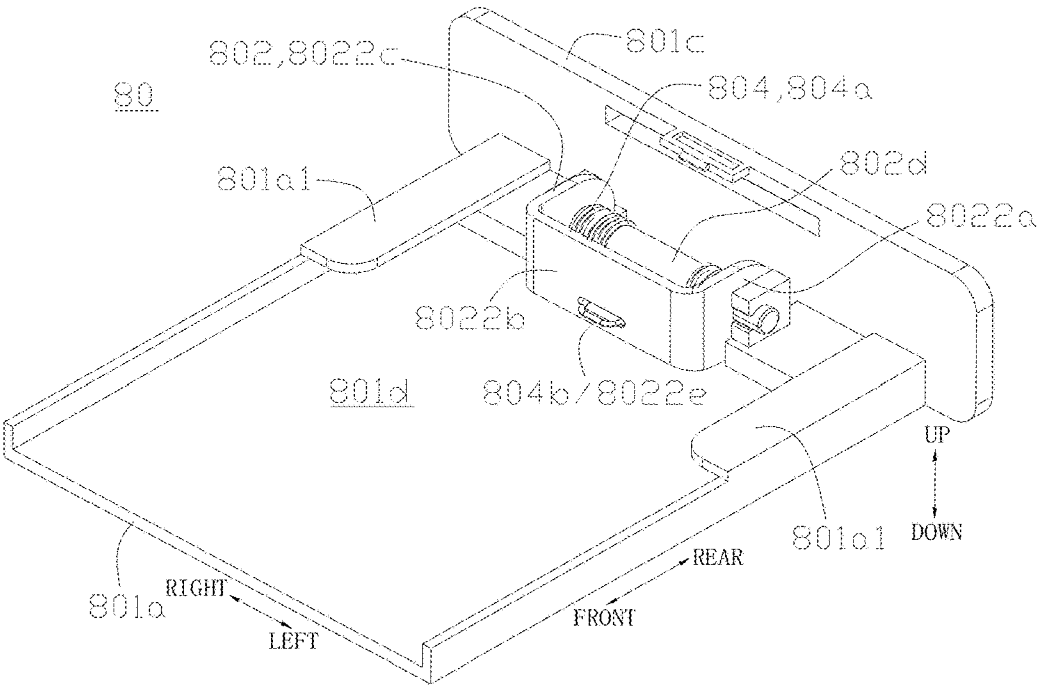
Figure 145B:
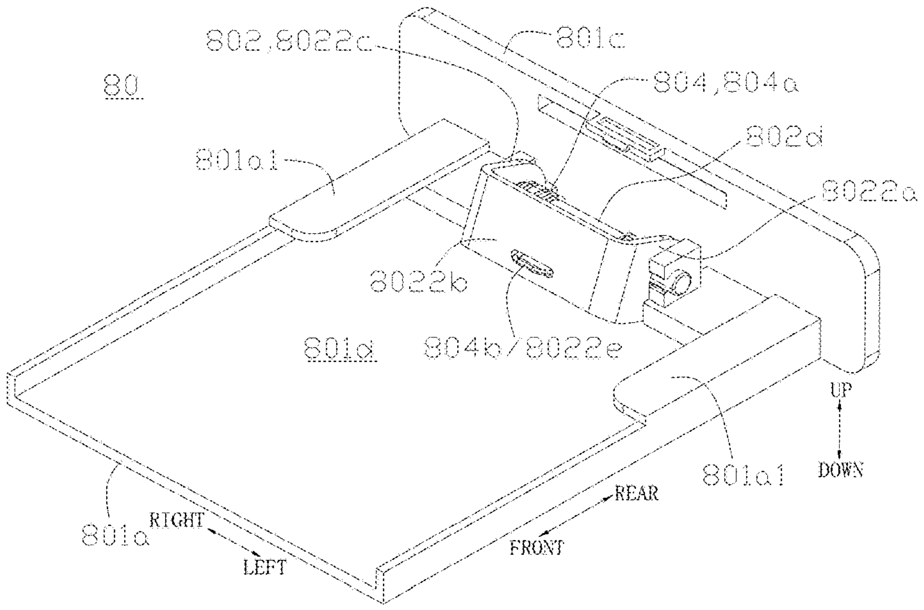

FIG. 145A and FIG. 145B are perspective views of a second embodiment of the detachable paper cassette in a portable inkjet photo printer according to the present disclosure.

Figure 145C:
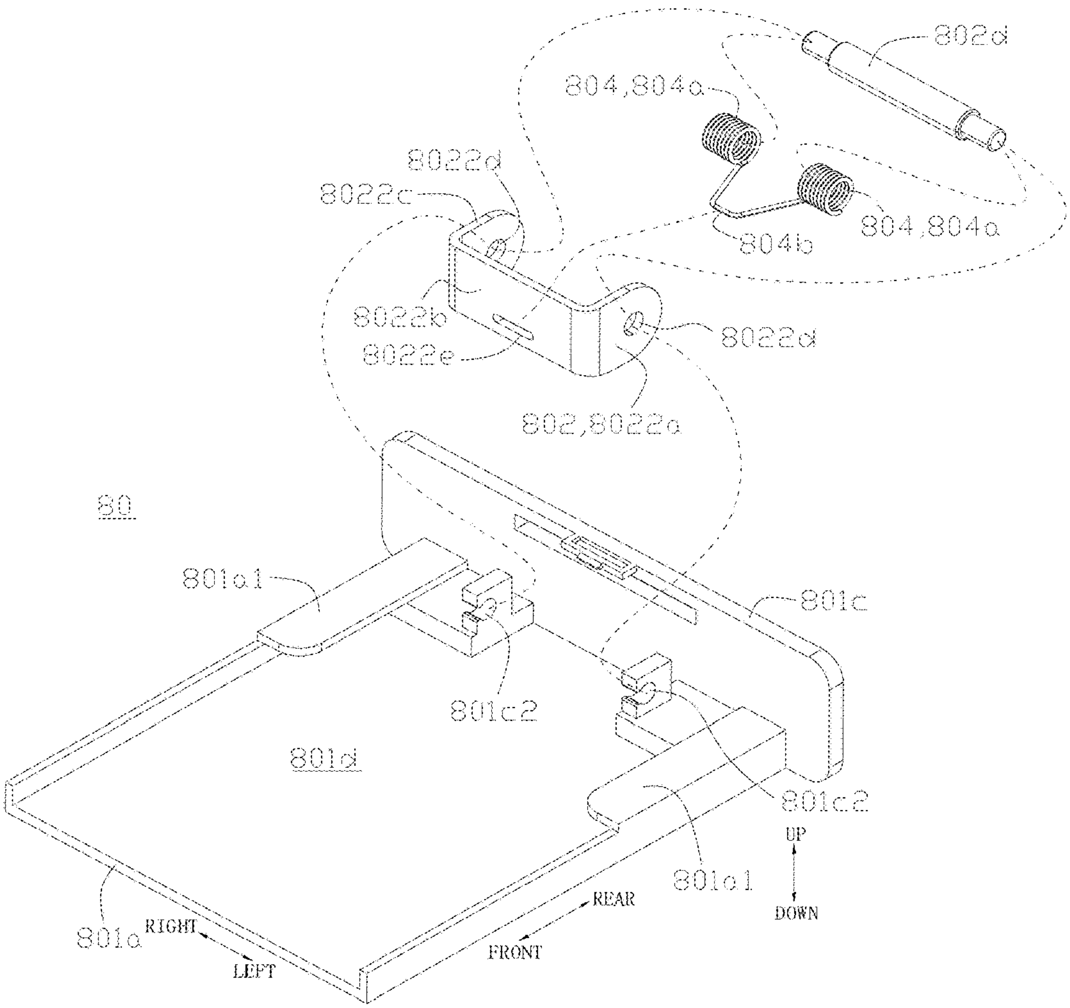

FIG. 145C is an exploded view of the second embodiment of the detachable paper cassette in a portable inkjet photo printer according to the present disclosure.

Figure 146:
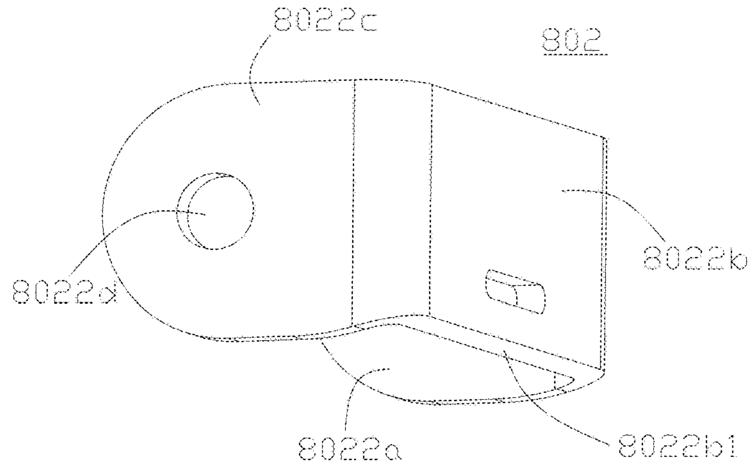

FIG. 146 is a schematic view of a pushing component in the second embodiment of the detachable paper cassette in a portable inkjet photo printer according to the present disclosure.

Figure 147:
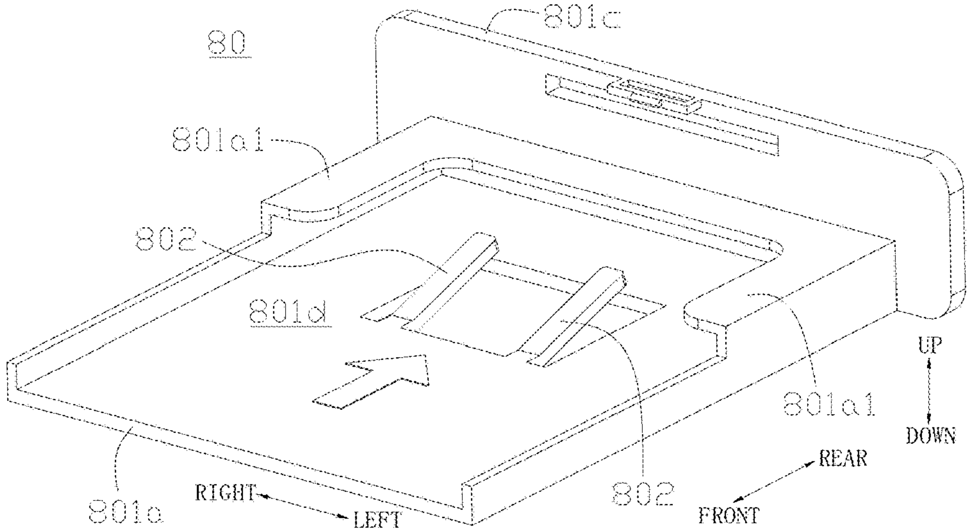

FIG. 147 is a perspective view of a third embodiment of the detachable paper cassette in a portable inkjet photo printer according to the present disclosure.

Figure 148:
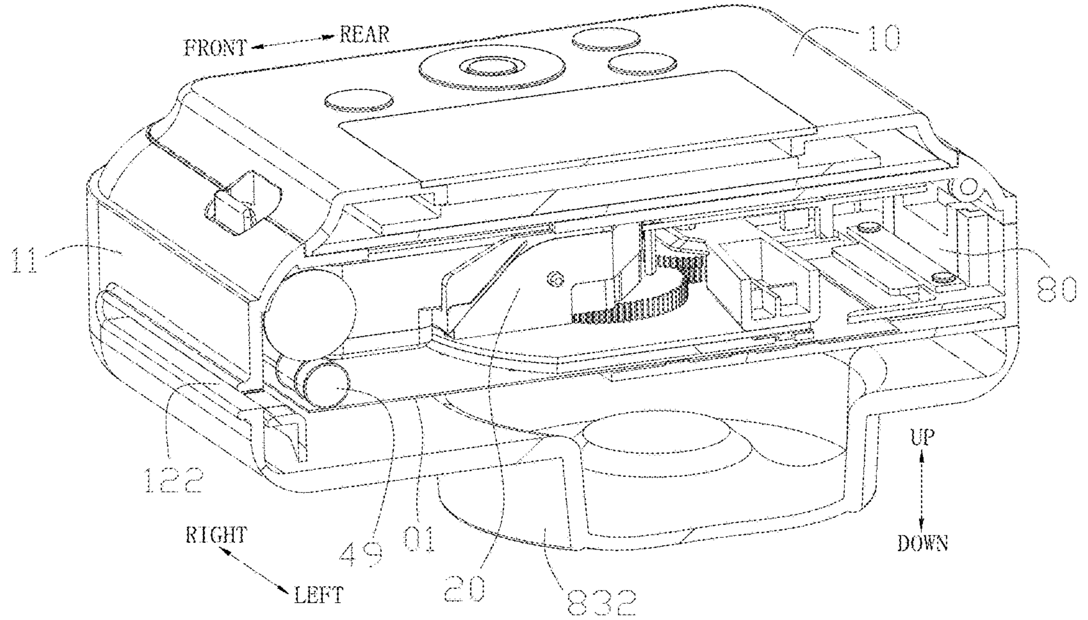

FIG. 148 is a perspective view of a portable inkjet photo printer according to the present disclosure, cut along a cutting plane perpendicular to the left-right direction.

Figure 149A:
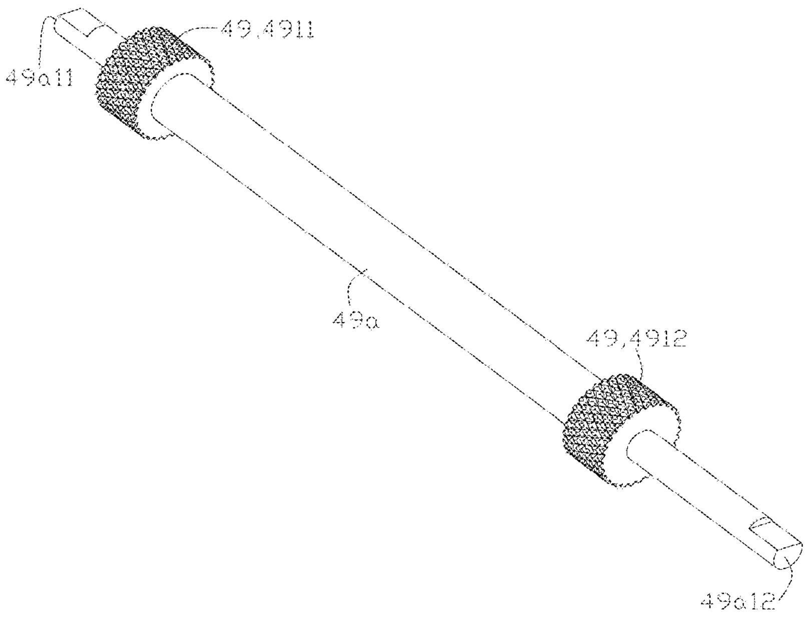
Figure 149B:
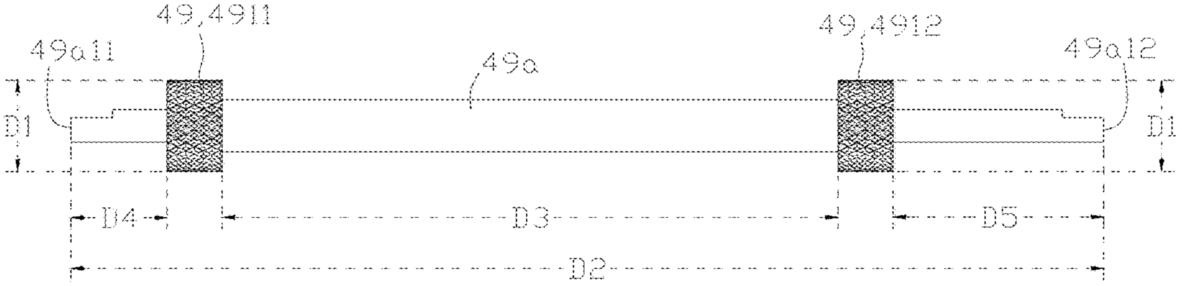

FIG. 149A and FIG. 149B are schematic views of a first embodiment of a pickup roller in a portable inkjet photo printer according to the present disclosure.

Figure 150:
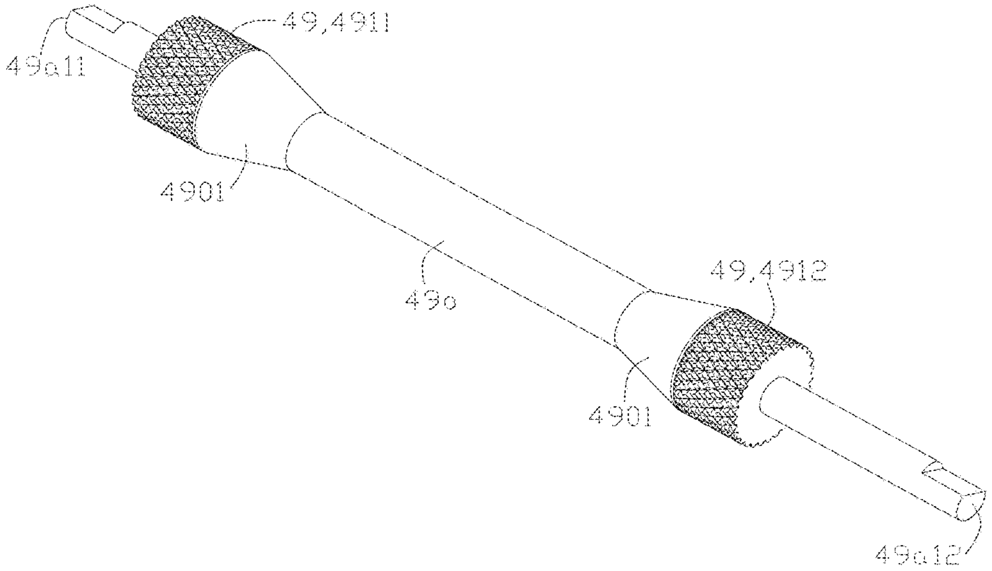

FIG. 150 is a perspective view of a second embodiment of a pickup roller in a portable inkjet photo printer according to the present disclosure.

Figure 151:
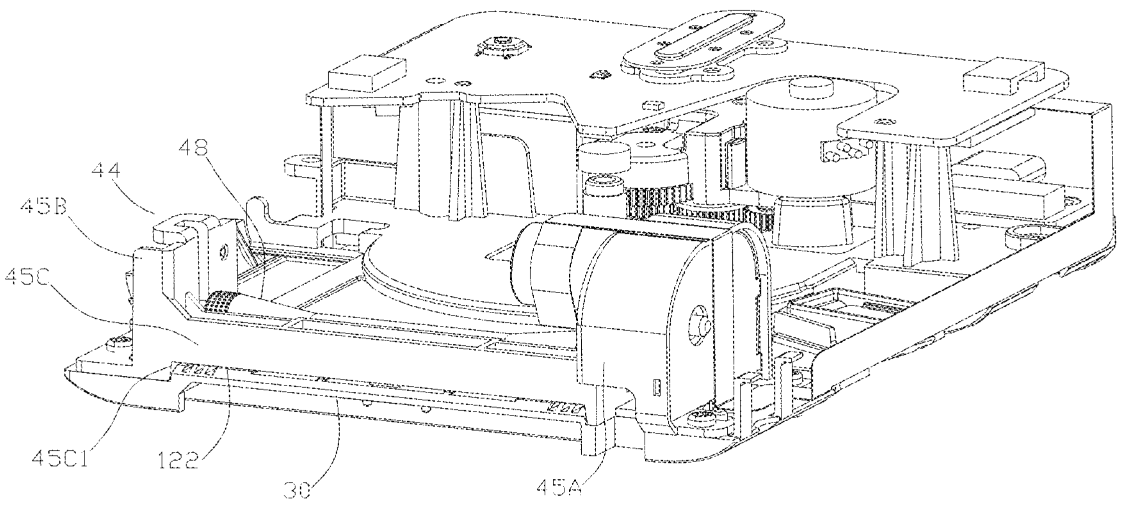

FIG. 151 is a schematic perspective view of a modification of a frame in a portable inkjet photo printer according to the present disclosure.

FIG. 152A, FIG. 152B, FIG. 152C, and FIG. 152D are schematic partial perspective views of the modification of the frame in a portable inkjet photo printer according to the present disclosure.

DETAILED DESCRIPTION OF THE EMBODIMENTS

The technical solutions of the present disclosure will be clearly and completely described below with reference to the accompanying drawings. Obviously, the described embodiments are only a part of the embodiments of the present disclosure, rather than all of the embodiments. Based on the embodiments of the present disclosure, all other embodiments obtained by those of ordinary skill in the art without creative efforts shall fall within the protection scope of the present disclosure.

In the description of the present disclosure, it should be noted that terms such as "center", "upper", "lower", "left", "right", "vertical", "horizontal", "inner", "outer", etc., indicating orientation or positional relationship are based on the orientation or positional relationship shown in the drawings, and are only for the convenience of describing the present disclosure and simplifying the description, rather than indicating or implying that the device or element referred to must have a specific orientation, be constructed and operated in a specific orientation, and therefore cannot be understood as a limitation on the present disclosure. In addition, the terms "first" and "second" are used for descriptive purposes only and cannot be understood as indicating or implying relative importance.

In the description of the present disclosure, it should be noted that unless otherwise clearly specified and limited, terms such as "install", "connected", "connection" should be understood in a broad sense, for example, it may be a fixed connection, a detachable connection, or an integral connection; it may be a mechanical connection or an electrical connection; it may be a direct connection, or an indirect connection through an intermediate medium, or it may be internal communication between two elements. For those of ordinary skill in the art, the specific meanings of the above terms in the present disclosure may be understood according to specific situations.

In addition, the technical features involved in the different embodiments of the present disclosure described below may be combined with each other as long as they do not conflict with each other.

Figure 1:
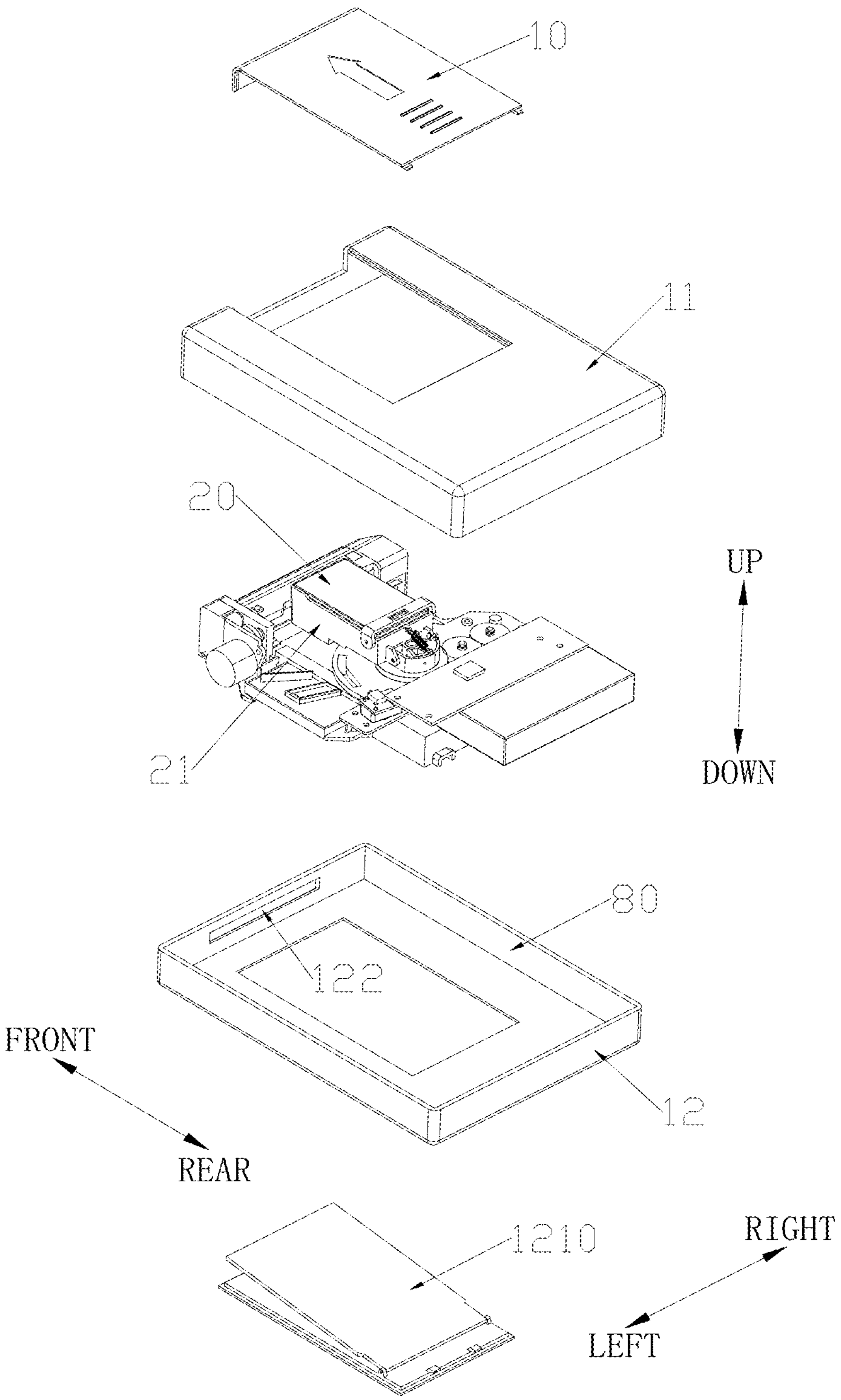
FIG. 1 is an exploded perspective view of a portable inkjet photo printer according to the present disclosure.
Figure 3:
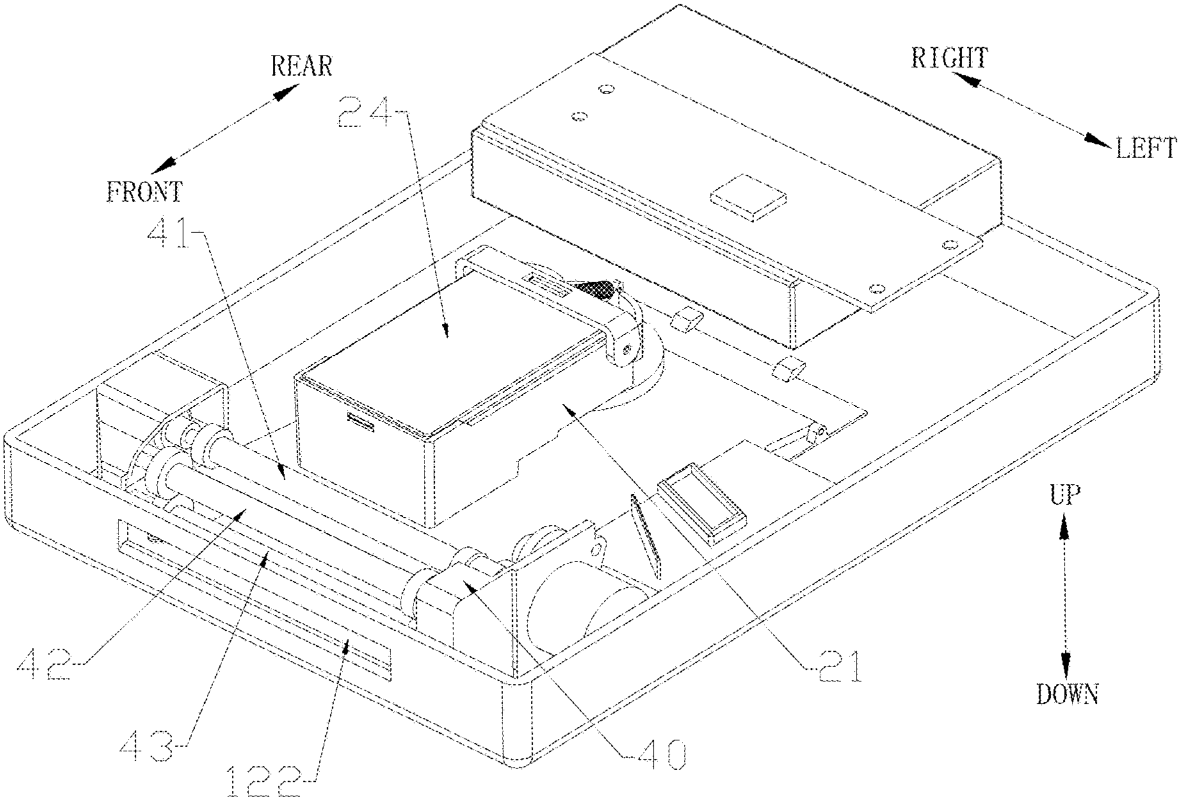
FIG. 3 is a first perspective view of the interior of a portable inkjet photo printer according to the present disclosure.
Figure 5:
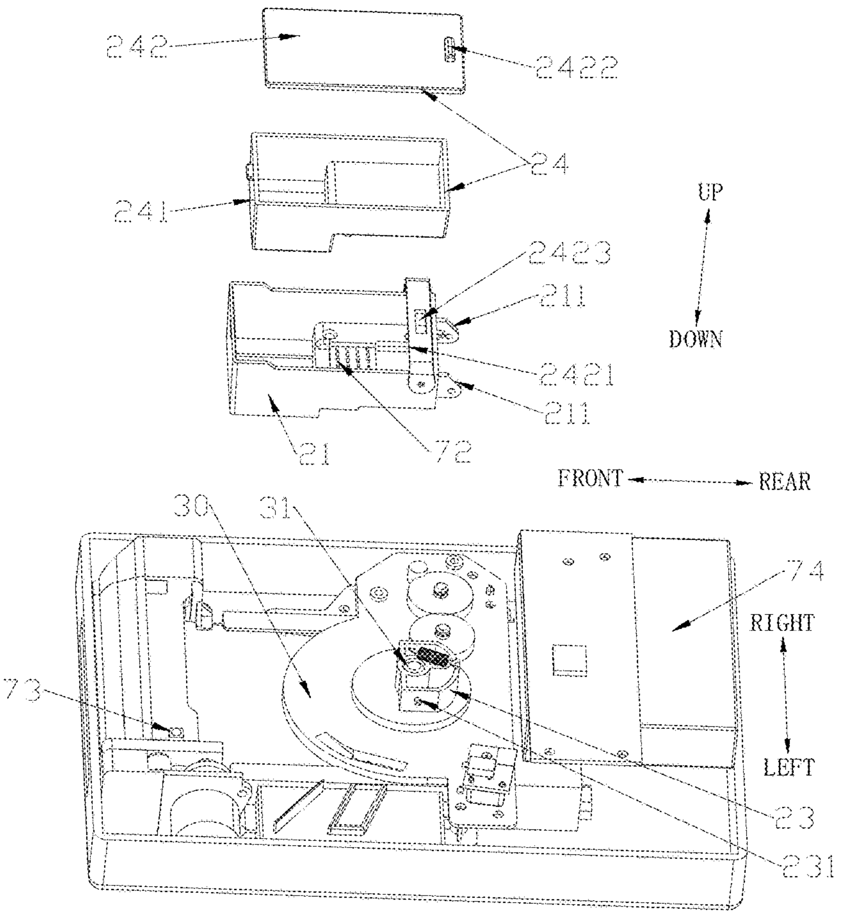
FIG. 5 is an exploded schematic view of a printing carriage and a printing mechanism in a portable inkjet photo printer according to the present disclosure.
Figure 7:
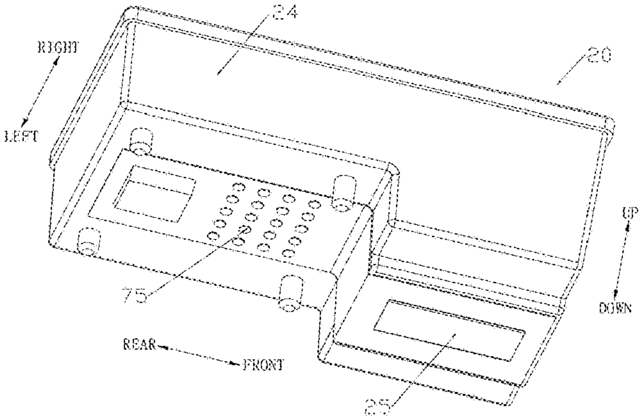
FIG. 7 is a perspective view of a printing mechanism in a portable inkjet photo printer according to the present disclosure.

As shown in FIG. 1, FIG. 3 and FIG. 5, a portable inkjet photo printer (hereinafter referred to as "printer") includes a housing assembly, a paper cassette 80 located inside the housing assembly for storing a printing medium 01, a printing mechanism 20 for ejecting printing fluid (e.g., ink) onto the printing medium in a printing area to form an image, and a paper feeding mechanism 40 for transporting the printing medium toward a paper outlet 122 along a paper feeding direction. The printing mechanism 20 includes an inkjet device 25 (as shown in FIG. 7) for ejecting ink onto the printing medium and an ink storage portion 24 for storing and supplying ink to the inkjet device 25. The inkjet device 25 and the ink storage portion 24 are integrally formed or detachably connected. Specifically, the printing medium is configured to receive ink from the inkjet device 25 to form an image.

The printing mechanism 20 is directly or indirectly disposed on a base 15 described later.

In the present application, taking the state shown in FIG. 1 as a reference, the printer has an up-down direction, a front-rear direction, and a left-right direction as shown in FIG. 1. The up-down direction, the front-rear direction, and the left-right direction intersect each other; preferably, the up-down direction, the front-rear direction, and the left-right direction are perpendicular to each other. Further, the front-rear direction and the left-right direction are parallel to the horizontal direction, and the up-down direction is parallel to the vertical direction.

Figure 68:
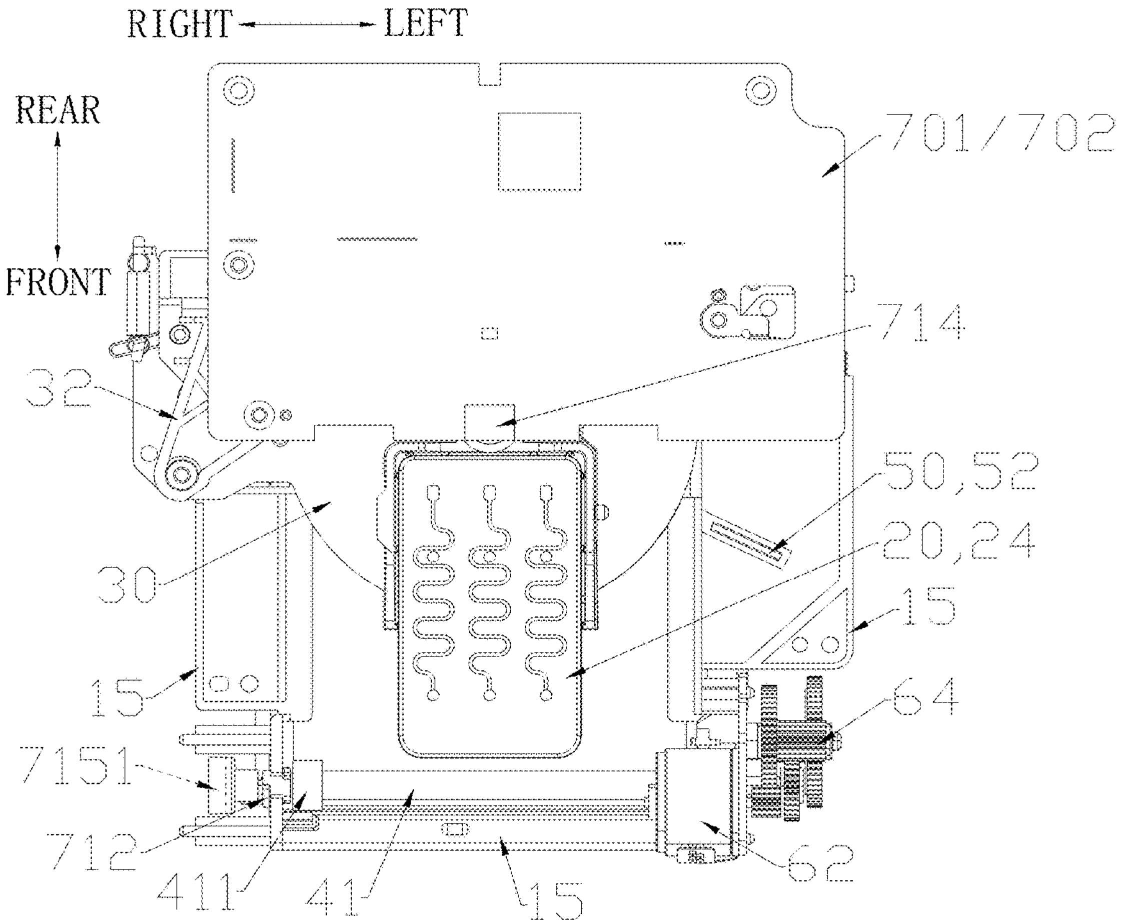
FIG. 68 is a schematic view of a portable inkjet photo printer according to the present disclosure with some components hidden, illustrating internal components and a circuit board.
Figure 69:
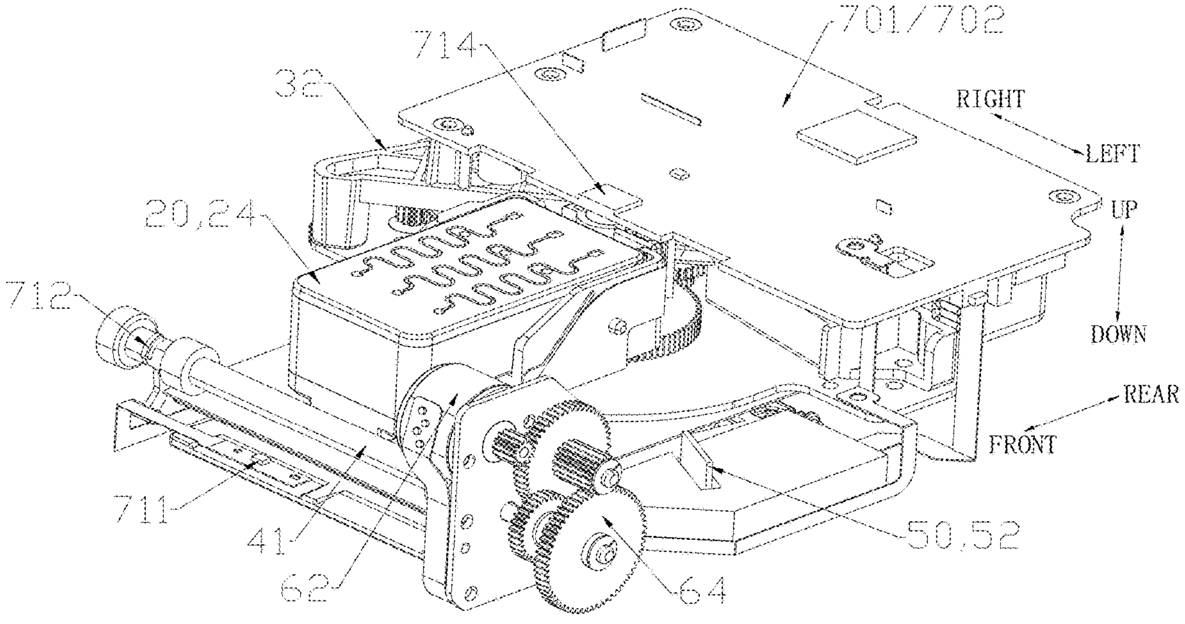
FIG. 69 and FIG. 70 are internal schematic views of a portable inkjet photo printer according to the present disclosure with some components hidden.
Figure 70:
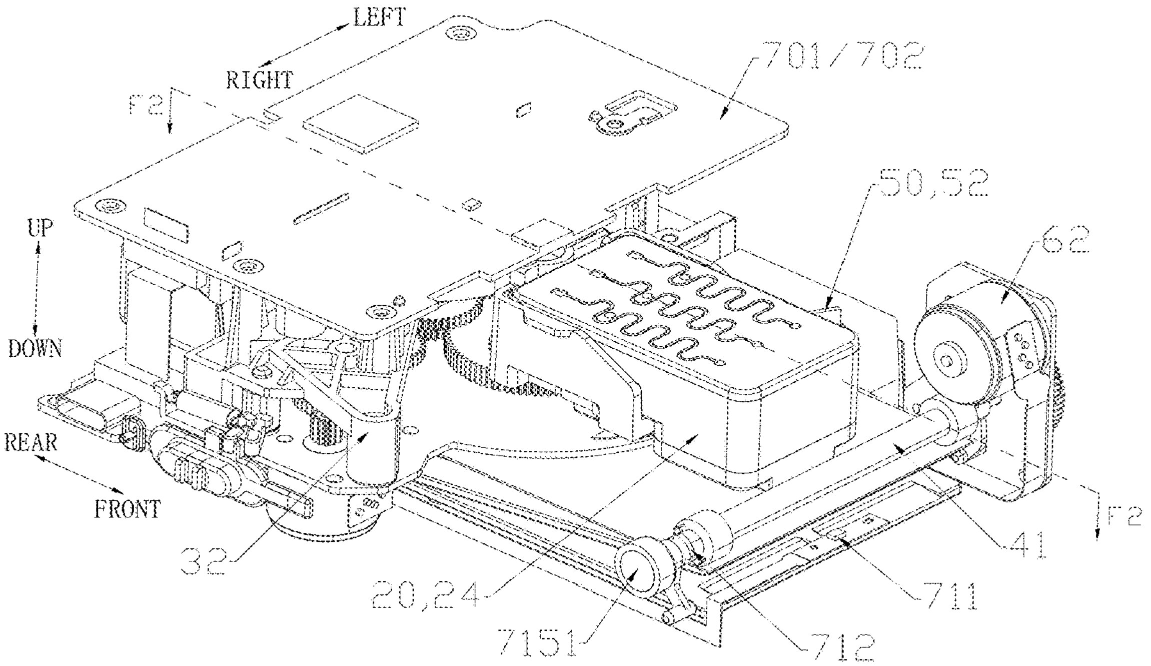
Figure 73:
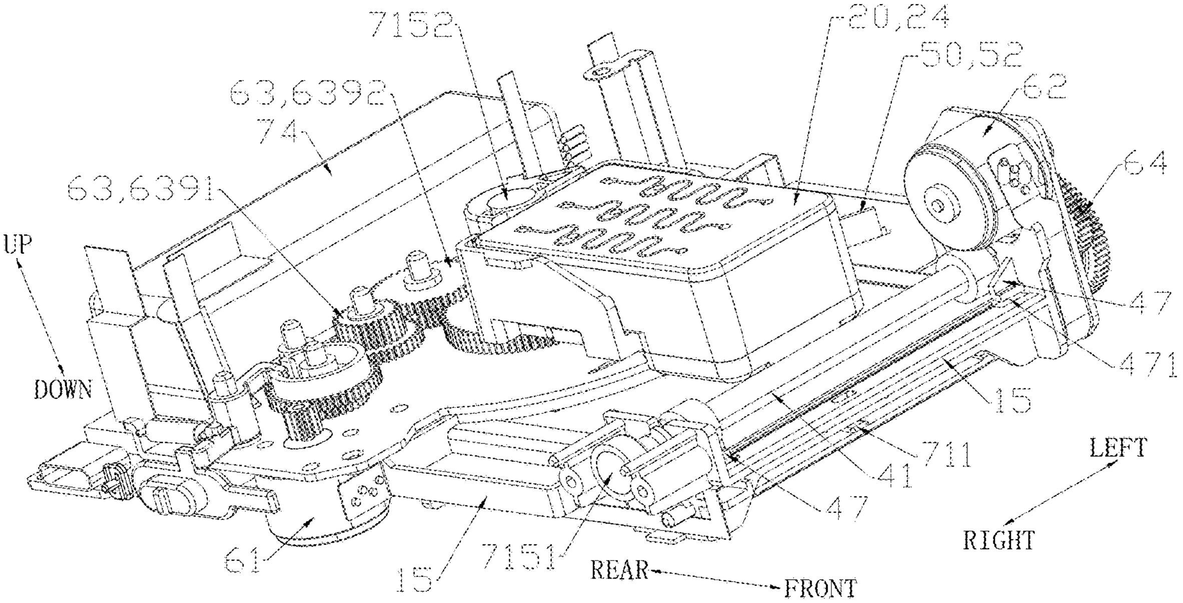

As shown in FIG. 68 and FIG. 73, the printer further includes a base 15 disposed therein, and internal components of the printer are installed on the base 15. Specifically, in some embodiments, the internal components include the printing mechanism 20 described later, a printing support mechanism 30, a cleaning mechanism 50, a power supply module 74, the paper feeding mechanism 40, a driving assembly, a locking mechanism 90, and other components. The internal components are installed using the base 15 as an installation foundation, therefore, when the printer is assembled, the complete internal components may be adapted to different housings, reducing assembly difficulty.

The printer further includes a printing support mechanism 30 for supporting a printing carriage (first bracket) 21/the printing mechanism 20 described later, a power supply module 74 for providing power to the entire printer, and a control module for controlling the operation of the entire printer. In other words, the control module is electrically connected to the power supply module 74, the driving assembly, the paper feeding mechanism, a sensing module, and the printing mechanism, respectively. The printer further includes a driving assembly for driving the printing mechanism 20 to move along a specific trajectory. The specific trajectory is preferably arcuate. The printing carriage 21 drives the printing mechanism 20 to move along a specific arcuate trajectory above the paper cassette 80, thereby completing printing.

In some embodiments, the power supply module 74 may be a cylindrical or rectangular rechargeable battery.

In some embodiments, the charging form of the printer may be wired charging and/or wireless charging. Specifically, when the printer is configured for wired charging, the printer further includes a port substrate. The port substrate is electrically connected to the control module, and the control module is electrically connected to the power supply module 74. The port substrate is provided with a charging interface. The charging interface may be USB Type-A, USB Type-C, etc. When the printer is configured for wireless charging, the printer includes a power receiving coil. The power receiving coil is electrically connected to the power supply module 74. Preferably, the power receiving coil is disposed on a side of the printer power supply module 74, more preferably, the power receiving coil is disposed on a side of the power supply module 74 close to a paper cassette cover plate of the printer described later, or disposed on a side of the power supply module 74 away from the paper outlet 122.

In some embodiments, the specific trajectory may also be in other forms, such as circular, linear, wavy, etc.

The printer may be provided with other wireless transmission module, such as a Bluetooth module and/or WIFI module, which is not specifically limited here. A user downloads an applet or APP of the printer through a mobile terminal, and then connects to the printer through Bluetooth or WIFI. After the control module receives an instruction, it sends an instruction to a second sensor (a part of the sensing module) located at the paper feeding mechanism 40 to start detection. The second sensor (not shown in the figure) starts to detect whether there is a printing medium (such as photo printing paper). When a printing medium is detected, the control module controls the printing mechanism 20 to execute a printing action. When no printing medium is detected, the control module activates the paper feeding mechanism 40 via the driving assembly to transport the printing medium to a second sensor detection position.

When the control module executes a printing instruction, it sends a printing signal to the printing mechanism 20. A first communication module 75 (as shown in FIG. 7) is provided on the printing mechanism 20. The first communication module 75 is configured to receive the printing signal; the first communication module 75 may be metal contacts and/or a processing module provided on the printing mechanism 20. Through the metal contacts and/or the processing module, the printing signal is processed and transmitted to the inkjet device 25, and then the inkjet device 25 controls ink discharge. That is, the first communication module 75 is electrically connected to the inkjet device 25.

During this process, the control module also sends a control instruction to the driving assembly. The driving assembly drives the printing mechanism 20 to move back and forth within a specific trajectory, executing the inkjet action during the movement. Specifically, the movement trajectory of the printing mechanism 20 may be arcuate or circular, which is not specifically limited here. Preferably, in this embodiment, the printing mechanism 20 adopts an arcuate movement trajectory. Since the arcuate swing occupies less space, it can effectively reduce the internal space of the printer, facilitating the miniaturized design of the printer.

At the same time as inkjet printing, the driving assembly drives the paper feeding mechanism 40 to transport the printing medium along the paper feeding direction until printing is completed. Preferably, the paper feeding direction is a forward direction.

Figure 76A:
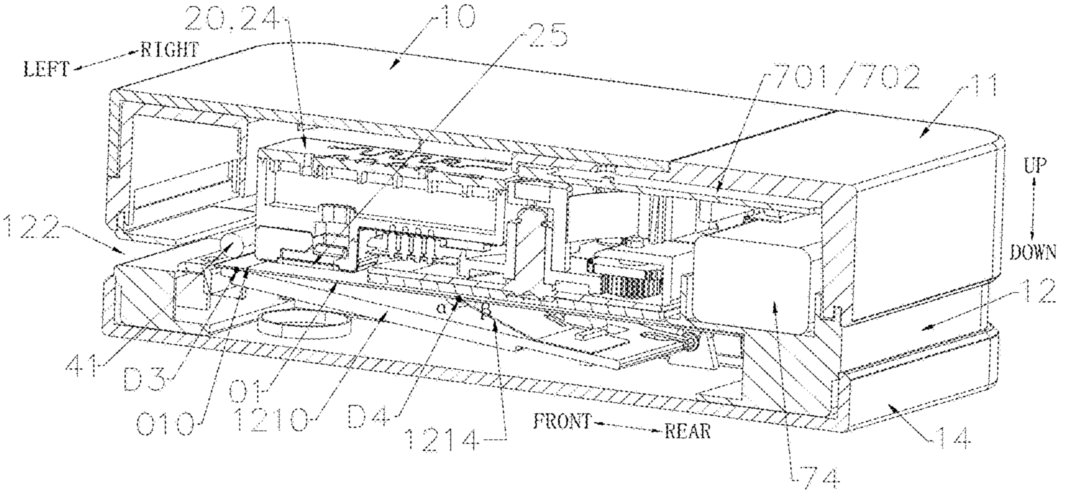
FIG. 76A is a schematic view of a portable inkjet photo printer according to the present disclosure, taken along line F2-F2 in FIG. 70, observed from right to left.

In this embodiment, the printing medium may be photo printing paper (photo paper). The photo paper has a printing area (image forming area) and a blank area. The printing area is the working area, and the blank area is the non-working area. Further, the form of the photo paper includes adhesive-backed photo paper and tearable photo paper. Among them, as shown in FIG. 76A, the tearable photo paper can use a die-cut line to form a tear line 010, facilitating the user to tear off the blank area of the photo paper. The tearable photo paper is sequentially provided with a back adhesive (not shown) and a backing layer (not shown) on the other side of the printing area. The tear line is provided on the tearable photo paper, facilitating tearing off the printing area and the back adhesive of the tearable photo paper from the backing layer for pasting. The thickness of the tearable photo paper is greater than the thickness of the backing layer. Preferably, the tear line 010 extends along the left-right direction. In other words, the dimension of the tear line 010 is the same as or substantially consistent with the width of the printing medium. One side of the tear line 010 is the printing area, and the other side of the tear line 010 is the blank area. The area/length of the blank area is smaller than the printing area. The size parameters of the photo paper are: width size is 49-55 mm, length size is 85-92 mm, preferably, width is 52 mm, length is 90 mm, i.e., 52×90 mm (before tearing off the blank area); wherein, the length size parameter after tearing off the blank area is 75-82 mm, preferably, the length size parameter after tearing off the blank area is 80 mm, i.e., 52×80 mm; the size of the image on the photo paper is the printing size, the width size of the printing size is 42-46 mm, the length size of the printing size is 55-62 mm, preferably, the printing size is 45×60 mm. It should be noted that the state when the printing medium is installed in the printer prevails, the dimension in the front-rear direction is the length, and the dimension in the left-right direction is the width; even if the photo paper does not have a back adhesive layer, the tear line 010 may also be provided.

In some embodiments, the printing medium may also be label paper, wherein the label paper is provided as a roll, or the printing medium may also be tattoo transfer paper.

Figure 102:
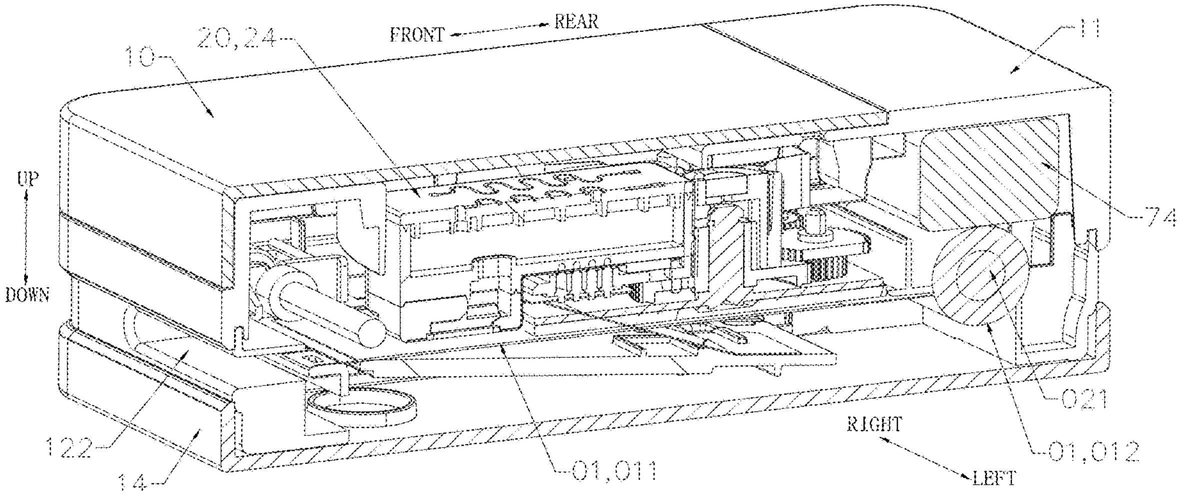
Figure 103:
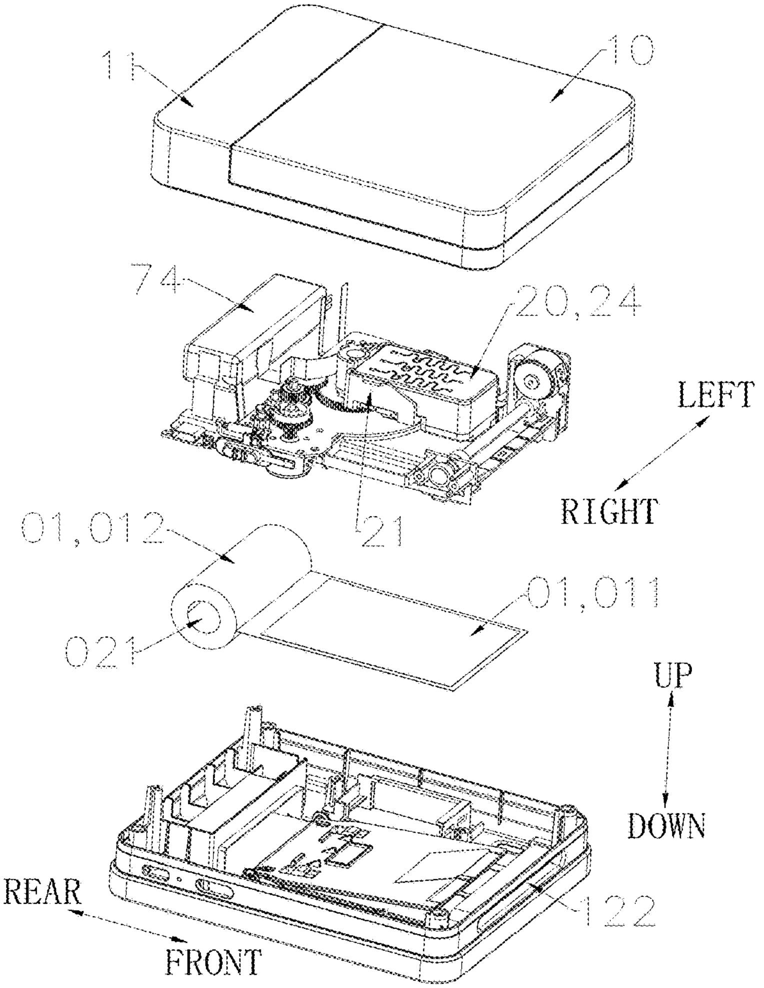

In some embodiments, as shown in FIG. 102 and FIG. 103, the printer includes a printing medium assembly. The printing medium assembly includes a printing medium 01. The printing medium 01 is set in a roll shape. Along the up-down direction, at least a part of the printing medium 01 is located below the internal components. Along the front-rear direction, the size of the printer may be shortened, which is conducive to the miniaturized design of the printer, making the printer more convenient to carry. Further, along the up-down direction, at least a part of the printing medium 01 is located below the printing mechanism 20 and the printing carriage 21. Specifically, the printing medium 01 includes an extension portion 011 and a roll portion 012. The extension portion 011 extends from the roll portion 012 along the paper feeding direction. Along the front-rear direction, a part of the extension portion 011 is located in front of the roll portion 012. Along the up-down direction, at least a part of the extension portion 011 is located below the printing area/printing mechanism 20. In other words, along the up-down direction, at least a part of the extension portion 011 overlaps with the printing area/printing mechanism 20. Along the up-down direction, at least a part of the roll portion 012 is located below the power supply module 74. In other words, along the up-down direction, at least a part of the roll portion 012 overlaps with the power supply module 74. The printing medium 01 is set in a roll shape, which can also facilitate user carrying and replacement.

In some embodiments, at least a part of the roll portion 012 is located below the printing mechanism 20.

In some embodiments, as shown in FIG. 102 and FIG. 103, the printing medium assembly further includes a paper roller 021. The paper roller 021 is configured to cooperate with the roll portion 012. The paper roller 021 is also configured to combine with the printer to position the printing medium 01. Along the up-down direction, at least a part of the paper roller 021 overlaps with the power supply module 74.

In some embodiments, the printer further includes a guide portion disposed in the paper cassette 80. The guide portion is configured to guide the extension portion 011, so that the extension portion 011 can be smoothly transported from the roll portion 012 along the paper feeding direction to the paper feeding mechanism 40/paper outlet 122. Preferably, the number of guide portions is two, and the two guide portions are respectively located on the left and right sides of the extension portion 011.

In some embodiments, the printing medium assembly further includes an installation housing. The installation housing is detachable relative to the printing mechanism 20/housing assembly. After the printing medium 01 is installed in the installation housing, it is then installed into the printer together with the installation housing. When the printing medium 01 needs to be replaced, the installation housing may be taken out to replace the printing medium 01.

In some embodiments, when the printing medium 01 is set in a roll shape, a die-cut line forming a tear line may be provided on the printing medium 01, and the user can tear off the printing medium 01 along the die-cut line for use; alternatively, a cutting portion may be provided at the paper outlet 122. The cutting portion is set as a jagged shape with multiple teeth, and the user can tear off the printing medium 01 along the cutting portion.

Figure 2A:
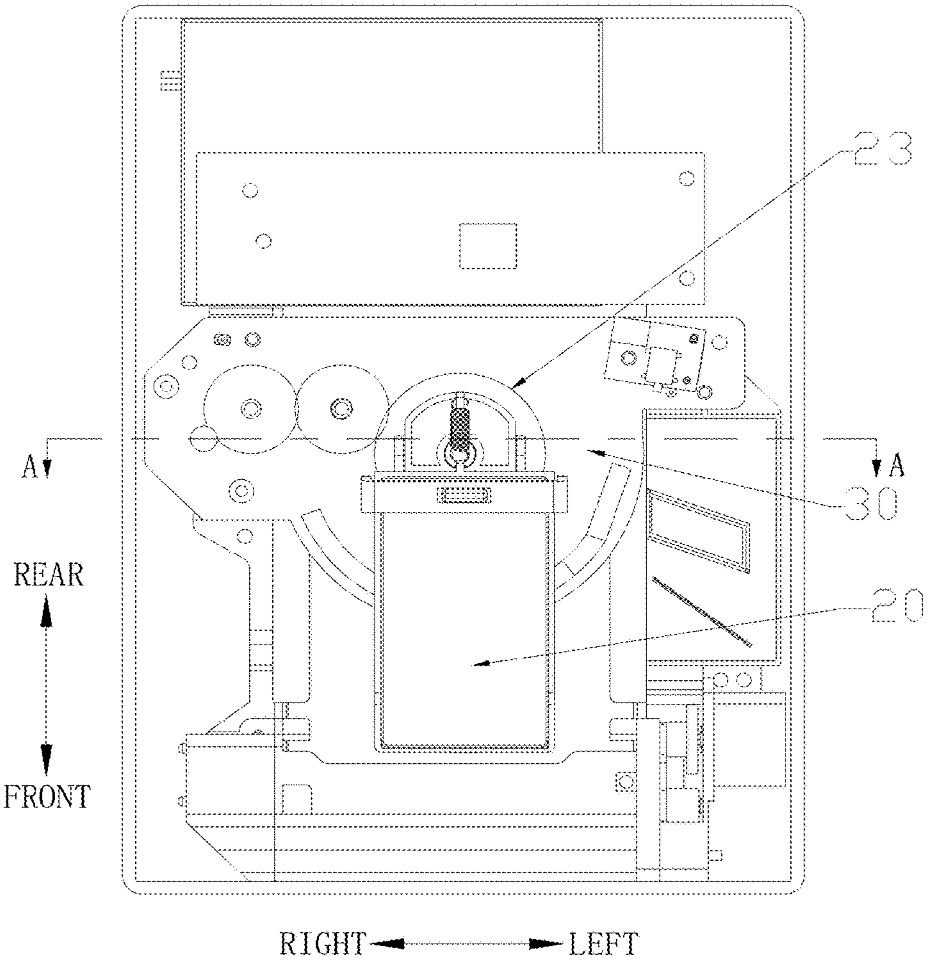
FIG. 2A is a schematic top view of the interior of a portable inkjet photo printer according to the present disclosure.
Figure 2B:
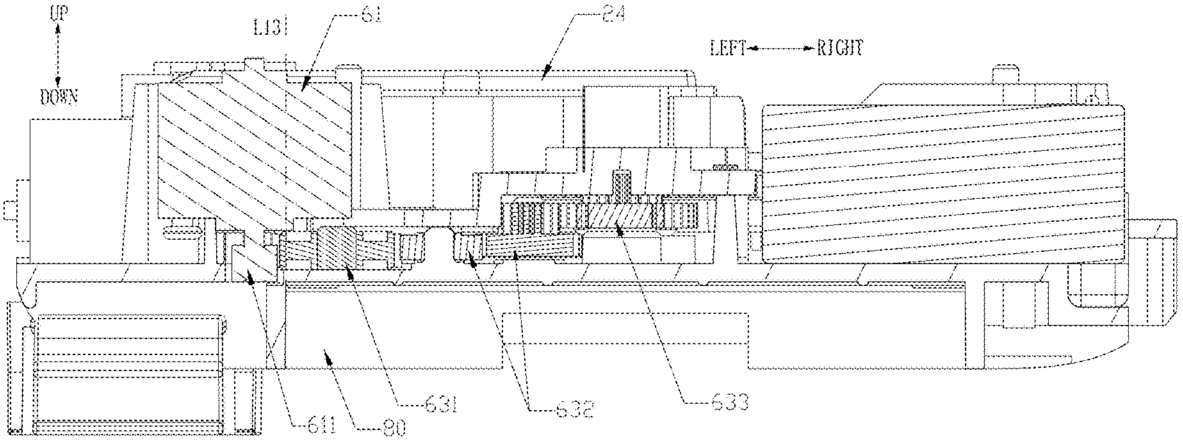
FIG. 2B is a cross-sectional view of a portable inkjet photo printer according to the present disclosure observed from right to left.

In some embodiments, along the up-down direction, at least a part of a first motor 61 described below overlaps with the paper cassette 80, and the first motor 61 is located above the paper cassette 80. As shown in FIG. 2B, along the leftmost side of the paper cassette 80, a dashed line L13 extends upward, and the dashed line L13 passes through the first motor 61. With such a configuration, the structure of the printer can be made more compact, which is conducive to reducing the overall size of the printer.

[Printing Mechanism]

Figure 4:
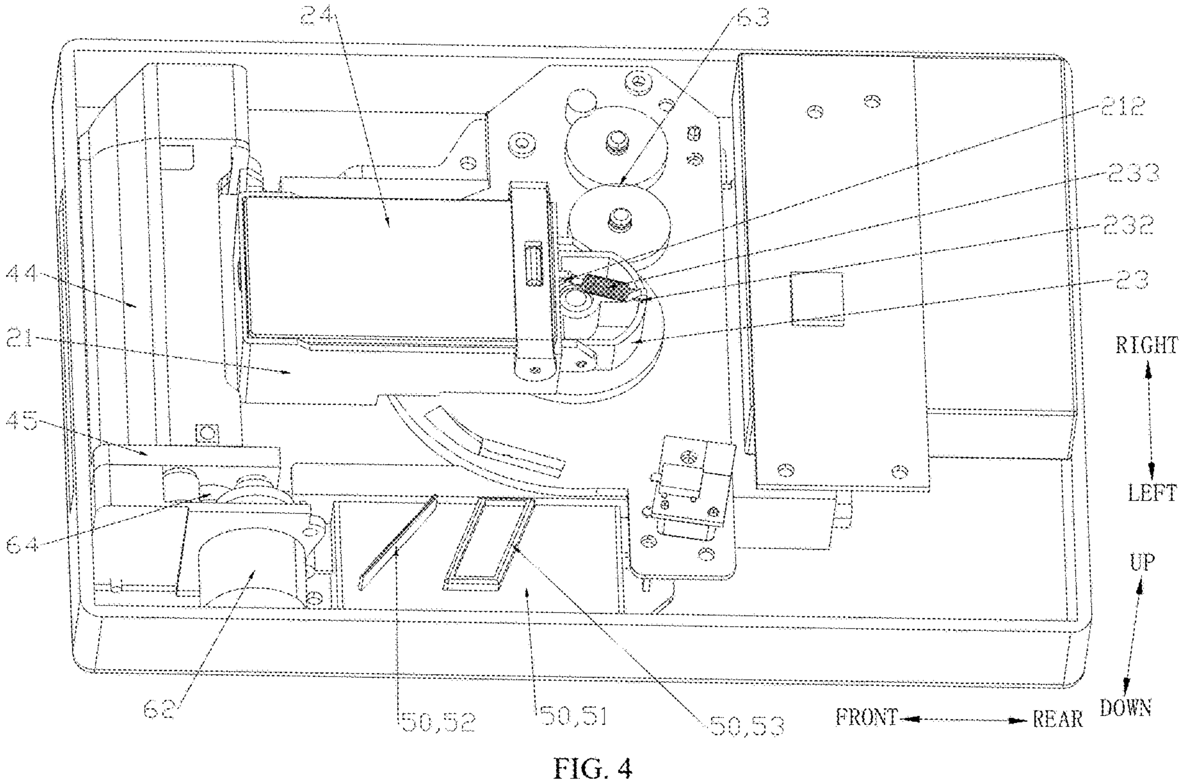
FIG. 4 is second perspective view of the interior of a portable inkjet photo printer according to the present disclosure.

As shown in FIG. 3 to FIG. 5, the printing mechanism 20 is installed on the printing carriage 21. The printing mechanism 20 includes an inkjet device 25 (as shown in FIG. 7) and an ink storage portion 24. The control module is respectively connected to the power supply module 74, the first communication module 75, and the driving assembly. The control module is configured to control the printing mechanism 20 to eject ink.

The ink storage portion 24 is fixedly connected or detachably connected to the printing carriage 21. The inkjet device 25 is fixedly connected or detachably connected to the ink storage portion 24. The inkjet device 25 communicates with the ink in the ink storage portion 24. In other words, the inkjet device 25 and the printing carriage 21 are fixedly connected or detachably connected. Specifically, the ink storage portion 24 includes a shell and an ink storage cavity formed by the shell. The ink storage cavity is configured to contain ink, and the inkjet device 25 communicates with the ink storage cavity.

In some embodiments, the ink storage portion 24 and the inkjet device 25 are fixedly connected. The combined body of the ink storage portion 24 and the inkjet device 25 is detachably installed on the printing carriage 21. In other words, the inkjet device 25 is fixedly connected to the shell. At this time, the combined body of the ink storage portion 24 and the inkjet device 25 is regarded as an ink cartridge with a print head (hereinafter referred to as the ink cartridge). The ink cartridge with a print head may be detachably installed on the printing carriage 21 via a securing mechanism described later (equivalent to a blocking portion 2421 described later). When the ink amount in the ink storage portion 24 is insufficient, the ink storage portion 24 and the inkjet device 25 may be replaced together. Every replacement can use a new print head, which is conducive to ensuring good printing quality.

In some embodiments, the dimension (length) of the ink cartridge in the front-rear direction is 40-50 mm. The dimension (width) of the ink cartridge in the left-right direction is 22-30 mm. The dimension of the ink cartridge in the up-down direction is 13-20 mm. The ratio of ink cartridge height to length is in the range of 25%-40%. The ratio of ink cartridge width to length is in the range of 35%-60%. Preferably, the ratio of ink cartridge height to length is in the range of 25%-35%. The ratio of ink cartridge width to length is in the range of 40%-60%. With such a configuration, when the ink cartridge is adapted to the printer, the overall size of the printer may be set more compactly, reducing the overall size of the printer and improving the portability of the printer.

Existing inkjet printers are limited by the size of the ink cartridge in the up-down direction, making it difficult to reduce the size of the printer in the up-down direction. To improve the portability of the printer, specifically, the dimension of the printer in the up-down direction is set to 27-42 mm, and the dimension of the ink cartridge in the up-down direction is set to 13-20 mm. The ratio of the dimension of the ink cartridge in the up-down direction to the dimension of the printer in the up-down direction is not less than 40%. Preferably, the ratio of the dimension of the ink cartridge in the up-down direction to the dimension of the printer in the up-down direction is 40%-70%. For example, the dimension of the printer in the up-down direction is set to 27-35 mm, and the dimension of the ink cartridge in the up-down direction is set to 15-20 mm. More preferably, the ratio of the dimension of the ink cartridge in the up-down direction to the dimension of the printer in the up-down direction is in the range of 45%-60%.

In some embodiments, the inkjet device 25 is fixedly connected to the printing carriage 21, and the ink storage portion 24 is detachably installed on the printing carriage 21. At this time, the ink storage portion 24 may be regarded as an ink cartridge (without a print head). When the ink amount in the ink storage portion 24 is insufficient, only the ink storage portion 24 needs to be replaced. The inkjet device 25 does not need to be replaced together with the ink storage portion 24. This is beneficial for reducing the user's printing cost.

Specifically, as described above, the printing mechanism 20 may be an ink cartridge with a print head, or a combination of an ink cartridge (without a print head) and a printing carriage 21 with a print head, or a combination of an ink bag and a printing carriage 21 with a print head.

In this embodiment, the ink storage portion 24 includes an ink storage portion body 241 and an upper cover 242 disposed above the ink storage portion body 241. Opening the upper cover 242 allows refilling of printing fluid into the ink storage portion body 241. The ink storage portion 24/ink storage portion body 241 is provided with a plurality of ink partition areas (ink storage chambers) therein for containing inks of multiple colors. Preferably, in this embodiment, three ink partition areas (ink storage chambers) are provided in the ink storage portion 24. The three ink storage chambers respectively contain inks of three different colors. The inkjet device 25 communicates with the three ink storage chambers respectively. The ink storage portion 24 may be an ink cartridge or an ink bag. In other words, the ink storage portion 24 may be set as a rigid cavity with unchangeable volume or a deformable cavity with changeable volume.

In some embodiments, the shell of the ink storage portion 24 includes an ink storage portion body 241 and an upper cover 242.

Figure 17:
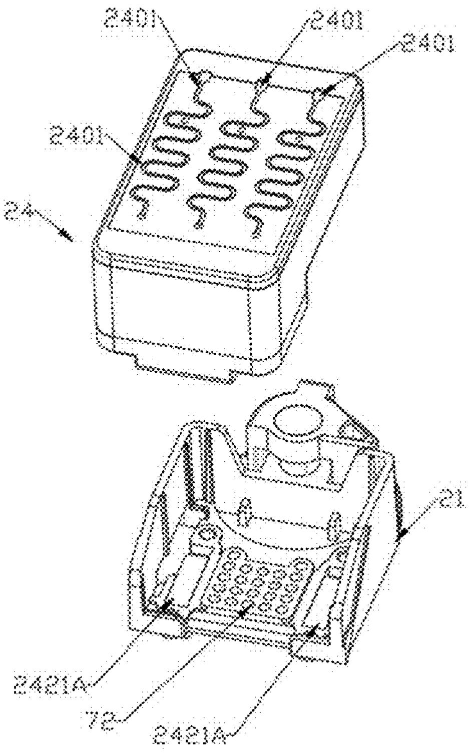

In this embodiment, as shown in FIG. 17, the ink storage portion 24 further includes an air guide structure 2401 disposed on the upper side of the shell. The interior of the ink storage chamber communicates with the atmosphere through the air guide structure 2401. Preferably, each ink storage chamber is connected to a corresponding air guide structure 2401. Optionally, a part of the air guide structure 2401 is configured as a groove structure formed on the surface of the shell, and another part is a sealing film covering the groove structure. Optionally, at least a part of the air guide structure 2401 may also be configured as a semi-permeable membrane (gas permeable, liquid impermeable).

In some embodiments, as shown in FIG. 49-FIG. 54C, the ink storage chamber 244 in the ink storage portion 24 includes a first chamber 244*a*, a second chamber 244*b*, and a third chamber 244*c*. The first chamber 244*a*, the second chamber 244*b*, and the third chamber 244*c* are respectively configured to contain inks of different colors, such as Cyan, Magenta, and Yellow. As another example, the ink storage chamber 244 may also be provided with a fourth chamber (not shown in the figure) for containing Black ink. The ink storage chamber 244 has a primary ink outlet 2441. Ink in the ink storage chamber 244 flows out through the primary ink outlet 2441. Further, the primary ink outlet 2441 includes a first primary ink outlet 2441*a* disposed in the first chamber 244*a*, a second primary ink outlet 2441*b* disposed in the second chamber 244*b*, and a third primary ink outlet 2441*c* disposed in the third chamber 244*c*.

Further, the printing mechanism 20 also includes an inkjet device installation portion 243 disposed below the ink storage portion body 241. The inkjet device installation portion 243 is separately formed from the ink storage portion body 241. The inkjet device installation portion 243 is configured to install the inkjet device 25. When the inkjet device installation portion 243 is combined with the ink storage portion body 241, an ink cavity 245 is formed therebetween. The ink cavity 245 communicates with the ink storage chamber 244 through the primary ink outlet 2441. In other words, ink in the ink storage chamber 244 flows into the ink cavity 245 through the primary ink outlet 2441. Preferably, corresponding to the primary ink outlet 2441, the ink cavity 245 includes a first cavity 245*a*, a second cavity 245*b*, and a third cavity 245*c*. The first cavity 245*a*, the second cavity 245*b*, and the third cavity 245*c* are separated from each other to avoid color mixing of inks of different colors. The inkjet device installation portion 243 has a plurality of secondary ink outlets 2431 facing downward. The secondary ink outlets 2431 are configured to communicate the inside and outside of the ink cavity 245. Preferably, the secondary ink outlets 2431 include a first secondary ink outlet 2431*a* disposed in the first cavity 245*a*, a second secondary ink outlet 2431*b* disposed in the second cavity 245*b*, and a third secondary ink outlet 2431*c* disposed in the third cavity 245*c*.

Further, the inkjet device 25 is disposed on the inkjet device installation portion 243. The inkjet device 25 is provided with nozzles 251 opposite to the secondary ink outlets 2431. Further, the nozzles 251 include a first nozzle 251*a*, a second nozzle 251*b*, and a third nozzle 251*c* which are separated from each other. Specifically, the inkjet device 25 and the nozzles 251 will be introduced in the inkjet device section described later.

In some embodiments, a sealing member is further disposed on the nozzle 251. The sealing member is preferably a pressure-sensitive adhesive. The pressure-sensitive adhesive has both viscosity and elasticity. Specifically, having elasticity can protect the nozzle 251, and having viscosity can prevent the flow of ink adhered to the nozzle 251. The pressure-sensitive adhesive is also used for sealing and moisturizing the nozzle 251.

In some embodiments, the printer further includes a sealing protection member 26. When the printer is not used for a long time after use/sleeps for a long time, or when the usage interval is long, to avoid ink drying at the nozzle 251 of the inkjet device 25 in the printer, the ink storage portion 24 may be removed from the printer and combined with the sealing protection member 26 to seal and protect the nozzle 251, and also to protect the ink storage portion 24.

Next, some embodiments of the sealing protection member 26 will be introduced, specifically as follows.

Sealing Protection Member Embodiment 1

Figure 97:
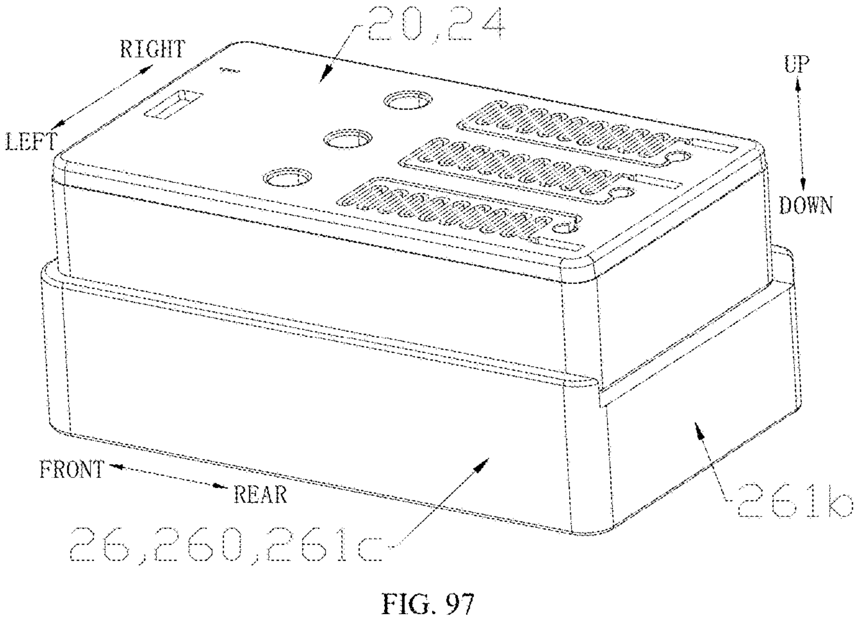
FIG. 97 is a schematic view of a first embodiment of a sealing protection member in a portable inkjet photo printer according to the present disclosure, showing the sealing protection member combined with an ink storage portion.
Figure 98:
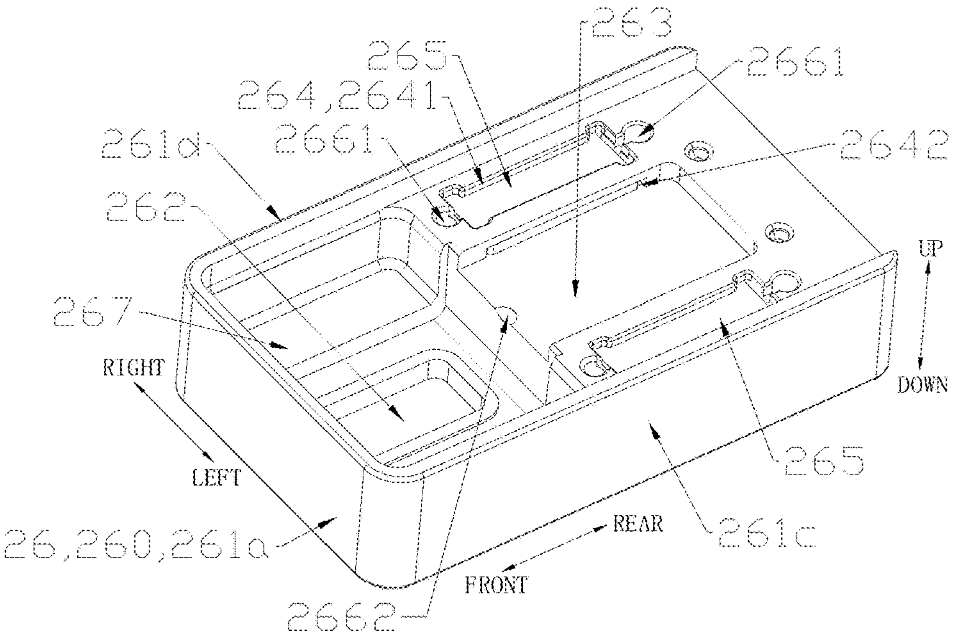
FIG. 98 is a schematic view of the first embodiment of the sealing protection member in a portable inkjet photo printer according to the present disclosure.

As shown in FIG. 97 and FIG. 98, the sealing protection member 26 is configured to combine with the ink storage portion 24 to seal and protect the nozzle 251 and protect the ink storage portion 24.

In some embodiments, at least a part of the sealing protection member 26 is made of an elastic material. In the state combined with the ink storage portion 24, when the ink storage portion 24 falls or receives an external impact, the sealing protection member 26 undergoes elastic deformation (such as the part sealing the nozzle 251) to reduce the impact force, thereby better protecting the nozzle 251/ink storage portion 24.

In some embodiments, the sealing protection member 26 is entirely composed of an elastic member. The elastic member may be silicone, rubber, sponge, etc. Preferably, the sealing protection member 26 is made of silicone.

In some embodiments, the sealing protection member 26 abuts against at least two opposite side walls of the ink storage portion 24 to form a clamping in the left-right direction and/or the front-rear direction. Preferably, when the sealing protection member 26 is combined with the ink storage portion 24, along the left-right direction/front-rear direction, the nozzle 251 is located between clamping surfaces formed by the abutment of the sealing protection member 26 and two opposite side walls of the ink storage portion 24, so as to make the combination of the sealing protection member 26 and the ink storage portion 24 firm and tight.

In some embodiments, the sealing protection member 26 includes a sealing protection member main body 260, and a first wall 261*a*, a second wall 261*b*, a third wall 261*c*, and a fourth wall 261*d* connected to the sealing protection member main body 260. Along the front-rear direction, the first wall 261*a* and the second wall 261*b* are opposite. Along the left-right direction, the third wall 261*c* and the fourth wall 261*d* are opposite.

In some embodiments, along the left-right direction, the third wall 261*c* and the fourth wall 261*d* form a clamp on a left side wall 24103 and a right side wall 24104 of the ink storage portion 24.

Figure 16:
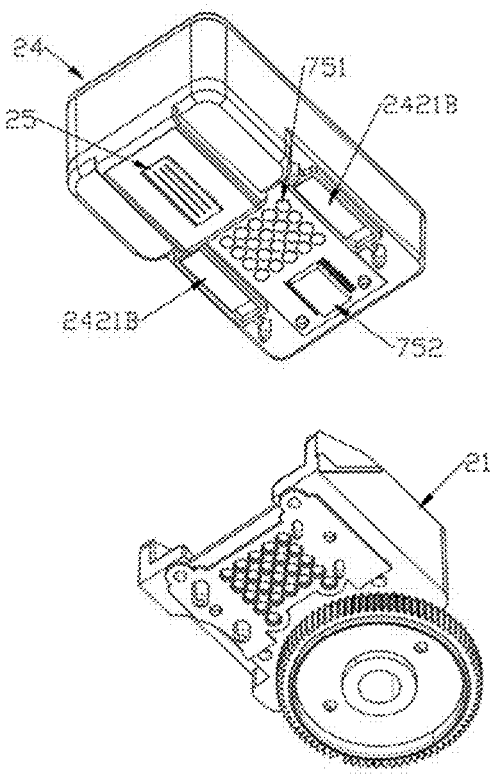
FIG. 16 and FIG. 17 are exploded schematic views of an embodiment of a printing mechanism in a portable inkjet photo printer according to the present disclosure.

In some embodiments, the sealing protection member 26 further includes a second accommodating space 267, a sealing space 262, and a clearance groove 263 formed on the sealing protection member main body 260. Along the up-down direction, the sealing space 262 is located below the second accommodating space 267 and the clearance groove 263. Along the front-rear direction, the second accommodating space 267 and the sealing space 262 are located in front of the clearance groove 263. The second accommodating space 267 is configured to accommodate at least a part of the ink storage portion 24. The sealing space 262 is configured to accommodate the nozzle 251 and seal the nozzle 251. The clearance groove 263 is configured to avoid the first communication module 75 (as shown in FIG. 16), specifically metal contacts 751 and/or memory 752 in the first communication module 75. On the one hand, along the up-down direction, the metal contacts 751 face downward, so the metal contacts 751 are not easily damaged when the ink storage portion 24 falls. On the other hand, the clearance groove 263 can prevent the metal contacts 751 from being damaged due to long-term compression.

In some embodiments, the sealing protection member 26 further includes a magnetic member 265 and a magnetic member installation portion 264. The magnetic member installation portion 264 is configured to accommodate the magnetic member 265. The magnetic member 265 is configured to cooperate with a second securing member 2421B (as shown in FIG. 16) disposed in the ink storage portion 24, preventing the sealing protection member 26 from detaching or shifting from the ink storage portion 24 and reducing the sealing performance of the nozzle 251, so that the ink storage portion 24 and the sealing protection member 26 are combined more tightly and firmly, thereby improving the sealing performance of the nozzle 251.

In some embodiments, along the left-right direction, the magnetic member installation portion 264 is located to the left and/or right of the clearance groove 263. The magnetic member installation portion 264 has an upper opening 2641 facing upward and a side opening 2642 facing left and/or right. The magnetic member 265 may be installed into the magnetic member installation portion 264 from the upper opening 2641, or the magnetic member 265 may also be installed into the magnetic member installation portion 264 from the side opening 2642.

In some embodiments, the magnetic member installation portion 264 is configured as a groove.

In some embodiments, the sealing protection member 26 further includes an air guide portion 2661. The air guide portion 2661 is configured to connect with the magnetic member installation portion 264, making it easier when the magnetic member 265 fits with the magnetic member installation portion 264. The number of air guide portions 2661 is one or more.

In some embodiments, an air guide component 2662 is also disposed between the sealing space 262 and the clearance groove 263. The air guide component 2662 communicates with the second accommodating space 267 and/or the sealing space 262. For example, the air guide component 2662 is an air guide groove connecting the sealing space 262 and the clearance groove 263. Specifically, the extension direction of the air guide groove is parallel to the up-down direction, or the extension direction of the air guide groove intersects with the up-down direction.

In some embodiments, the sealing protection member 26 may not be provided with the magnetic member 265. That is, the magnetic member installation portion 264 may be configured to avoid the second securing member 2421B in the ink storage portion 24, so that the ink storage portion 24 and the sealing protection member 26 are combined more stably.

Sealing Protection Member Embodiment 2

Figure 99:
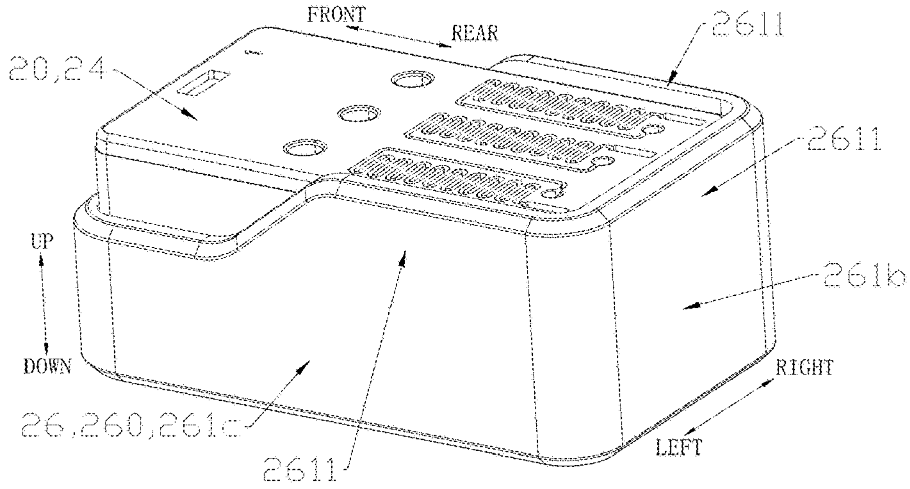
FIG. 99 is a schematic view of a second embodiment of the sealing protection member in a portable inkjet photo printer according to the present disclosure, showing the sealing protection member combined with an ink storage portion.

As shown in FIG. 99, different from Embodiment 1, the contact range between the sealing protection member 26 and the ink storage portion 24 is larger. Specifically, the sealing protection member 26 further includes an extension portion 2611 extending from the second wall 261*b*, the third wall 261*c*, and the fourth wall 261*d*. Along the front-rear direction, the extension portion 2611 is located behind the first wall 261*a*. Along the up-down direction, the extension portion 2611 is located above the second wall 261*b*, the third wall 261*c*, and the fourth wall 261*d*. The extension portion 2611 increases the contact area between the sealing protection member 26 and the ink storage portion 24. Overall, it can ensure the balance of friction force between the ink storage portion 24 and the sealing protection member 26, thereby avoiding the situation where at least a part of the sealing protection member 26 falls off from the ink storage portion 24 due to the small contact area between the rear side of the ink storage portion 24 and the sealing protection member 26.

Modification of Sealing Protection Member Embodiment 2

Figure 100:
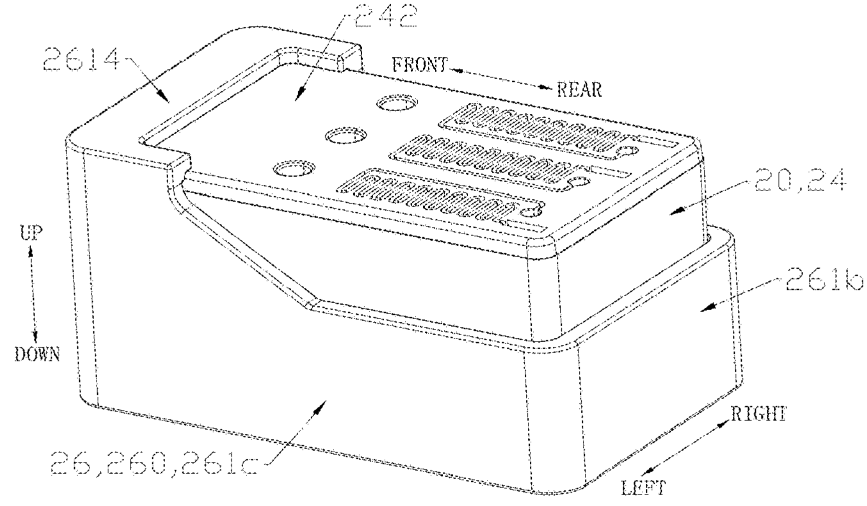
FIG. 100 is a schematic view of a variation of the second embodiment of the sealing protection member in a portable inkjet photo printer according to the present disclosure, showing the sealing protection member combined with an ink storage portion.

As shown in FIG. 100, different from Embodiment 1, the sealing protection member 26 adds an abutting portion 2614 abutting against the upper cover 242 of the ink storage portion 24. Along the up-down direction, the abutting portion 2614 is located above the clearance groove 263. The sealing protection member 26 forms a clamping on the ink storage portion 24 in the up-down direction. The abutting portion 2614 is configured to better combine the sealing protection member 26 with the ink storage portion 24, avoiding detachment of the sealing protection member 26 from the ink storage portion 24 which would reduce the sealing performance of the nozzle 251.

The beneficial effects obtainable by Embodiment 1, Embodiment 2, and the modification of Embodiment 2 of the sealing protection member 26 include:

When the printer is not used for a long time interval, or when the printer sleeps for a long time, the ink storage portion 24 may be taken out and combined with the sealing protection member 26 to seal and protect the nozzle 251.

As described above, the ink stored in the ink storage chamber 244 flows into the ink cavity 245 through the primary ink outlet 2441, and is then supplied to the outside (e.g., printing medium) through the secondary ink outlet 2431 and the nozzle 251.

In some embodiments, as shown in FIG. 50A to FIG. 50D, a positioning portion 2432 is disposed on the inkjet device installation portion 243, and a positioned portion 2411 configured to cooperate with the positioning portion 2432 is disposed on the ink storage portion body 241. The figures show one embodiment wherein the positioning portion 2432 includes a first positioning portion 24321 and a second positioning portion 24322, and the positioned portion 2411 includes a first positioned portion 24111 and a second positioned portion 24112. Specifically, the first positioning portion 24321 cooperates with the first positioned portion 24111, and the second positioning portion 24322 cooperates with the second positioned portion 24112, so that the inkjet device installation portion 243 is positionally installed onto the ink storage portion body 241.

In some embodiments, as shown in FIG. 53A, FIG. 53B, FIG. 54A to FIG. 54C, and FIG. 59, a filter member 2442 is disposed on the primary ink outlet 2441. The filter member 2442 is configured to filter the ink in the ink storage chamber 244 to prevent impurities in the ink from being ejected and reducing image forming quality. Preferably, the filter member 2442 is a filter screen welded to the primary ink outlet 2441, and the filter screen may be made of metallic material. In other embodiments, the filter member 2442 may also be configured as a sponge, felt, non-woven fabric, etc. The form and material of the filter member 2442 are not limited herein.

In some embodiments, as shown in FIG. 50A, FIG. 51, FIG. 52, FIG. 53A, FIG. 53B, and FIG. 54A to FIG. 54C, the air guide structure 2401 is disposed on the upper cover 242. Specifically, the air guide structure 2401 includes an air channel 2402, an air guide hole 2403, a film 2404, and an air inlet hole 2405. The film 2404 covers the air channel 2402 and the air guide hole 2403. One end of the air channel 2402 communicates with the air inlet hole 2405, and the other end of the air channel 2402 communicates with the air guide hole 2403. The air guide hole 2403 further communicates with the ink storage chamber 244. In other words, the air inlet hole 2405 communicates the atmosphere with the air channel 2402, and the air guide hole 2403 communicates the air channel 2402 with the ink storage chamber 244. Specifically, the film 2404 is a sealing film.

In some embodiments, the air guide structure 2401 further includes a semi-permeable membrane 2406 (gas permeable, liquid impermeable) disposed in the air channel 2402 to prevent ink from flowing back and overflowing from the air channel 2402.

Further, corresponding to the first chamber 244*a*, the second chamber 244*b*, and the third chamber 244*c*, the air guide structure 2401 includes a first air guide structure 2401*a*, a second air guide structure 2401*b*, and a third air guide structure 2401*c*. Specifically, the air channel 2402 includes a first air channel 2402*a*, a second air channel 2402*b*, and a third air channel 2402*c*. The air guide hole 2403 includes a first air guide hole 2403*a*, a second air guide hole 2403*b*, and a third air guide hole 2403*c*. The air inlet hole 2405 includes a first air inlet hole 2405*a*, a second air inlet hole 2405*b*, and a third air inlet hole 2405*c*.

Further, the arrangement of the first air guide structure 2401*a*, the second air guide structure 2401*b*, and the third air guide structure 2401*c* is the same. For example, along the direction from front to rear, the air inlet hole 2405, the air channel 2402, and the air guide hole 2403 are arranged in sequence. Along the direction from left to right, the first air guide structure 2401*a*, the second air guide structure 2401*b*, and the third air guide structure 2401*c* are arranged at intervals. Along the direction from left to right, the first air guide hole 2403*a*, the second air guide hole 2403*b*, and the third air guide hole 2403*c* are arranged at intervals.

In some embodiments, as shown in FIG. 55A, FIG. 55B, FIG. 56, FIG. 57, and FIG. 59, the arrangement of the first air guide structure 2401*a*, the second air guide structure 2401*b*, and the third air guide structure 2401*c* is different. For example, along the direction from left to right, the first air guide structure 2401*a*, the second air guide structure 2401*b*, and the third air guide structure 2401*c* are arranged at intervals. Along the direction from front to rear, the first air inlet hole 2405*a* is located behind the first air channel 2402*a*, the third air inlet hole 2405*c* is located behind the third air channel 2402*c*, and the second air inlet hole 2405*b* is located in front of the second air channel 2402*b*. Along the left-right direction, the first air channel 2402*a* and the third air channel 2402*c* are arranged in mirror image.

In some embodiments, along the front-rear direction, the air inlet hole 2405 and the air guide hole 2403 are located on different sides.

Further, an ink injection hole 2424 is also provided on the upper cover 242. Ink may be injected into the ink storage chamber 244 through the ink injection hole 2424 without opening the upper cover 242, making the ink injection operation simple and convenient. Corresponding to the first chamber 244*a*, the second chamber 244*b*, and the third chamber 244*c*, the ink injection hole 2424 includes a first ink injection hole 2424*a*, a second ink injection hole 2424*b*, and a third ink injection hole 2424*c*.

Figure 56:
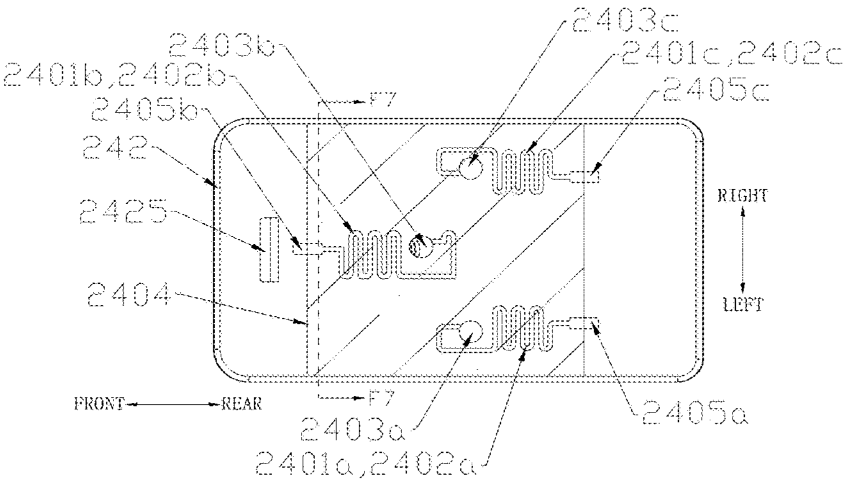
FIG. 56 is a schematic view of an upper cover in another embodiment of the printing mechanism in a portable inkjet photo printer according to the present disclosure.

In some embodiments, as shown in FIG. 56, the air guide hole 2403 may also be used for injecting ink into the ink storage chamber 244.

Figure 77A:
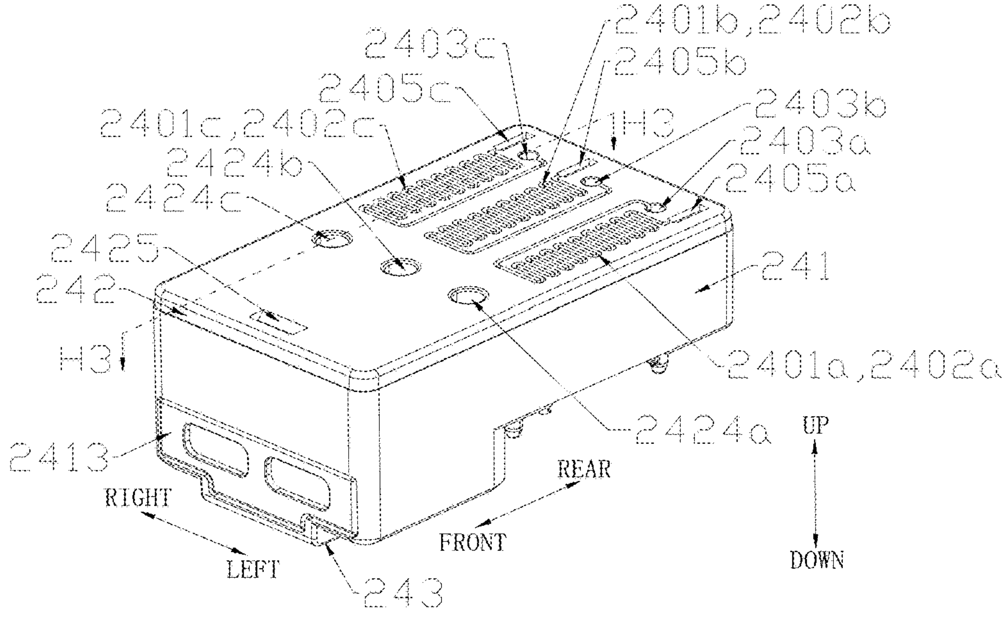
FIG. 77A is a perspective view of one implementation of a printing mechanism in a portable inkjet photo printer according to the present disclosure.
Figure 77B:
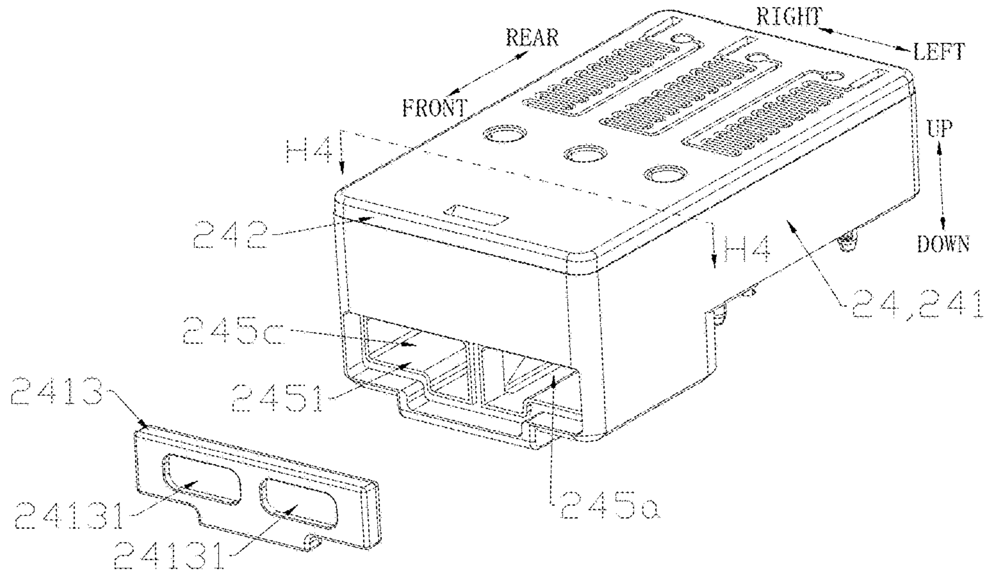
FIG. 77B is an exploded view of partial components of one implementation of a printing mechanism in a portable inkjet photo printer according to the present disclosure.
Figure 78:
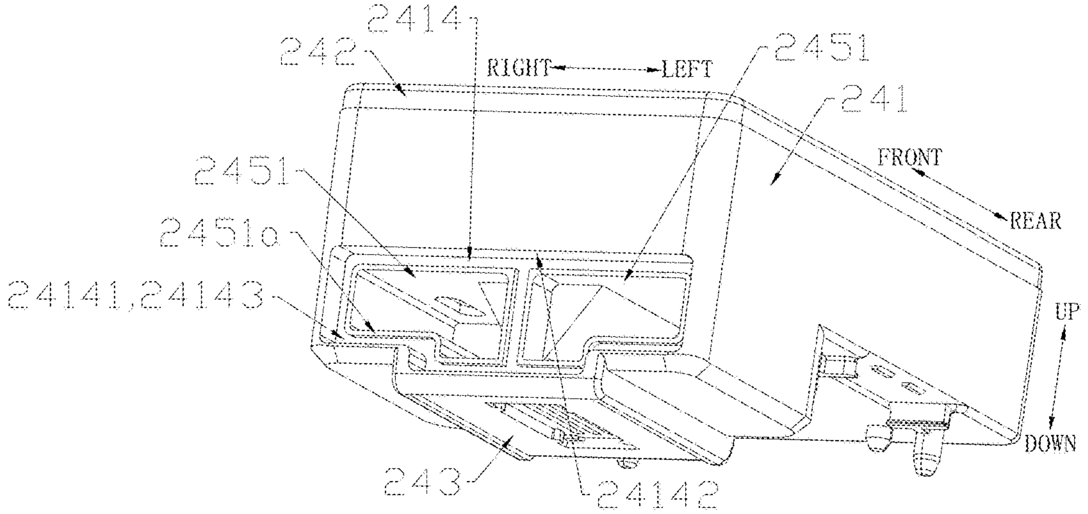
FIG. 78 is a schematic view of one implementation of a printing mechanism in a portable inkjet photo printer according to the present disclosure.
Figure 79:
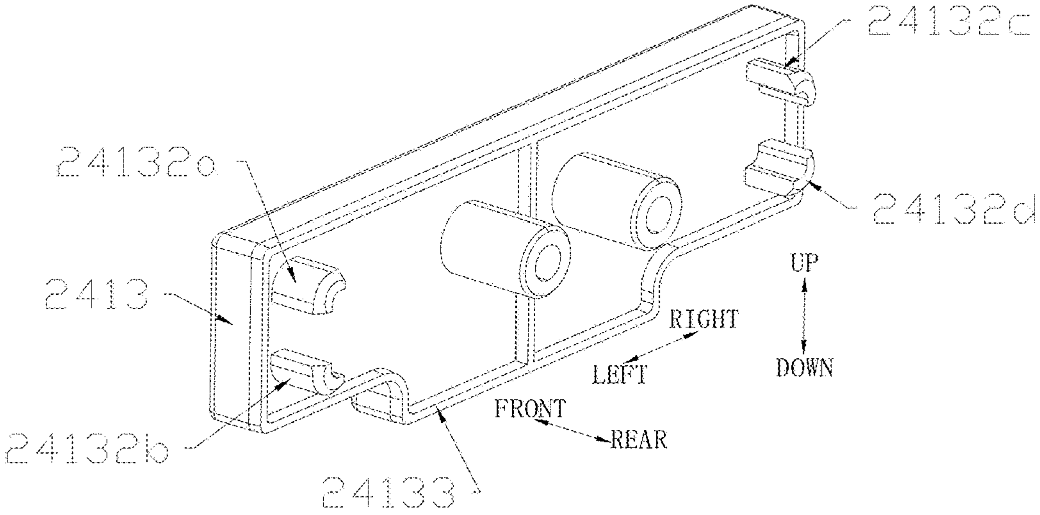
FIG. 79 is a schematic view of an ink cavity cover of a printing mechanism in a portable inkjet photo printer according to the present disclosure.
Figure 80:
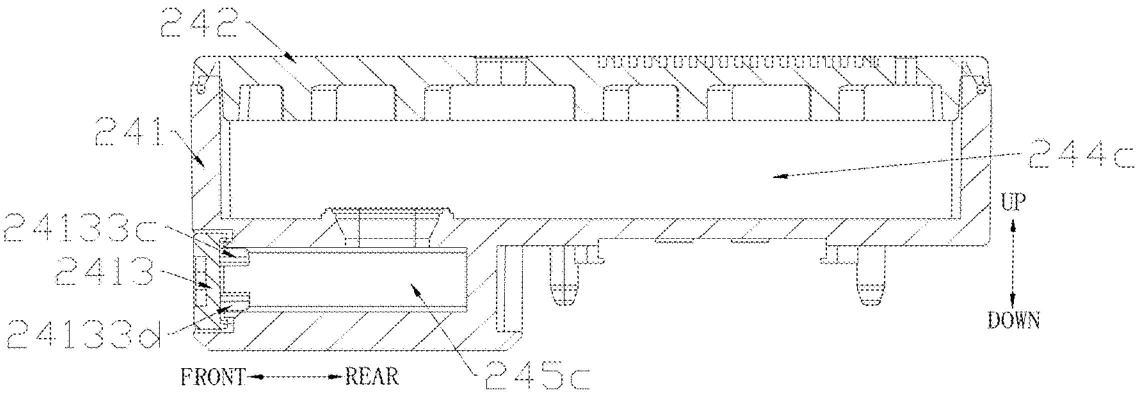
FIG. 80 is a schematic view of one implementation of a printing mechanism in a portable inkjet photo printer according to the present disclosure, taken along line H3-H3 in FIG. 77A, observed from left to right.

In some embodiments, as shown in FIG. 77A, along the direction from left to right, the first air guide hole 2403*a*, the second air guide hole 2403*b*, and the third air guide hole 2403*c* are arranged at intervals. Along the front-rear direction, the first air inlet hole 2405*a* and the first air guide hole 2403*a* are located on the same side, the second air inlet hole 2405*b* and the second air guide hole 2403*b* are located on the same side, and the third air inlet hole 2405*c* and the third air guide hole 2403*c* are located on the same side. Along the left-right direction, the first air guide structure 2401*a* is arranged symmetrically with at least one of the second air guide structure 2401*b* and the third air guide structure 2401*c*. Further, the paths of the first air channel 2402*a*, the second air channel 2402*b*, and the third air channel 2402*c* are elongated. Along the front-rear direction, the ink injection hole 2424 is located at the front side or rear side of the air guide structure 2401.

Figure 83:
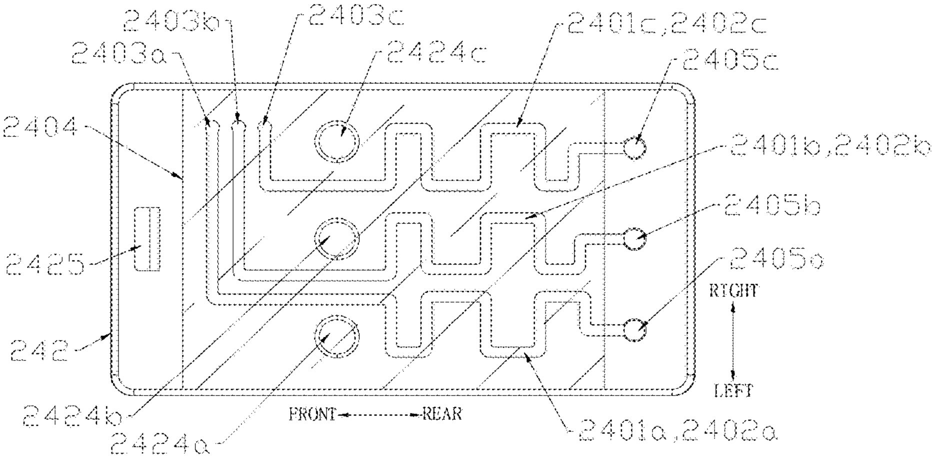
FIG. 83 is a schematic view of one implementation of a printing mechanism in a portable inkjet photo printer according to the present disclosure, showing an upper cover.

In some embodiments, as shown in FIG. 83, along the front-rear direction, the first air inlet hole 2405*a* and the first air guide hole 2403*a* are respectively located on two sides of the first air channel 2402*a*, the second air inlet hole 2405*b* and the second air guide hole 2403*b* are respectively located on two sides of the second air channel 2402*b*, and the third air inlet hole 2405*c* and the third air guide hole 2403*c* are respectively located on two sides of the third air channel 2402*c*. Along the direction from front to rear, the first air guide hole 2403*a*, the second air guide hole 2403*b*, and the third air guide hole 2403*c* are arranged at intervals. Along the front-rear direction, the ink injection hole 2424 is located between the air guide hole 2403 and the air inlet hole 2405.

In some embodiments, as shown in FIG. 55A, FIG. 55B to FIG. 58A, and FIG. 58B to FIG. 61, the inkjet device installation portion 243 is integrally formed with the ink storage portion body 241. Further, in this embodiment, the aforementioned ink cavity 245 is not provided, but the ink storage chamber 244 communicates directly with the inkjet device 25. Specifically, a flow channel 246 is disposed in the ink storage portion 24. The flow channel 246 communicates the primary ink outlet 2441 with the secondary ink outlet 2431 respectively. In other words, the flow channel 246 is formed between the primary ink outlet 2441 and the secondary ink outlet 2431. The flow channel 246 is a narrow passage to reduce ink sloshing, thereby reducing the possibility of ink forming bubbles. At the same time, the narrow flow channel 246 is conducive to expelling bubbles formed therein to the ink storage chamber 244, thereby improving printing/image forming quality. Further, corresponding to the first chamber 244*a*, the second chamber 244*b*, and the third chamber 244*c*, the flow channel 246 includes a first flow channel 246*a*, a second flow channel 246*b*, and a third flow channel 246*c*.

Figure 58A:
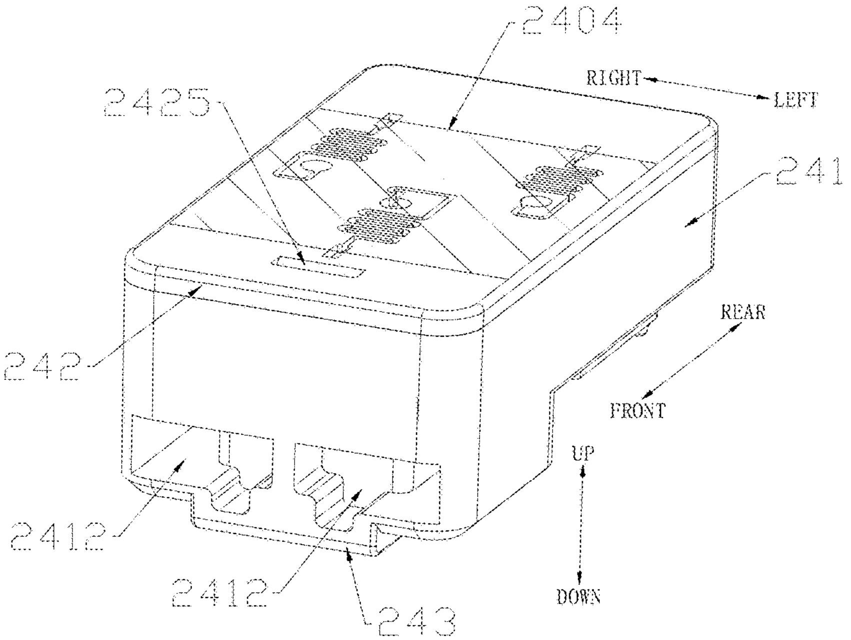
FIG. 58A and FIG. 58B are perspective views of the printing mechanism in another embodiment of the printing mechanism in a portable inkjet photo printer according to the present disclosure.
Figure 58B:
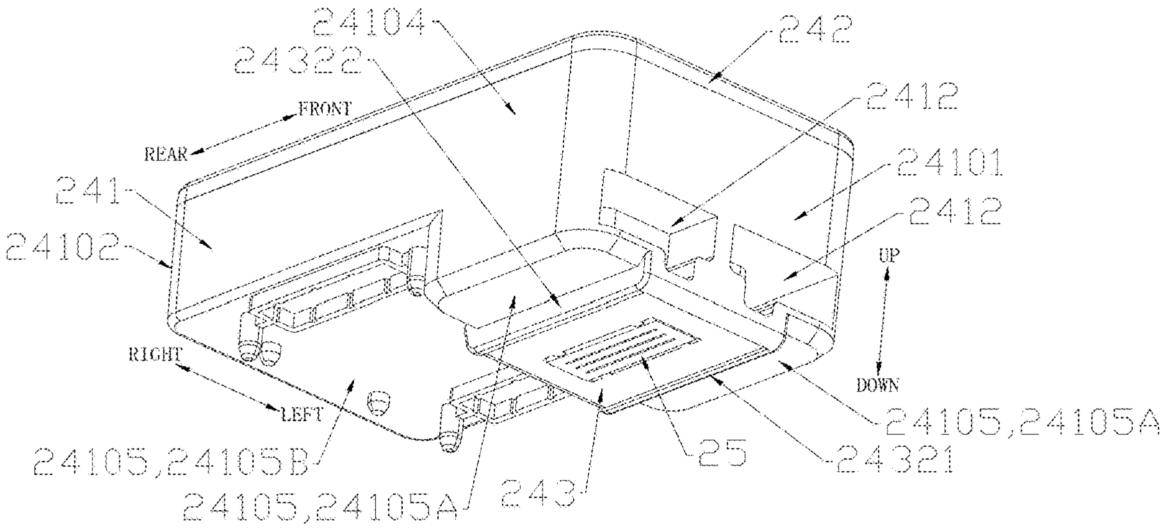
Figure 59:
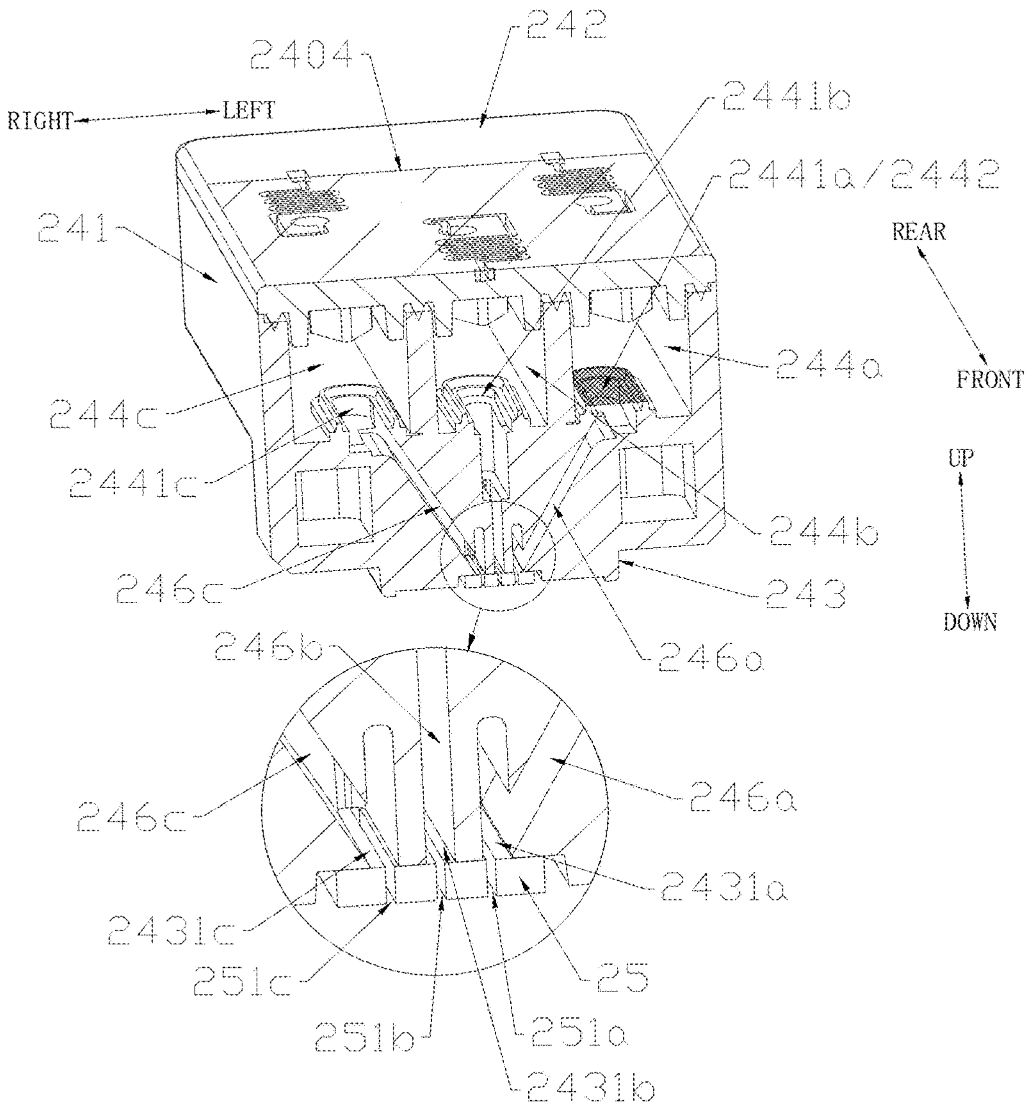
FIG. 59 is a schematic view of another embodiment of the printing mechanism in a portable inkjet photo printer according to the present disclosure, taken along line F7-F7 in FIG. 56, observed from front to rear.
Figure 60:
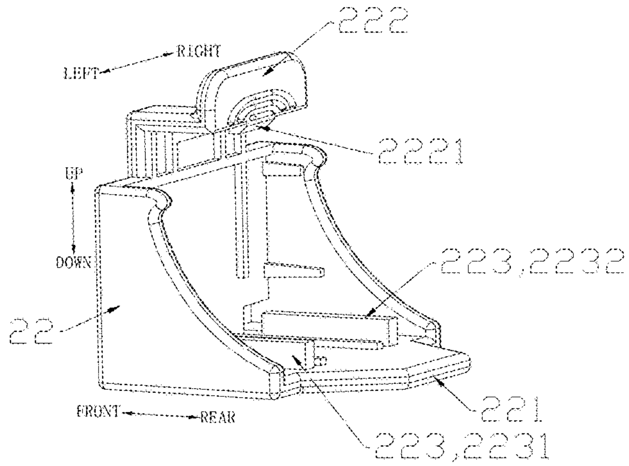
FIG. 60 is a perspective view of the protective cover in another embodiment of the printing mechanism in a portable inkjet photo printer according to the present disclosure.
Figure 61:
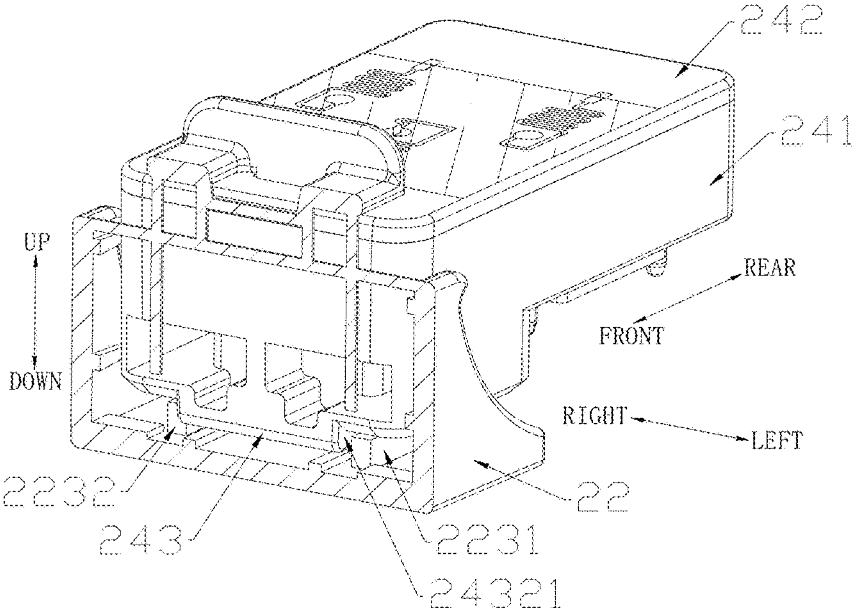
FIG. 61 is a schematic view of the printing mechanism and the protective cover combined in another embodiment of the printing mechanism in a portable inkjet photo printer according to the present disclosure, taken along line F8-F8 in FIG. 55A, observed from front to rear.

In some embodiments, as shown in FIG. 58A, FIG. 58B, and FIG. 61, a recessed portion 2412 is provided on the front side of the ink storage portion 24 to avoid the phenomenon of local unevenness during molding of the ink storage portion 24 due to excessive thickness of the material (e.g., rubber/plastic material) used to make the ink storage portion 24.

In some embodiments, as shown in FIG. 77A, FIG. 77B, FIG. 78, FIG. 79, and FIG. 80, the ink storage portion body 241 is provided with a connection port 2451 communicating with the ink cavity 245 (specifically the first cavity 245*a* and the third cavity 245*c*). The ink storage portion 24 further includes a face cover 2413. The face cover 2413 is configured to combine with the ink storage portion body 241 to close the connection port 2451.

Further, along the front-rear direction, on the front side of the connection port 2451, a face cover groove 2414 is formed on the ink storage portion body 241. The face cover groove 2414 is configured to accommodate at least a part of the face cover 2413. The face cover groove 2414 communicates with the first cavity 245*a* and the third cavity 245*c*. Specifically, the outer peripheral side of the connection port 2451 has a protrusion 2451*a* extending forward. The face cover groove 2414 has a face cover groove bottom surface 24141 and a face cover groove inner wall 24142. An accommodating groove 24143 is formed between the face cover groove bottom surface 24141, the face cover groove inner wall 24142, and the protrusion 2451*a*. The accommodating groove 24143 is configured to combine with a part of the face cover 2413.

Further, a guide member 24132 is disposed between the face cover 2413 and the ink storage portion body 241. Specifically, the guide member 24132 is disposed on the face cover 2413. More specifically, the guide member 24132 includes a first guide member 24132*a*, a second guide member 24132*b*, a third guide member 24132*c*, and a fourth guide member 24132*d* disposed at four corners. Along the up-down direction, the first guide member 24132*a* and the second guide member 24132*b* are symmetrically disposed, and the third guide member 24132*c* and the fourth guide member 24132*d* are symmetrically disposed. Along the left-right direction, the first guide member 24132*a* and the third guide member 24132*c* are symmetrically disposed, and the second guide member 24132*b* and the fourth guide member 24132*d* are symmetrically disposed. When the face cover 2413 is accommodated by the face cover groove 2414, the first guide member 24132*a* and the second guide member 24132*b* are configured to abut and cooperate with the first cavity 245*a*, and the third guide member 24132*c* and the fourth guide member 24132*d* are configured to abut and cooperate with the third cavity 245*c*.

Further, two recesses 24131 are provided on the front side surface of the face cover 2413. On the one hand, the recesses 24131 can reduce the thickness of the rubber/plastic material of the face cover 2413. On the other hand, during production, the two recesses 24131 may be clamped by an automated fixture, facilitating production.

Further, an accommodation portion 24133 configured to cooperate with the accommodating groove 24143 is disposed on the rear side of the face cover 2413.

Further, the combination form of the face cover 2413 and the ink storage portion body 241 may be bonding, welding, snap-fitting, etc., which is not limited herein.

Beneficial Effects Obtainable by this Embodiment:

1. By providing the ink cavity 245, air is prevented from entering the nozzle 251. By providing the connection port 2451, it is ensured that the ink cavity 245 can be formed during production. By disposing the connection port 2451 on the front side, when sealing the connection port 2451 with the face cover 2413, the influence on the quality of the nozzle 251 can be reduced.
2. When the face cover 2413 and the ink storage portion body 241 are fixed by glue bonding, the accommodating groove 24143 can accommodate the glue to prevent the glue from entering the ink cavity 245. When the face cover 2413 and the ink storage portion body 241 are fixed by welding, since the welding head contacts the front side of the ink storage portion 24 rather than the bottom surface where the nozzle 251 is located, damage to the relatively precise nozzle 251 by the welding head can be avoided.

Figure 81:
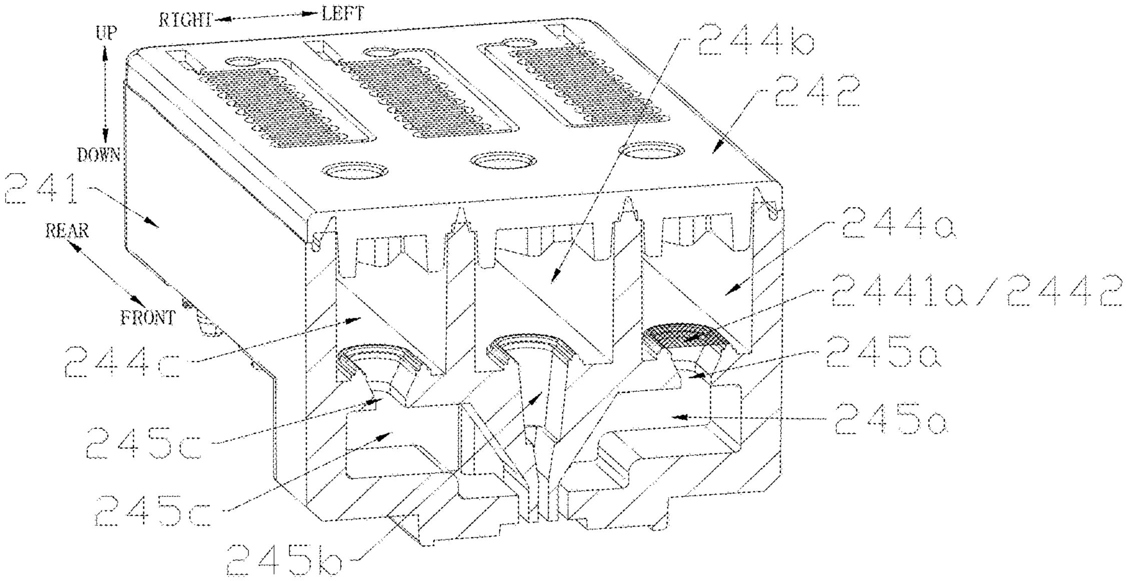
FIG. 81 is a schematic view of one implementation of a printing mechanism in a portable inkjet photo printer according to the present disclosure, taken along line H4-H4 in FIG. 77B, observed from front to rear.

In some embodiments, as shown in FIG. 81, the space sizes of the first cavity 245*a*, the second cavity 245*b*, and the third cavity 245*c* in the ink cavity 245 are different. Specifically, the space of the second cavity 245*b* is smaller than the space of the first cavity 245*a* and the third cavity 245*c*. Further, in the ink storage chamber 244, along the left-right direction, the dimension of the second chamber 244*b* is larger than the dimension of the first chamber 244*a* and the third chamber 244*c*, so that the volumes of the three colors of ink contained in the first chamber 244*a*, the second chamber 244*b*, and the third chamber 244*c* match respectively.

In some embodiments, as shown in FIG. 55A, FIG. 55B, FIG. 57, FIG. 58B, FIG. 60, and FIG. 61, before the printing mechanism 20 is installed into the printer, it is necessary to combine a protective cover 22 with the printing mechanism 20 to protect the printing mechanism 20, for example, to protect the inkjet device 25, so as to prevent the inkjet device 25 from being damaged or contaminated by contact with the outside world. Further, the protective cover 22 includes a baffle 221, a snap-fit member 222, and a guide member (first guide member) 223. The snap-fit member 222 and the guide member 223 are respectively connected to the baffle 221. Along the up-down direction, the snap-fit member 222 and the guide member 223 are spaced apart. Still further, the snap-fit member 222 is configured as a cantilever. A snap-fit portion 2221 is disposed on the snap-fit member 222. The snap-fit portion 2221 is configured to cooperate with a snapped portion 2425 disposed on the upper cover 242, so as to combine the protective cover 22 with the printing mechanism 20. The guide member 223 includes a first guide portion 2231 and a second guide portion 2232 spaced apart in the left-right direction. The first guide portion 2231 and the second guide portion 2232 are configured to combine with the inkjet device installation portion 243 to guide the combination of the printing mechanism 20 and the protective cover 22. In some embodiments, the inkjet device installation portion 243 includes a first guided portion 24321 located on the left side and a second guided portion 24322 located on the right side. The first guide portion 2231 contacts the first guided portion 24321, and the second guide portion 2232 contacts the second guided portion 24322, that is, the inkjet device installation portion 243 is clamped by the first guide portion 2231 and the second guide portion 2232. In some embodiments, the first guide portion 2231 and the second guide portion 2232 are configured as protrusions.

In some embodiments, a sponge corresponding to the position of the nozzle 251 is further disposed on the protective cover 22. The sponge is configured to protect the nozzle 251 and prevent the nozzle 251 from being damaged when subjected to external impact.

Figure 57:
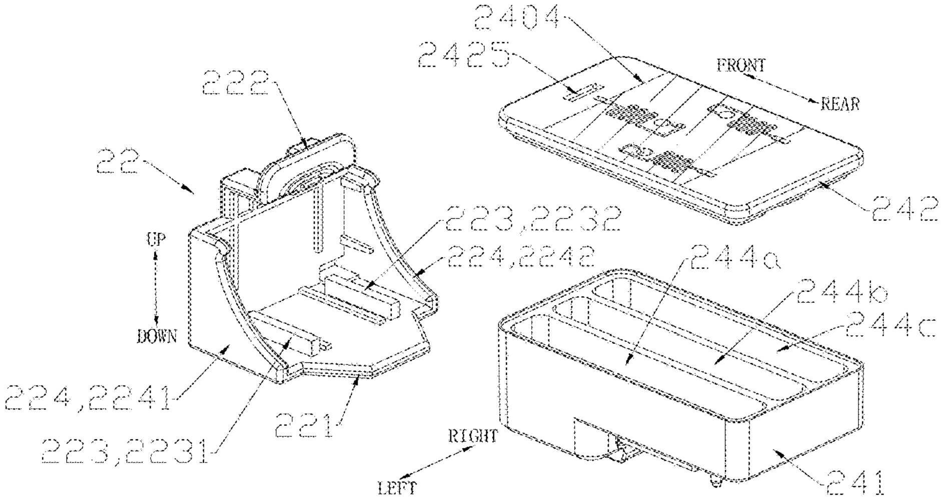
FIG. 57 is an exploded view of the printing mechanism and the protective cover in another embodiment of the printing mechanism in a portable inkjet photo printer according to the present disclosure.

In some embodiments, as shown in FIG. 57, the protective cover 22 further includes side plates 224 connected to the baffle 221. Along the left-right direction, the side plates 224 include a left side plate 2241 and a right side plate 2242 arranged at an interval. When the printing mechanism 20 is combined with the protective cover 22, the side plates 224 are configured to prevent the printing mechanism 20 from shaking in the left-right direction.

Figure 82A:
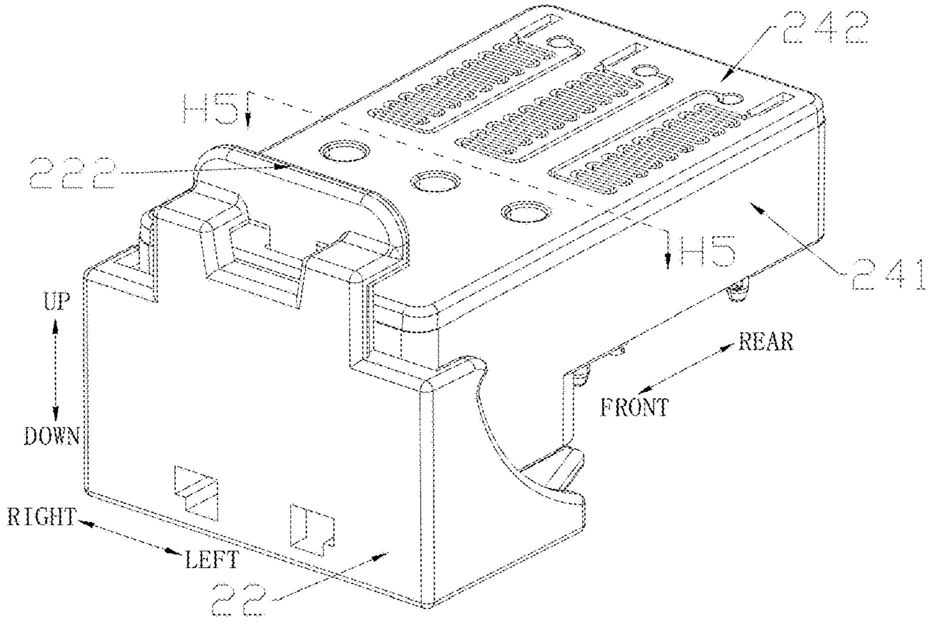
FIG. 82A is a schematic view of one implementation of a printing mechanism in a portable inkjet photo printer according to the present disclosure, showing the printing mechanism and a protective cover.
Figure 82B:
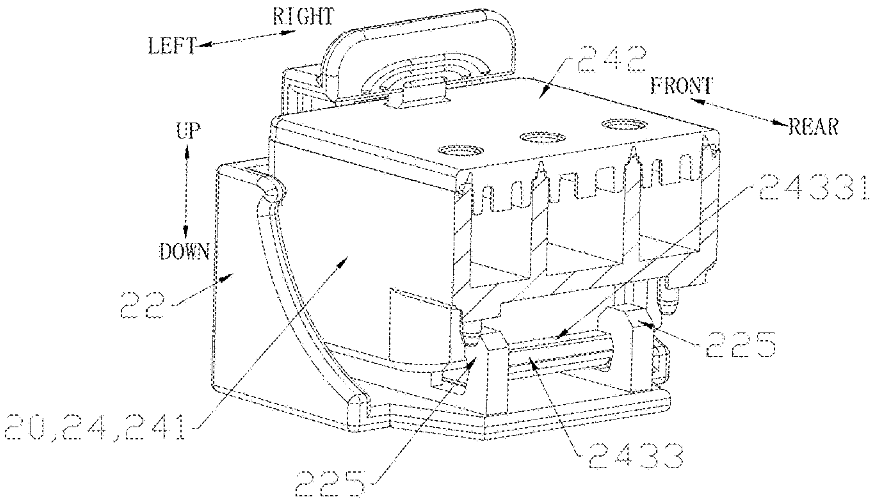
FIG. 82B is a schematic view of one implementation of a printing mechanism in a portable inkjet photo printer according to the present disclosure, wherein the printing mechanism is cut along line H5-H5 in FIG. 82A and observed from rear to front.

In some embodiments, as shown in FIG. 82A and FIG. 82B, the protective cover 22 is further provided with a hook 225. When the protective cover 22 is combined with the printing mechanism 20, the hook 225 is configured to snap with a protruding portion 2433 disposed on the ink storage portion 24. Specifically, the protruding portion 2433 has a snap-fit surface 24331. The hook 225 snaps with the protruding portion 2433 so as to abut against the snap-fit surface 24331, making the combination of the protective cover 22 and the printing mechanism 20 firmer and more stable. Preferably, the number of the protruding portions 2433 is two, spaced apart in the left-right direction.

The printer further includes a control module, a power supply module 74, and a first communication module 75. The control module is electrically connected to the power supply module 74, the first communication module 75, and the driving assembly, respectively. The control module is configured to control the printing mechanism 20 to eject ink. Specifically, the first communication module 75 is configured to be electrically connected to the control module of the printer. Further, the first communication module 75 has metal contacts. Along the up-down direction, the metal contacts and the inkjet device 25 are disposed on the same side. Preferably, the metal contacts and the inkjet device 25 are connected via an FPC cable. The printer further includes a second communication module 72. The second communication module 72 is electrically connected to the control module and the first communication module 75, respectively. The first communication module 75 and the second communication module 72 are electrically connected. The control module sends a printing signal to the first communication module 75 via the second communication module 72. Preferably, the second communication module 72 is a metal contact pin.

In some embodiments, as shown in FIG. 16, the first communication module 75 includes metal contacts 751 and a memory 752. The memory 752 is electrically connected to the control module via the metal contacts 751 and the second communication module 72. The memory 752 is configured to store information such as production information of the ink cartridge, ink print volume, and remaining ink amount.

[Locking Mechanism]

After the printer is powered off, in order to prevent the printing mechanism 20 from rotating or translating accidentally, especially rotating or translating under inertia or external impact, the printer further includes a locking mechanism 90 disposed therein. The locking mechanism 90 is configured to make the printing mechanism 20 immovable/stationary relative to the printing support mechanism 30/housing assembly. In other words, after the printer is powered off, the printing mechanism 20 is locked (in a locked state) under the action of the locking mechanism 90.

Locking Mechanism Embodiment 1

Figure 33:
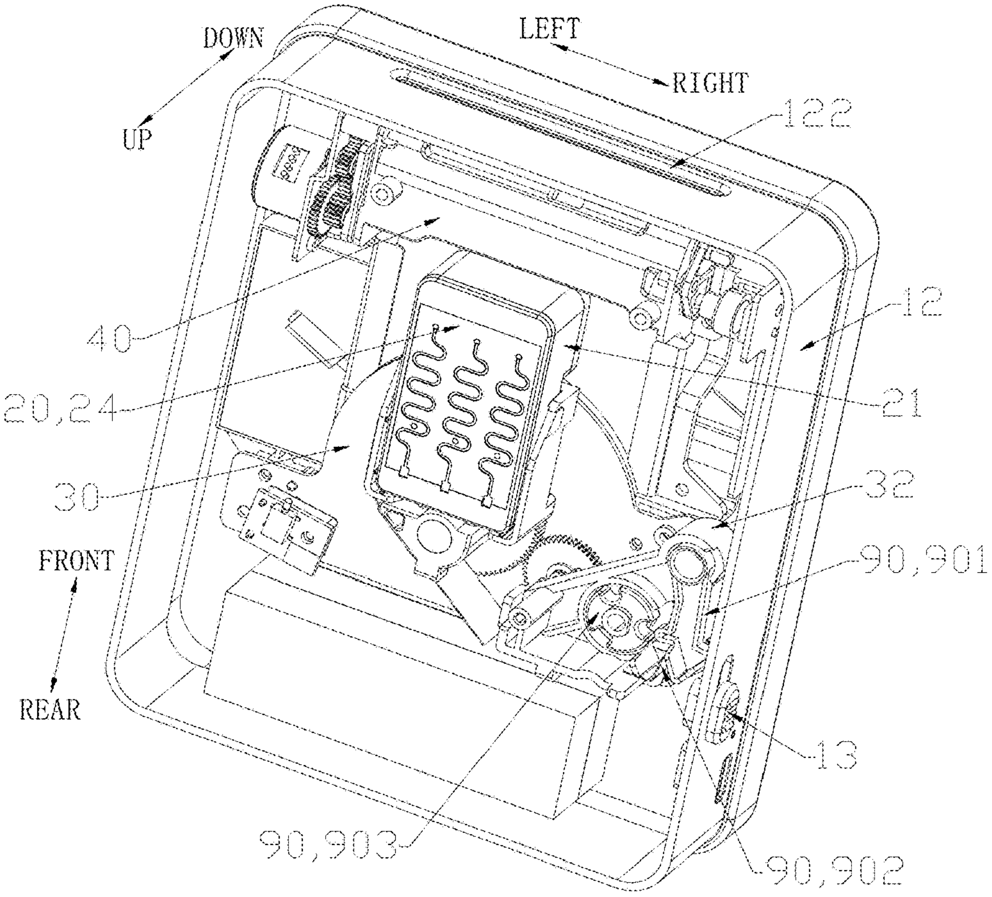
FIG. 33 is a perspective view of a locking mechanism in a first embodiment of a locking mechanism in a portable inkjet photo printer according to the present disclosure, with some components hidden.
Figure 34:
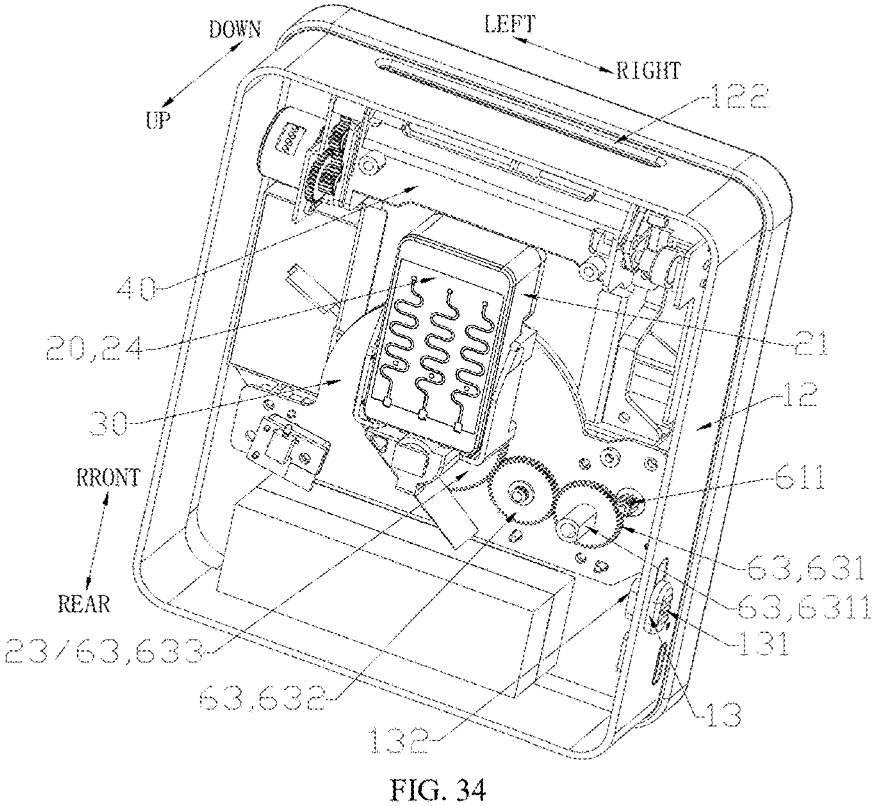
FIG. 34 is a perspective view of the locking mechanism in the first embodiment of the locking mechanism in a portable inkjet photo printer according to the present disclosure, with some components hidden.

As shown in FIG. 33 and FIG. 34, a movably disposed control member (a type of force-applying member) 13 is disposed on the housing assembly. Further, in this embodiment, the control member 13 is slidably disposed on the second housing 12. Specifically, the control member 13 is preferably a power switch (sliding type) of the printer. Still further, the control member 13 is configured to interact with the locking mechanism 90, and controls the locking mechanism 90 by sliding the control member 13, thereby realizing the locking and unlocking of the printing mechanism 20.

Further, along the front-rear direction, the control member 13 is configured to move between an open position and a closed position. When the control member 13 is in the open position, the printer is in a power-on state or executes a power-on program, and the printing mechanism 20 is unlocked (not locked, in a free state). When the control member 13 is in the closed position, the printer is in a power-off state, a sleep state, or executes a power-off program, and the printing mechanism 20 is locked (in a locked state).

In some embodiments, the control member 13 includes a pushing portion 132. The pushing portion 132 is configured to push a part of the locking mechanism 90 to cause the locking mechanism 90 to lock the printing mechanism 20.

In some embodiments, the control member 13 further includes a force receiving portion 131. A user slides the control member 13 by pushing the force receiving portion 131. Ribs are disposed at intervals on the force receiving portion 131. The ribs can increase the friction when the user pushes the force receiving portion 131 to better slide the control member 13.

Figure 35:
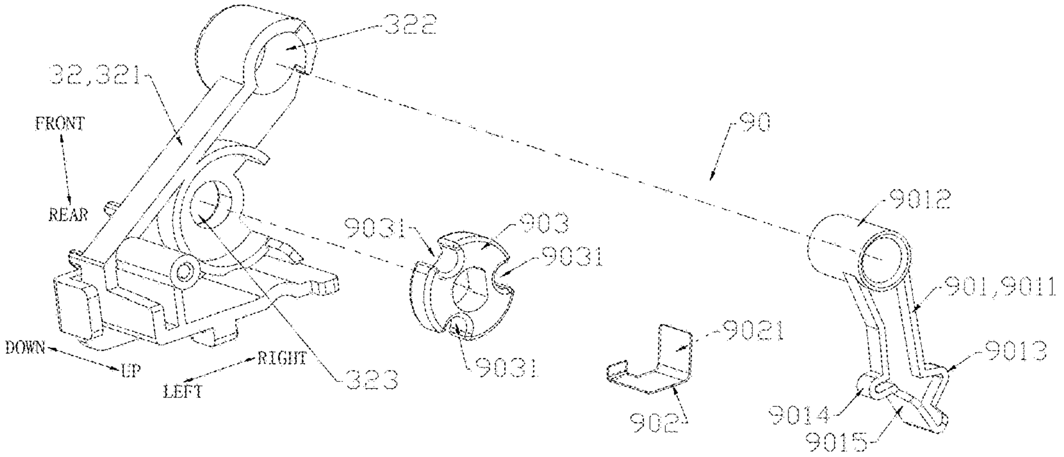
FIG. 35 is an exploded view of the first embodiment of the locking mechanism in a portable inkjet photo printer according to the present disclosure.

As shown in FIG. 33 to FIG. 35, the locking mechanism 90 includes a third securing member 901, a reset member 902, and a locked member 903. The third securing member 901 is configured to interact with the locked member 903 to lock the printing mechanism 20. The reset member 902 is configured to unlock the printing mechanism 20.

Specifically, the third securing member 901 is movably disposed relative to the printing support mechanism 30/housing assembly. In this embodiment, the third securing member 901 is rotatably disposed relative to the printing support mechanism 30/housing assembly. The third securing member 901 includes a pushed portion 9013, an acting portion 9014, and a reset portion 9015. Further, the pushed portion 9013 is configured to be pushed by the pushing portion 132 to rotate, thereby causing the acting portion 9014 to cooperate with a part of the locked member 903, and causing the reset portion 9015 to abut against the reset member 902. The third securing member 901 further includes a connecting main body 9011 and a moving portion 9012. The moving portion 9012 is rotatably installed on a second bracket/limiting bracket 32 described later, or rotatably installed on the printing support mechanism 30. The moving portion 9012, the pushed portion 9013, the acting portion 9014, and the reset portion 9015 are all disposed on the connecting main body 9011. The moving portion 9012 is located at one end of the connecting main body 9011, and the pushed portion 9013, the acting portion 9014, and the reset portion 9015 are located at the other end of the connecting main body 9011.

Specifically, the reset member 902 is an elastic component, such as an elastic metal sheet, a cantilever, a spring, rubber, sponge, etc. In this embodiment, the reset member 902 is configured as an elastic metal sheet. The reset member 902 has an abutment portion 9021 abutting against the reset portion 9015. When the control member 13 slides to the closed position, the third securing member 901 is pushed to rotate in one direction, causing the reset portion 9015 to abut against the abutment portion 9021, and the reset member 902 undergoes elastic deformation. When the control member 13 slides to the open position, the third securing member 901 is no longer pushed. Under the elastic action of the reset member 902, the third securing member 901 rotates in the other direction and resets. Further, the reset member 902 is disposed on the second bracket/limiting bracket 32, or the reset member 902 is disposed on the third securing member 901, or the reset member 902 is disposed on a part of the printing support mechanism 30.

Specifically, the locked member 903 is installed on a connecting post 6311 of a first coupling member 631 described later. The locked member 903 can move (e.g., rotate) with the first coupling member 631. The first coupling member 631 is configured to transmit the driving force output by the first motor 61 to cause the printing mechanism 20 to rotate or translate. Further, the locked member 903 has an acted-upon portion 9031 configured to cooperate with the acting portion 9014. The number of the acted-upon portions 9031 is one or more. In this embodiment, the number of the acted-upon portions 9031 is three, which are disposed at intervals along the rotation direction of the locked member 903.

In some embodiments, the acting portion 9014 may be configured as a protrusion or a groove, and the acted-upon portion 9031 may be configured as a groove or a protrusion configured to cooperate with the acting portion 9014.

As shown in FIG. 33 and FIG. 35, in this embodiment, the locking mechanism 90 is movably (e.g., rotatably) disposed on the second bracket/limiting bracket 32. Specifically, the second bracket/limiting bracket 32 includes a main body portion 321, an accommodating portion (first accommodating portion) 322 disposed on the main body portion 321, and a through hole 323 disposed on the main body portion 321. The accommodating portion 322 is configured to accommodate the moving portion 9012. The connecting post 6311 of the first coupling member 631 passes through the through hole 323.

Figure 36A:
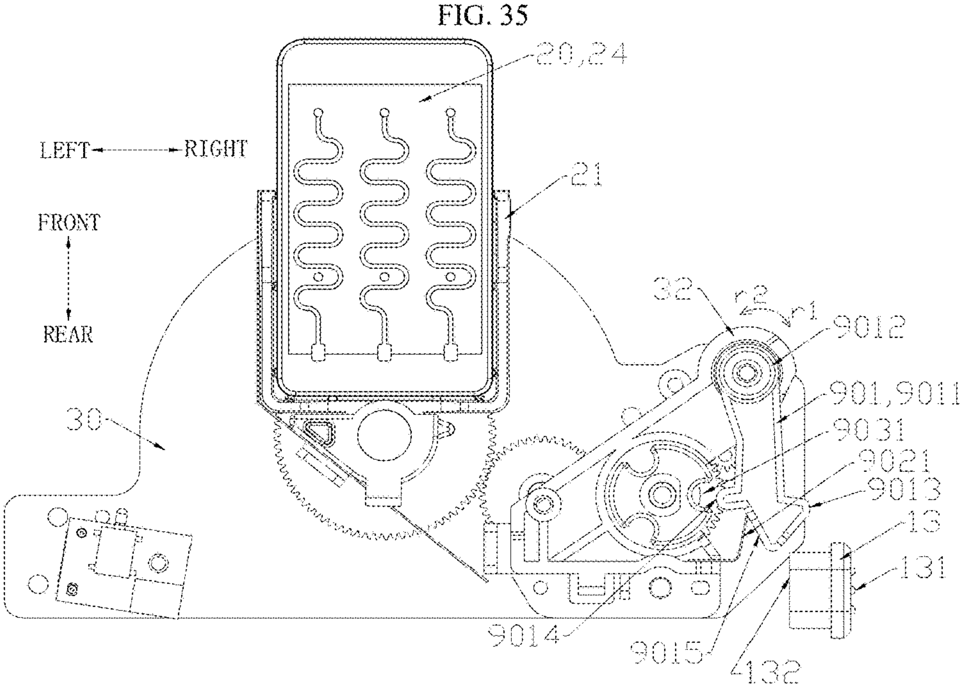
FIG. 36A is a schematic view of the first embodiment of the locking mechanism in a portable inkjet photo printer according to the present disclosure, observed from top to bottom with some components hidden, when the printing mechanism is not locked.

As shown in FIG. 36A, when the control member 13 is in the open position, the printer is in the power-on state. At this time, the third securing member 901 is not pushed by the control member 13. The acting portion 9014 does not cooperate with the acted-upon portion 9031. The printing mechanism 20 is not locked, and the printing mechanism 20 is in a free state.

Figure 36B:
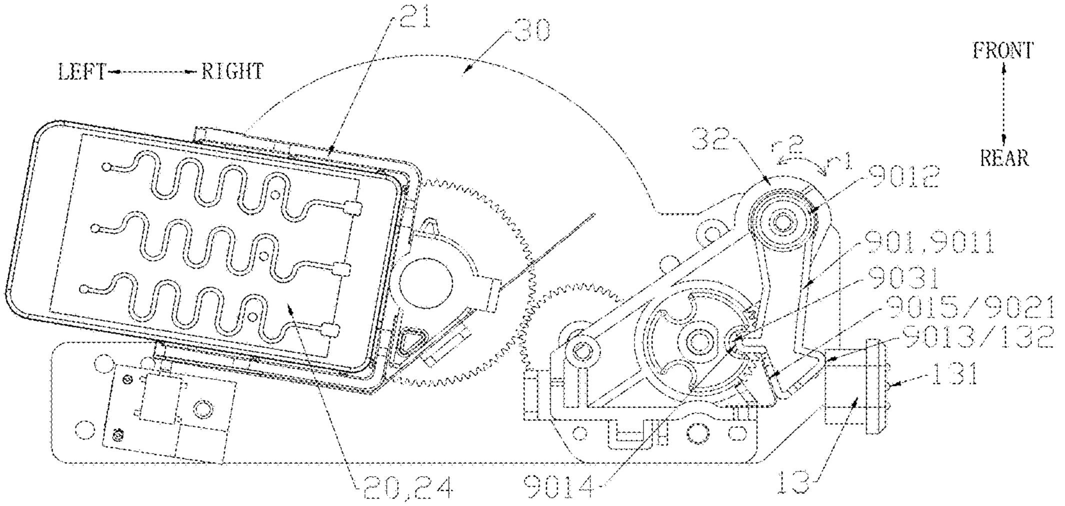
FIG. 36B is a schematic view of the first embodiment of the locking mechanism in a portable inkjet photo printer according to the present disclosure, observed from top to bottom with some components hidden, when the printing mechanism is locked.

As shown in FIG. 36B, when the control member 13 slides from the open position to the closed position, the pushing portion 132 pushes the pushed portion 9013 to rotate around the moving portion 9012 in the direction r1, and drives the acting portion 9014 to cooperate with the acted-upon portion 9031, causing the locked member 903 to be stuck and stop rotating, thereby stopping the first coupling member 631 from rotating, and further interrupting the transmission of the driving force. Finally, the printing mechanism 20 stops moving and is locked. In other words, the printing mechanism 20 is in a locked state. At the same time, the reset portion 9015 is driven to abut against the abutment portion 9021 of the reset member 902, causing the reset member 902 to undergo elastic deformation. At this time, the printer is in a power-off state, a sleep state, or executes a power-off program.

As shown in FIG. 36A, when the control member 13 slides from the closed position to the open position, the pushing portion 132 disengages from pushing the pushed portion 9013. Under the elastic action of the reset member 902, the reset portion 9015 and the pushing portion 132 rotate around the moving portion 9012 in a direction opposite to r1, i.e., in the direction r2, and drives the acting portion 9014 to disengage from the acted-upon portion 9031. The locked member 903 is no longer stuck, allowing the first coupling member 631 to transmit the driving force, and the printing mechanism 20 is unlocked. In other words, the printing mechanism 20 returns to the free state. At this time, the printer is in the power-on state.

Locking Mechanism Embodiment 2

The difference between this embodiment and Locking Mechanism Embodiment 1 is that, in this embodiment, the component providing the pushing force to the third securing member 901 is an electromagnetic member. In this embodiment, the control member 13 is the power switch (preferably a push switch/key switch) of the printer. The control member 13 is electrically connected to the locking mechanism 90. When the control member 13 is pressed to open, the printer is in the power-on state, the electromagnetic member is energized (open position), and the printing mechanism 20 is unlocked (not locked, in a free state). When the control member 13 is pressed to close or executes a power-off program, the printer is in a power-off state or sleep state, the electromagnetic member is powered off (closed position), and the printing mechanism 20 is locked (in a locked state). The details are as follows.

Figure 38:
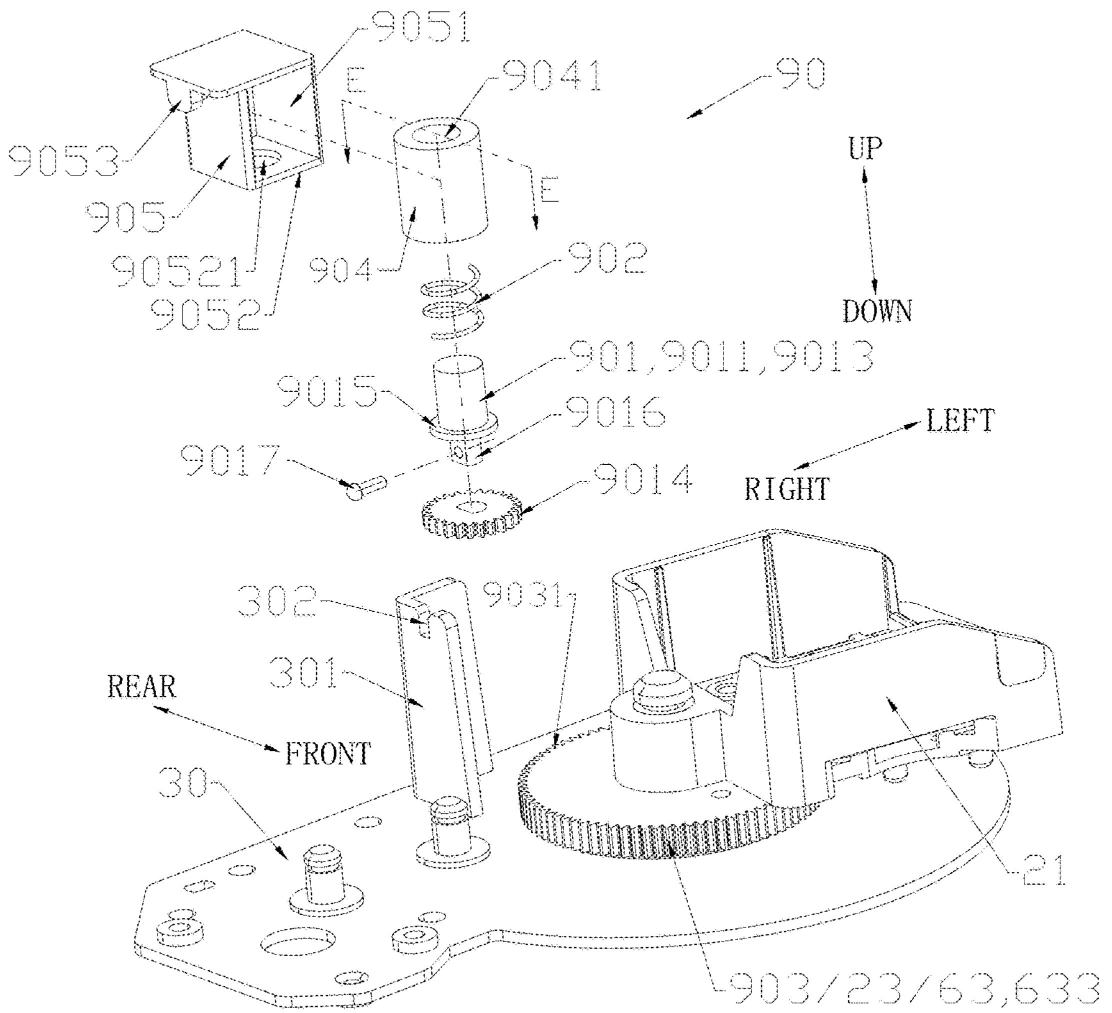
FIG. 38 is an exploded view of the second embodiment of the locking mechanism in a portable inkjet photo printer according to the present disclosure.

As shown in FIG. 38, the locking mechanism 90 similarly includes a third securing member 901, a reset member 902, and a locked member 903. The third securing member 901 is configured to interact with the locked member 903 to lock the printing mechanism 20. The reset member 902 is configured to keep the printing mechanism 20 locked.

In some embodiments, an electromagnetic member (a type of force-applying member) 904 is disposed in the printer. When energized, the electromagnetic member 904 generates magnetic force. When powered off, the magnetic force of the electromagnetic member 904 disappears. Specifically, the electromagnetic member 904 is disposed on a support bracket 301 provided on the printing support mechanism 30. In the up-down direction, the third securing member 901 is configured to retract and extend relative to the electromagnetic member 904. Alternatively, the electromagnet 904 may also be disposed on the housing assembly or a circuit board described later.

In some embodiments, an electromagnetic member bracket 905 for installing the electromagnetic member 904 is further disposed in the printer. The electromagnetic member bracket 905 is installed on the support bracket 301 or the housing assembly. Specifically, the electromagnetic member bracket 905 is provided with a snapped portion 9053, and the support bracket 301 is provided with a snap-fit portion 302. The snapped portion 9053 cooperates with the snap-fit portion 302 so that the electromagnetic member bracket 905 is installed. The electromagnetic member bracket 905 is further provided with an installation portion 9051, a base plate 9052, and a through hole 90521 penetrating the base plate 9052. The electromagnetic member 904 is accommodated by the installation portion 9051 and supported by the base plate 9052. The third securing member 901 can retract and extend relative to the electromagnetic member 904 through the through hole 90521.

In some embodiments, the electromagnetic member 904 may also be disposed on the second bracket/limiting bracket 32.

Specifically, the third securing member 901 is movably disposed relative to the printing support mechanism 30/housing assembly. In this embodiment, the third securing member 901 is disposed movably in the up-down direction relative to the printing support mechanism 30/housing assembly. For example, the third securing member 901 extends and retracts in the up-down direction. The third securing member 901 includes a pushed portion 9013, an acting portion 9014, and a reset portion 9015. Further, when energized, the pushed portion 9013 is configured to be attracted by the magnetic force generated by the electromagnetic member 904 to drive the third securing member 901 to retract upward, thereby causing the reset portion 9015 to abut against the reset member 902. The acting portion 9014 is configured to cooperate with the locked member 903 to achieve the locking of the printing mechanism 20.

The third securing member 901 further includes a connecting main body 9011. The pushed portion 9013 is disposed on the connecting main body 9011. The acting portion 9014 is disposed at an end 9016 of the connecting main body 9011. In this embodiment, the acting portion 9014 and the connecting main body 9011 are separately formed. The reset portion 9015 protrudes outward from the connecting main body 9011. A limiting post (first limiting post) 9017 is further disposed on the end 9016. The limiting post 9017 is configured to prevent the acting portion 9014 from falling off. Further, the acting portion 9014 is configured as a gear having teeth or protrusions.

In some embodiments, the acting portion 9014 and the connecting main body 9011 are integrally formed.

Specifically, the reset member 902 is an elastic component, such as an elastic metal sheet, a cantilever, a spring, rubber, sponge, etc. In this embodiment, the reset member 902 is configured as a spring, preferably a compression spring. When energized, the electromagnetic member 904 generates magnetic force. The magnetic force is greater than the elastic force of the reset member 902. Therefore, the third securing member 901 retracts upward, and the reset portion 9015 abuts against the reset member 902. The reset member 902 undergoes elastic deformation. At this time, one end of the reset member 902 abuts against the reset portion 9015, and the other end abuts against the electromagnetic member 904. When powered off, the magnetic force of the electromagnetic member 904 disappears. At this time, the magnetic force is smaller than the elastic force. Under the elastic action of the reset member 902, the third securing member 901 extends downward. In other embodiments, the reset member 902 may also be a tension spring, a torsion spring, etc.

Specifically, the locked member 903 is installed on a third coupling member 633 or a movable member 23 described later. Alternatively, the locked member 903 and the third coupling member 633/movable member 23 are integrally formed. The locked member 903 can move (e.g., rotate) with the third coupling member 633/movable member 23. The third coupling member 633/movable member 23 is configured to transmit the driving force output by the first motor 61, causing the printing mechanism 20 to rotate or translate. Further, the locked member 903 has an acted-upon portion 9031 configured to cooperate with the acting portion 9014. The number of the acted-upon portion 9031 is one or more. In this embodiment, the acted-upon portion 9031 is teeth or protrusions.

In some embodiments, the acting portion 9014 may be configured as a protrusion or a groove, and the acted-upon portion 9031 may be configured as a groove or a protrusion configured to cooperate with the acting portion 9014.

Figure 37A:
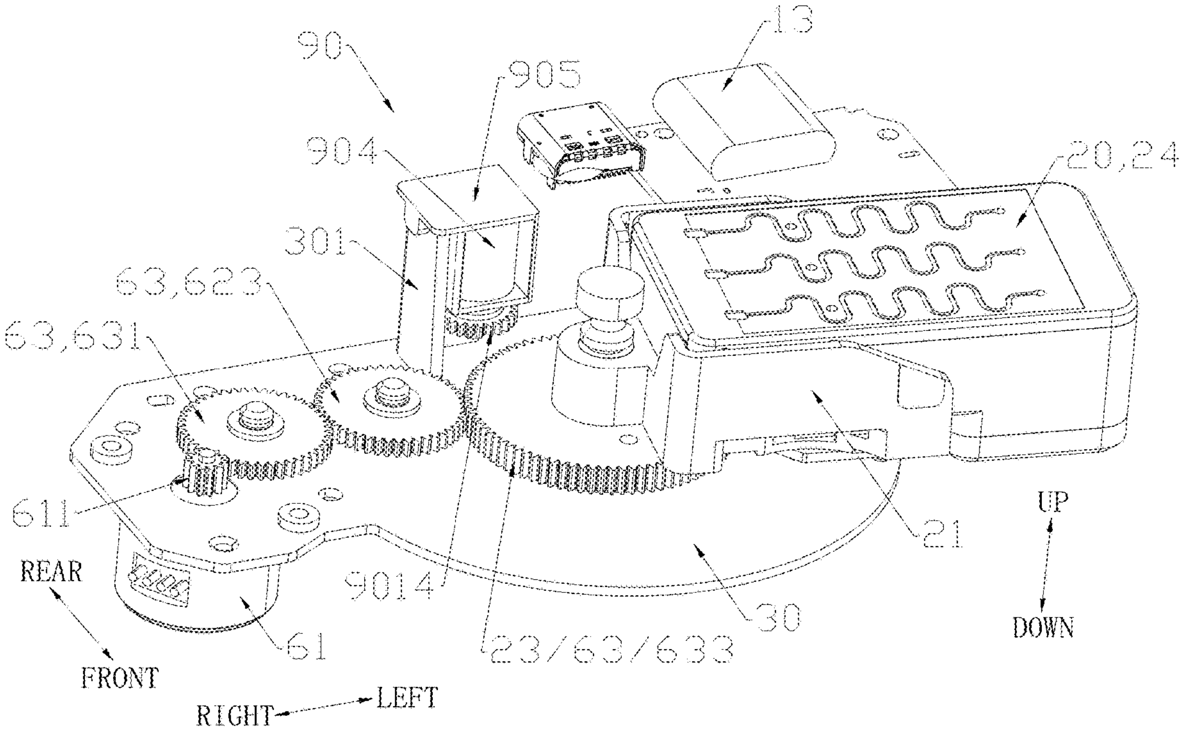
FIG. 37A is a perspective view of a locking mechanism in a second embodiment of the locking mechanism in a portable inkjet photo printer according to the present disclosure, with some components hidden, when the locking mechanism is not locked.
Figure 37B:
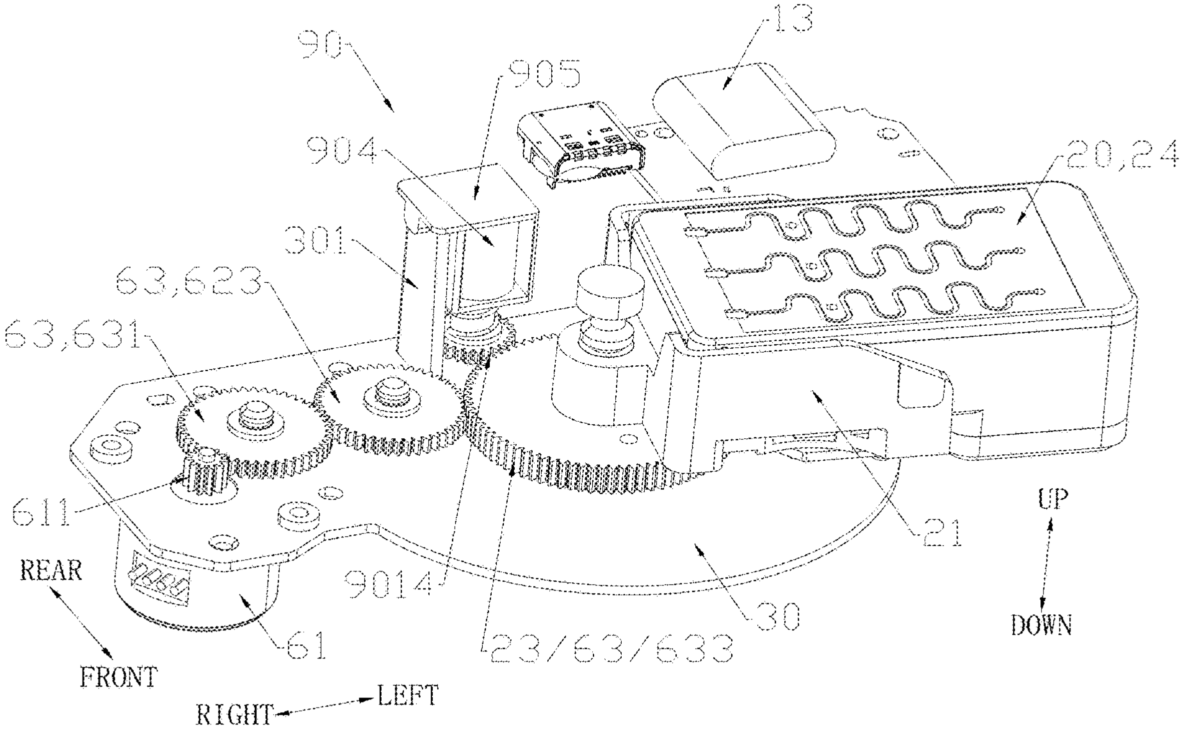
FIG. 37B is a perspective view of the locking mechanism in the second embodiment of the locking mechanism in a portable inkjet photo printer according to the present disclosure, with some components hidden, when the locking mechanism is locked.

As shown in FIG. 37A and FIG. 37B, as described above, in this embodiment, the locking mechanism 90 is movably (e.g., translatably) disposed on the electromagnetic member 904.

Figure 39A:
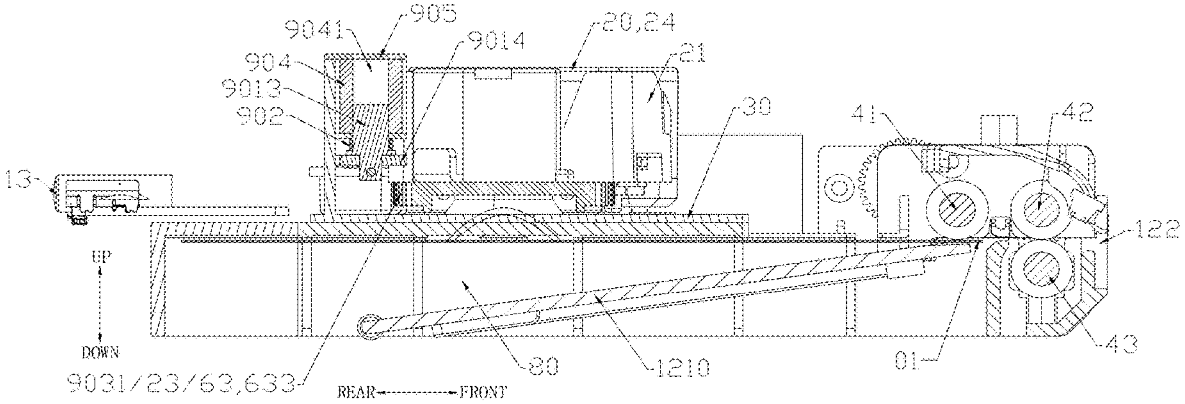
FIG. 39A is a cross-sectional view of the second embodiment of the locking mechanism in a portable inkjet photo printer according to the present disclosure, taken along line E-E in FIG. 38 with some components hidden, observed from right to left, when the printing mechanism is not locked.
Figure 39B:
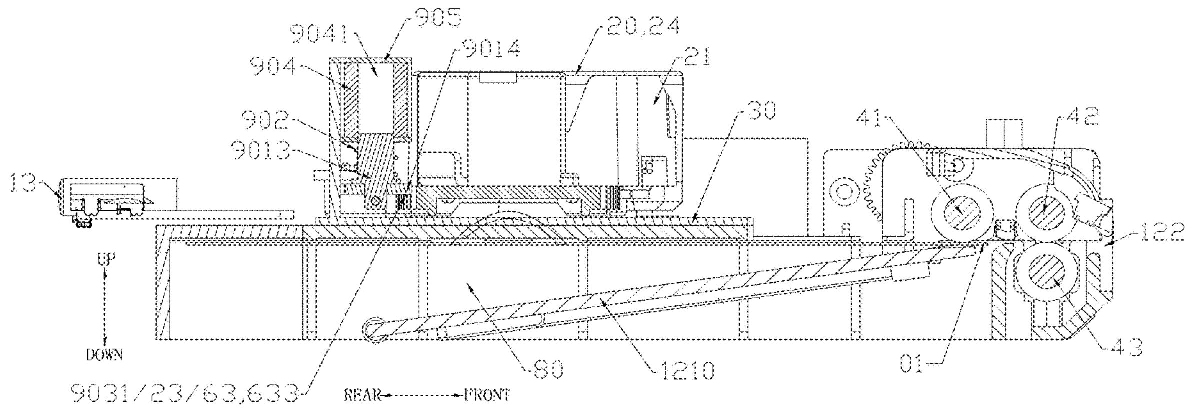
FIG. 39B is a cross-sectional view of the second embodiment of the locking mechanism in a portable inkjet photo printer according to the present disclosure, taken along line E-E in FIG. 38 with some components hidden, observed from right to left, when the printing mechanism is locked.

As shown in FIG. 37B and FIG. 39B, when powered off, the printer is in a power-off state or sleep state. The electromagnetic member 904 is powered off, and the magnetic force disappears. Under the elastic action of the reset member 902, the third securing member 901 extends downward and drives the acting portion 9014 to cooperate with the acted-upon portion 9031, causing the locked member 903 to be stuck and stop rotating. This causes the third coupling member 633/movable member 23 to stop rotating, thereby interrupting the transmission of the driving force. Finally, the printing mechanism 20 stops moving and is locked. In other words, the printing mechanism 20 is in a locked state.

As shown in FIG. 37A and FIG. 39A, when energized, the printer is in a power-on state. The electromagnetic member 904 is energized to generate magnetic force. The magnetic force overcomes the elastic force of the reset member 902 to cause the third securing member 901 to retract upward, and drives the acting portion 9014 to disengage from the acted-upon portion 9031. The locked member 903 is no longer stuck. Thus, the third coupling member 633/movable member 23 can transmit the driving force, and the printing mechanism 20 is unlocked. In other words, the printing mechanism 20 returns to the free state.

Locking Mechanism Embodiment 3

The difference between this embodiment and Locking Mechanism Embodiment 1 is that, in this embodiment, the locked member 903 and the first coupling member 631 are integrally formed. Details are as follows.

Figure 63A:
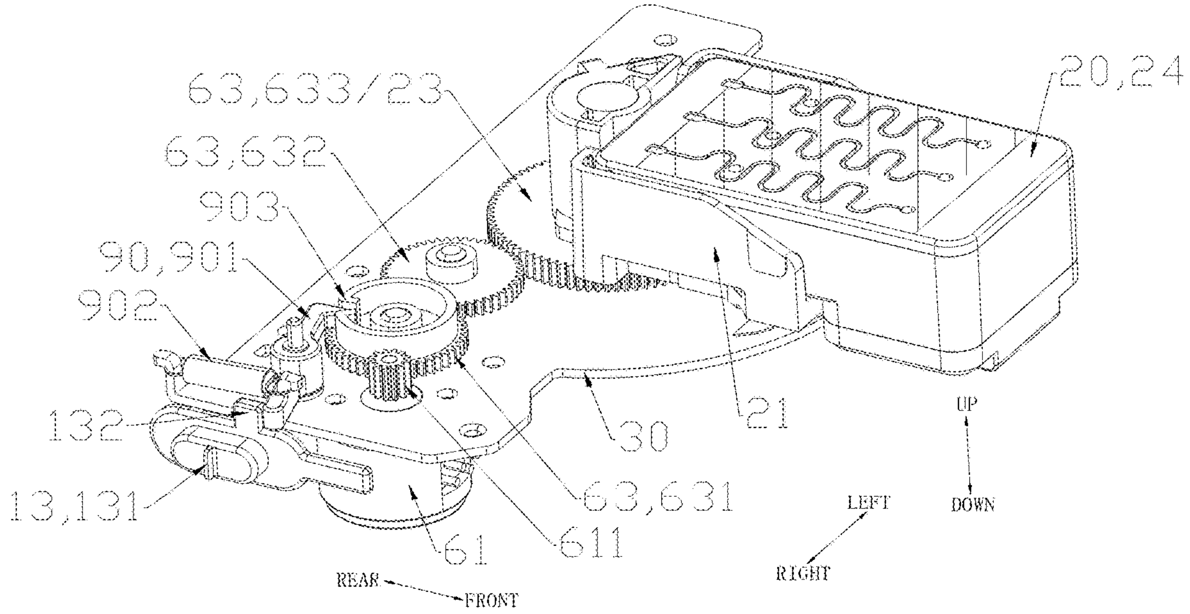
FIG. 63A is a schematic view of a third embodiment of a locking mechanism in a portable inkjet photo printer according to the present disclosure, with some components hidden.

As shown in FIG. 63A, a movably disposed control member (a type of force-applying member) 13 is disposed on the housing assembly. Further, in this embodiment, the control member 13 is slidably disposed on the second housing 12. Specifically, the control member 13 is preferably a power switch (sliding type) of the printer. Still further, the control member 13 is configured to interact with the locking mechanism 90. By sliding the control member 13 to control the locking mechanism 90, the locking and unlocking of the printing mechanism 20 are realized.

Further, along the front-rear direction, the control member 13 is configured to slide between an open position and a closed position. When the control member 13 is in the open position, the printer is in a power-on state, and the printing mechanism 20 is unlocked (not locked, in a free state). When the control member 13 is in the closed position, the printer is in a power-off state, a sleep state, or executes a power-off program, and the printing mechanism 20 is locked (in a locked state).

In some embodiments, the control member 13 includes a pushing portion 132. The pushing portion 132 is configured to push a part of the locking mechanism 90 to unlock the printing mechanism 20 by the locking mechanism 90.

As introduced above, in order to avoid the influence of ink drying at the nozzle 251 of the inkjet device 25 in the printer, when the control member 13 moves from the open position to the closed position, the printer executes a sleep program, driving the printing mechanism 20 to move to a preset sealing position described later, preventing the nozzle 251 from directly contacting the atmosphere and causing the ink to dry quickly. Conversely, when the control member moves from the closed position to the open position, the printer executes a power-on program, driving the printing mechanism 20 to move from the sealed position to a predetermined position, and the user can install/replace the ink storage portion (ink cartridge) from the predetermined position.

However, it takes a certain amount of time for the printer to move the printing mechanism to the predetermined position after executing the power-on program. If the user forgets to move the control member 13 to the open position and directly opens the cover member 10 described later, the printing mechanism 20 cannot move to the predetermined position, and thus the ink storage portion (ink cartridge) cannot be installed/replaced.

Alternatively, if the user moves the control member 13 from the closed position to the open position and opens the cover member 10 described later, and then gives up waiting before the printing mechanism 20 moves to the predetermined position, the user will feel confused, causing inconvenience in use.

Therefore, in this embodiment, while the control member 13 serves as the power switch of the printer, it also has the function of restricting the opening of the cover member 10 described later. For example, when the ink storage portion 24 (ink cartridge) needs to be replaced, the control member 13 is moved from the closed position to the open position, the printer starts, and drives the ink storage portion 24 to move to the predetermined position. At the same time, since the control member 13 releases the restriction on the cover member 10, the user can set the cover member to the open state and take out the ink storage portion 24 (ink cartridge).

With such a configuration, the execution of the power-on program may be synchronized with the opening of the cover member 10, shortening the waiting time for the user after opening the cover member 10. More importantly, it can also prevent the user from forgetting to move the control member 13 from the closed position to the open position.

In some embodiments, the control member 13 further includes a force receiving portion 131. The user slides the control member 13 by pushing the force receiving portion 131. The force receiving portion 131 is provided with protrusions. The protrusions can increase the friction when the user pushes the force receiving portion 131 to better slide the control member 13.

Figure 64:
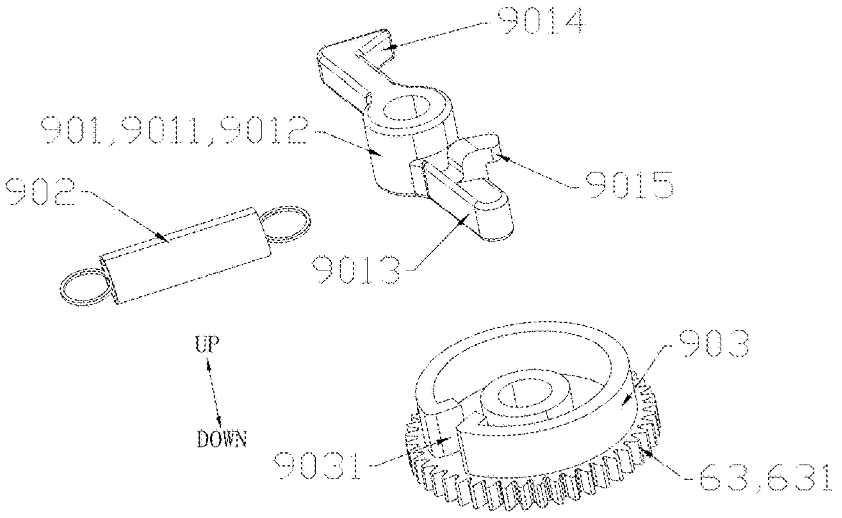
FIG. 64 is an exploded view of the third embodiment of the locking mechanism in a portable inkjet photo printer according to the present disclosure.

As shown in FIG. 63A and FIG. 64, the locking mechanism 90 similarly includes a third securing member 901, a reset member 902, and a locked member 903. The third securing member 901 is configured to interact with the locked member 903 to cause the printing mechanism 20 to be locked. The reset member 902 is configured to keep the printing mechanism 20 locked.

Specifically, the third securing member 901 is movably disposed relative to the printing support mechanism 30/housing assembly. In this embodiment, the third securing member 901 is rotatably disposed relative to the printing support mechanism 30/housing assembly. The third securing member 901 includes a pushed portion 9013, an acting portion 9014, and a reset portion 9015. Further, the pushed portion 9013 is configured to be pushed by the pushing portion 132, and the acting portion 9014 is configured to cooperate with a part of the locked member 903 to lock the printing mechanism 20. The reset portion 9015 is configured to connect with one end of the reset member 902. The third securing member 901 further includes a connecting main body 9011 and a moving portion 9012. The moving portion 9012 is rotatably installed on the second bracket/limiting bracket 32 or rotatably installed on the printing support mechanism 30. The moving portion 9012, the pushed portion 9013, the acting portion 9014, and the reset portion 9015 are all disposed on the connecting main body 9011. The acting portion 9014 is located at one end of the connecting main body 9011, and the pushed portion 9013 is located at the other end of the connecting main body 9011.

Specifically, the reset member 902 is an elastic component, such as an elastic metal sheet, a cantilever, a spring, rubber, sponge, etc. In this embodiment, the reset member 902 is configured as a spring, preferably a tension spring. One end of the reset member 902 is connected to the reset portion 9015, and the other end is connected to a part of the printing support mechanism 30.

Specifically, the locked member 903 is disposed on the first coupling member 631. In this embodiment, the locked member 903 and the first coupling member 631 are integrally formed. Further, the locked member 903 is a protrusion extending from the first coupling member 631. The locked member 903 can move (e.g., rotate) with the first coupling member 631. The first coupling member 631 is configured to transmit the driving force output by the first motor 61 to cause the printing mechanism 20 to rotate or translate. Further, the locked member 903 has an acted-upon portion 9031 configured to cooperate with the acting portion 9014. The number of the acted-upon portion 9031 is one or more. In this embodiment, the number of the acted-upon portion 9031 is one.

In some embodiments, in the front-rear direction, the third securing member 901 is located on a side of the first coupling member 631 away from the paper outlet 122/printing area. At the same time, the third securing member 901 is disposed away from the swing range of the printing mechanism 20, which can make the internal structure of the printer more compact and is also conducive to the miniaturized design of the printer.

In some embodiments, in the left-right direction, the control member 13 and the third securing member 901/first coupling member 631 at least partially overlap to make the printer compact and reduce the size of the printer in the front-rear direction.

Figure 63B:
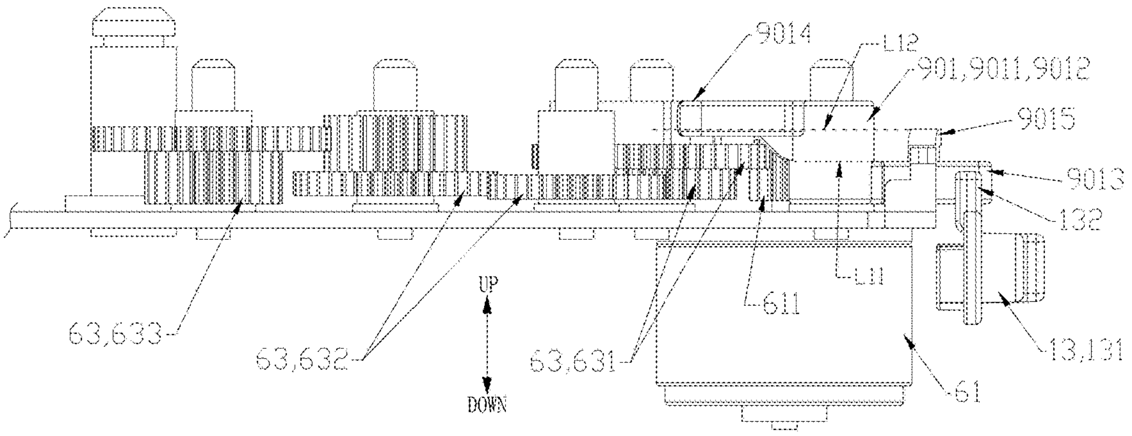
FIG. 63B is a plan view of the third embodiment of the locking mechanism in a portable inkjet photo printer according to the present disclosure, with some components hidden, observed from rear to front.

In some embodiments, the reset portion 9015 is disposed on the pushed portion 9013. In the up-down direction, the pushed portion 9013 is located below the acting portion 9014. The third securing member 901 is located above a first intermediate transmission assembly 63 described later. At least a part of the third securing member 901/at least a part of the first coupling member 631 is located above the pushed portion 9013 (refer to dashed line L11 in FIG. 63B). At least a part of the locked member 903 is located above the reset portion 9015. Along the front-rear direction/left-right direction, the reset portion 9015 and the acting portion 9014 at least partially overlap (refer to dashed line L11 and dashed line L12 in FIG. 63B). Preferably, along the up-down direction, the locked member 903 is located above the first intermediate transmission assembly 63 described later, and they at least partially overlap in the up-down direction. With such a configuration, the acting portion 9014 is set higher than the pushed portion 9013. The acting portion 9014 located above can cooperate with the acted-upon portion 9031. The reset portion 9015 is disposed on the pushed portion 9013 located below. This makes the space of the printer more compact.

In some embodiments, the acting portion 9014 may be configured as a protrusion or a groove, and the acted-upon portion 9031 may be configured as a groove or a protrusion configured to cooperate with the acting portion 9014.

Figure 65A:
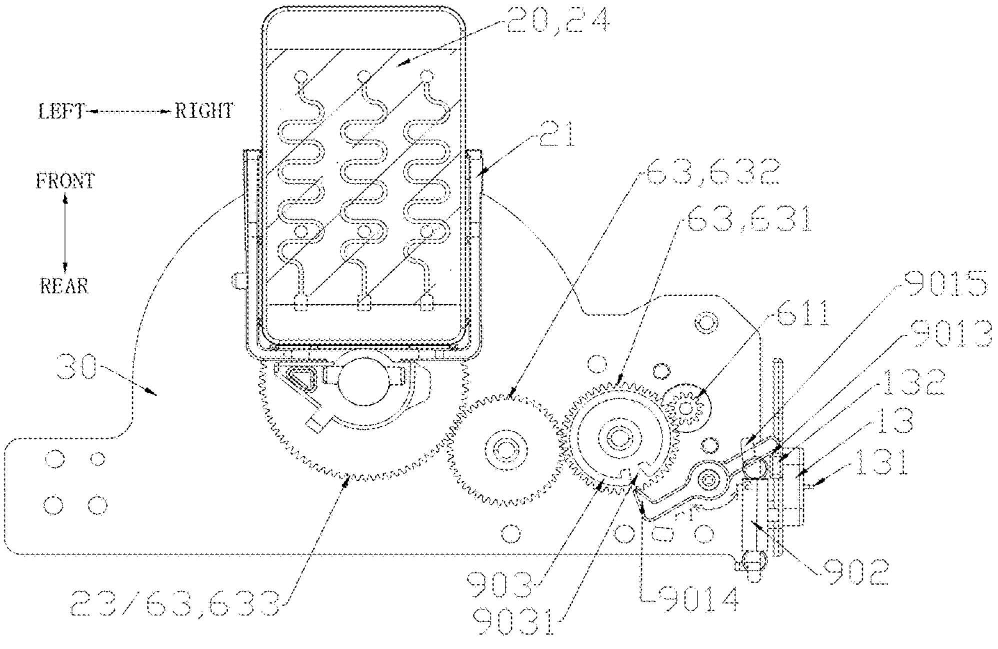
FIG. 65A is a schematic view of the third embodiment of the locking mechanism in a portable inkjet photo printer according to the present disclosure, with some components hidden, observed from top to bottom, when the printing mechanism is not locked.

As shown in FIG. 65A, when the control member 13 is in the open position, the printer is in the power-on state. The third securing member 901 is pushed by the control member 13. The reset member 902 undergoes elastic deformation. The acting portion 9014 does not cooperate with the acted-upon portion 9031. The printing mechanism 20 is not locked, and the printing mechanism 20 is in a free state.

Figure 65B:
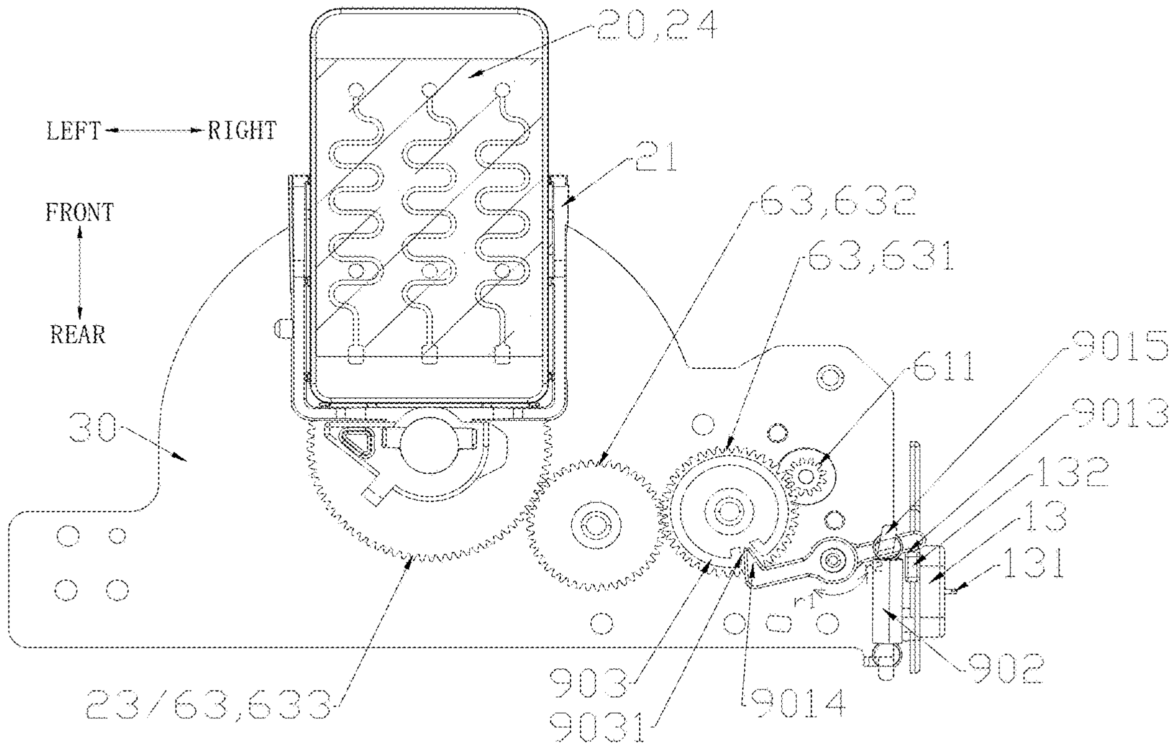
FIG. 65B is a schematic view of the third embodiment of the locking mechanism in a portable inkjet photo printer according to the present disclosure, with some components hidden, observed from top to bottom, when the printing mechanism is locked.

As shown in FIG. 65B, when the control member 13 slides from the open position to the closed position, under the action of the reset member 902, the third securing member 901 rotates around the moving portion 9012 along the direction r1, and drives the acting portion 9014 to cooperate with the acted-upon portion 9031, causing the locked member 903 to be stuck and stop rotating. Thus, the first coupling member 631 stops rotating, thereby interrupting the transmission of the driving force. Finally, the printing mechanism 20 stops moving and is locked. In other words, the printing mechanism 20 is in a locked state. At this time, the printer is in a power-off state, a sleep state, or executes a power-off program.

As shown in FIG. 65A, when the control member 13 slides from the closed position to the open position, the pushing portion 132 pushes the pushed portion 9013 to rotate around the moving portion 9012 in a direction opposite to r1, i.e., in the direction r2, and drives the acting portion 9014 to disengage from the acted-upon portion 9031. The locked member 903 is no longer stuck. Thus, the first coupling member 631 can transmit the driving force, and the printing mechanism 20 is unlocked. In other words, the printing mechanism 20 returns to the free state. At the same time, the reset member 902 undergoes elastic deformation. At this time, the printer is in the power-on state.

The beneficial effects obtainable by the above Locking Mechanism Embodiment 1 to Locking Mechanism Embodiment 3 include: preventing the printing mechanism from rotating or translating when power is off, so as to avoid affecting subsequent printing quality.

[Securing Mechanism]

The securing mechanism (the blocking portion 2421 described later is one implementation of the securing mechanism) is disposed between the printing carriage 21 and the ink storage portion 24. The securing mechanism may be disposed on at least one of the ink storage portion 24 and the printing carriage 21. Regardless of whether the inkjet device 25 is fixedly connected to the ink storage portion 24, the ink storage portion 24 may be detachably connected to the printing carriage 21 in various different implementations.

In some embodiments, the securing mechanism includes a first securing member and a second securing member. Specifically, the first securing member is disposed on the ink storage portion 24, and the second securing member is disposed on the printing carriage 21.

In some embodiments, the securing mechanism is a magnetic structure, such as the first securing member and the second securing member interacting through magnetism described later, which is not limited herein.

In some embodiments, the securing mechanism is an elastic structure. Specifically, at least one of the first securing member and the second securing member is an elastic structure, and the other one of the first securing member and the second securing member cooperates with the elastic structure to achieve the fixed connection between the printing carriage 21 and the ink storage portion 24. Optionally, the first securing member is an elastic structure, and the second securing member is a protrusion structure cooperating with the elastic structure. Specifically, the first securing member is an elastic structure movably disposed on the printing carriage 21, and the second securing member is a protrusion disposed on the ink storage portion 24. When installing/removing the ink storage portion 24, the first securing member undergoes elastic deformation to lock/unlock the protrusion. Refer to the blocking portion 2421 described later for details. Optionally, the first securing member is an elastic structure, and the second securing member is configured as a structure abutting against the elastic structure. For example, the second securing member is a groove structure recessed corresponding to the first securing member. As another example, the second securing member is configured as a flat surface. The ink storage portion 24 is fixed by the friction force generated by the elastic deformation after the first securing member abuts against the second securing member.

In some embodiments, the ink storage portion 24 is fixedly installed on the printing carriage 21 by the friction force formed by the mutual abutment between the first securing member and the second securing member.

In some embodiments, as shown in FIG. 141A and FIG. 141B, the first communication module 75 is disposed on the printing mechanism 20. For example, a length direction of the ink storage portion 24 is the front-rear direction, a width direction of the ink storage portion 24 is the left-right direction, and a height direction of the ink storage portion 24 is the up-down direction, the first communication module 75 is disposed on the side wall of the printing mechanism 20 in the left-right direction. Further, the first communication module 75 is disposed on the left side wall 24103 and/or the right side wall 24104 of the ink storage portion 24. The second communication module 72 is disposed on the printing carriage 21. The second communication module 72 is preferably a metal contact pin. For example, a length direction of the printing carriage 21 is the front-rear direction, a width direction of the printing carriage 21 is the left-right direction, and a height direction of the printing carriage 21 is the up-down direction, the second communication module 72 is disposed on the side wall of the printing carriage 21 in the left-right direction. In the left-right direction, the second communication module 72 and the first communication module 75 are disposed opposite to each other.

Further, as shown in FIG. 141A and FIG. 141B, the securing mechanism includes a first securing member 2421A and a second securing member 2421B. Specifically, the first securing member 2421A is the second communication module 72 configured as a form of metal contact pin, and the second securing member 2421B is the first communication module 75. Preferably, the first securing members 2421A are respectively located on opposite side walls of the printing carriage 21 in the left-right direction, and the second securing members 2421B are respectively located on the left side wall 24103 and the right side wall 24104. Further, the first securing member 2421A/metal contact pin 72 can undergo elastic deformation. When the ink storage portion 24 is installed to the printing carriage 21, the metal contact pin 72 disposed on the side wall of the printing carriage 21 in the left-right direction undergoes elastic deformation and applies elastic force to the ink storage portion 24/second securing member 2421B to increase friction, thereby preventing the ink storage portion 24 from falling off. It can also make the fixing method of the ink storage portion 24 simpler, thereby reducing costs. Further, the securing mechanism further includes a fourth securing member 2421C. The fourth securing member 2421C is configured as a snap-fit portion. Specifically, the fourth securing member 2421C is configured to cooperate with the opposite side walls of the printing carriage 21 in the left-right direction to serve a guiding and limiting function.

In some embodiments, as shown in FIG. 141C to FIG. 141D, the printing carriage 21 includes a cavity 2100 and a contact pin hole 2101. The cavity 2100 is configured to accommodate the printing mechanism 20. The contact pin hole 2101 is recessed from a side wall of the printing carriage 21 in a direction away from the cavity 2100. The contact pin hole 2101 is configured to expose at least a part of the second communication module 72 toward the cavity 2100, facilitating the electrical connection between the second communication module 72 and the first communication module 75. A communication module fixing portion is provided between the printing carriage 21 and the second communication module 72. The communication module fixing portion is located at a side wall of the printing carriage 21 away from the cavity 2100. That is, the communication module fixing portion is disposed on an outer side wall of the printing carriage 21.

Specifically, the contact pin hole 2101 is disposed penetrating the side wall of the printing carriage 21. In the left-right direction, contact pin holes 2101 are provided on opposite side walls of the printing carriage 21. Preferably, the communication module fixing portion includes a protrusion 2102A provided on the printing carriage 21 and a hole 2102B on the second communication module 72. During assembly, the protrusion 2102A passes through the hole 2102B, and a part of the protrusion 2102A is melted and deformed by heat staking to fix the second communication module 72 on the printing carriage. With such a configuration, the contact pin hole 2101 provided penetrating the printing carriage 21 facilitates the installation of the second communication module 72, and the assembly is simple.

Figure 8:
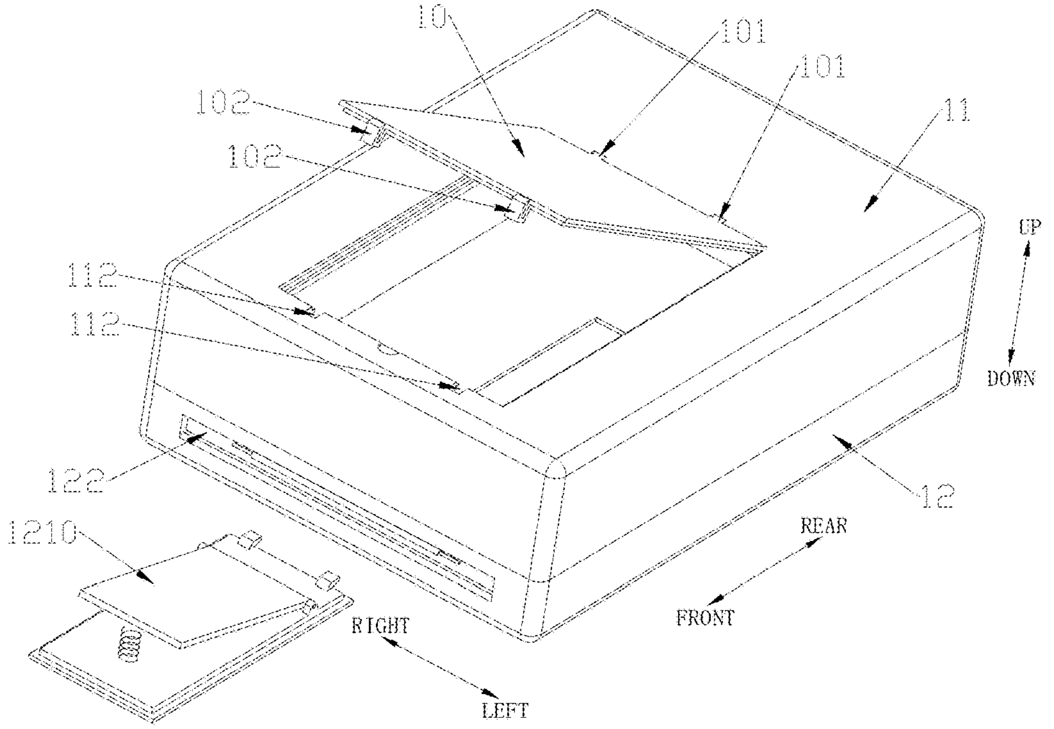
FIG. 8 and FIG. 9 are schematic views of a first embodiment of a cover opening mechanism in a portable inkjet photo printer according to the present disclosure.

In some embodiments, the securing mechanism may also be configured to cooperate with the cover member 10 described later (as shown in FIG. 1 and FIG. 8) to achieve the detachable connection between the ink storage portion 24 and the printing carriage 21. Preferably, when installing the ink storage portion 24, the cover member 10 is set to the open state. After the ink storage portion 24 is set to the predetermined position, during the process of the cover member 10 changing from the open state to the closed state, the securing mechanism interacts with the cover member 10, so that the ink storage portion 24 is fixed to the printing carriage 21. During the process of the cover member 10 changing from the closed state to the open state, the cover member 10 interacts with the securing mechanism, so that the ink storage portion 24 is unlocked from the printing carriage 21. This embodiment may also be combined with the aforementioned embodiments, that is, the securing mechanism is configured as a magnetic structure, an elastic structure, or the ink storage portion 24 is fixedly installed on the printing carriage 21 by the friction force formed by the mutual abutment between the first securing member and the second securing member.

[Printing Area]

The printing area is the area that overlaps with the printing medium when the printing mechanism moves along the specific trajectory. Or in other words, the printing area is the area where the printing medium can receive ink ejected from the inkjet device 25 when passing through the printing mechanism along the paper feeding direction. Conversely, it is the non-printing area. In this embodiment, the shaded part P in FIG. 10 is the printing area.

[Specific Trajectory]

Figure 10:
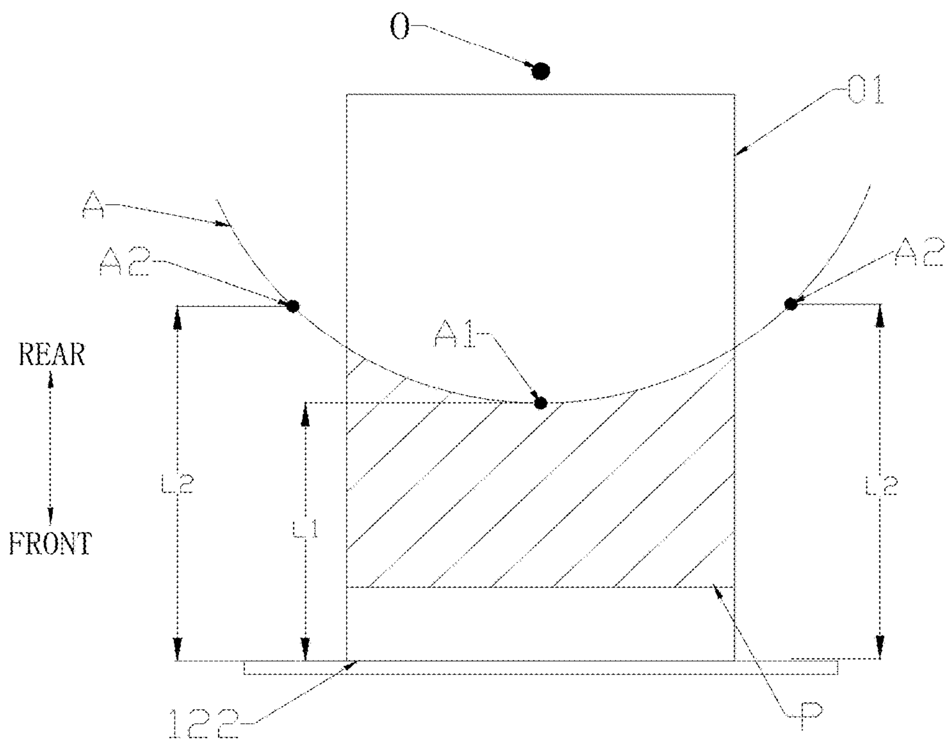
FIG. 10 is a schematic view of a specific trajectory, a printing area, a printing medium, and a paper outlet in a portable inkjet photo printer according to the present disclosure.

FIG. 10 is a schematic view of the specific trajectory A, the printing area P, the printing medium 01, and the paper outlet 122.

In some embodiments, when the printing medium 01 passes through the printing area P, the projection trajectory of the specific trajectory A on the printing medium 01 is arcuate.

In some embodiments, along the direction perpendicular to the paper feeding direction (forward direction), the projection trajectory formed by the specific trajectory A on the printing medium 01 is arcuate.

In some embodiments, viewed along the direction perpendicular to the paper feeding direction, the specific trajectory A is arcuate, or in other words, when the printing mechanism 20 moves along the specific trajectory A with "O" as the center, the printing range of the printing mechanism 20 is fan-shaped, annular, or circular, i.e., the printing area P is fan-shaped, annular, or circular.

In some embodiments, along the paper feeding direction/the travel direction of the printing medium, the specific trajectory A has a first position A1 and two second positions A2. Specifically, when the printing mechanism 20 is at the first position A1, along the front-rear direction, the distance between the inkjet device 25 and the paper outlet 122 is L1. When the printing mechanism 20 is at the second position A2, along the front-rear direction, the distance between the inkjet device 25 and the paper outlet 122 is L2, and L1<L2. In this embodiment, the printing area is the shaded part P, i.e., along the up-down direction, the printing area P is the area where the printing mechanism 20/inkjet device/print head 25 overlaps with the printing medium 01 when moving along the specific trajectory A.

In some embodiments, in the left-right direction, the displacement of the specific trajectory A is defined to be greater than or equal to the width of the printing medium 01, or in other words, in the left-right direction, the maximum distance of the specific trajectory A is greater than or equal to the width of the printing medium 01.

In some embodiments, the plane formed by extending along the front-rear direction and the left-right direction is parallel to the horizontal plane. When the printing mechanism 20 moves along the specific trajectory A, the printing mechanism 20 is inclined relative to the horizontal plane.

Figure 15:
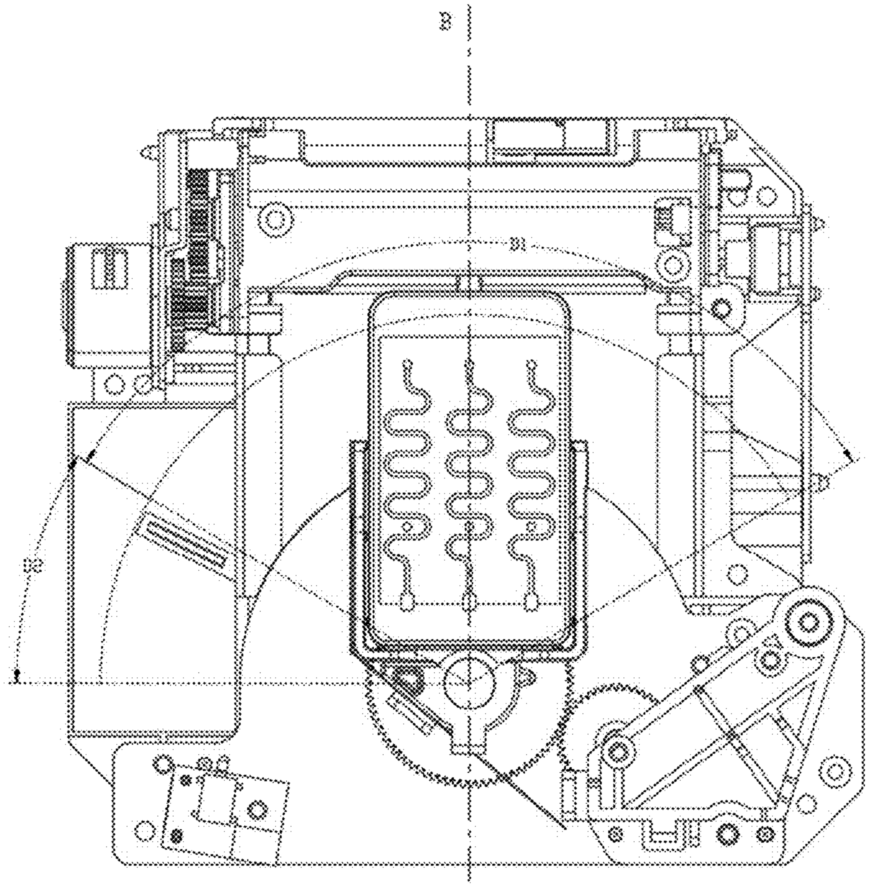
FIG. 15 is a schematic view of a rotatable range of a printing mechanism in a portable inkjet photo printer according to the present disclosure.

Further, as shown in FIG. 15, in some embodiments, the rotatable range of the printing mechanism 20 includes a printing area range D1 and a non-printing area range D2. For example, draw a reference line B passing through the center position of the paper outlet 122 and the central axis of the rotating member 23 described later. Define that the printing mechanism 20 is at the 0° position of the rotatable range at this time. At this time, the rotatable range of the printing mechanism 20 is (−90°, 60°). Specifically, the printing area range D1 is (−60°, 60°), and the non-printing area range D2 (−90°, −60°) other than the printing area P may be regarded as the position where the printing mechanism 20 is located during cleaning. The above range is given as an example and is not specifically limited herein.

[Inkjet Device]

The inkjet device 25 is configured to eject ink onto the printing medium to form an image, such as paper, photo paper, etc. The inkjet device 25 includes a fluid delivery structure to provide printing fluid, and also includes at least one nozzle to eject the printing fluid onto the printing medium.

In some examples, the inkjet device 25 may be a print head.

In some examples, the inkjet device/print head 25 includes an internal delivery structure (e.g., channels) to guide the printing fluid to a series of print head dies. In one example, the print head die includes a fluid delivery structure and a fluid ejection circuit to eject printing fluid from nozzles on an orifice plate installed on the print head die.

In some examples, the inkjet device 25 is based on thermal inkjet or piezoelectric inkjet printing technology.

In some examples, different printing fluids are individually guided into a single print head die and ejected within the single print head die. In other examples, each print head die is configured to eject a single kind of printing fluid. Specifically, multiple print head dies are further disposed in a single print head die unit to eject multiple different printing fluids.

In some embodiments, as shown in FIG. 123, the inkjet device 25 includes at least one nozzle 251. The nozzle 251 includes at least one nozzle unit 2511. When there are multiple nozzle units 2511, the multiple nozzle units 2511 are arranged in a straight line. Specifically, the arrangement direction of the multiple nozzle units 2511 is perpendicular to the paper feeding direction, in other words, the multiple nozzle units 2511 are arranged along the left-right direction. Specifically, when the inkjet device 25 is provided with one or more nozzles 251, each nozzle 251 is configured to eject printing fluid (such as ink) of the same color. Specifically, when the inkjet device 25 is provided with one nozzle 251, the nozzle 251 is configured to eject ink of one color, for example, the nozzle 251 ejects Black (B) ink, and the printer performs monochrome printing. When the printer is provided with three nozzles 251, each nozzle 251 is configured to eject ink of one color, for example, the three nozzles 251 are respectively configured to eject Cyan (C), Magenta (M), and Yellow (Y) inks of three different colors. When the printer is provided with four nozzles 251, each nozzle 251 is configured to eject ink of one color, for example, the four nozzles 251 are respectively configured to eject Cyan (C), Magenta (M), Yellow (Y), and Black (B) inks of four different colors, and the printer performs color printing. Further, the printing medium is set as roll paper. Still further, a back adhesive may be provided on the printing medium. Preferably, the printing medium may be label paper, tattoo transfer paper, etc., so that color printing of small-sized paper may be performed. Further, the width of the arrangement of the multiple nozzle units 2511 along the left-right direction is not less than the width of the printing area along the left-right direction. Specifically, the size of the printing medium in the left-right direction is half an inch. In some embodiments, as shown in FIG. 122 to FIG. 126, the printing support mechanism 30 is rotatably disposed relative to the base 15. Specifically, the printing support mechanism 30 is provided with a third snap-fit portion 3011, and the base 15 is provided with a third snapped portion 1511. The third snap-fit portion 3011 is configured to rotatably cooperate with the third snapped portion 1511. Along the front-rear direction, the third snap-fit portion 3011 and the third snapped portion 1511 are disposed on the side away from the paper outlet 122. Further, along the front-rear direction, the paper outlet 122 is located at the front end portion, and the third snap-fit portion 3011/third snapped portion 1511 is located at the rear end portion. Still further, the rotation axis of the printing support mechanism 30 is parallel to the left-right direction. In some embodiments, the third snap-fit portion 3011 is configured as a rotation shaft, and the third snapped portion 1511 is configured as a hole/groove cooperating with the rotation shaft, or the third snapped portion 1511 is configured as a rotation shaft, and the third snap-fit portion 3011 is configured as a hole/groove cooperating with the rotation shaft.

In some embodiments, as shown in FIG. 125, the securing mechanism includes a first snap-fit portion 24151 and a first snapped portion 24152. The first snap-fit portion 24151 snaps with the first snapped portion 24152 to secure/lock the printing mechanism 20. Specifically, the first snap-fit portion 24151 is disposed on the printing support mechanism 30, and the first snapped portion 24152 is disposed on the base 15. Further, the first snap-fit portion 24151 is rotatably disposed.

In some embodiments, as shown in FIG. 125, after the securing mechanism is unlocked, the printing mechanism 20/printing carriage 21 can rotate relative to the printing support mechanism 30. Further, the rotation axis of the printing mechanism 20/printing carriage 21 is parallel to the left-right direction. Specifically, a movable member 23 disposed on the printing carriage 21 rotatably cooperates with a mating portion 3012 disposed on the printing support mechanism 30. Still further, the movable member 23 is configured as a rotation shaft, and the mating portion 3012 is configured as a hole/groove cooperating with the rotation shaft, or the mating portion 3012 is configured as a rotation shaft, and the movable member 23 is configured as a hole/groove cooperating with the rotation shaft.

In some embodiments, the printer is further provided with a shielding cover 3013. The shielding cover 3013 is detachably combined with the printing support mechanism 30 by means of a snap-fit. Further, when the printing mechanism 20 is locked, along the up-down direction, at least a part of the shielding cover 3013 is located below the printing carriage 21. Along the front-rear direction, the shielding cover 3013 is located behind the inkjet device 25.

[Printing Support Mechanism]

As shown in FIG. 5, the printer further includes a printing support mechanism 30. Viewed in the up-down direction, the printing support mechanism 30 is disposed below the printing carriage 21. The printing support mechanism 30 is configured to support the printing mechanism 20. Along the up-down direction, on the side close to the inkjet device 25, the shape of the printing support mechanism 30 is configured to be consistent with the movement trajectory formed when the printing carriage 21/printing mechanism 20 moves along the specific trajectory A. In other words, along the up-down direction, on the side close to the inkjet device 25, the shape of the printing support mechanism 30 is preferably arcuate. Further, the angle of the arc of the printing support mechanism 30 is configured to be the same as the angle of the movement trajectory of the printing carriage 21/printing mechanism 20. This is beneficial for more precise positioning of the printing mechanism 20 during printing.

Figure 41A:
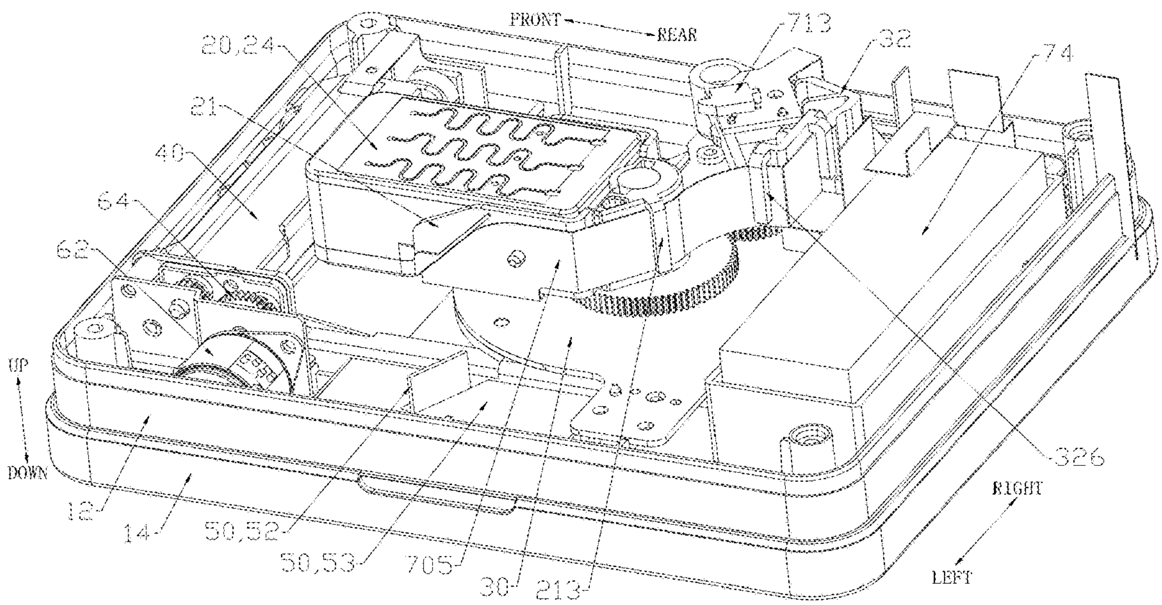
FIG. 41A and FIG. 41B are schematic views of a third electrical connector in a printing mechanism in a portable inkjet photo printer according to the present disclosure.
Figure 41B:
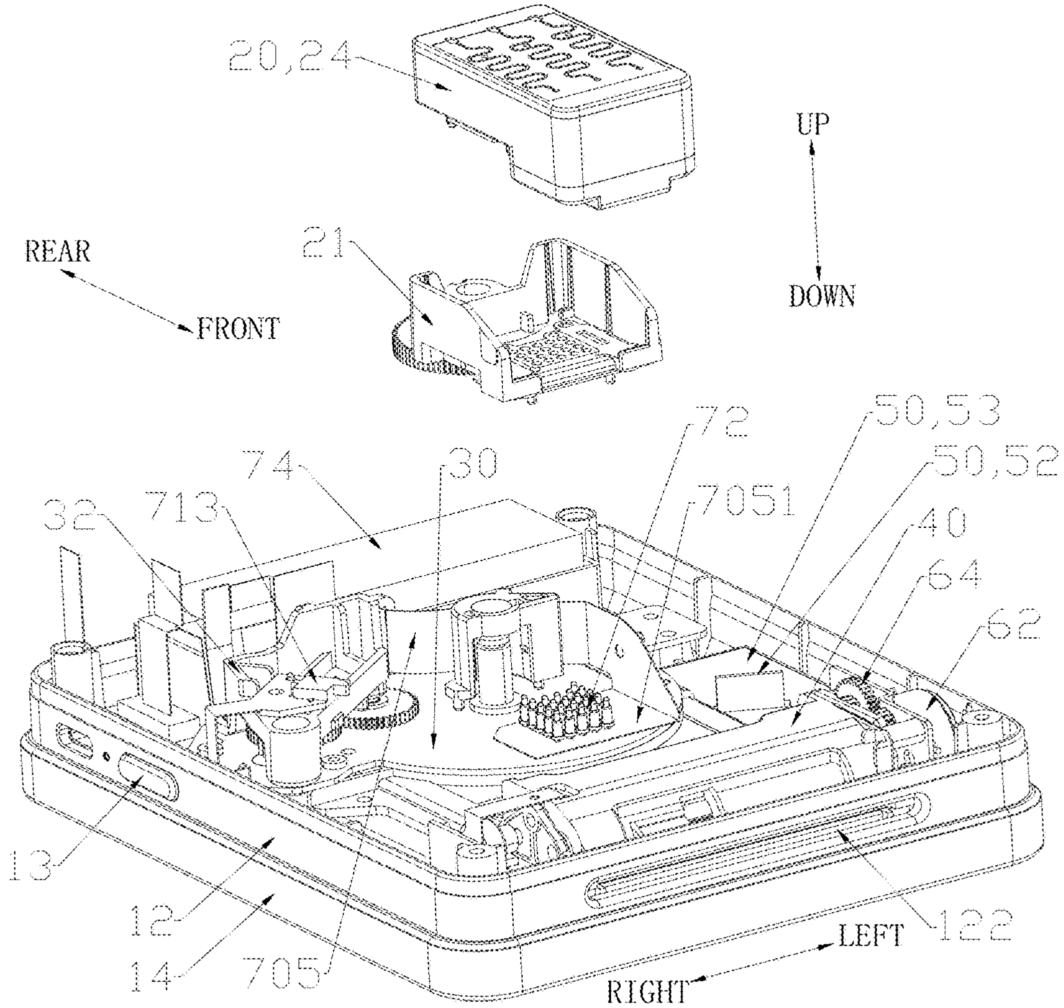
Figure 42:
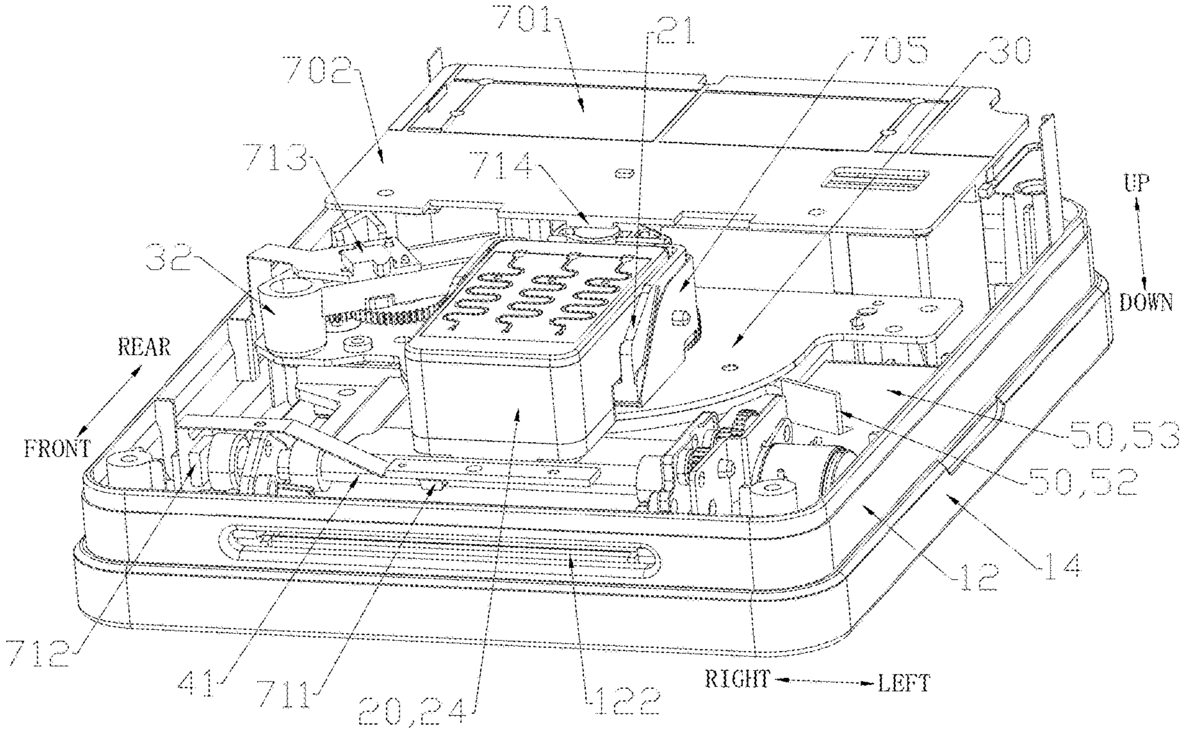
FIG. 42 is a schematic view of a portable inkjet photo printer according to the present disclosure with some components hidden.

In some embodiments, the driving assembly is installed on the printing support mechanism 30. A sensor component for detecting the position of the driving assembly and/or the printing mechanism 20 is also installed on the printing support mechanism 30. For example, when the printing mechanism 20 rotates erroneously to a limit position, the sensor component is triggered. At this time, the control module forcibly stops the rotation of the first motor 61 described later. Optionally, the sensor component is configured as a micro switch. Further, as shown in FIG. 41A, FIG. 41B, and FIG. 42, in this embodiment, a position sensor 713 for detecting the position of the printing mechanism 20 and a second bracket/limiting bracket 32 for limiting the printing mechanism 20 are installed on the printing support mechanism 30. In this embodiment, the position sensor 713 is disposed on the second bracket/limiting bracket 32. When the printing mechanism 20 rotates to the limit position, the position sensor 713 is triggered. The position sensor 713 feeds back information to the control module, and the control module controls the first motor 61 to stop rotating or reverse. Still further, in this embodiment, the number of position sensors 713 is one or two. In the left-right direction, the position sensor 713 may be disposed on the leftmost side or the rightmost side. The position sensor 713 may be a photoelectric sensor or a magnetic sensor (such as a magnetic encoder).

In other embodiments, the printing support mechanism 30 may also be circular.

[Printing Carriage]

Printing Carriage Embodiment 1

As shown in FIG. 4 and FIG. 5, the printer further includes a printing carriage 21 and a driving assembly. The printing mechanism 20 is installed on the printing carriage 21. The printing carriage 21 is configured to match the size of the printing mechanism 20. The driving assembly is configured to drive the printing carriage 21 and the printing mechanism 20 to move along a specific trajectory. Specifically, the printing carriage 21 is provided with an installation portion 211. The driving assembly is provided with a rotating member (an example of movable member) 23 and a driving gear. A connecting portion 231 is provided on the rotating member 23. The connecting portion 231 cooperates with the installation portion 211 so that the rotating member 23 and the printing carriage 21 are connected to each other. Along the front-rear direction, the installation portion 211 is disposed at an end away from the inkjet device 25. In this embodiment, along the front-rear direction, the installation portion 211 is located behind the inkjet device 25. The connecting portion 231 is preferably a connecting arm. The installation portion 211 is configured to connect with the connecting arm 231. Specifically, a protrusion or a recess is provided on the connecting arm. The installation portion 211 is provided as a recess cooperating with the protrusion or a protrusion cooperating with the recess. The connecting arm 231 and the installation portion 211 are preferably hinged to each other, so that the printing mechanism 20 can be fixed to the printing carriage 21. To realize the swing of the printing mechanism 20 along a fixed trajectory, a rotating shaft 31 is provided on the printing support mechanism 30. The printing carriage 21 is nested on the rotating shaft 31 of the printing support mechanism 30 through the rotating member 23, so that the printing mechanism 20 can rotate with the printing carriage 21. In other embodiments, one or more connecting portions 231 may be provided. In this embodiment, the number of connecting portions 231 and installation portions 211 is preferably two.

In some embodiments, the movable member can perform curvilinear motion (e.g., rotation) or linear motion (e.g., translation). The movable member is connected to the printing carriage 21 and is configured to cause the printing carriage 21 and the printing mechanism 20 to perform curvilinear motion (e.g., rotation) or linear motion (e.g., translation).

It should be noted that the connection relationship between the printing carriage 21 and the driving assembly has multiple implementation schemes below. Observed in the up-down direction, the driving gear is disposed below the rotating member 23.

Example 1

The driving assembly includes a rotating member 23 and a driving gear. The driving gear is configured to drive the rotating member 23. At least a part of the printing carriage 21 and the rotating member 23 are detachably connected. Specifically, the rotating member 23 and the driving gear are detachably connected or integrally formed. The rotating member 23 and/or the driving gear are located above the printing medium.

Specifically, the printing carriage 21 and the driving assembly are detachably connected. The printing carriage 21 is detachably connected to the rotating member 23 of the driving assembly through the installation portion 211. At this time, the rotating member 23 and the driving gear belong to a part of the driving assembly. The rotating member 23 and the driving gear may be set as a detachable connection or integrally formed.

Example 2

The printing carriage 21 includes the rotating member 23 and the driving gear. The rotating member 23 and the driving gear are integrally formed. Specifically, the printing carriage 21, the rotating member 23, and the driving gear are an integrally formed structure of the three.

Example 3

The printing carriage 21 includes the rotating member 23. The driving assembly includes the driving gear. Specifically the rotating member 23 and the driving gear are detachably connected. Specifically, the printing carriage 21 and the rotating member 23 are integrally formed. The printing carriage 21 is detachably connected to the driving gear of the driving assembly through the rotating member 23.

Printing Carriage Embodiment 2

In other embodiments, the connecting portion 231 and the installation portion 211 may also be cancelled, and the printing carriage 21 and the rotating member 23 are integrally formed, or the printing carriage 21, the rotating member 23, and the driving gear are integrally formed.

Printing Carriage Embodiment 3

As described above, the ink storage portion 24 includes an ink storage portion body 241 and further includes an upper cover 242 disposed above the ink storage portion body 241. In order to stably place the ink storage portion 24/printing mechanism 20 in the printing carriage 21, in this embodiment, the printing carriage 21 is provided with a blocking portion 2421 (securing mechanism) for fixing the ink storage portion 24. The blocking portion 2421 can move relative to the ink storage portion 24 to realize the locking or unlocking of the ink storage portion 24. Specifically, the blocking portion 2421 is configured to interact with the upper cover 242. For example, the blocking portion 2421 cooperates with a protrusion/groove disposed on the upper cover 242 to achieve the fixation of the ink storage portion 24, which is not limited herein. In this embodiment, the blocking portion 2421 is generally in the shape of a handle, connected via hinge portions disposed on the left and right sides of the printing carriage 21. The blocking portion 2421 can rotate relative to the ink storage portion 24. The upper cover 242 is provided with a protruding portion 2422. The blocking portion 2421 is provided with a recessed portion 2423 cooperating with the protruding portion 2422. Alternatively, the upper cover 242 is provided with a recessed portion 2423, and the blocking portion 2421 is provided with a protruding portion 2422 cooperating with the recessed portion 2423. When the blocking portion 2421 rotates to the top of the upper cover 242, the protruding portion 2422 cooperates with the recessed portion 2423, so that the blocking portion 2421 can snap with the upper cover 242, playing a role in better closing the ink storage portion 24. When the user needs to add ink, turning the blocking portion 2421 to a position away from the upper cover 242 allows the upper cover 242 to be directly opened for operation, which can also effectively prevent ink leakage. In other embodiments, the blocking portion 2421 may also be a lock structure disposed on both sides of the printing carriage 21, which is not specifically limited here.

Specifically, step portions are provided on both sides of the printing carriage 21 exposed above. The setting of the step portions facilitates the picking and placing of the printing mechanism 20. The upper cover 242 and the ink storage portion body 241 are detachably connected. To better prevent ink leakage, the upper cover 242 and the ink storage portion body 241 are preferably connected by snap-fitting.

Specifically, a second communication module 72 is disposed in the printing carriage 21. The second communication module 72 is preferably a metal contact pin.

In some embodiments, the printing carriage 21 is set as a semi-rectangular hollow structure, as long as it can expose the inkjet device 25 in the printing mechanism 20 and can support the printing mechanism 20.

In other embodiments, the printing carriage 21 and the ink storage portion 24 may also be magnetically connected through a securing mechanism. Specifically, as shown in FIG. 16 and FIG. 17, the printing carriage 21 and the printing mechanism 20 are detachably connected through magnetic members. The securing mechanism includes a first securing member 2421A and a second securing member 2421B interacting magnetically. The first securing member 2421A is disposed on the printing carriage 21, and the second securing member 2421B is disposed on the ink storage portion 24. When the user needs to replace the ink storage portion 24, the magnetic connection makes the installation and disassembly of the printing mechanism 20 more convenient and provides a better installation feel.

More specifically, a first communication module 75 electrically connected to the second communication module 72 is disposed on the lower side of the ink storage portion 24. In the front-rear direction, the inkjet device 25 is located in front of the first communication module 75. Preferably, a pair of first securing members 2421A are respectively located on the left and right sides of the second communication module 72, and a pair of second securing members 2421B are respectively located on the left and right sides of the first communication module 75.

Specifically, any one of the first securing member 2421A and the second securing member 2421B has magnetism, and the other of the first securing member 2421A and the second securing member 2421B has magnetism or may be magnetically attracted. Optionally, both the first securing member 2421A and the second securing member 2421B are permanent magnets. Optionally, both the first securing member 2421A and the second securing member 2421B may also be electromagnets. Optionally, one of the first securing member 2421A and the second securing member 2421B is a permanent magnet, and the other is an electromagnet. Optionally, any one of the first securing member 2421A and the second securing member 2421B is a permanent magnet or an electromagnet, and the other is a ferromagnetic material such as iron, nickel, cobalt, etc., that may be attracted by magnetism.

Figure 49:
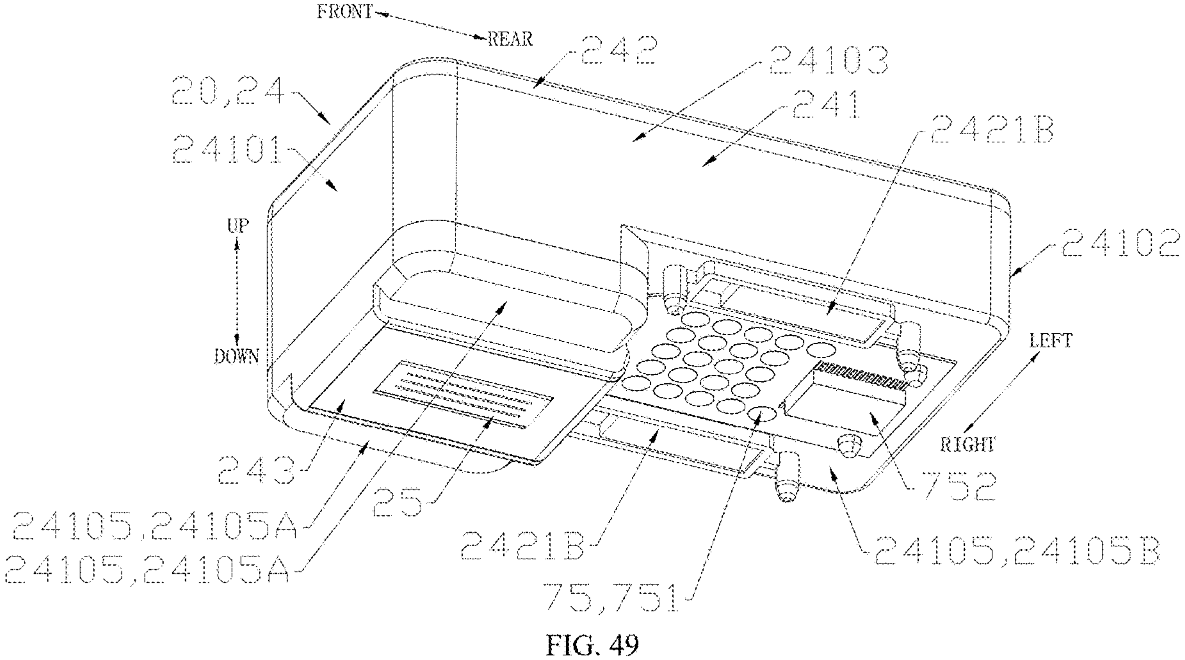
FIG. 49 is a perspective view of a first embodiment of a printing mechanism in a portable inkjet photo printer according to the present disclosure.
Figure 50A:
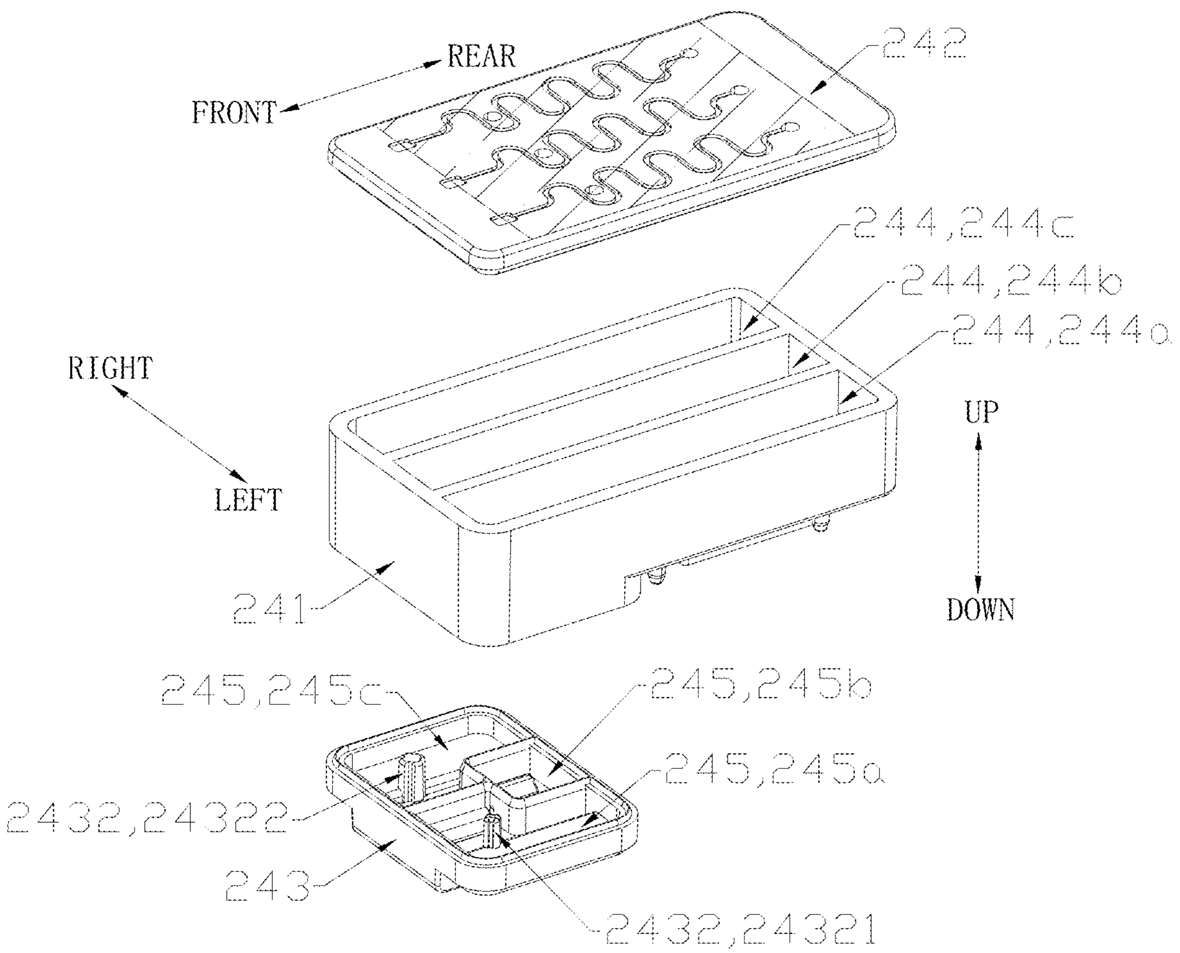
FIG. 50A is an exploded view of the first embodiment of the printing mechanism in a portable inkjet photo printer according to the present disclosure.
Figure 50B:
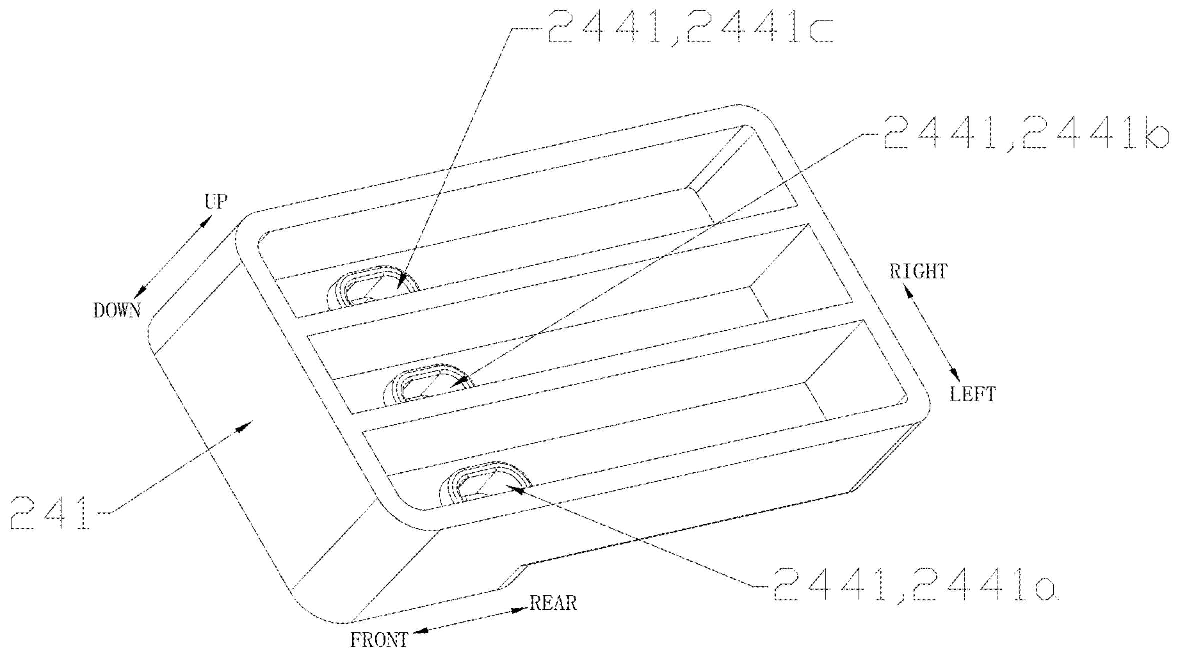
FIG. 50B is a perspective view of an ink storage portion body in the first embodiment of the printing mechanism in a portable inkjet photo printer according to the present disclosure.
Figure 50C:
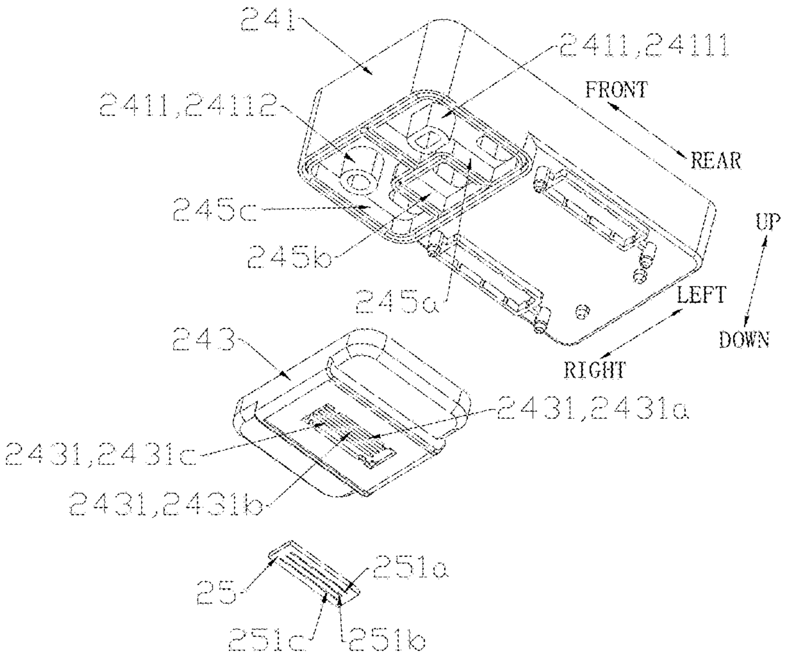
FIG. 50C is an exploded view from another angle of the first embodiment of the printing mechanism in a portable inkjet photo printer according to the present disclosure.
Figure 50D:
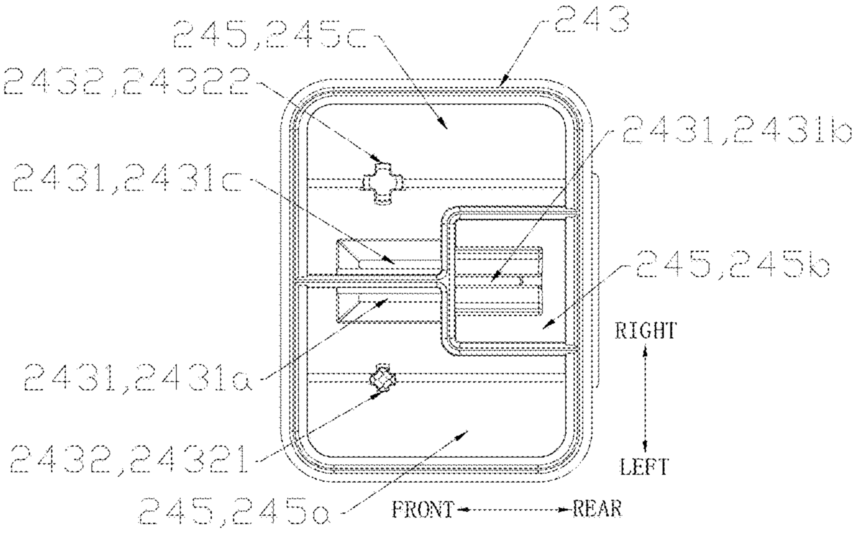
FIG. 50D is a schematic view of an inkjet device installation portion in the first embodiment of the printing mechanism in a portable inkjet photo printer according to the present disclosure.
Figure 51:
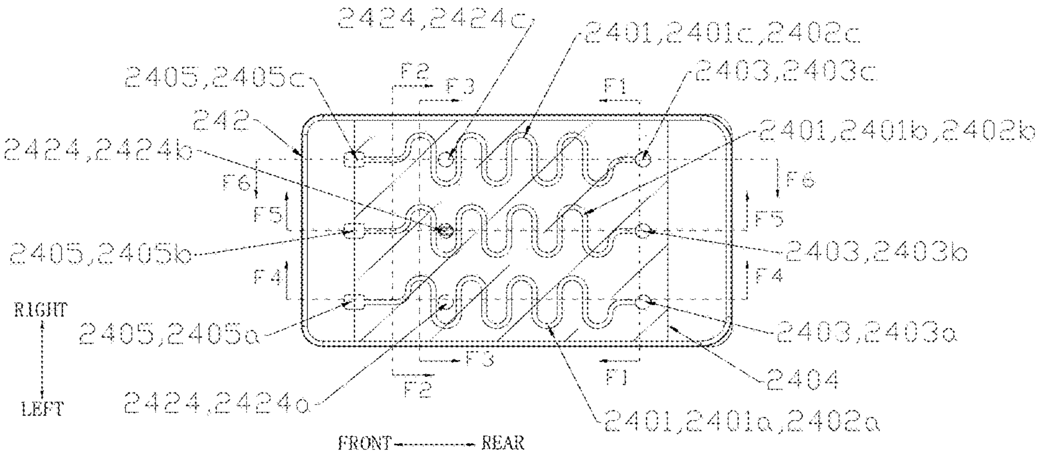
FIG. 51 is a schematic view of an upper cover in the first embodiment of the printing mechanism in a portable inkjet photo printer according to the present disclosure.
Figure 52:
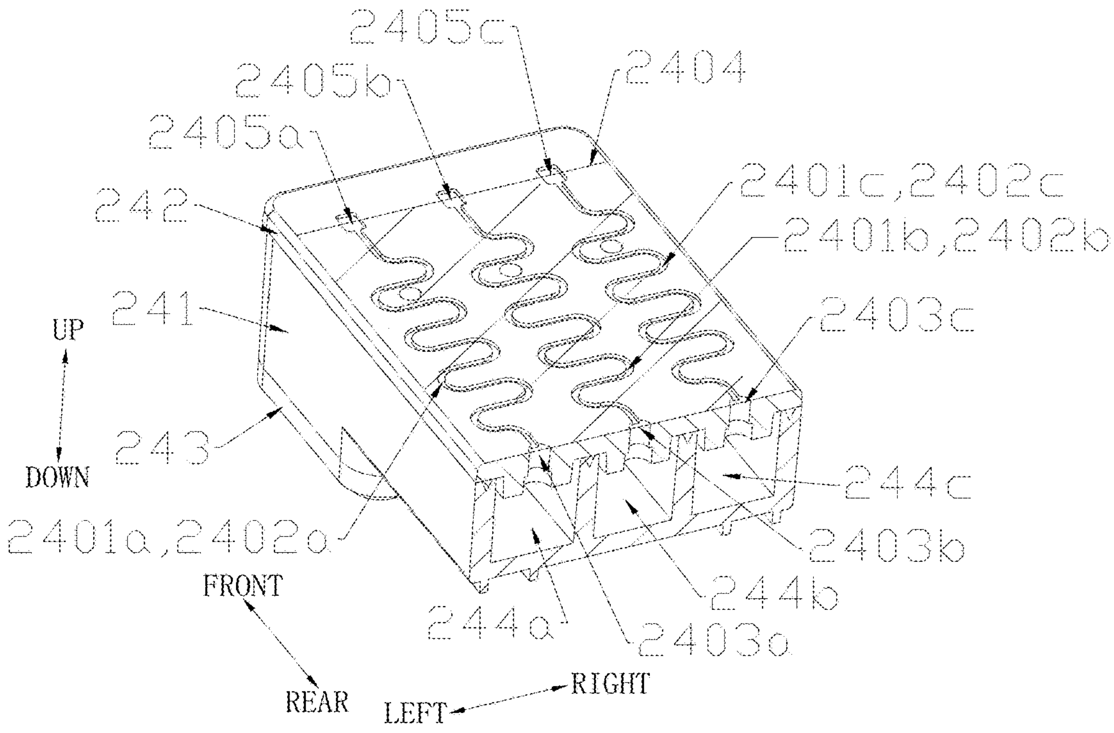
FIG. 52 is a schematic view of the first embodiment of the printing mechanism in a portable inkjet photo printer according to the present disclosure, taken along line F1-F1 in FIG. 51, observed from rear to front.
Figure 53A:
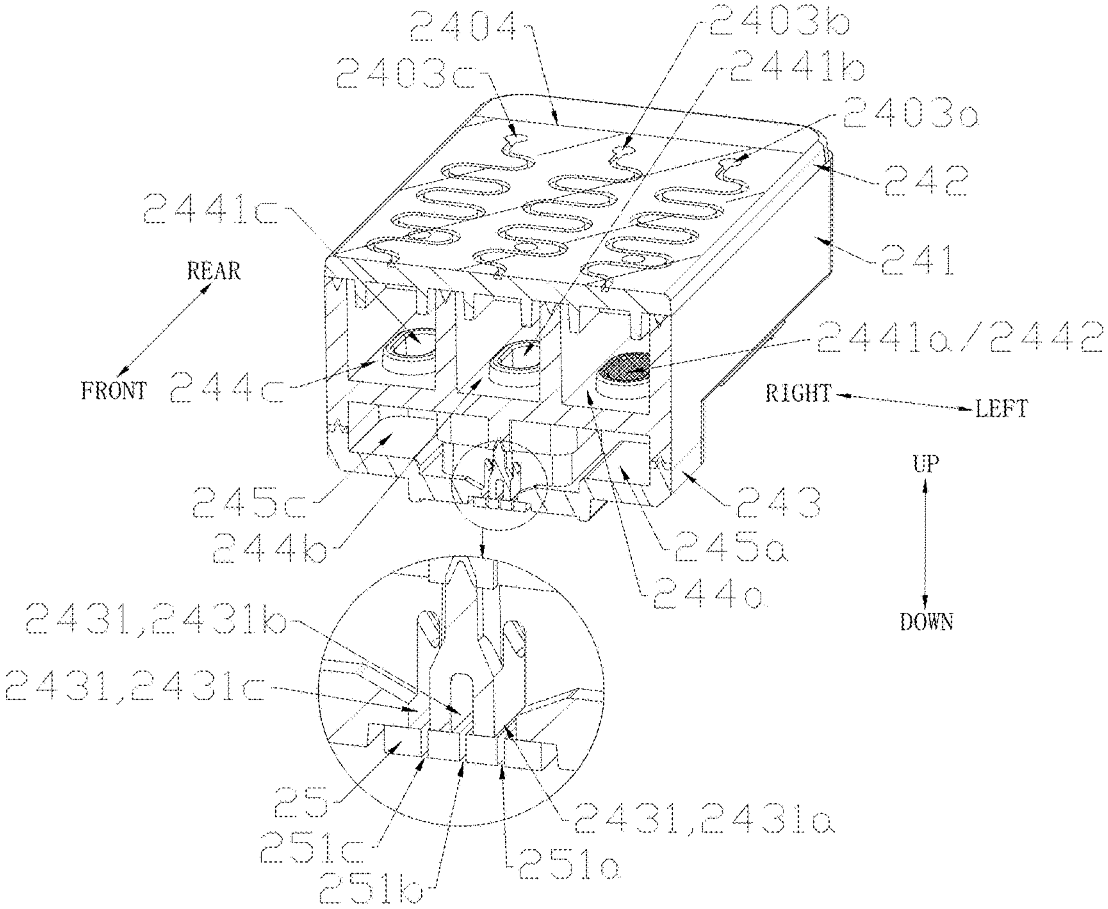
FIG. 53A is a schematic view of the first embodiment of the printing mechanism in a portable inkjet photo printer according to the present disclosure, taken along line F2-F2 in FIG. 51, observed from front to rear.
Figure 53B:
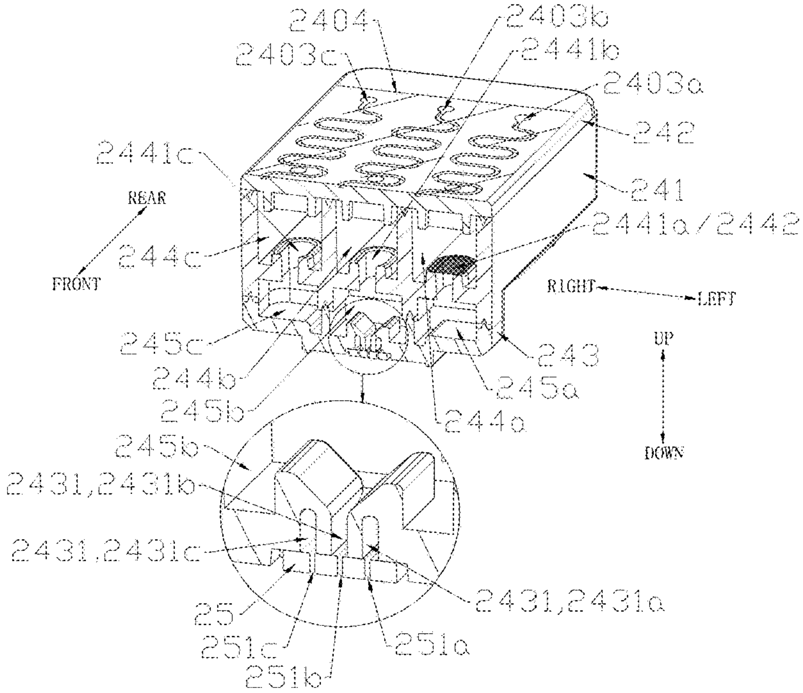
FIG. 53B is a schematic view of the first embodiment of the printing mechanism in a portable inkjet photo printer according to the present disclosure, taken along line F3-F3 in FIG. 51, observed from front to rear.
Figure 54A:
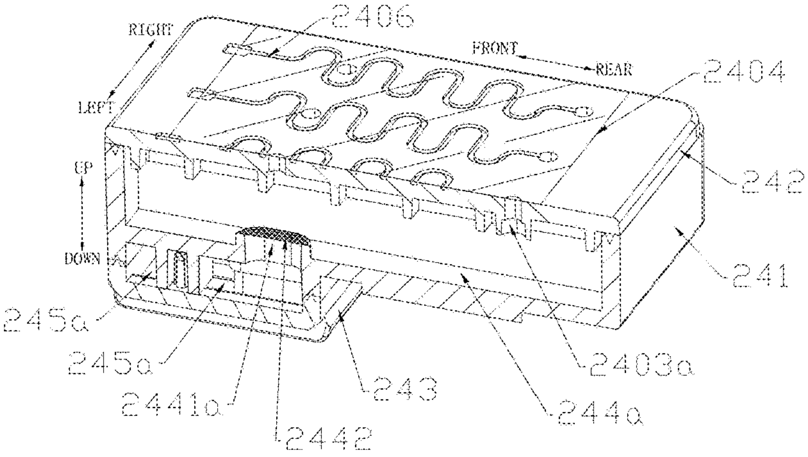
FIG. 54A is a schematic view of the first embodiment of the printing mechanism in a portable inkjet photo printer according to the present disclosure, taken along line F4-F4 in FIG. 51, observed from left to right.
Figure 54B:
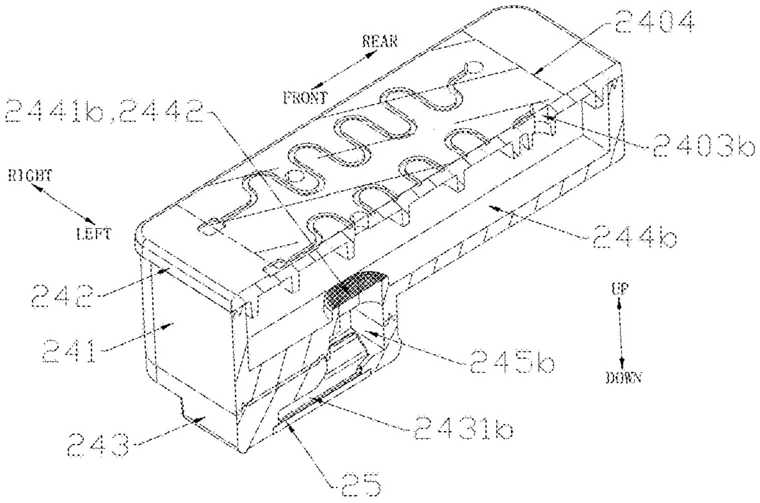
FIG. 54B is a schematic view of the first embodiment of the printing mechanism in a portable inkjet photo printer according to the present disclosure, taken along line F5-F5 in FIG. 51, observed from left to right.
Figure 54C:
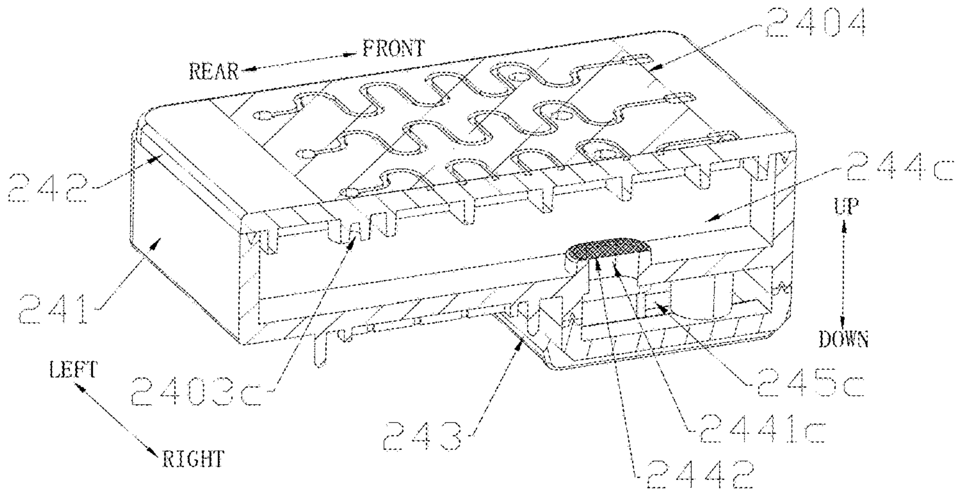
FIG. 54C is a schematic view of the first embodiment of the printing mechanism in a portable inkjet photo printer according to the present disclosure, taken along line F6-F6 in FIG. 51, observed from right to left.
Figure 55A:
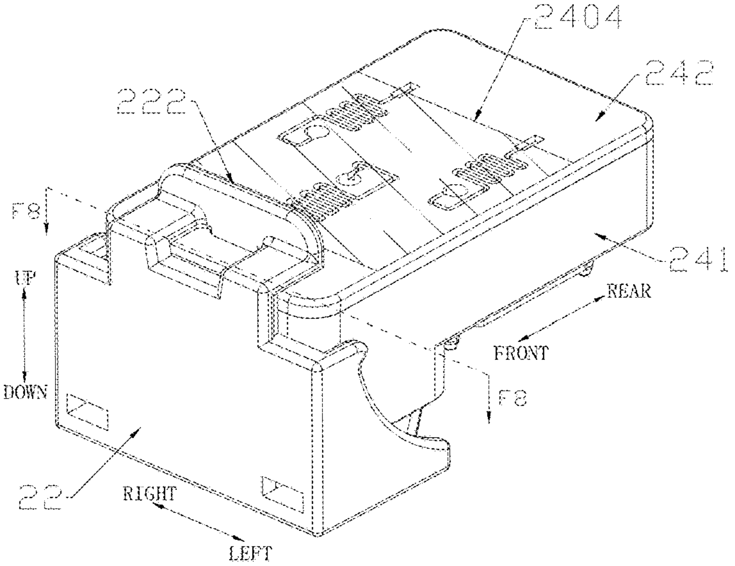
FIG. 55A and FIG. 55B are schematic views of a printing mechanism and a protective cover in another embodiment of the printing mechanism in a portable inkjet photo printer according to the present disclosure.
Figure 55B:
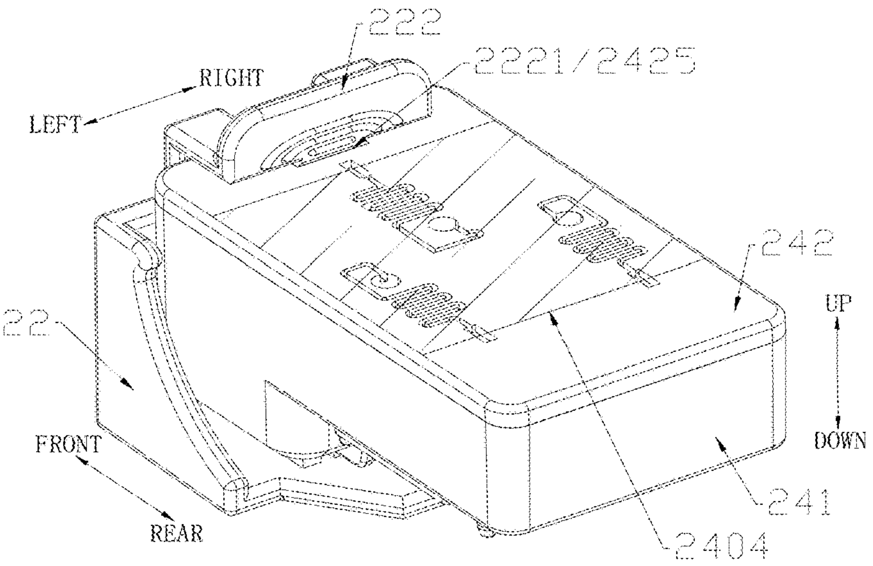

In some embodiments, as shown in FIG. 49 and FIG. 58B, the ink storage portion 24 has a front side wall 24101 and a rear side wall 24102 opposite in the front-rear direction, a left side wall 24103 and a right side wall 24104 opposite in the left-right direction, and a bottom wall 24105 opposite to the upper cover 242 in the up-down direction. In some embodiments, the bottom wall 24105 includes a first bottom wall 24105A and a second bottom wall 24105B staggered in the up-down direction. In the up-down direction, the second bottom wall 24105B is closer to the upper cover 242 than the first bottom wall 24105A. In the front-rear direction, the second bottom wall 24105B is located behind the first bottom wall 24105A. The second securing member 2421B may be disposed on at least one of the front side wall 24101, the rear side wall 24102, the left side wall 24103, the right side wall 24104, and the bottom wall 24105. Correspondingly, the first securing member 2421A may also be disposed at other positions on the printing carriage 21, as long as the ink storage portion 24 can be installed on the printing carriage 21.

In some embodiments, as shown in FIG. 142, a position sensor 713 is disposed on a first circuit board 701 and/or a second circuit board 702 described later. A detected portion 713B is disposed on the printing carriage 21. When the printing carriage 21 moves to a limit position of predetermined rotatable range, in the up-down direction, the position sensor 713 and the detected portion 713B are disposed opposite to each other. Specifically, in the up-down direction, the detected portion 713B is located below the position sensor 713. At this time, the detected portion 713B is detected so that the printer recognizes that the printing mechanism 20 has completed resetting, preventing the printing mechanism 20 from moving excessively and accumulating errors. Further, the position sensor 713 is set as a photoelectric sensor. The orientation of the position sensor 713 is perpendicular to the plane formed by the movement area of the printing carriage 21. For example, the detection light emitted by the position sensor 713 is emitted downward. Disposing the position sensor 713 and the detected portion 713B opposite to each other in the up-down direction can make the detection result accurate.

[Limiting Bracket]

Figure 66A:
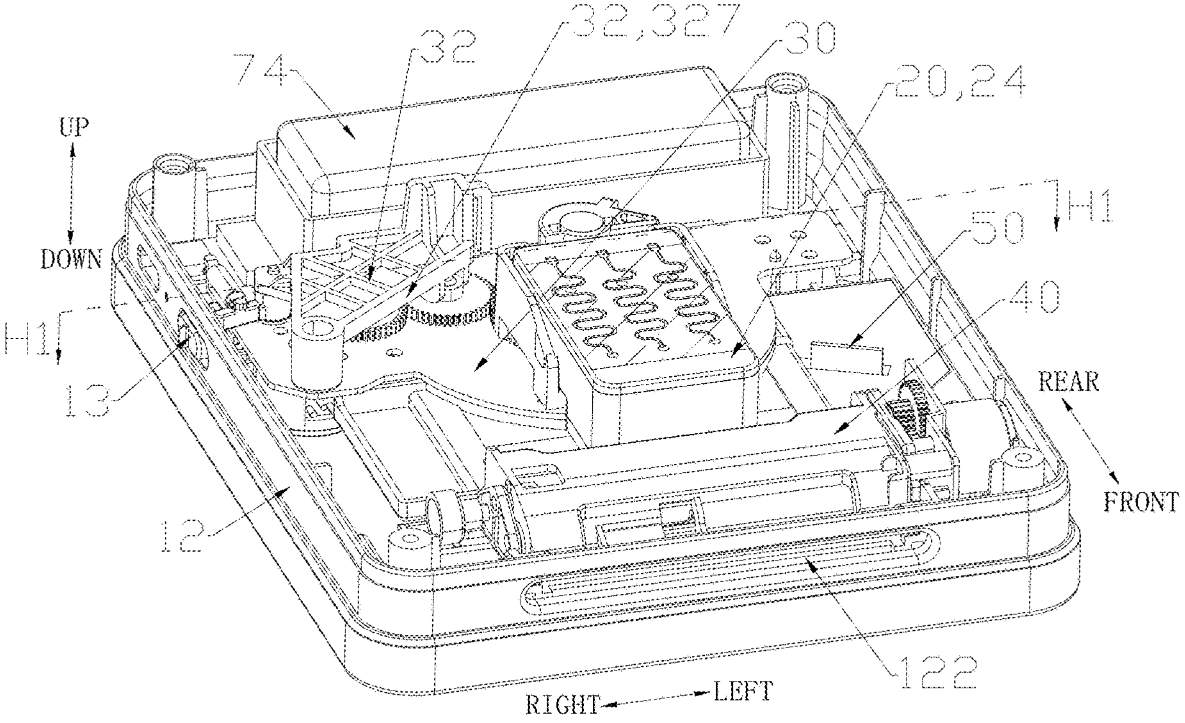
FIG. 66A is a perspective view of a first embodiment of a limiting bracket in a portable inkjet photo printer according to the present disclosure, with some components hidden.
Figure 66B:
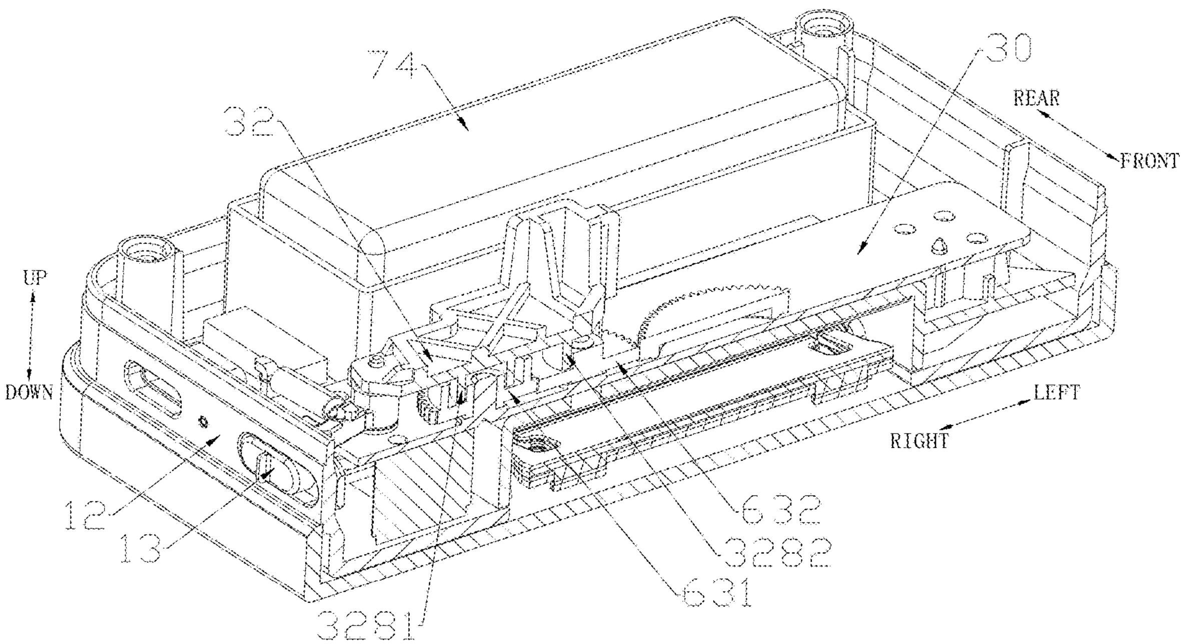
FIG. 66B is a cross-sectional view of the first embodiment of the limiting bracket in a portable inkjet photo printer according to the present disclosure, with some components hidden, taken along line H1-H1 in FIG. 66A, observed from front to rear.
Figure 67:
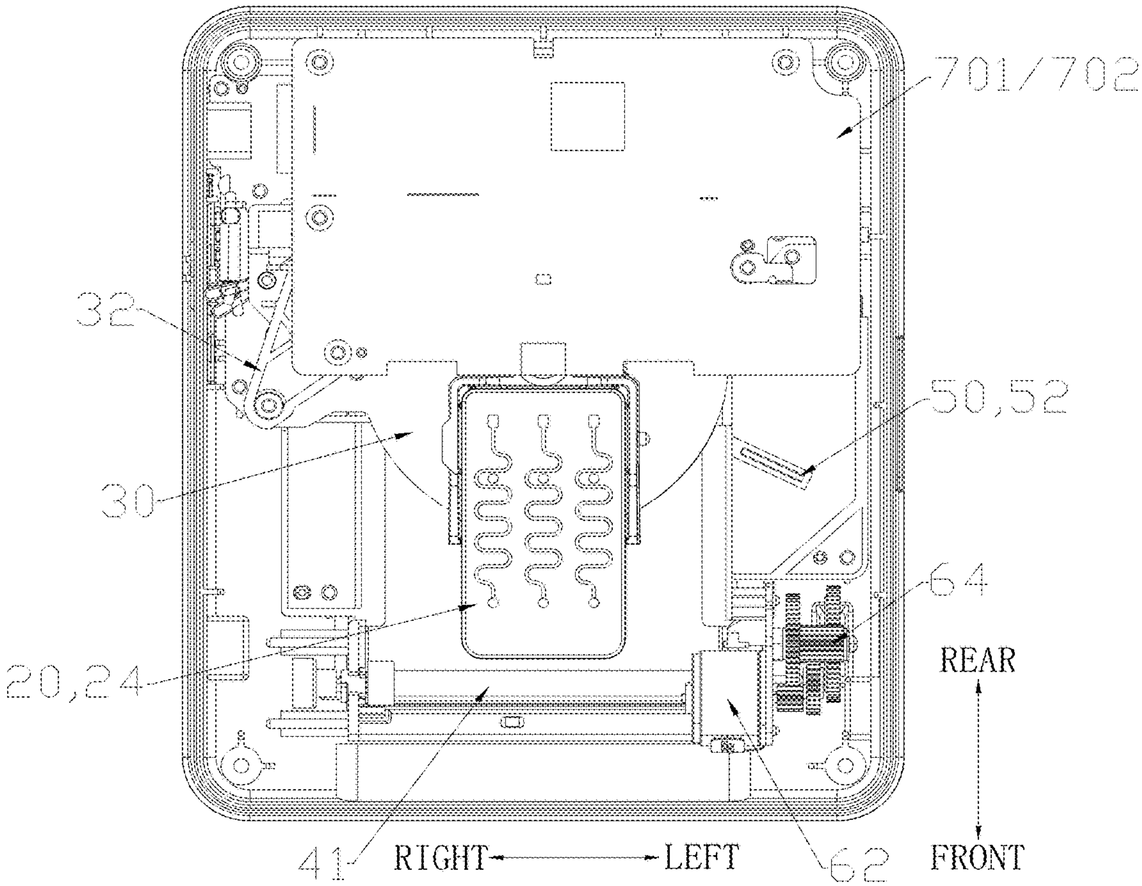
FIG. 67 is a schematic view of a portable inkjet photo printer according to the present disclosure.

In some embodiments, as shown in FIG. 66A and FIG. 66B, the second bracket/limiting bracket 32 is detachably disposed on the printing support mechanism 30. The second bracket/limiting bracket 32 is configured to restrict the printing mechanism 20. Specifically, on the movement trajectory of the printing mechanism 20, the second bracket/limiting bracket 32 is configured to prevent the printing mechanism 20 from moving to the limit position, so as to protect the printing mechanism 20 from damage. In the front-rear direction, the second bracket/limiting bracket 32 is located on a side away from the paper outlet 122. In the left-right direction, the second bracket/limiting bracket 32 is located on the left side or the right side of the printing mechanism 20. In the up-down direction, a part of the second bracket/limiting bracket 32 overlaps with the first coupling member 631, for example, in the up-down direction, the second bracket/limiting bracket 32 may be located above or below the first coupling member 631.

In some embodiments, in the left-right direction, the second bracket/limiting bracket 32 and the cleaning mechanism 50 may be disposed on the same side of the printing mechanism 20, or may be disposed on different sides of the printing mechanism 20. FIG. 66A and FIG. 66B show one embodiment where the second bracket/limiting bracket 32 is disposed on the right side of the printing mechanism 20, and the cleaning mechanism 50 is disposed on the left side of the printing mechanism 20.

In some embodiments, the second bracket/limiting bracket 32 may also be integrally formed with the printing support mechanism 30.

In some embodiments, the second bracket/limiting bracket 32 is provided with a third limiting portion 327. The third limiting portion 327 is configured to interact with the printing mechanism 20 or the printing carriage 21 to limit the printing mechanism 20 on the movement trajectory of the printing mechanism 20, thereby protecting the printing mechanism 20 from damage.

In some embodiments, as shown in FIG. 66B, the second bracket/limiting bracket 32 is further configured to limit the first coupling member 631 and/or a second coupling member 632. For example, a fourth limiting portion 3281 and a fifth limiting portion 3282 extending toward the printing support mechanism 30 are disposed on the second bracket/limiting bracket 32. The fourth limiting portion 3281 is sleeved on the first coupling member 631, and the fifth limiting portion 3282 is sleeved on the second coupling member 632, for limiting the first coupling member 631 and/or the second coupling member 632 in the up-down direction, preventing the first coupling member 631 and/or the second coupling member 632 from falling off.

Figure 74:
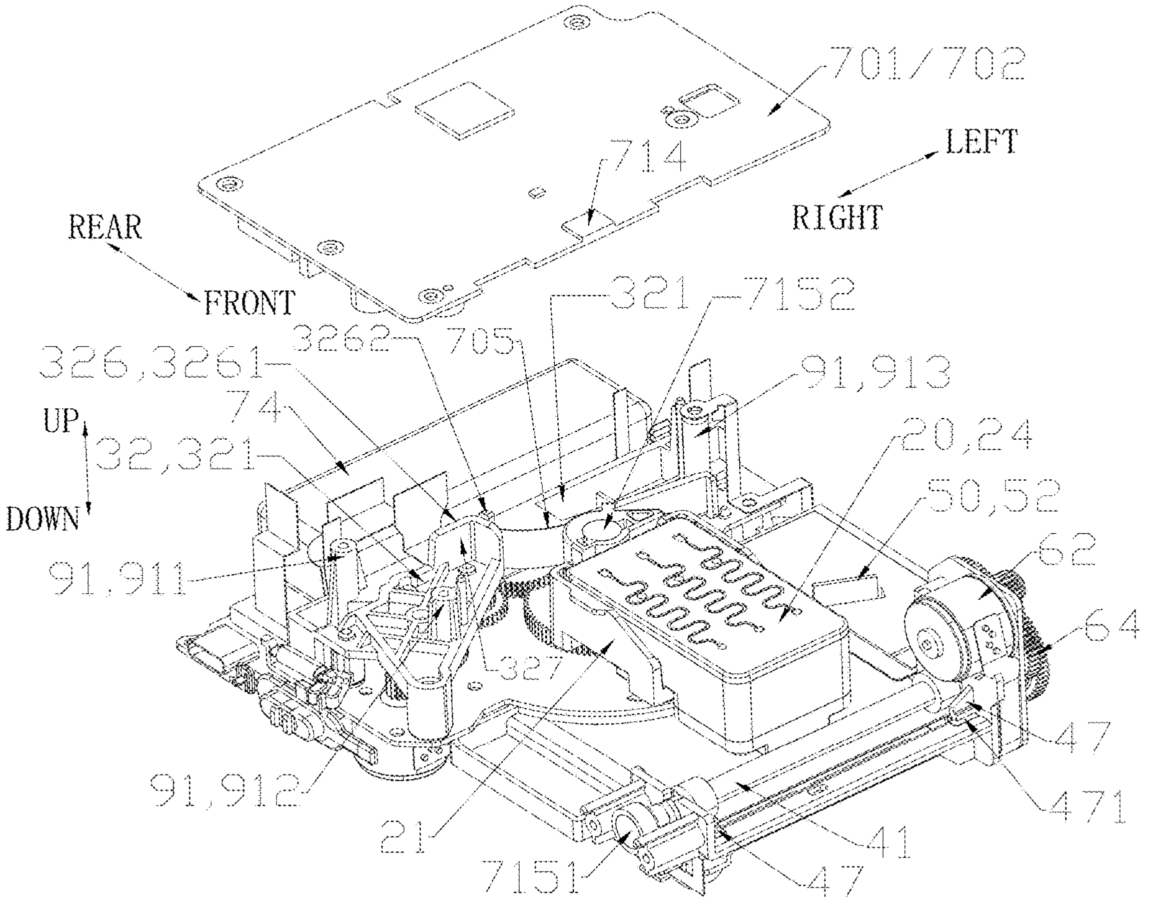
FIG. 74 and FIG. 75 are schematic views of the interior of a portable inkjet photo printer according to the present disclosure with some components hidden.

In some embodiments, as shown in FIG. 74, the second bracket/limiting bracket 32 further includes a fixing portion 91. The first circuit board 701 and/or the second circuit board 702 described later are fixedly installed on the base 15 described later via the fixing portion 91. Specifically, more than two fixing portions 91 are provided at intervals. Along the left-right direction, the fixing portions 91 are respectively located on both sides of the rotation center of the printing mechanism 20/the second magnetic member 7152 described later. With such a configuration, the second bracket/limiting bracket 32 can strengthen the base 15, and can also fix the first circuit board 701/second circuit board 702 described later, making the structure compact.

In some embodiments, the second bracket/limiting bracket 32 further includes a second limiting portion 326 for restricting a third electrical connector 705 described later. The second limiting portion 326 includes a limiting surface 3261 and a limiting block 3262. The limiting block 3262 and the limiting surface 3261 are spaced apart. Preferably, the limiting surface is a side surface of the second limiting portion 326. With such a configuration, the limiting of the third electrical connector 705 is realized through the interval between the limiting block 3262 and the limiting surface 3261. The structure is simple and convenient for assembly.

Further, the limiting surface 3261 is set in an L shape, which can not only better fit the shape of the third electrical connector 705, but also ensure that the third electrical connector 705 is installed more stably.

[Driving Assembly]

Figure 24A:
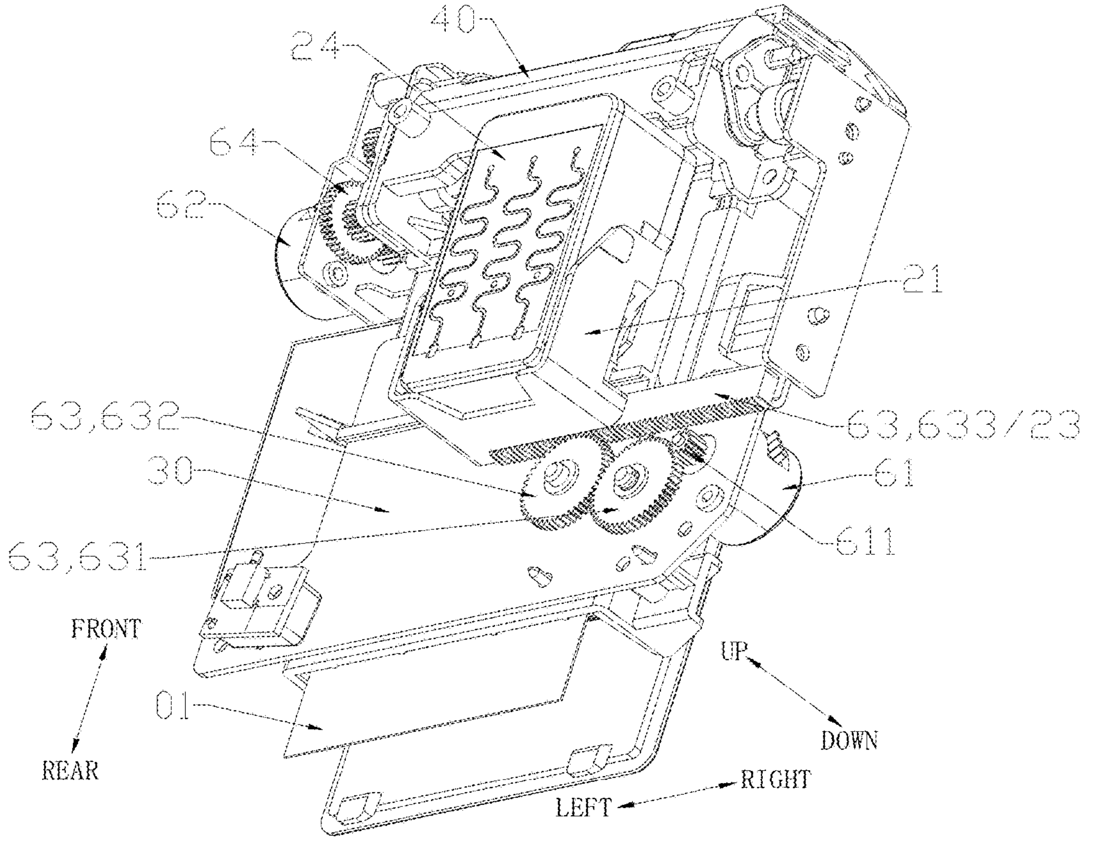
FIG. 24A and FIG. 24B are perspective views of a first embodiment of a driving assembly in a portable inkjet photo printer according to the present disclosure.

As shown in FIG. 3 to FIG. 6, the driving assembly includes a rotating member (a type of movable member) 23, a driving gear 611 (as shown in FIG. 24A), and a first motor 61 (as shown in FIG. 24A). The rotating member 23 is drivably connected to the first motor 61 via the driving gear 611. The driving gear 611 is installed at the output end of the first motor 61 to transmit the driving force of the first motor 61 to the rotating member 23. In this embodiment, the first motor 61 directly drives the driving gear 611 to drive the printing carriage 21, causing the printing mechanism 20 to move along an arcuate trajectory. Preferably, in the up-down direction, the driving assembly is located above the printing medium and/or the paper cassette 80. More preferably, in the up-down direction, the driving gear 611 and/or the rotating member 23 are located above the printing medium and/or the paper cassette 80.

Further, the driving assembly is also provided with an error compensation member, which is configured to press the driving gear 611 against the rotating member 23 and/or the first motor 61, avoiding the error in the control module's judgment of the position of the printing mechanism 20 caused by the first motor 61 needing to idle for a period of time to drive the driving gear 611 and/or the rotating member 23 due to the gap between the gears when starting. The error compensation member may be a spring-loaded gear or a helical gear (helical tooth gear). Specifically, the teeth in the spring-loaded gear can ensure tight contact between gears under the elastic force of the spring, reducing errors caused by backlash. Specifically, compared to spur gears, the teeth of helical gears are arranged in a helix, which can provide smoother contact during the meshing process, thereby reducing the influence of backlash. For example, the rotating shaft of the driving gear 611 is configured to be movable relative to the housing assembly. The error compensation member is set as an elastic member. The error compensation member is fixedly connected to the rotating shaft of the driving gear 611. The driving gear 611 is pressed against the rotating member 23 and/or the first motor 61 under the elastic force of the error compensation member, thereby eliminating the error in the control module's judgment of the position of the printing mechanism 20 caused by the idling of the first motor 61 when starting.

In other embodiments, the driving assembly further includes a first intermediate transmission assembly 63 disposed between the first motor 61 and the driving gear 611 serving as a driving force transmission member. The first intermediate transmission assembly 63 is a gear train. Adding the first intermediate transmission assembly 63 can not only amplify the torque of the motor, thereby enabling the motor to drive a heavier load, but also amplify the output torque of the motor, thereby allowing the use of a smaller motor, saving costs and space.

Figure 72:
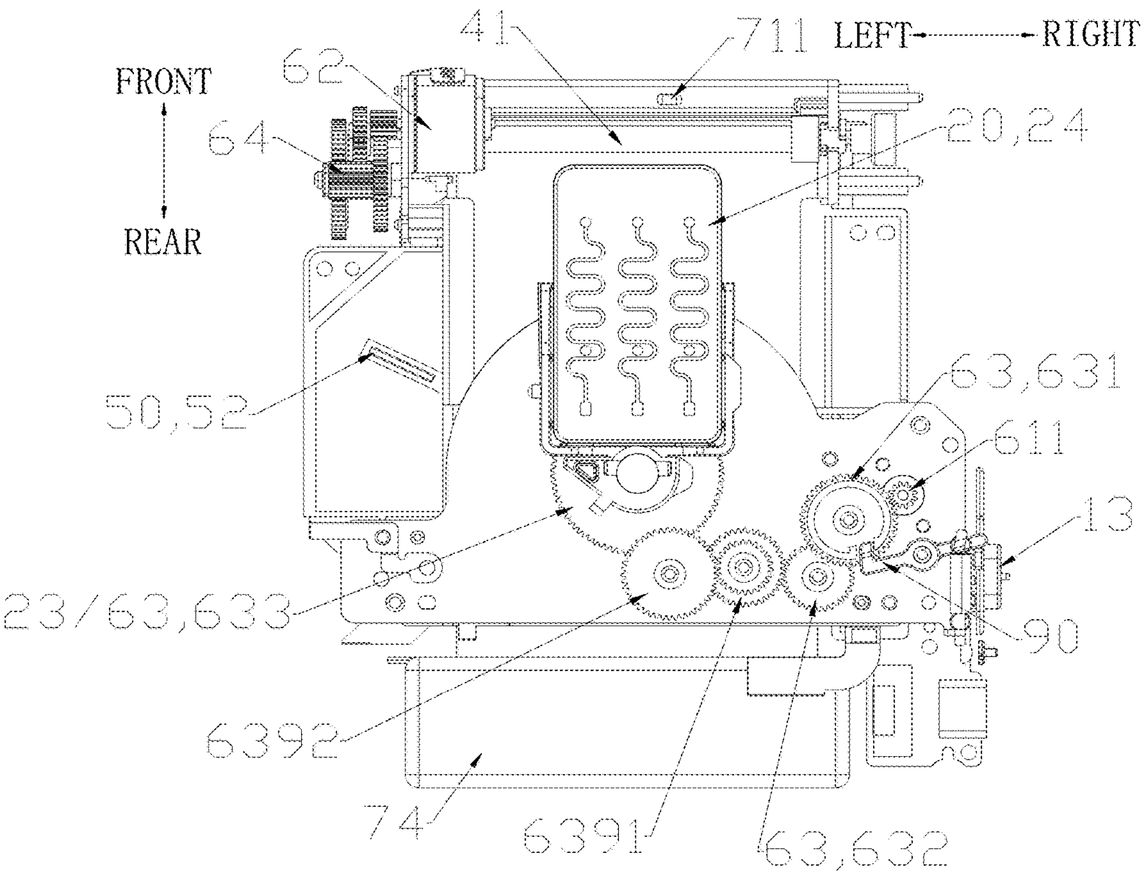
FIG. 72 and FIG. 73 are schematic views of one implementation of a driving assembly in a portable inkjet photo printer according to the present disclosure.

In some embodiments, as shown in FIG. 72 and FIG. 73, when the first intermediate transmission assembly 63 is a gear train, the first intermediate transmission assembly 63 includes a first coupling member 631, a second coupling member 632, a third coupling member 633, a seventh coupling member 6391, and an eighth coupling member 6392. The first coupling member 631, the second coupling member 632, the third coupling member 633, the seventh coupling member 6391, and the eighth coupling member 6392 are all configured as gears. At least one of them is a double-layer gear. The driving force output by the first motor 61 passes through the driving gear 611, the first gear 631, the second gear 632, the seventh gear 6391, the eighth gear 6392, and the third gear 633 in sequence to be transmitted to the printing mechanism 20. By increasing the number of gear stages to increase the total transmission ratio, the effect of deceleration and torque increase can be achieved. This means that the unit angle rotated by the motor will become smaller after passing through multiple stages of deceleration, thereby making the movement of the rotating parts more precise and improving the rotation accuracy of the printing mechanism. By setting the aforementioned error compensation member, errors (such as backlash, manufacturing tolerances, etc.) generated by multi-stage gear transmission can be eliminated or reduced. In some embodiments, the driving assembly further includes a second intermediate transmission assembly 64. The second intermediate transmission assembly 64 is configured to transmit the driving force of the first motor 61 to the paper feeding mechanism 40 and cause the paper feeding mechanism 40 to rotate. In other words, the second intermediate transmission assembly 64 is configured to control the paper feeding mechanism 40. The paper feeding mechanism 40 includes a transmission roller group. The transmission roller group is connected to the first motor 61 via the second intermediate transmission assembly 64. Specifically, the second intermediate transmission assembly 64 is a gear train including a plurality of driven gears.

In other preferred embodiments, the driving assembly may further add a second motor 62. The first motor 61 is connected to the first intermediate transmission assembly 63. The second motor 62 is connected to the second intermediate transmission assembly 64. The two motors respectively control different systems. For example, the first motor 61 controls the printing carriage 21, and the second motor 62 controls the paper feeding mechanism 40.

Figure 43A:
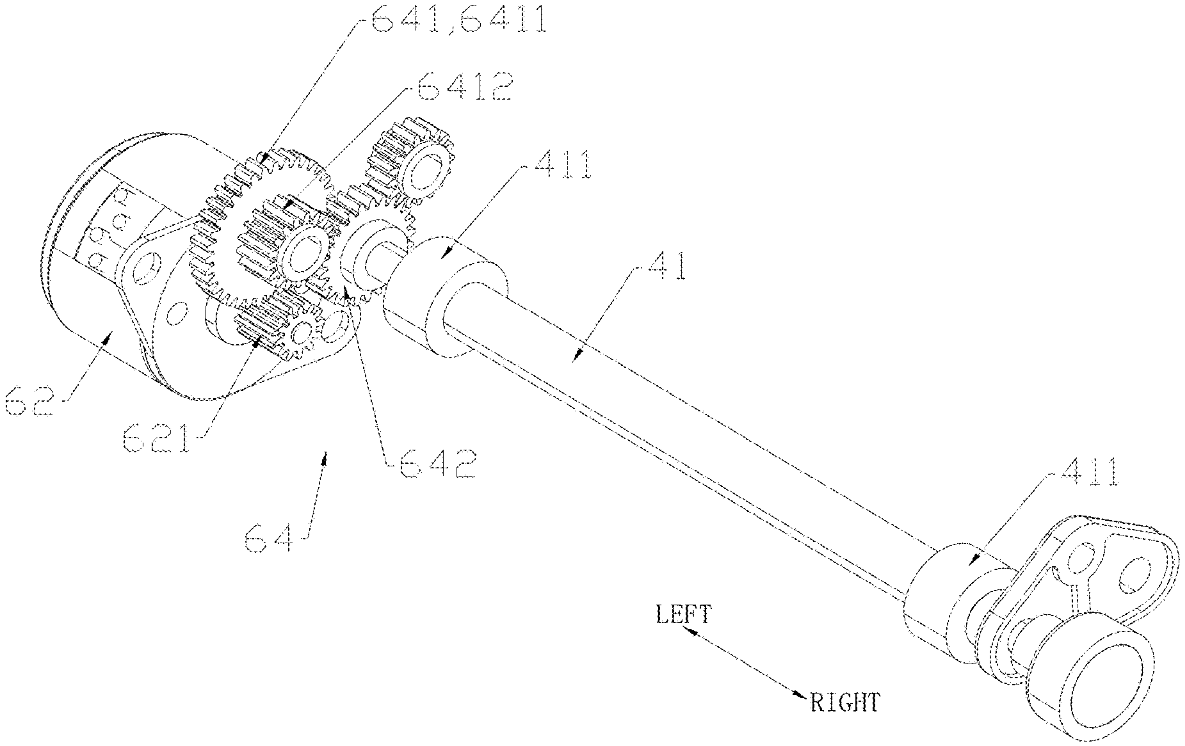
FIG. 43A is a schematic view of relative positions of a second motor, a second intermediate transmission assembly, and a rubber roller in a portable inkjet photo printer according to the present disclosure.

Further, in some embodiments, as shown in FIG. 43A, the transmission roller group includes at least a first rubber roller 41 extending along the left-right direction. The output end of the second motor 62 is provided with a second driving gear 621. The second intermediate transmission assembly 64 includes at least a fourth coupling member 641 and a fifth coupling member 642. In this embodiment, the fourth coupling member 641 and the fifth coupling member 642 are both configured as gears. Therefore, the fourth coupling member 641 and the fifth coupling member 642 may also be respectively referred to as a fourth gear 641 and a fifth gear 642. The fourth gear 641 meshes with the second driving gear 621 and the fifth gear 642, respectively. Still further, the fourth gear 641 includes a large gear portion 6411 meshing with the second driving gear 621 and a small gear portion 6412 meshing with the fifth gear 642. The large gear portion 6411 and the small gear portion 6412 are coaxially disposed. The fifth gear 642 is coaxially disposed with the first rubber roller 41 and is configured to drive the first rubber roller 41 to rotate. The driving force output by the second motor 62 is transmitted to the fourth gear 641 via the second driving gear 621, and the fourth gear 641 then transmits the driving force to the paper feeding mechanism 40. Specifically, the fourth gear 641 is configured to receive driving force by the large gear portion 6411 and output driving force by the small gear portion 6412, which can achieve the effect of reducing speed and increasing torque, improving paper feeding accuracy, and optimizing the spatial layout of various components, which is conducive to miniaturization of the printer.

Figure 43B:
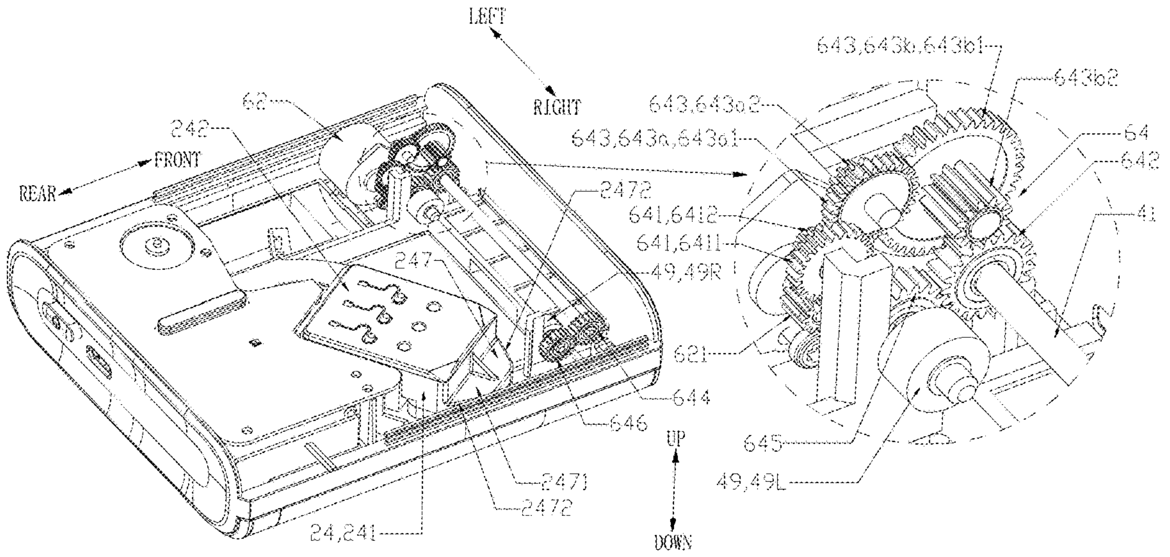
FIG. 43B is another schematic view of relative positions of a second motor, a second intermediate transmission assembly, and a rubber roller in a portable inkjet photo printer according to the present disclosure.

In some embodiments, as shown in FIG. 43B, the transmission roller group further includes a paper discharge roller and a pickup roller 49 disposed on the paper discharge roller. The paper discharge roller and the pickup roller 49 are disposed in the paper cassette 80 for outputting the printing medium in the paper cassette 80. The driving force output by the second motor 62 passes through the second intermediate transmission assembly 64 and the first rubber roller 41 in sequence to be transmitted to the pickup roller 49. Further, in the up-down direction, the paper discharge roller/pickup roller 49 and the paper pressing mechanism described later at least partially overlap. Along the front-rear direction, the paper discharge roller/pickup roller 49 is spaced apart from the first rubber roller 41. For example, along the front-rear direction, the first rubber roller 41 is located in front of the paper discharge roller/pickup roller 49. Further, the paper discharge roller/pickup roller 49 is drivably connected to the second motor 62/gear train.

Further, the second intermediate transmission assembly 64 further includes a sixth coupling member 643 combined with the fourth coupling member 641 and the fifth coupling member 642 simultaneously. The driving force output by the second motor 62 passes through the second driving gear 621, the fourth coupling member 641, and the sixth coupling member 643 in sequence, and is transmitted to the first rubber roller 41 via the fifth coupling member 642. Moreover, the sixth coupling member 643 includes a first intermediate member 643*a* and a second intermediate member 643*b* coupled to each other. Preferably, the fourth coupling member 641, the fifth coupling member 642, the first intermediate member 643*a*, and the second intermediate member 643*b* are all set as gears. Therefore, the fourth coupling member 641, the fifth coupling member 642, the first intermediate member 643*a*, and the second intermediate member 643*b* may also be respectively referred to as a fourth gear 641, a fifth gear 642, a first intermediate gear 643*a*, and a second intermediate gear 643*b*. Specifically, the fourth gear 641 includes a large gear portion 6411 meshing with the second driving gear 621 and a small gear portion 6412 meshing with the fifth gear 642. The large gear portion 6411 and the small gear portion 6412 are coaxially disposed. The first intermediate gear 643*a* further meshes with the small gear portion 6412. The second intermediate gear 643*b* further meshes with the fifth gear 642. The first intermediate gear 643*a* includes a second large gear portion 643*al* and a second small gear portion 643*a*2 coaxially disposed. The second intermediate gear 643*b* includes a third large gear portion 643*b*1 and a third small gear portion 643*b*2 coaxially disposed. The second large gear portion 643*al* meshes with the small gear portion 6412. The second small gear portion 643*a*2 meshes with the third large gear portion 643*b*1. The third small gear portion 643*b*2 meshes with the fifth gear 642. It may be seen that the second intermediate transmission assembly can increase torque and thus drive a larger load.

Still further, as shown in FIG. 43B, at least two pickup rollers 49 are provided. The two pickup rollers 49 are spaced apart along the left-right direction. Moreover, the pickup rollers 49 and the first rubber roller 41 are not coaxially disposed. Along the front-rear direction, the pickup roller 49 is closer to the ink storage portion 24 than the first rubber roller 41. The first rubber roller 41 is configured to receive the driving force and transmit the driving force to the pickup roller 49. With such a configuration, in the front-rear direction, the pickup roller 49 can be closer to the printing area without interfering with the inkjet device 25, which can reduce the size of the blank area of the printing medium 01 and increase the proportion of the printing area of the printing medium 01.

Specifically, the second intermediate transmission assembly 64 further includes a ninth coupling member 644, a first transmission member 645, and a second transmission member 646. Specifically, the ninth coupling member 644 and the fifth coupling member 642 are respectively located at the left and right ends of the first rubber roller 41. The first transmission member 645 is configured to drive one of the pickup rollers 49 to rotate. The second transmission member 646 is configured to drive another pickup roller 49 to rotate. Preferably, the first transmission member 645 is coaxially disposed with one of the pickup rollers 49, and the second transmission member 646 is coaxially disposed with another pickup roller 49. The ninth coupling member 644, the first transmission member 645, and the second transmission member 646 are all configured as gears. Therefore, the ninth coupling member 644, the first transmission member 645, and the second transmission member 646 may also be respectively referred to as a ninth gear 644, a first transmission gear 645, and a second transmission gear 646. The first transmission gear 645 meshes with the fifth gear 642, and the second transmission gear 646 meshes with the ninth gear 644.

In some embodiments, the ink storage portion 24 further includes an extension plate 247 connected to the ink storage portion body 241 or the upper cover 242. Continuing as shown in FIG. 43B, the extension plate 247 extends forward from the ink storage portion body 241 or the upper cover 242. Moreover, the upper, left, and right sides and the front of the extension plate 247 are all open. Along the up-down direction, the extension plate 247 is closer to the inkjet device 25 than the upper end of the ink storage portion 24. Therefore, a pickup clearance portion 2471 will be formed above the extension plate 247. With such a configuration, the ink storage portion 24 can avoid the pickup roller 49 during printing, thereby further shortening the distance between the pickup roller 49 and the printing area.

Figure 48A:
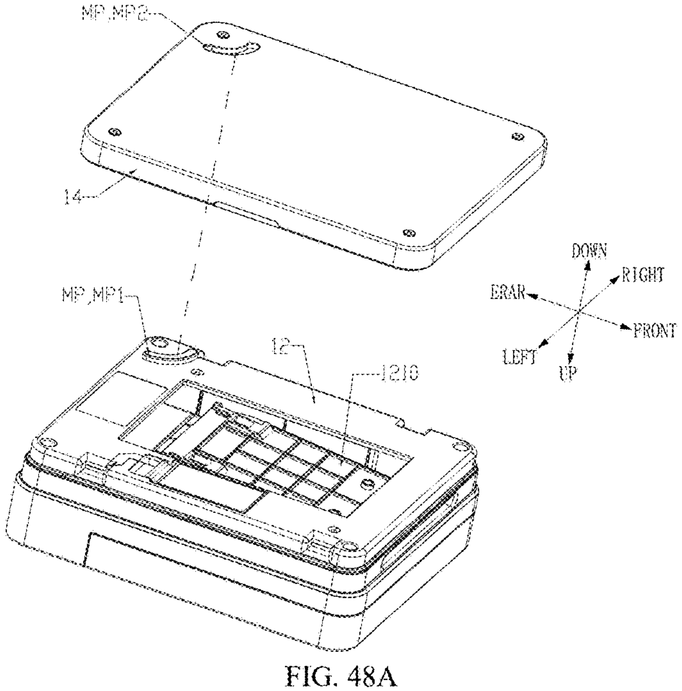
FIG. 48A is a perspective view of a paper cassette cover plate and a second housing in the second embodiment of the cover opening mechanism in a portable inkjet photo printer according to the present disclosure being separated.
Figure 48B:
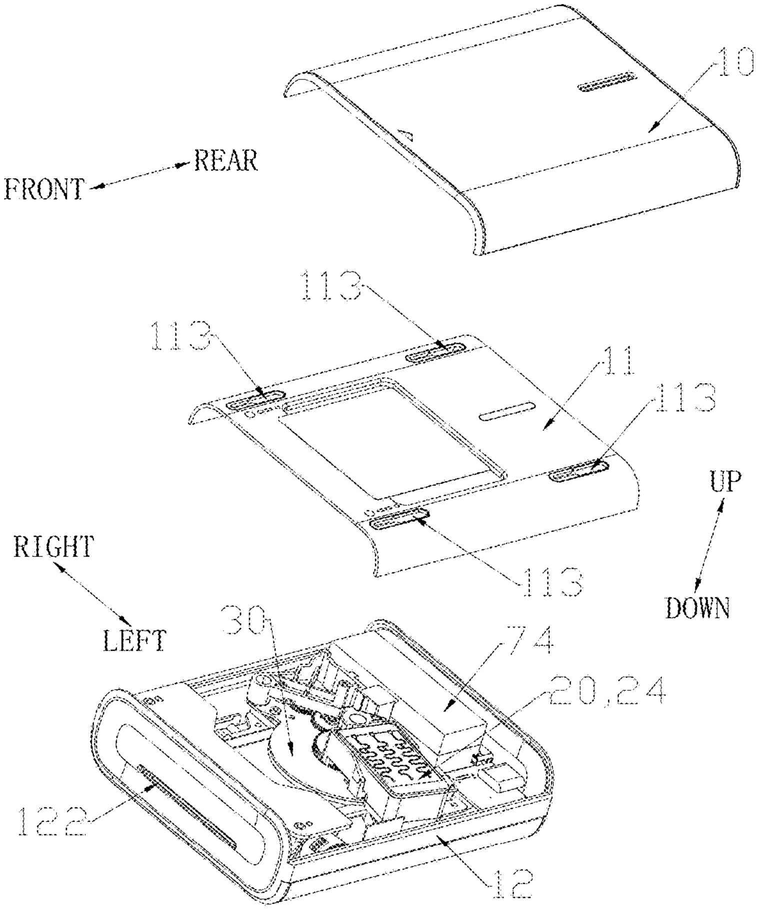
FIG. 48B is a schematic view of another example of the second embodiment of the cover opening mechanism in a portable inkjet photo printer according to the present disclosure.

Further, as shown in FIG. 48B, the left and right sides of the cover member 10, the left and right sides of the first housing 11, and the left and right sides of the second housing 12 are all arc-shaped. A step is formed between the extension plate 247 and the upper end of the ink storage portion 24. The ink storage portion 24 may also match the arc shape, thereby allowing the space inside the printer to be utilized more fully.

Still further, the left end and/or the right end of the extension plate 247 is also provided with a chamfer 2472. During the working process of the printer, the chamfer 2472 can prevent the ink storage portion 24 from interfering with the pickup rollers 49.

In some embodiments, the pickup roller 49 may also be configured as toothed. For example, a plurality of tooth-like protrusions are equidistantly provided around the circumference of the pickup roller.

Figure 71A:
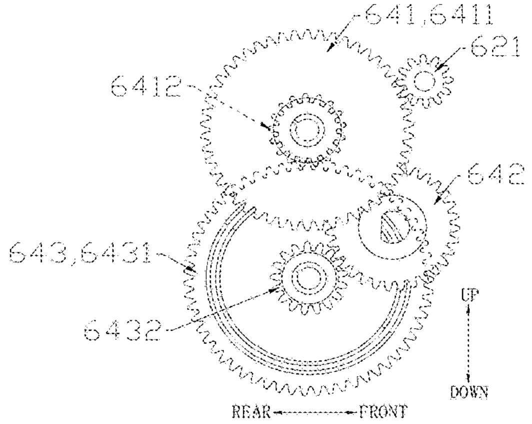
FIG. 71A and FIG. 71B are schematic views of a structure of a second intermediate transmission assembly in a portable inkjet photo printer according to the present disclosure.
Figure 71B:
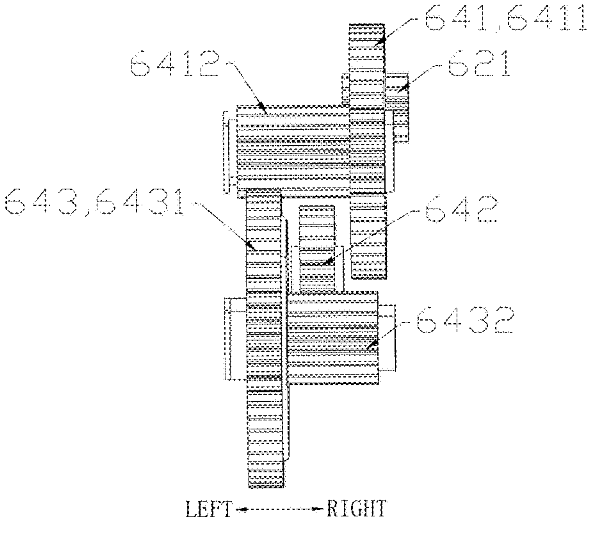

In some embodiments, as shown in FIG. 67-FIG. 71B, in the left-right direction, the second motor 62 is disposed on the right side of the second intermediate transmission assembly 64. In the front-rear direction, a part of the second motor 62 is located in front of the frontmost end of the second intermediate transmission assembly 64. In the up-down direction, a part of the second motor 62 is located above the uppermost end of the second intermediate transmission assembly 64. In other words, in the left-right direction, a part of the second motor 62 overlaps with the second intermediate transmission assembly 64. Observed along the left-right direction, a part of the second motor 62 is located at the front upper side of the second intermediate transmission assembly 64. That is, the second motor 62 and the second intermediate transmission assembly 63 are staggered. Thus, the paper feeding mechanism 40 can be placed closer to the printing area, which makes the printer structure more compact and can reduce the possibility of incorrect abutment between the tilted printing medium in the paper cassette 80 and the paper feeding mechanism 40. At the same time, the second motor 62 is disposed on the right side of the second intermediate transmission assembly 64 (as shown in FIG. 72) rather than on the front or rear side, which can effectively shorten the size of the printer in the front-rear direction and further make the printer structure compact. Further, along the up-down direction, the second motor 62 is located above the paper feeding mechanism 40 to further make the printer structure compact. Along the up-down direction, the uppermost end of the second motor 62 is located below the uppermost end of the internal components of the printer. In other words, along the up-down direction, the second motor 62 does not exceed the uppermost end of the internal components of the printer. With such a configuration, the printer structure can be further compacted. Further, as shown in FIG. 71A and FIG. 71B, the second intermediate transmission assembly 64 at least includes a fourth coupling member 641 and a fifth coupling member 642. The fourth coupling member 641 is configured to receive the driving force from the second motor 62. The fifth coupling member 642 is further connected to the first rubber roller 41 coaxially and configured to drive the first rubber roller 41 to rotate. In some embodiments, the second intermediate transmission assembly 64 further includes a sixth coupling member 643. In this embodiment, the fourth coupling member 641, the fifth coupling member 642, and the sixth coupling member 643 are configured as gears. Therefore, the fourth coupling member 641, the fifth coupling member 642, and the sixth coupling member 643 may also be respectively referred to as a fourth gear 641, a fifth gear 642, and a sixth gear 643. Specifically, the sixth gear 643 meshes with the fourth gear 641 and the fifth gear 642 respectively. With this, the fourth gear 641 receives the driving force and can transmit it to the first rubber roller 41 through the sixth gear 643 and the fifth gear 642 sequentially. Still further, at least one of the fourth gear 641 and the sixth gear 643 is a double-layer gear. For example, the fourth gear 641 includes a large gear portion 6411 and a small gear portion 6412 disposed coaxially, and/or, the sixth gear 643 includes a first large gear portion 6431 and a first small gear portion 6432 disposed coaxially.

In some embodiments, the second motor 62 may be reversed to increase the proportion of the printing area and improve the utilization rate of the printing medium. For example, when the printing mechanism 20 rotates for printing, the second motor 62 may be controlled to reverse via a terminal (such as a mobile phone, computer, etc.) to control the size of the printing area and the blank area, and whether to keep the blank area, etc.

When the second motor 62 reverses, the pickup roller/paper discharge roller disposed in the paper cassette 80 can increase the travel of the printing medium moving in the direction opposite to the paper feeding direction, which can further increase the proportion of the printing area and improve the utilization rate of the printing medium.

In some embodiments, as shown in FIG. 133A and FIG. 133B, the printing mechanism 20 performs printing along an arcuate printing trajectory. Along the up-down direction, the paper cassette 80 is located below the first motor 61. The printer is provided with a paper feeding component including at least two paper discharge rollers/pickup rollers, configured to transport the printing medium 01 in the paper cassette 80 toward the paper outlet 122 along the paper feeding direction. Further, the printer is provided with a first paper discharge roller/first pickup roller 48, a second paper discharge roller/second pickup roller 482, and a third paper discharge roller/third pickup roller 483. Along the front-rear direction, the first pickup roller 48, the second pickup roller 482, and the third pickup roller 483 are arranged sequentially from rear to front. In the up-down direction, during the movement of the printing medium 01 along the paper discharge direction, the first pickup roller 48, the second pickup roller 482, and the third pickup roller 483 respectively abut against the lower side/back side of the printing medium 01, so that the printing medium 01 is more stably transported to the paper outlet 122. Still further, in the front-rear direction, the third pickup roller 483 is located at a position close to the paper outlet 122. In the up-down direction, at least a part of the first pickup roller 48 is located below the paper cassette 80. At least the second pickup roller 482 is located below the printing mechanism 20/ink storage portion 24. Still further, the lower side of the paper cassette 80 is provided with a groove matching the first pickup roller 48, configured to enable the first pickup roller 48 to abut against the printing medium 01. Further, along the up-down direction, the pickup roller 49 is located above the third pickup roller 483. Along the left-right direction, two pickup rollers 49 are disposed at an interval. The pickup rollers 49 are configured to apply downward pressure to the printing medium to serve a paper pressing function, ensuring that the printing medium/photo paper does not bend in the printing area affecting the printing quality, thereby improving the printing quality.

Further, in order to improve the utilization rate of the printing medium 01, the printer may be set such that the printing medium 01 starts to enter the printing area, and the inkjet device 25/nozzle 251 starts to perform inkjet printing. Specifically, as shown in FIG. 133A and FIG. 133B, the printer is provided with a second sensor/paper discharge sensor 711 described later. In the up-down direction, the paper discharge sensor 711 is located below the printing mechanism 20/ink storage portion 24. Along the front-rear direction, the paper discharge sensor 711 may be disposed in front of or behind the second pickup roller 482. The figure shows the situation where the paper discharge sensor 711 is disposed behind the second pickup roller 482. In the front-rear direction, the paper discharge sensor 711 is located behind the inkjet device 25. When the printing medium 01 is transported forward along the paper discharge direction, the paper discharge sensor 711 detects the printing medium 01 and sends a command to the printer. Then the printer controls the inkjet device 25/nozzle 251 to execute the inkjet printing action. This can expand the printing range of the printing medium 01, thereby effectively improving the utilization rate of the printing medium 01.

Further, as shown in FIG. 133A and FIG. 133B, the printer is further provided with a third sensor 7112. Along the front-rear direction, the third sensor 7112 is located at a position close to the paper outlet 122, configured to detect whether the printing medium 01 has been taken out. For example, after the printer completes printing, the third sensor 7112 detects the printing medium 01 and sends a signal to the printer. Then the printer is controlled to prompt the user to take out the printing medium 01 in time to facilitate the next use.

In some embodiments, as shown in FIG. 138, FIG. 139A, FIG. 139B, and FIG. 140, the movement mode of the printing mechanism 20 is swinging along an arcuate trajectory in the left-right direction, or in other words, the printing mechanism 20 generates displacement on the arcuate trajectory in the left-right direction. Along the front-rear direction, the first intermediate transmission assembly 63 is located on the rear side of the printing mechanism 20. Specifically, in the front-rear direction, at least a part of the first intermediate transmission assembly 63 overlaps with the printing area of the printing mechanism 20. And, in the front-rear direction, at least a part of the first intermediate transmission assembly 63 also overlaps with the moving area of the printing mechanism 20. Further, when the first intermediate transmission assembly 63 is a gear train, the first intermediate transmission assembly 63 includes a first gear 631, a second gear 632, and a third gear 633. Along the front-rear direction, the driving gear 611, the first gear 631, the second gear 632, and the third gear 633 are disposed on the rear side of the printing mechanism 20. Further, in the left-right direction, the power supply module 74 and the first intermediate transmission assembly 63 are disposed adjacently. Specifically, the dimension of the power supply module 74 in the left-right direction is smaller than half of the dimension of the chamber formed inside the housing assembly in the left-right direction. In this way, the size of the printer in the left-right direction can be reduced, and the layout of the internal parts of the printer is further optimized, thereby realizing the miniaturized design of the printer.

Further, as shown in FIG. 139B, the second gear 632 and the third gear 633 are configured as coaxial two-stage gears in the up-down direction. For example, the second gear 632 includes a fourth large gear portion 6321 and a fourth small gear portion 6322. In the up-down direction, the fourth small gear portion 6322 is located on the upper side of the fourth large gear portion 6321. The third gear 633 includes a fifth large gear portion 6331 and a fifth small gear portion 6332. In the up-down direction, the fifth large gear portion 6331 is located on the upper side of the fifth small gear portion 6332. The first intermediate transmission assembly 63 further includes a tenth gear 634A. The tenth gear 634A is immovable relative to the movable member 23/printing carriage 21. The tenth gear 634A and the movable member 23/printing carriage 21 are integrally formed or formed as separate bodies. The driving gear 611, the first gear 631, the second gear 632, the third gear 633, and the tenth gear 634A are all configured to rotate around axes parallel to the up-down direction. The first motor 61 outputs driving force to the driving gear 611. The driving gear 611 meshes with the first gear 631 to transmit the driving force to the first gear 631. The first gear 631 meshes with the second gear 632 to transmit the driving force to the second gear 632. Specifically, the first gear 631 meshes with the fourth large gear portion 6321. The fourth small gear portion 6322 meshes with the fifth large gear portion 6331. The fifth small gear portion 6332 meshes with the tenth gear 634A, thereby driving the printing mechanism 20 to swing along an arcuate trajectory.

Further, the locked member 903 in the locking mechanism 90 is configured to be immovable relative to the third gear 633. As shown in FIG. 139A, in the up-down direction, the locked member 903 is located on the upper side of the third gear 633.

Further, when the printing mechanism 20 is at the operating opening 110 described later corresponding to the cover member 10 after being opened, i.e., the printing mechanism 20 is at a position where it can be taken out, for example, the cover member 10 is used to cover the operating opening 110 described later, when the printing mechanism 20 is at the intermediate position shown in FIG. 138, along the front-rear direction, at least a part of the first intermediate transmission assembly 63 overlaps with the printing mechanism 20. Further, along the front-rear direction, the control member 13 overlaps with the first intermediate transmission assembly 63. Specifically, the control member 13 is located at the rear end portion of the printer. Further, as shown in FIG. 139A and FIG. 139B, in the up-down direction, the first motor 61 and the first intermediate transmission assembly 63 are both disposed above the printing support mechanism 30. In other words, the paper cassette 80 is disposed below the printing support mechanism 30 to avoid the first motor 61 from interfering with the paper cassette, thereby increasing the size of the paper cassette 80, and further reducing the size of the printer in the up-down direction, thereby realizing the miniaturized design of the printer.

In some embodiments, as shown in FIG. 140, the power supply module 74 may also be configured as an irregularly shaped structure. When the printing mechanism 20 moves to the side where the power supply module 74 is located, for example, when the printing mechanism 20 moves to the right side, in the up-down direction, a part of the power supply module 74 is located below the printing mechanism 20. In other words, along the up-down direction, a part of the power supply module 74 overlaps with the printing mechanism 20. For example, the power supply module 74 includes a first part 741*a* and a second part 741*b* shown by dashed lines in the figure. When the printing mechanism 20 moves to the right side, in the up-down direction, the second part 741*b* is located below the printing mechanism 20.

Next, some embodiments of the driving assembly will be described in detail.

Driving Assembly Embodiment 1

In this embodiment, the first intermediate transmission assembly 63 is configured as a gear mechanism.

Example 1

Figure 24B:
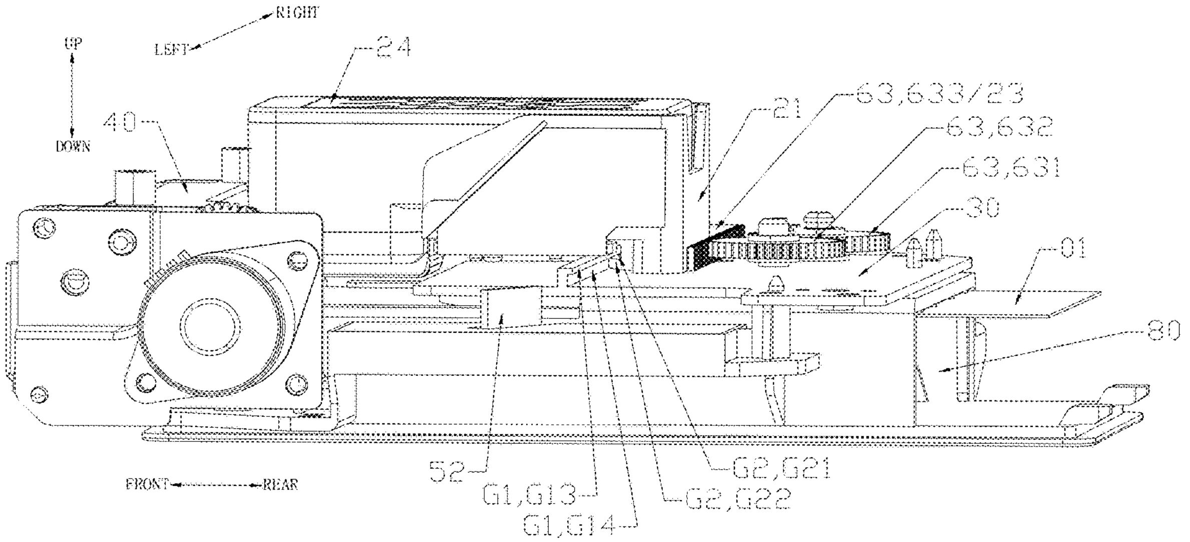

As shown in FIG. 24A and FIG. 24B, in this embodiment, the first intermediate transmission assembly 63 preferably uses a rack and pinion engagement. Specifically, the first intermediate transmission assembly 63 includes a first coupling member 631, a second coupling member 632, and a third coupling member 633. Preferably, the first coupling member 631 and the second coupling member 632 are gears, and the third coupling member 633 is a rack. Further, the rack 633 may be regarded as a type of movable member 23, or the rack 633 and the movable member 23 are integrally or separately formed. The driving gear 611, the first gear 631, and the second gear 632 can rotate around axes parallel to the up-down direction. The rack 633 can move along the left-right direction. Still further, the first gear 631 meshes with the driving gear 611 and the second gear 632 respectively. The second gear 632 meshes with the first gear 631 and the rack 633 respectively. In other words, the driving force output by the first motor 61 passes through the driving gear 611, the first gear 631, and the second gear 632 sequentially to be transmitted to the rack 633, thereby causing the rack 633/movable member 23 to drive the printing carriage 21 to move in the left-right direction, and further driving the printing mechanism 20 to move in the left-right direction. In other words, in this embodiment, the driving assembly drives the printing mechanism 20 to move along a specific trajectory, and the specific trajectory is a straight line parallel to the left-right direction.

Figure 25A:
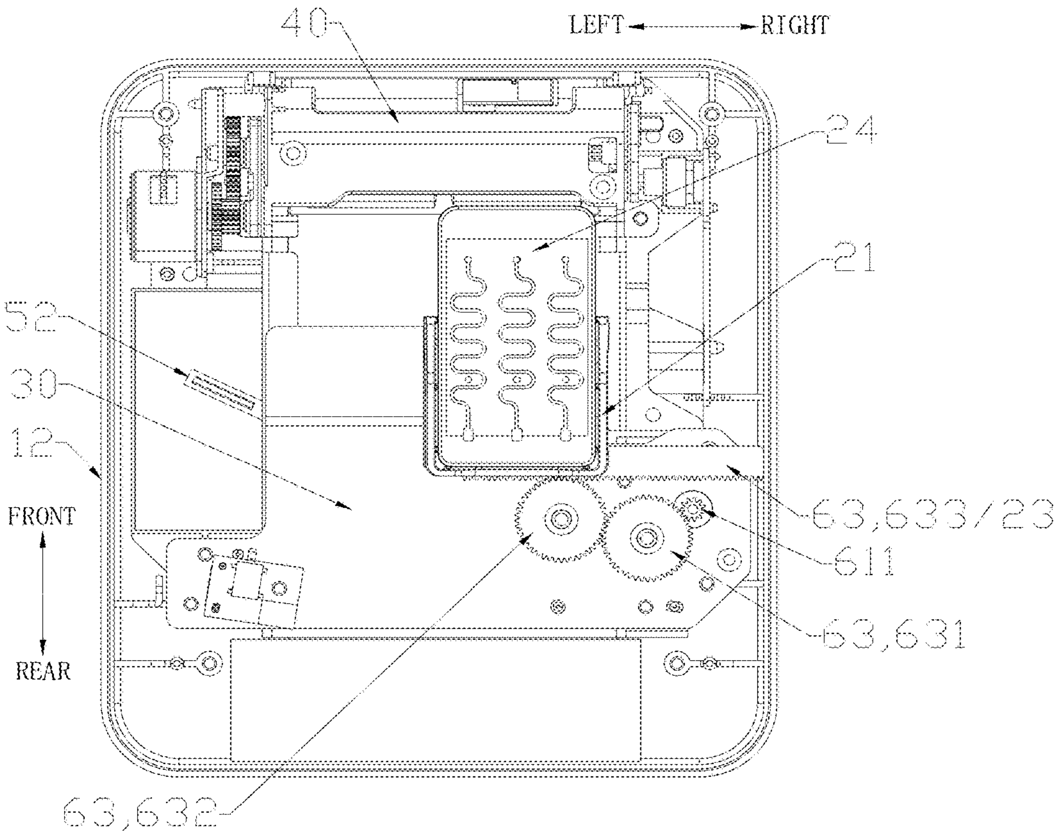
FIG. 25A is a side view of the first embodiment of the driving assembly in a portable inkjet photo printer according to the present disclosure, when the printing mechanism is in a first position.
Figure 25B:
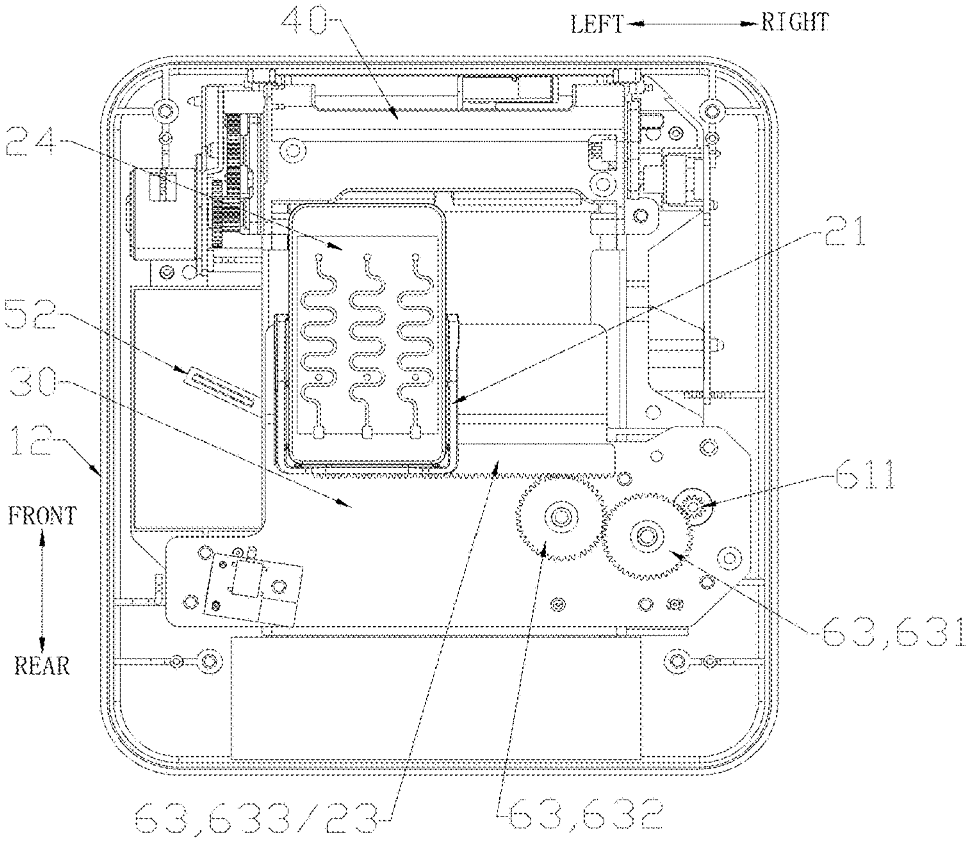
FIG. 25B is a side view of the first embodiment of the driving assembly in a portable inkjet photo printer according to the present disclosure, when the printing mechanism is in a second position.

As shown in FIG. 25A and FIG. 25B, along the paper feeding direction/printing medium travel direction, the printing mechanism 20 has a third position and a fourth position on the specific trajectory. The printing mechanism 20 can move between the third position and the fourth position along the left-right direction under the drive of the driving assembly. When the printing mechanism 20 is at the third position, along the front-rear direction, the distance between the inkjet device and the paper outlet is L1 (as shown in FIG. 10). When the printing mechanism 20 is at the fourth position, along the front-rear direction, the distance between the inkjet device and the paper outlet is also L1.

Continuing as shown in FIG. 24B, in this embodiment, a guide portion G1 and a guided portion G2 described later preferably utilize sliding friction. Specifically, the guide portion G1 is disposed on the printing support mechanism 30. The guided portion G2 is disposed on the printing carriage 21/movable member 23/rack 633. The guide portion G1 extends along the left-right direction and includes a first protrusion G13 and a first groove portion G14. The guided portion G2 includes a second groove portion G21 cooperating with the first protrusion G13 and a second protrusion G22 cooperating with the first groove portion G14. The guided portion G2 moves along the left-right direction under the guidance of the guide portion G1.

Beneficial effects obtainable in this embodiment: The rack and pinion transmission structure is compact, which is conducive to the miniaturized design of the printer.

Example 2

Figure 26:
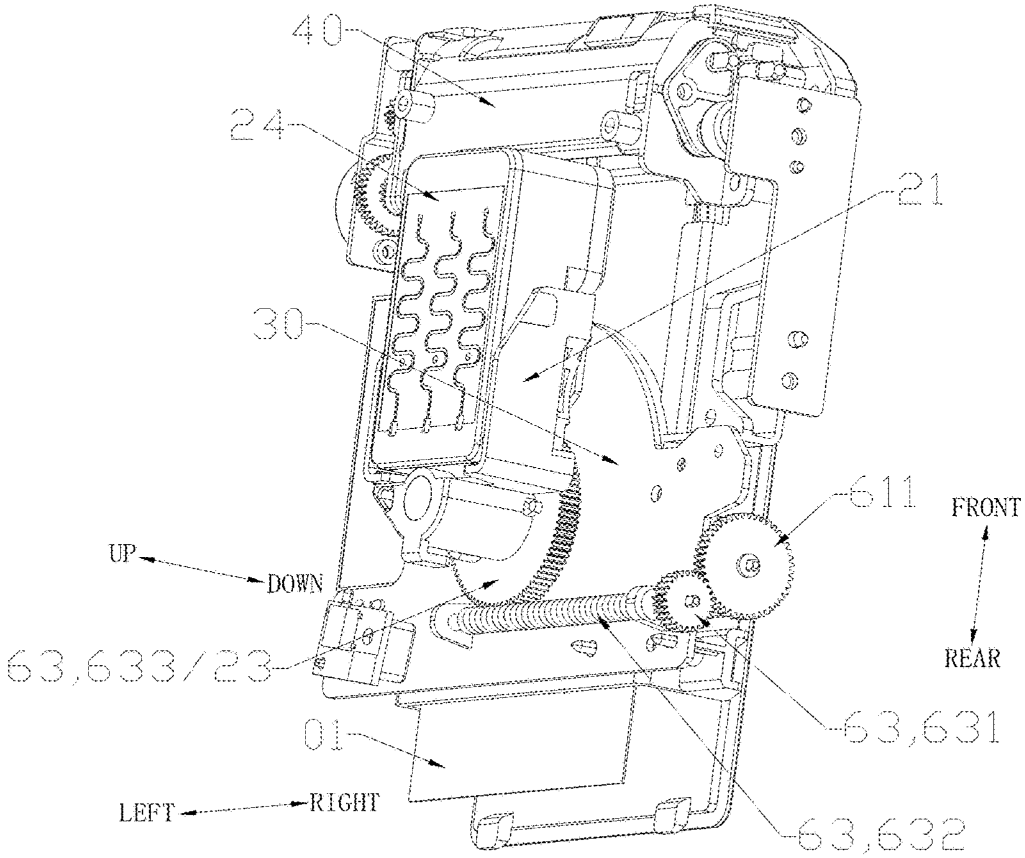
FIG. 26 is a perspective view of another example of the first embodiment of the driving assembly in a portable inkjet photo printer according to the present disclosure.

As shown in FIG. 26, in this embodiment, the first intermediate transmission assembly 63 preferably uses a worm and worm gear mechanism. Specifically, the first intermediate transmission assembly 63 includes a first coupling member 631, a second coupling member 632, and a third coupling member 633. Preferably, the first coupling member 631 is a gear, the second coupling member 632 is a worm, and the third coupling member 633 is a worm gear. Further, the worm gear 633 may be regarded as a type of movable member 23, or the worm gear 633 and the movable member 23 are integrally or separately formed. The driving gear 611, the first gear 631, and the worm 632 can rotate around axes parallel to the left-right direction. The worm gear 633 can rotate around an axis parallel to the up-down direction. Still further, in the left-right direction, the first gear 631 is installed at the end of the worm 632 and meshes with the driving gear 611 to receive the driving force output by the first motor 61, and drive the worm 632 to rotate around the axis parallel to the left-right direction. The worm 632 meshes with the worm gear 633 and drives the worm gear 633 to rotate around the axis parallel to the up-down direction, thereby causing the worm gear 633/movable member 23 to drive the printing carriage 21 to rotate around the axis parallel to the up-down direction, and further driving the printing mechanism 20 to rotate around the axis parallel to the up-down direction. In other words, the driving assembly drives the printing mechanism 20 to move along a specific trajectory. In this embodiment, the specific trajectory is arcuate (refer to FIG. 10).

Beneficial Effects Obtainable in this Embodiment:

1. Compared with two meshing gears, the worm and worm gear meshing presents an arcuate line contact, with more teeth meshing simultaneously, possessing greater load-bearing capacity.
2. Compared with two meshing gears, the worm and worm gear have a large transmission ratio, fewer parts, and smaller overall size, which is conducive to the miniaturized design of the printer.
3. Compared with two meshing gears, the transmission of the worm and worm gear is accurate and stable, making the movement of the printing mechanism 20 along the specific trajectory (e.g., arcuate) more stable, which in turn is conducive to improving the image forming quality of the printing mechanism 20 on the printing medium.

Driving Assembly Embodiment 2

In this embodiment, the first intermediate transmission assembly 63 is configured as a crank-link mechanism.

Example 1

Figure 27:
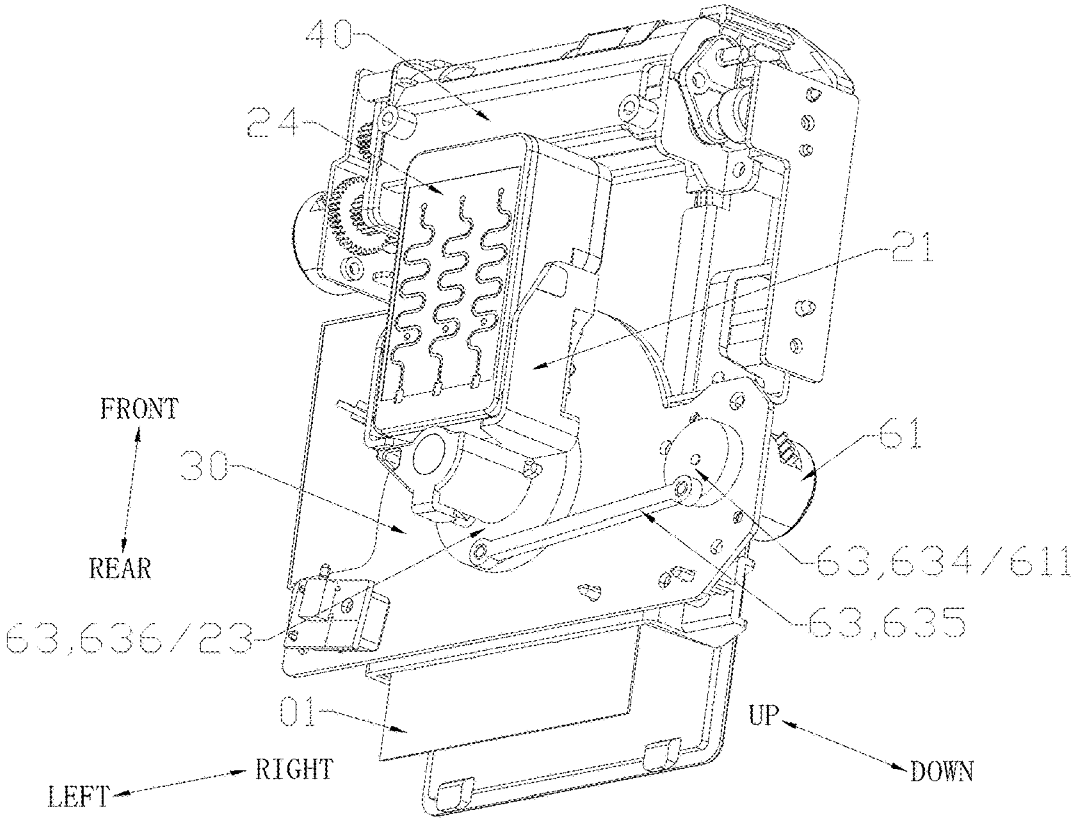
FIG. 27 is a perspective view of a second embodiment of a driving assembly in a portable inkjet photo printer according to the present disclosure.

As shown in FIG. 27, in this embodiment, the first intermediate transmission assembly 63 is preferably a double crank mechanism. Specifically, the first intermediate transmission assembly 63 includes a first crank 634, a connecting rod 635, and a second crank 636. Further, the first crank 634 is disposed on the driving gear 611 and is integrally or separately formed with the driving gear 611. The second crank 636 is disposed on the rotating member/ movable member 23 and is integrally or separately formed with the rotating member/movable member 23. The connecting rod 635 connects the first crank 634 and the second crank 636. The first crank 634 and the second crank 636 can rotate around axes parallel to the up-down direction. Still further, the first crank 634 receives the driving force output by the first motor 61 and rotates around an axis parallel to the up-down direction. The connecting rod 635 transmits the driving force to the second crank 636, causing the second crank 636 to rotate around an axis parallel to the up-down direction, thereby causing the second crank 636/rotating member/movable member 23 to drive the printing carriage 21 to rotate around an axis parallel to the up-down direction, and further driving the printing mechanism 20 to rotate around an axis parallel to the up-down direction. In other words, the driving assembly drives the printing mechanism 20 to move along a specific trajectory. In this embodiment, the specific trajectory is arcuate.

Preferably, in the radial direction perpendicular to the axis, the length of the first crank 634 is smaller than the length of the second crank 636.

Figure 28A:
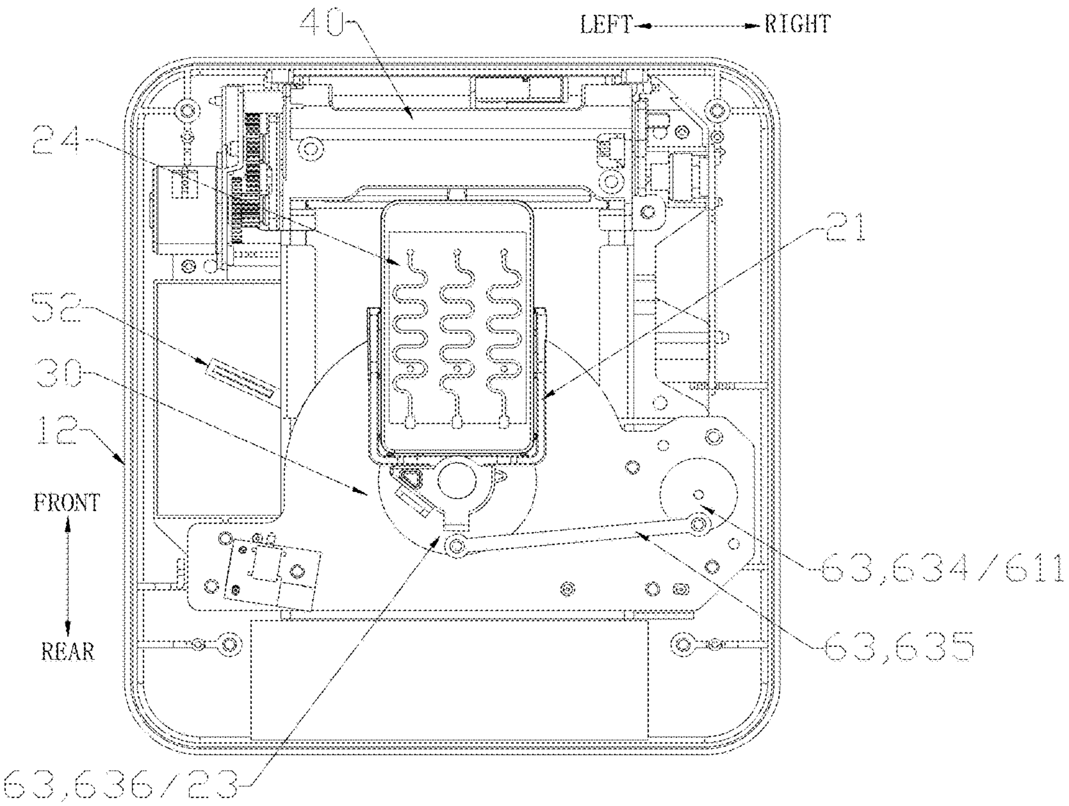
FIG. 28A is a side view of the second embodiment of the driving assembly in a portable inkjet photo printer according to the present disclosure, when the printing mechanism is in a first position.
Figure 28B:
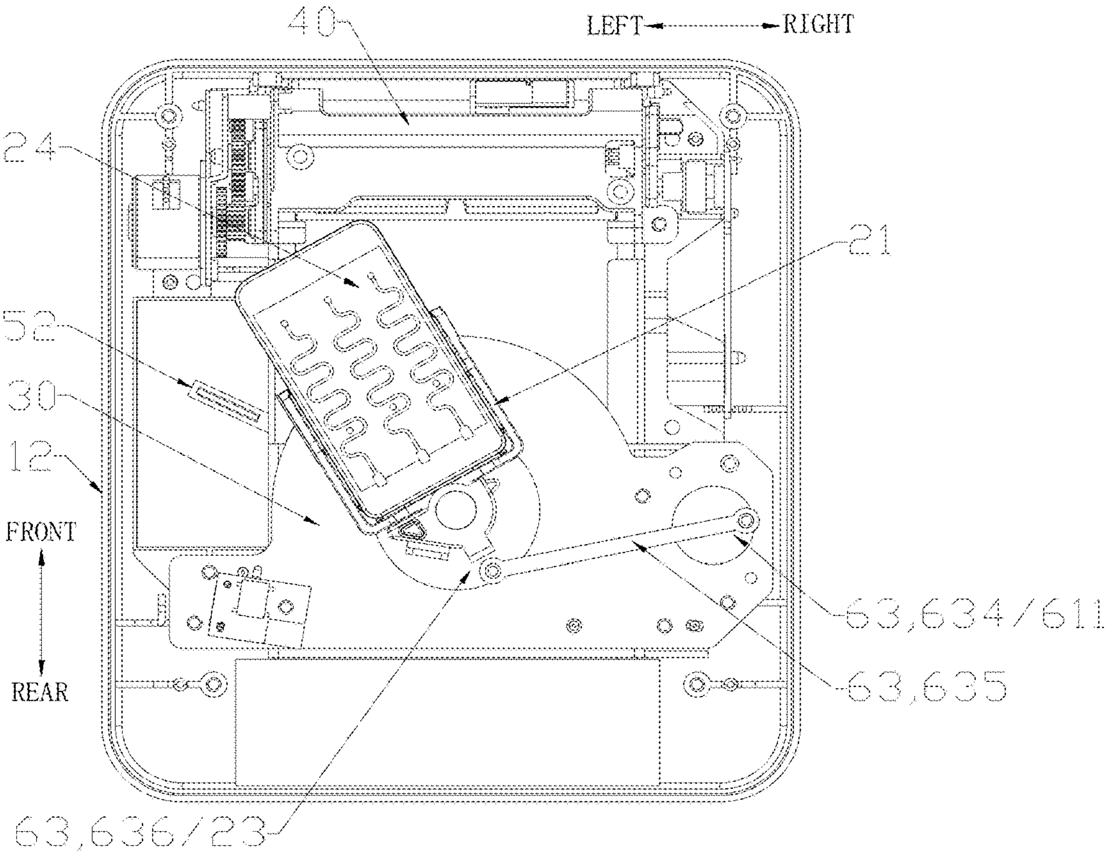
FIG. 28B and FIG. 28C are side views of the second embodiment of the driving assembly in a portable inkjet photo printer according to the present disclosure, when the printing mechanism is in a second position.
Figure 28C:
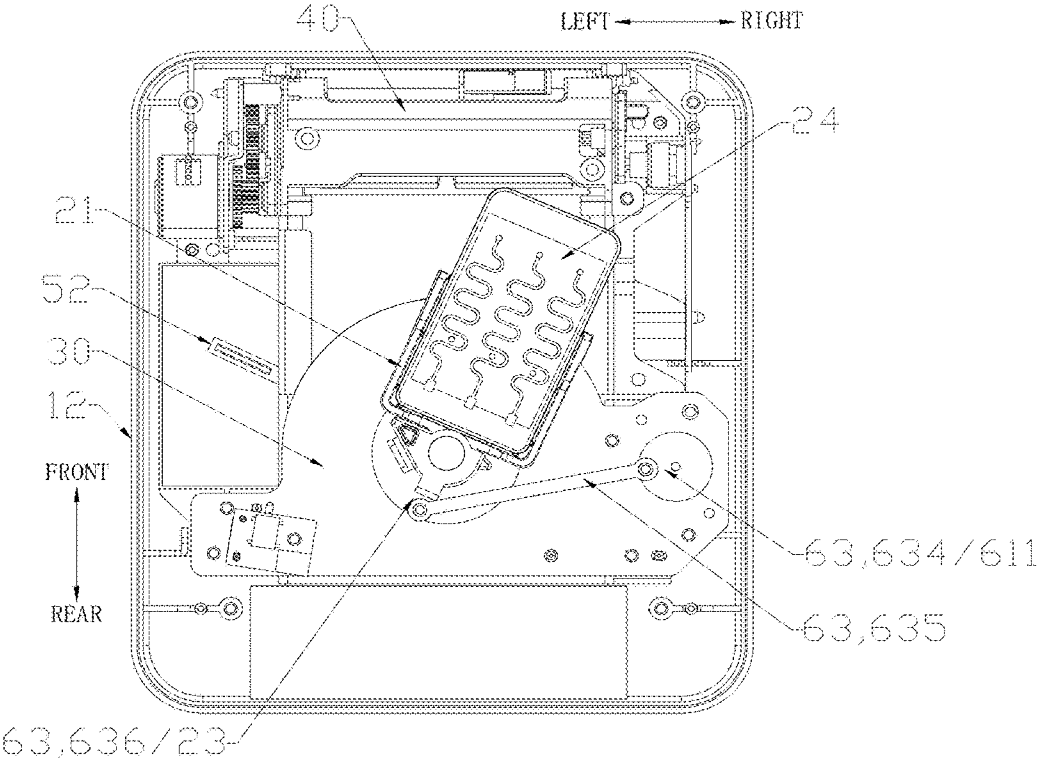

The trajectory formed by the rotation of the printing mechanism 20 around the axis parallel to the up-down direction under the drive of the driving assembly can refer to FIG. 10. FIG. 28A shows the state of the printing mechanism 20 at the first position. FIG. 28B and FIG. 28C show the state of the printing mechanism 20 at the second position. When the printing mechanism 20 is at the first position, along the front-rear direction, the distance between the inkjet device 25 and the paper outlet 122 is L1 (as shown in FIG. 10). When the printing mechanism 20 is at the second position, along the front-rear direction, the distance between the inkjet device 25 and the paper outlet 122 is L2 (as shown in FIG. 10), and L1<L2.

Beneficial Effects Obtainable in this Embodiment:

1. The double crank mechanism has a simple structure and is easy to design and manufacture, thereby reducing costs.
2. The double crank mechanism has low friction during transmission and high transmission efficiency.
3. The lengths of the first crank and the second crank are different, allowing the second crank to undergo variable speed rotation when the first crank undergoes constant speed rotation, which is conducive to improving the design freedom of the printing mechanism or the printer.

Example 2

Figure 29:
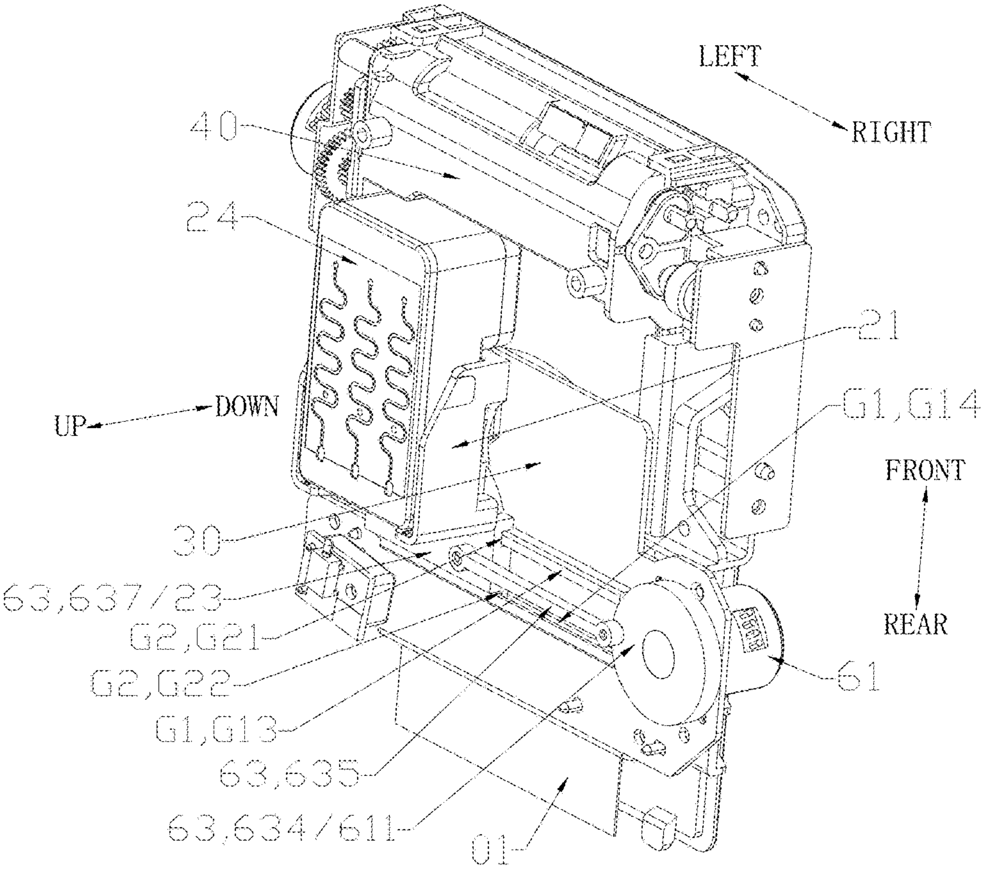
FIG. 29 is a perspective view of another example of the second embodiment of the driving assembly in a portable inkjet photo printer according to the present disclosure.

As shown in FIG. 29, in this embodiment, the first intermediate transmission assembly 63 is preferably a slider-crank mechanism. Specifically, the first intermediate transmission assembly 63 includes a first crank 634, a connecting rod 635, and a slider 637. Further, the first crank 634 is disposed on the driving gear 611 and is integrally or separately formed with the driving gear 611. The slider 637 may be regarded as a type of movable member 23, or the slider 637 is disposed on the movable member 23 and is integrally or separately formed with the movable member 23. The connecting rod 635 connects the first crank 634 and the slider 637. The first crank 634 can rotate around an axis parallel to the up-down direction. The slider 637 can move along the left-right direction. Still further, the first crank 634 receives the driving force output by the first motor 61 and rotates around an axis parallel to the up-down direction. The connecting rod 635 transmits the driving force to the slider 637, causing the slider 637 to move in the left-right direction, thereby causing the slider 637/movable member 23 to drive the printing carriage 21 to move in the left-right direction, and further driving the printing mechanism 20 to move in the left-right direction. In other words, in this embodiment, the driving assembly drives the printing mechanism 20 to move along a specific trajectory, and the specific trajectory is a straight line parallel to the left-right direction.

Figure 30A:
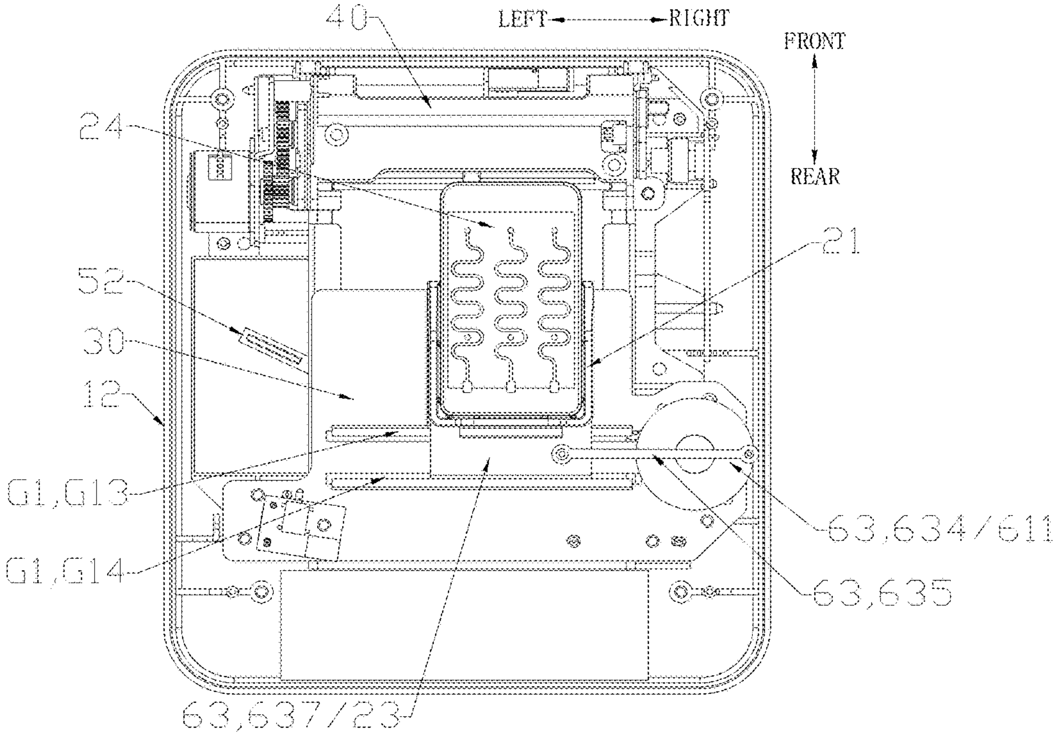
FIG. 30A is a side view of said another example of the second embodiment of the driving assembly in a portable inkjet photo printer according to the present disclosure, when the printing mechanism is in a first position.
Figure 30B:
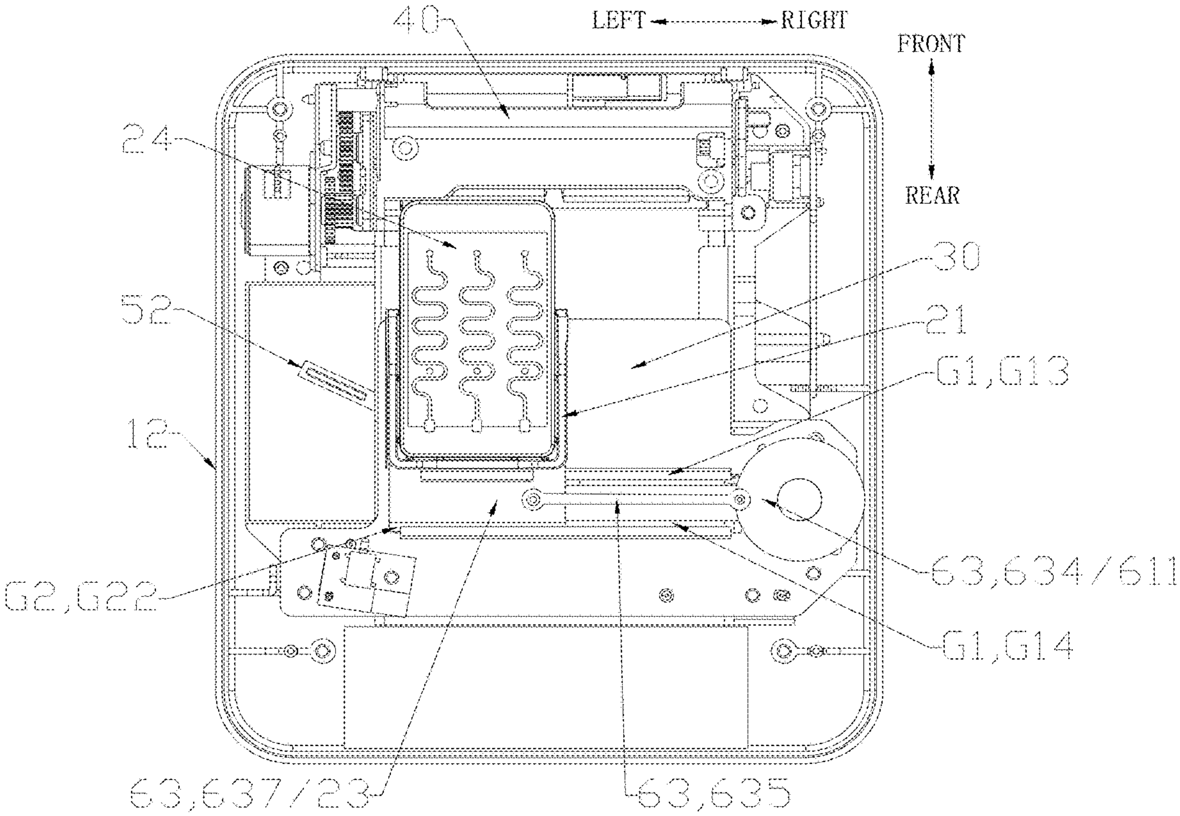
FIG. 30B is a side view of said another example of the second embodiment of the driving assembly in a portable inkjet photo printer according to the present disclosure, when the printing mechanism is in a second position.

As shown in FIG. 30A and FIG. 30B, along the paper feeding direction/printing medium travel direction, the printing mechanism 20 has a third position and a fourth position on the specific trajectory. The printing mechanism 20 can move between the third position and the fourth position along the left-right direction under the drive of the driving assembly. When the printing mechanism 20 is at the third position, along the front-rear direction, the distance between the inkjet device and the paper outlet is L1 (as shown in FIG. 10). When the printing mechanism 20 is at the fourth position, along the front-rear direction, the distance between the inkjet device and the paper outlet is also L1.

Continuing as shown in FIG. 29, in this embodiment, the guide portion G1 and the guided portion G2 described later preferably utilize sliding friction. Specifically, the guide portion G1 is disposed on the printing support mechanism 30. The guided portion G2 is disposed on the printing carriage 21/movable member 23/slider 637. The guide portion G1 extends along the left-right direction and includes a first protrusion G13 and a first groove portion G14. The guided portion G2 includes a second groove portion G21 cooperating with the first protrusion G13 and a second protrusion G22 cooperating with the first groove portion G14. The slider 637 (guided portion G2) moves along the left-right direction under the guidance of the guide portion G1.

Beneficial Effects Obtainable in this Embodiment:

1. The slider-crank mechanism has a simple structure and is easy to design and manufacture, thereby reducing costs.
2. The slider-crank mechanism can convert the rotational motion of driving force rotating around an axis parallel to the up-down direction into linear motion along the left-right direction, possessing higher motion conversion efficiency.

Driving Assembly Embodiment 3

In this embodiment, the first intermediate transmission assembly 63 is configured as a belt transmission mechanism.

Example 1

Figure 31:
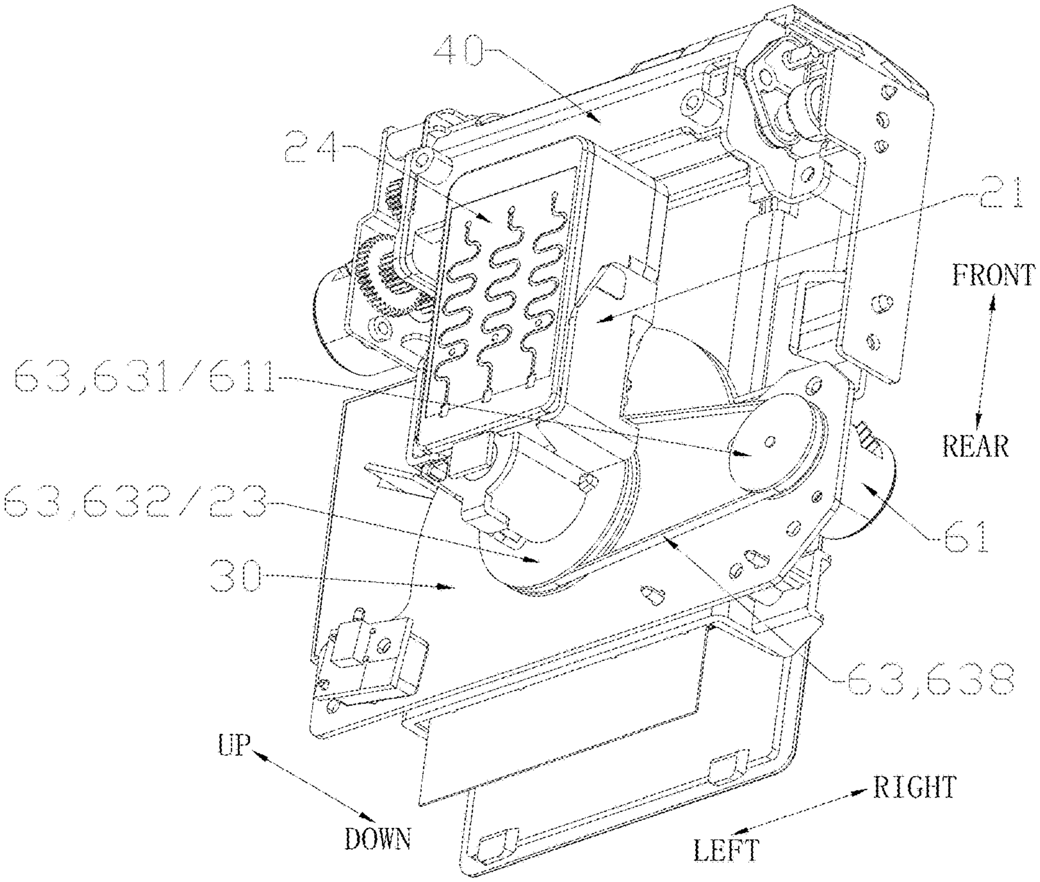
FIG. 31 is a perspective view of a third embodiment of a driving assembly in a portable inkjet photo printer according to the present disclosure.
Figure 32:
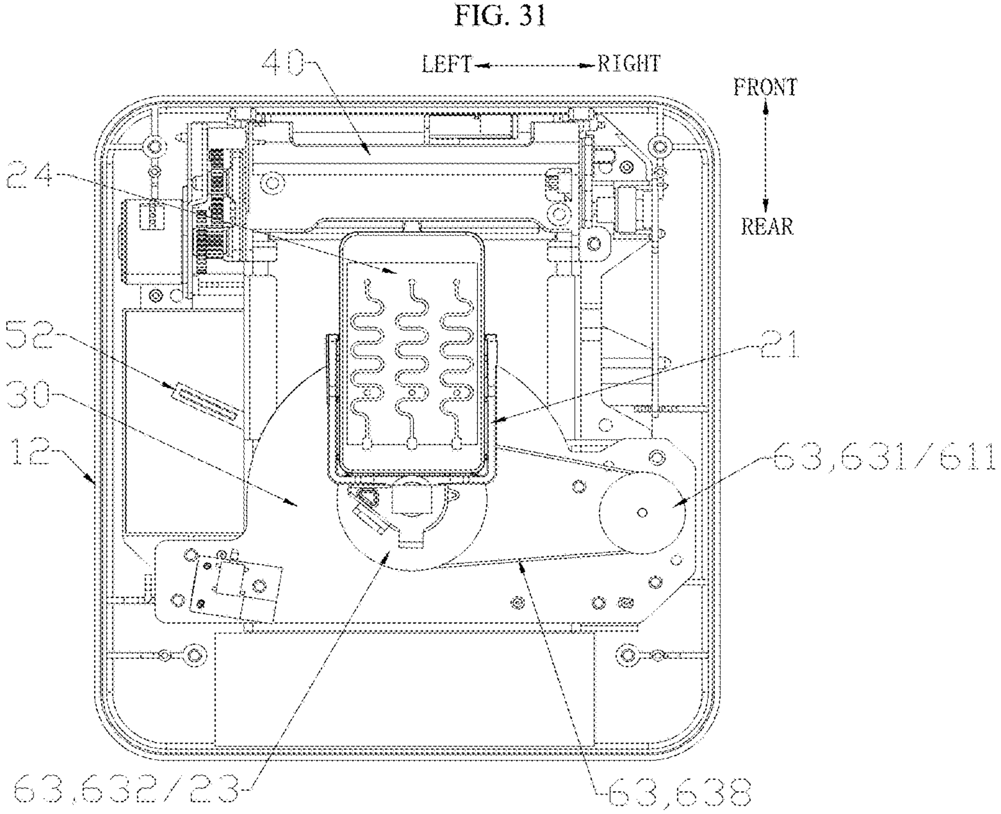
FIG. 32 is a side view of the third embodiment of the driving assembly in a portable inkjet photo printer according to the present disclosure, when the printing mechanism is in a first position.

As shown in FIG. 31 and FIG. 32, in this embodiment, the first intermediate transmission assembly 63 is preferably a synchronous belt transmission mechanism. Specifically, the first intermediate transmission assembly 63 includes a first synchronous pulley 631, an endless belt 638, and a second synchronous pulley 632. The endless belt 638 winds around the first synchronous pulley 631 and the second synchronous pulley 632 simultaneously. The first synchronous pulley 631 is installed as a driving pulley on the output end of the first motor 61. The second synchronous pulley 632 serves as a driven pulley. Further, the first synchronous pulley 631 may be regarded as the driving gear 611, and the second synchronous pulley 632 may be regarded as a type of movable member 23, or the second synchronous pulley 632 and the movable member 23 are integrally or separately formed. The first synchronous pulley 631 and the second synchronous pulley 632 can rotate around axes parallel to the up-down direction. The endless belt 638 rotates around the first synchronous pulley 631 and the second synchronous pulley 632. The first motor 61 outputs driving force to drive the first synchronous pulley 631 to rotate, causing the endless belt 638 to drive the second synchronous pulley 632 to rotate simultaneously, thereby causing the movable member 23 to drive the printing carriage 21 to rotate around an axis parallel to the up-down direction, and further driving the printing mechanism 20 to rotate around an axis parallel to the up-down direction. In other words, the driving assembly drives the printing mechanism 20 to move along a specific trajectory. In this embodiment, the specific trajectory is arcuate (refer to FIG. 10).

Beneficial Effects Obtainable in this Embodiment:

1. The synchronous belt transmission mechanism can make the transmission of driving force smoother, thereby making the movement of the printing mechanism 20 along the specific trajectory (e.g., arcuate) smoother, which in turn is conducive to improving the image forming quality of the printing mechanism 20 on the printing medium.
2. The synchronous belt transmission mechanism has a compact structure, which is conducive to the miniaturized design of the printer.

In some embodiments, the belt transmission mechanism may also be any one or more of a flat belt transmission, a V-belt transmission, a multi-wedge belt transmission, etc.

In other embodiments, the synchronous belt transmission mechanism may also cause the printing mechanism 20 to move along the left-right direction.

Example 2

Different from Example 1, in this embodiment, the printing mechanism 20 is configured to move along the left-right direction. In addition, in this embodiment, the printing medium 01 is set in a roll shape, specifically as follows.

In some embodiments, the printing medium 01 may also be set as non-roll paper.

In some embodiments, along the up-down direction, at least a part of the printing medium 01 is located below the printing area/printing mechanism 20. In other words, along the up-down direction, at least a part of the printing medium 01 overlaps with the printing area/printing mechanism 20.

In some embodiments, as shown in FIG. 104 to FIG. 107, the printing carriage 21 and the movable member 23 are set to move along the left-right direction. The printing carriage 21 and the movable member 23 are integrally or separately formed. The figure shows the structure where the printing carriage 21 and the movable member 23 are integrally formed.

Figure 104:
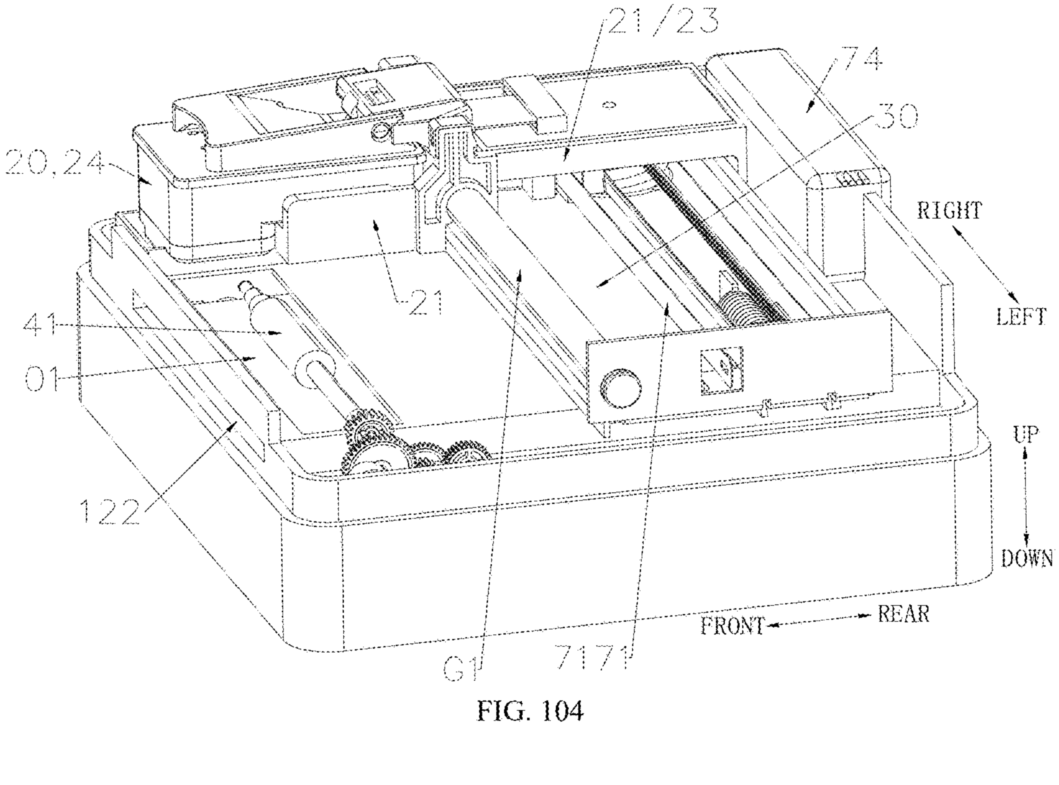
Figure 107:
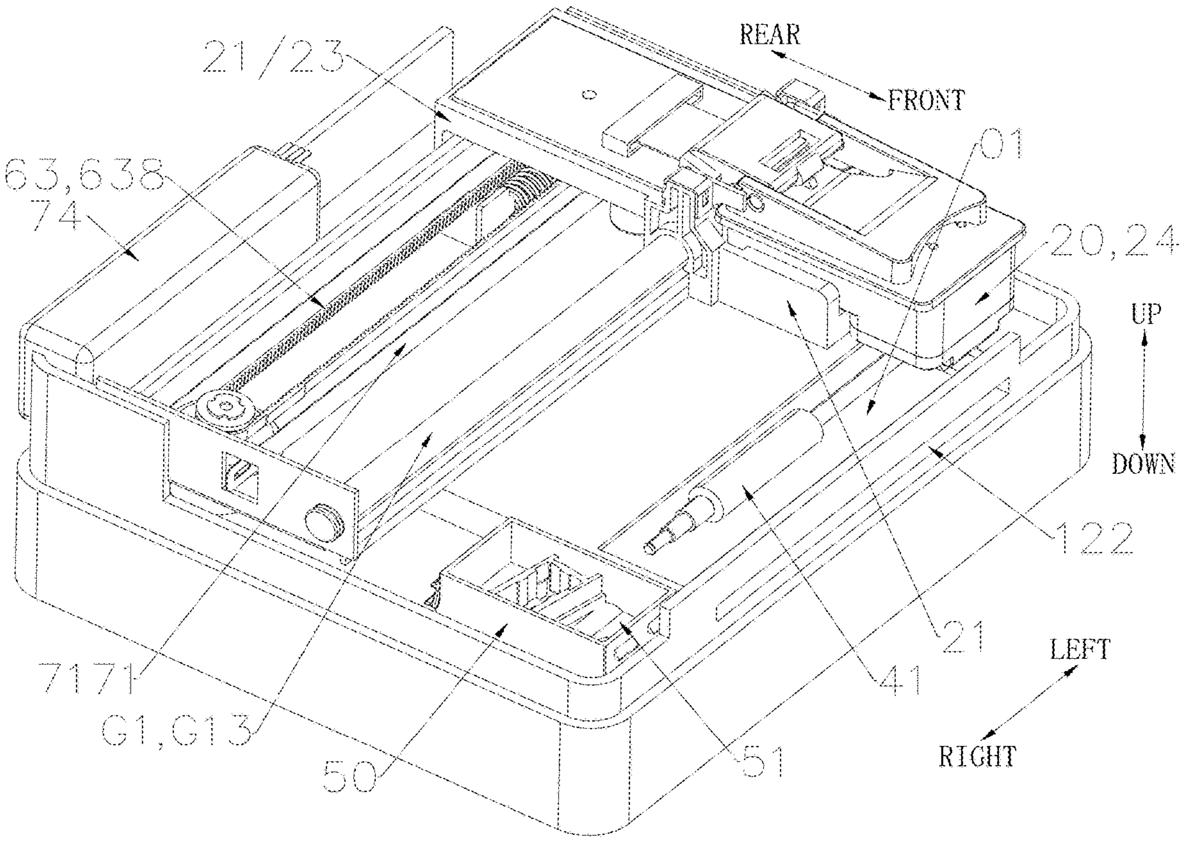

The printing mechanism 20 has a third position (as shown in FIG. 104) and a fourth position (as shown in FIG. 107) on the specific trajectory. The printing mechanism 20 can move between the third position and the fourth position.

As shown in FIG. 104 to FIG. 107, in this embodiment, the printer is provided with a guide mechanism described later. The guide mechanism is configured to guide the printing mechanism 20/printing carriage 21 to move along the left-right direction. The guide mechanism includes a guide portion G1 and a guided portion G2. The guided portion G2 slidably cooperates with the guide portion G1. Specifically, the guide portion G1 is disposed on the printing support mechanism 30, and the guided portion G2 is disposed on the printing carriage 21/movable member 23. Further, the guide portion G1 extends along the left-right direction to guide the printing mechanism 20/printing carriage 21 to move along the left-right direction. In other words, the printing carriage 21 is slidably disposed on the printing support mechanism 30.

Figure 105A:
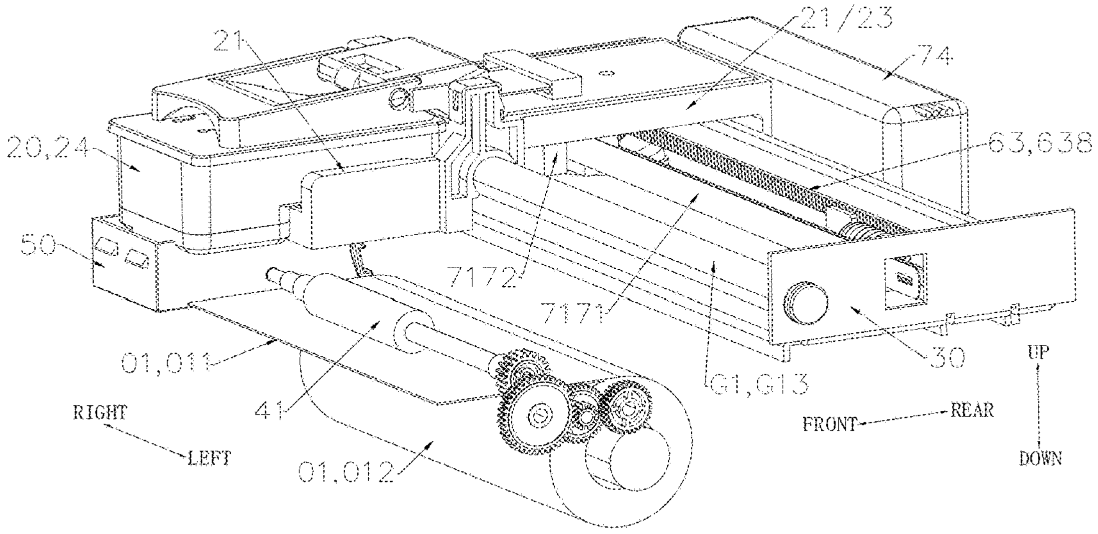
Figure 105B:
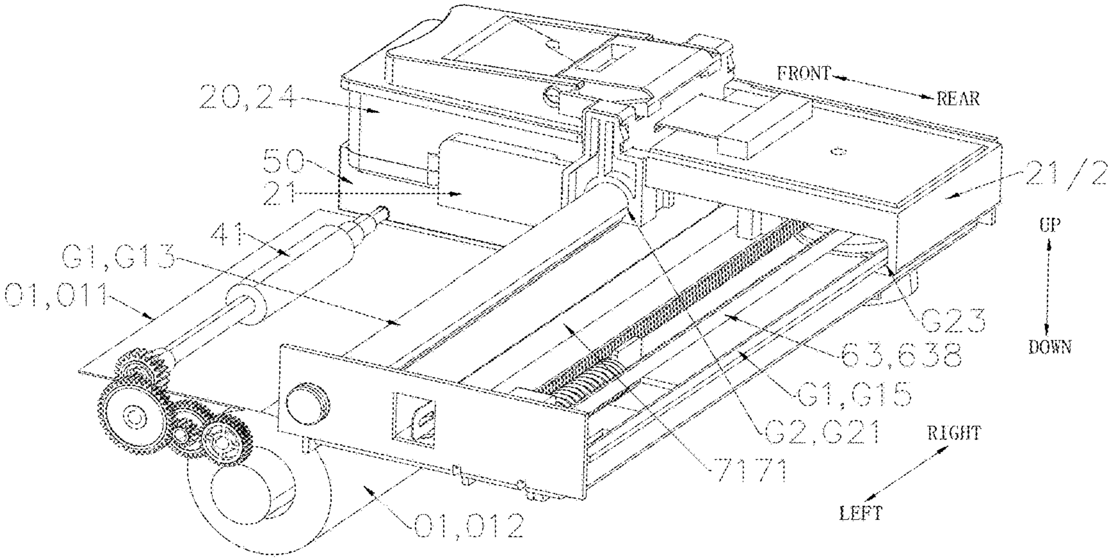

In some embodiments, as shown in FIG. 105B, the guide portion G1 is configured as a protrusion structure, and the guided portion G2 is configured as a groove structure. Specifically, the guide portion G1 includes a first protrusion G13 and an eighth protrusion G15. The guided portion G2 includes a second groove portion G21 and a third groove portion G23. Along the front-rear direction, the first protrusion G13 and the eighth protrusion G15 are spaced apart, and the second groove portion G21 and the third groove portion G23 are spaced apart. Further, the first protrusion G13 is configured to cooperate with the second groove portion G21, and the eighth protrusion G15 is configured to cooperate with the third groove portion G23, to guide the printing mechanism 20/printing carriage 21 to move along the left-right direction. Preferably, the first protrusion G13 is a column extending along the left-right direction.

In some embodiments, along the front-rear direction, the first protrusion G13 is located in front of the eighth protrusion G15, and the second groove portion G21 is located in front of the third groove portion G23.

In some embodiments, the guide portion G1 may also be configured as a groove structure, and the guided portion G2 may also be configured as a protrusion structure.

Figure 106:
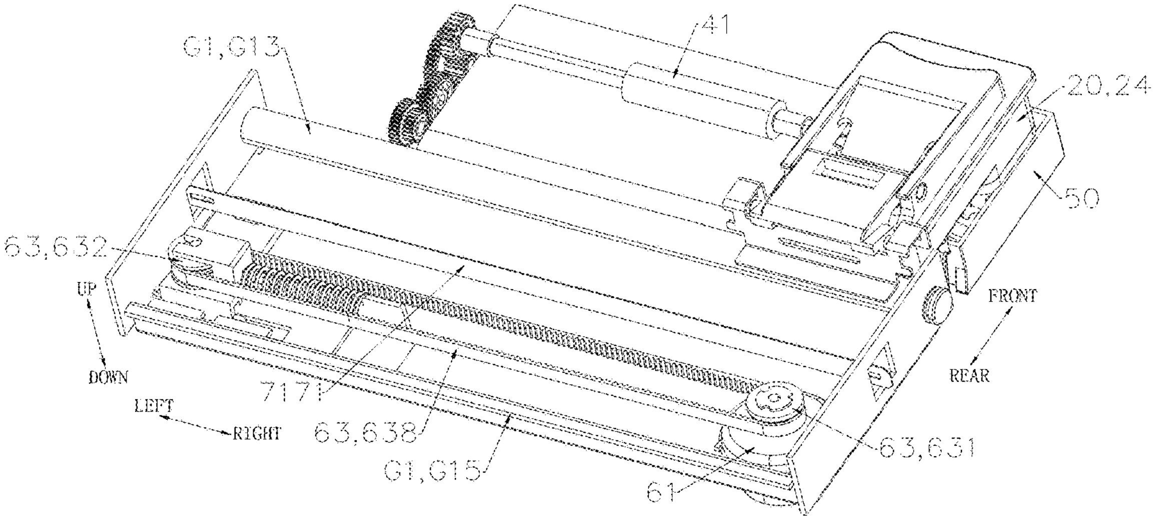

As shown in FIG. 106, the first intermediate transmission assembly 63 also includes a first synchronous pulley 631, an endless belt 638, and a second synchronous pulley 632. The endless belt 638 winds around the first synchronous pulley 631 and the second synchronous pulley 632 simultaneously. Along the left-right direction, the first synchronous pulley 631 and the second synchronous pulley 632 are spaced apart. The first synchronous pulley 631 serves as a driving pulley installed on the output end of the first motor 61. The second synchronous pulley 632 serves as a driven pulley. Further, the first synchronous pulley 631 may be regarded as the driving gear 611. The first synchronous pulley 631 and the second synchronous pulley 632 can rotate around axes parallel to the up-down direction. The endless belt 638 winds around the first synchronous pulley 631 and the second synchronous pulley 632 to rotate. Preferably, the diameters of the first synchronous pulley 631 and the second synchronous pulley 632 are the same. Therefore, after the endless belt 638 winds around the first synchronous pulley 631 and the second synchronous pulley 632, the endless belt 638 can move along the left-right direction. Still further, a part of the endless belt 638 is fixedly connected to the printing carriage 21. For example, a part of the endless belt 638 may be fixedly connected to the printing carriage 21 through a snap-fit method. The first motor 61 outputs driving force to drive the first synchronous pulley 631 to rotate, causing the endless belt 638 to drive the second synchronous pulley 632 to rotate simultaneously. Since a part of the endless belt 638 is fixedly connected to the printing carriage 21, the endless belt 638 can drive the printing carriage 21 and the printing mechanism 20 disposed on the printing carriage 21 to move along the left-right direction. In other words, the driving assembly drives the printing mechanism 20 to move along a specific trajectory. In this embodiment, the specific trajectory is a straight line. Further, the straight line is parallel to the left-right direction.

In some embodiments, along the front-rear direction, the first intermediate transmission assembly 63 is located between the first protrusion G13 and the eighth protrusion G15.

As shown in FIG. 105A, the printer further includes a high-precision position scale (such as a grating ruler) 7171.

The grating ruler 7171 extends along the left-right direction and is installed on the printing support mechanism 30. The sensing module further includes a displacement sensor 7172. The displacement sensor 7172 is installed on the printing carriage 21 and can move along the left-right direction with the printing carriage 21. Further, the displacement sensor 7172 is configured to cooperate with the grating ruler 7171. Specifically, the grating ruler 7171 is marked with scale information. The displacement sensor 7172 can read the scale information on the grating ruler 7171 when moving along the left-right direction with the printing carriage 21, and feed back the scale information to the control module of the printer in real time to obtain the position of the printing carriage 21/printing mechanism 20, thereby enabling precise control of the movement and inkjet timing of the printing carriage 21/printing mechanism 20, further optimizing the printing function of the printer and improving the user experience.

In some embodiments, along the front-rear direction, the displacement sensor 7172 is opposite to the grating ruler 7171.

In some embodiments, the displacement sensor 7172 may be a photoelectric sensor.

In some embodiments, as shown in FIG. 105B and FIG. 106, along the front-rear direction, the grating ruler 7171 is located between the first protrusion G13 and the eighth protrusion G15. For example, along the front-rear direction, the grating ruler 7171 is located in front of the first intermediate transmission assembly 63.

In some embodiments, as shown in FIG. 107, along the front-rear direction, the cleaning mechanism 50/collection portion 51 is located behind the paper outlet 122. Along the left-right direction, the cleaning mechanism 50/collection portion 51 is located to the right of the paper outlet 122/printing area. Further, the cleaning mechanism 50/collection portion 51 is detachable to facilitate cleaning of the cleaning mechanism 50/collection portion 51.

Beneficial Effects Obtainable in this Embodiment:

1. Compared with the rotating or swinging movement mode, setting the printing mechanism 20 to move along the left-right direction can shorten the movement distance, making the printer structure compact, effectively reducing the volume of the printer, facilitating the miniaturized design of the printer, and thereby improving the space utilization rate of the printer.
2. The printing medium is set in a roll shape, which can greatly reduce the size of the paper cassette 80 in the front-rear direction, which is conducive to further reducing the volume of the printer.

Example 3

Same as Example 2, in this embodiment, the printing mechanism 20 is also set to move along the left-right direction, and the printing medium 01 is set as non-roll paper or roll paper.

As shown in FIG. 111-FIG. 116, the printer has a first upper side wall 1611 and a first lower side wall 1612 opposite in the up-down direction, a first front side wall 1613 and a first rear side wall 1614 opposite in the front-rear direction, and a first left side wall 1615 and a first right side wall 1616 opposite in the left-right direction. The paper outlet 122 is disposed on the first front side wall 1613.

In some embodiments, the area of the first front side wall 1613 is smaller than the area of the first upper side wall 1611/first lower side wall 1612.

In some embodiments, the dimension of the housing assembly in the left-right direction is the largest, followed by the dimension in the front-rear direction, and the dimension in the up-down direction is the smallest.

In some embodiments, the control member 13 is disposed on the housing assembly, for example, the control member 13 is disposed on the second housing 12. Further, the control member 13 is disposed on the first left side wall 1615.

In some embodiments, the printer is further provided with an indicator light 133 to prompt the user.

In some embodiments, the printing mechanism 20 and the printing carriage 21 move along the left-right direction. Along the front-rear direction, the printing mechanism 20, the printing carriage 21, and the printing area are located on a side close to the paper outlet 122.

In some embodiments, the printer further includes a first paper discharge roller/first pickup roller 48. Along the up-down direction, at least a part of the first paper discharge roller 48 overlaps with the first protrusion G13. As one implementation, along the up-down direction, the first paper discharge roller 48 is located below the first protrusion G13. Further, the first paper discharge roller 48 extends along the left-right direction. Still further, along the front-rear direction, the guide member, the grating ruler 7171, the first intermediate transmission assembly 63, and the first paper discharge roller 48 are located on a side far from the paper outlet 122.

In some embodiments, the first protrusion G13, the grating ruler 7171, the endless belt 638, and the first paper discharge roller 48 are disposed along the left-right direction.

In some embodiments, the power supply module 74 is disposed along the left-right direction. In other words, the size of the power supply module 74 in the left-right direction is larger than the size in the front-rear direction.

In some embodiments, along the left-right direction, the first protrusion G13, the grating ruler 7171, the endless belt 638, the first paper discharge roller 48, and the power supply module 74 are larger than half of the size of the cavity formed inside the housing assembly in the left-right direction.

In summary, disposing the first protrusion G13, the grating ruler 7171, the endless belt 638, the first paper discharge roller 48, and the power supply module 74 along the left-right direction, and setting the printing mechanism 20 to move along the left-right direction, can effectively utilize the internal space of the printer, making the internal structure of the printer compact, which is conducive to the miniaturized design of the printer.

In some embodiments, the paper discharge sensor 711 is disposed at a position close to the paper outlet 122 for detecting the printing medium.

Figure 111:
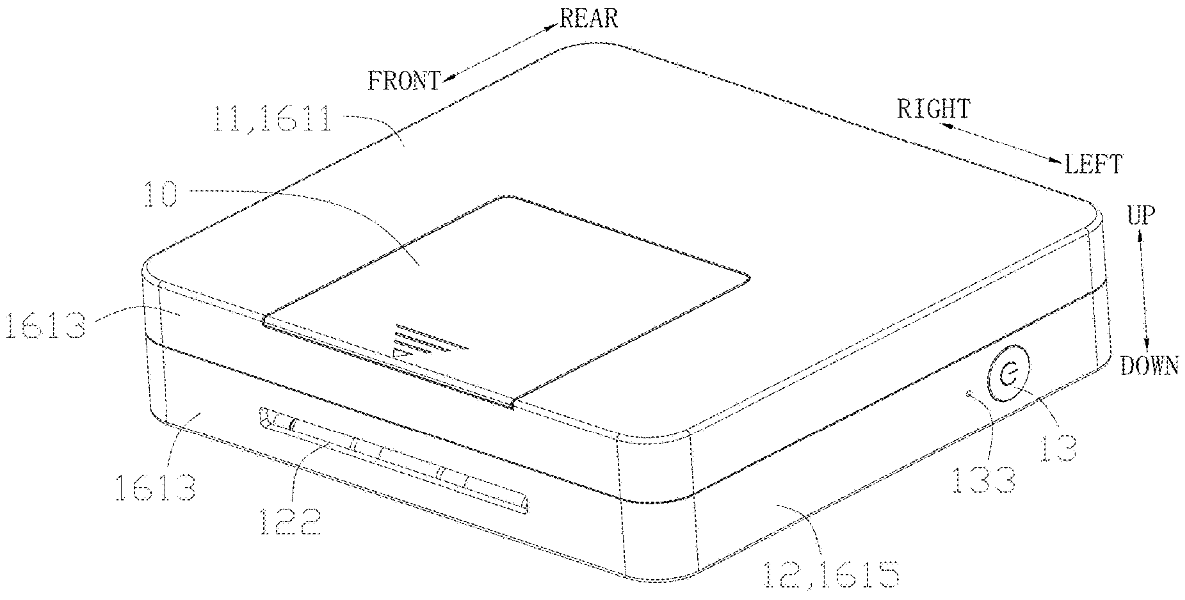
Figure 112A:
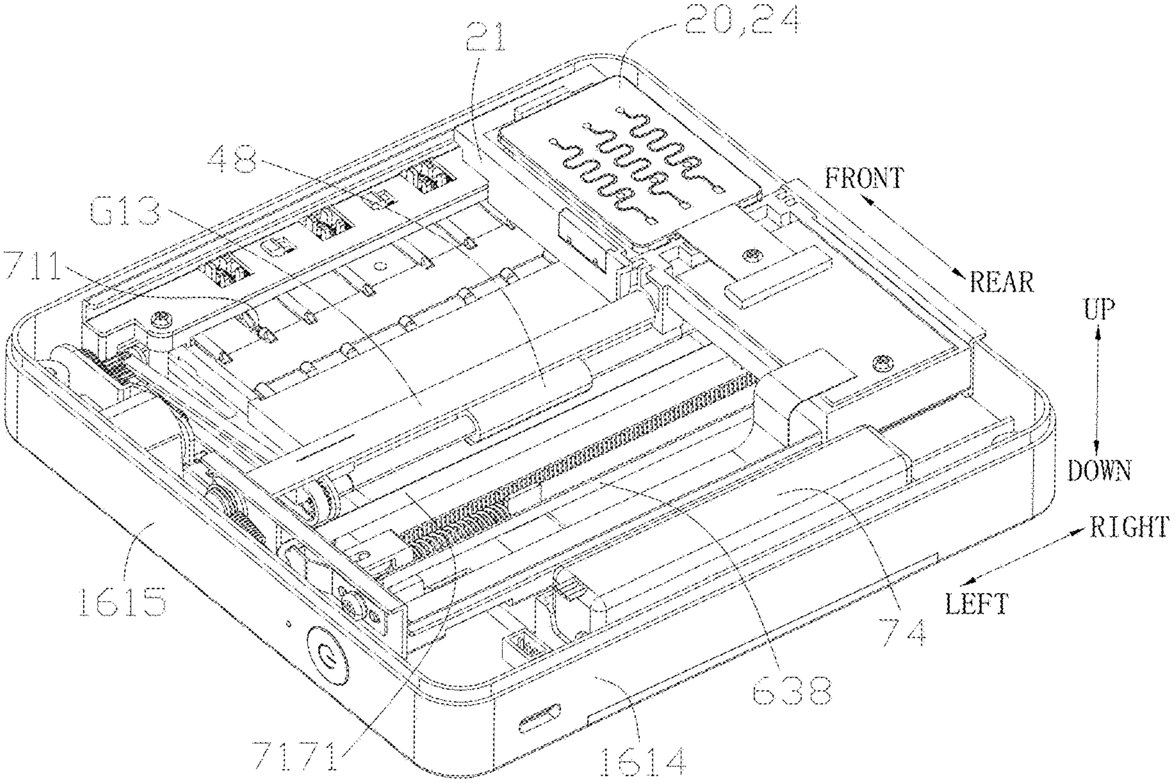
Figure 112B:
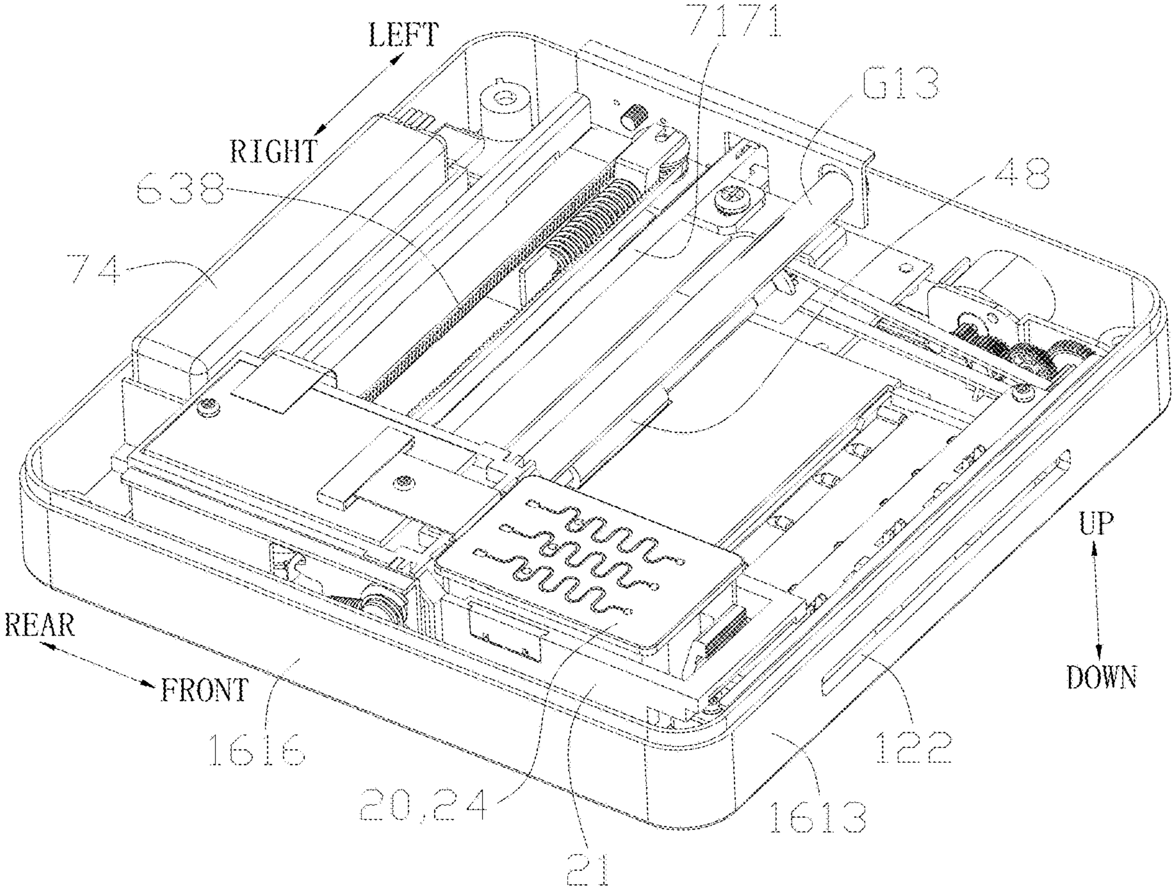
Figure 113:
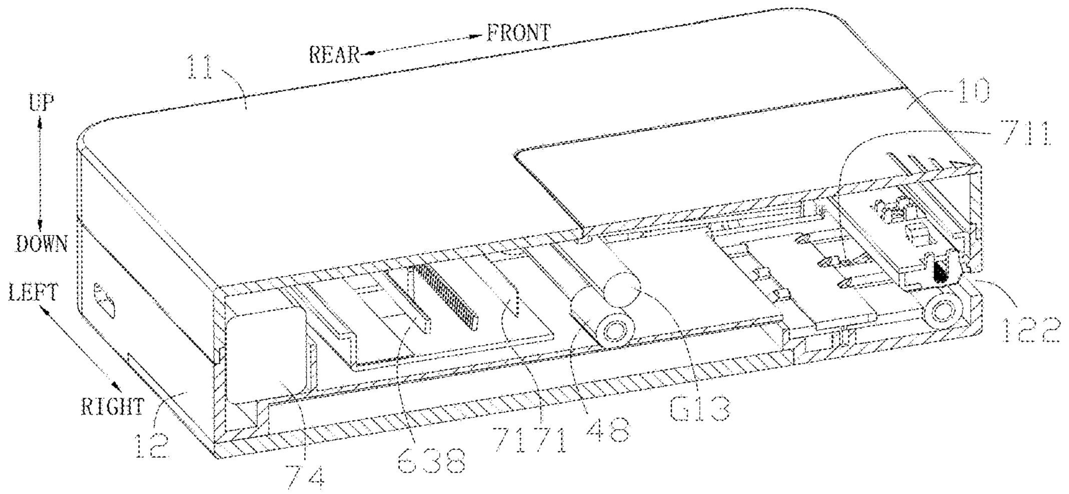
Figure 114:
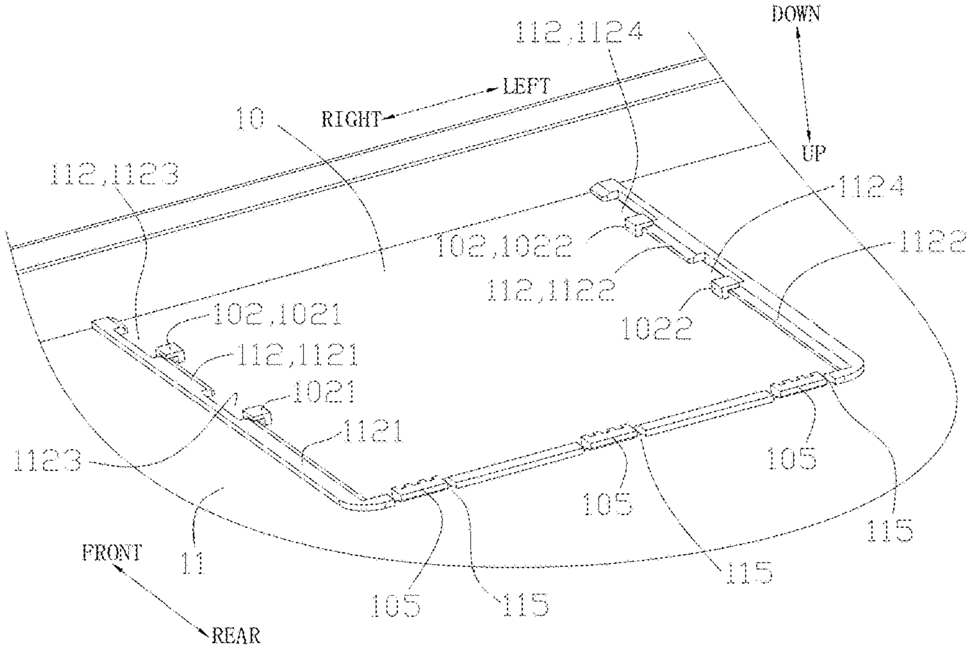

In some embodiments, as shown in FIG. 111 and FIG. 114, the cover member 10 is disposed on the first housing 11. The cover member 10 is slidably installed and detached along the front-rear direction. Further, along the up-down direction, at least a part of the cover member 10 overlaps with the printing area. When the printing mechanism 20 needs to be installed/detached/replaced, the printing carriage 21 moves along the left-right direction to a position corresponding to the cover member 10 in the up-down direction. Opening the cover member 10 allows the installation/detachment/replacement of the printing mechanism 20. Along the left-right direction, the cover member 10 may be disposed in the middle position of the printer to make the printer concise and beautiful.

Further, as shown in FIG. 114, a fastener 112 is disposed on the first housing 11, and a snap member 102 is disposed on the cover member 10. Specifically, at least a part of the fastener 112 is configured to cooperate with the snap member 102. As one implementation, along the left-right direction, the fastener 112 includes a first fastener 1121 and a second fastener 1122 spaced apart. Along the left-right direction, the fastener 112 further includes a first notch 1123 and a second notch 1124 spaced apart. Still further, the number of the first notches 1123 is two, spaced apart along the front-rear direction. The number of the second notches 1124 is two, spaced apart along the front-rear direction. Along the front-rear direction, the number of the first fasteners 1121 is two, spaced apart. The number of the second fasteners 1122 is two, spaced apart. Along the left-right direction, the snap member 102 includes a first snap member 1021 and a second snap member 1022 spaced apart. The first snap member 1021 is configured to cooperate (snap-fit) with the first fastener 1121. The second snap member 1022 is configured to cooperate (snap-fit) with the second fastener 1122. Still further, along the front-rear direction, the number of the first snap members 1021 is two, spaced apart. The number of the second snap members 1022 is two, spaced apart.

Further, as shown in FIG. 114, a first clearance portion 115 is further disposed on the first housing 11, and a first limiting member 105 is further disposed on the cover member 10. The first clearance portion 115 is configured to allow the first limiting member 105 to abut against the first housing 11, thereby positioning the cover member 10 in the up-down direction.

When the cover member 10 is installed, the cover member 10 is placed on the first housing 11 along the up-down direction, aligning the first snap member 1021 with the first notch 1123 and the second snap member 1022 with the second notch 1124. Then, the cover member 10 is slid backward along the front-rear direction, so that the first snap member 1021 snaps with the first fastener 1121, and the second snap member 1022 snaps with the second fastener 1122, completing the installation of the cover member 10.

In some embodiments, the first snap member 1021 and the second snap member 1022 are configured as groove structures, and the first fastener 1121 and the second fastener 1122 are configured as protrusion structures, or the first snap member 1021 and the second snap member 1022 are configured as protrusion structures, and the first fastener 1121 and the second fastener 1122 are configured as groove structures.

In some embodiments, as shown in FIG. 137, a first sensor 73 is further disposed in the printer. The first sensor 73 is configured to detect the opening/closing state of the cover member 10. For example, the first sensor 73 may be disposed on the first circuit board 701/second circuit board 702 and electrically connected to the first circuit board 701/second circuit board 702. When the cover member 10 is closed, the cover member 10 abuts against the first sensor 73 to detect whether the cover member 10 is closed.

In some embodiments, as shown in FIG. 115, a paper cassette cover plate 14 is disposed on the second housing 12. The paper cassette cover plate 14 is slidably installed and detached along the front-rear direction. After removing the paper cassette cover plate 14, the operation of replacing/refilling the printing medium can be performed. The paper cassette cover plate 14 covers the paper cassette 80.

As shown in FIG. 116, the printing mechanism 20 is provided with a securing mechanism. The securing mechanism is configured to fix/lock the printing mechanism 20 to the printing carriage 21. As one implementation, the securing mechanism includes a first snap-fit portion 24151 and a first snapped portion 24152. The first snap-fit portion 24151 is configured to snap with the first snapped portion 24152 to fix the printing mechanism 20 to the printing carriage 21. Along the front-rear direction, the first snap-fit portion 24151 and the first snapped portion 24152 are disposed opposite to each other. Specifically, the first snap-fit portion 24151 is disposed on the printing mechanism 20. For example, the first snap-fit portion 24151 and the ink storage portion body 241 are integrally or separately formed. The first snap-fit portion 24151 has elasticity. The first snapped portion 24152 is disposed on the printing carriage 21. Further, when the printing mechanism 20 is installed to the printing carriage 21, the first snap-fit portion 24151 abuts against the printing carriage 21 and undergoes elastic deformation, until the first snap-fit portion 24151 snaps with the first snapped portion 24152, and the printing mechanism 20 is fixed/locked. When unlocking, pressing the first snap-fit portion 24151 to cause it to undergo elastic deformation can release the snap-fit between the first snap-fit portion 24151 and the first snapped portion 24152, and the printing mechanism 20 is not fixed/locked.

In some embodiments, the first snap-fit portion 24151 is provided with a groove, and the first snapped portion 24152 is configured as a protrusion snapping with the groove, or the first snap-fit portion 24151 is provided with a protrusion, and the first snapped portion 24152 is configured as a groove snapping with the protrusion.

Example 4

The difference from Example 3 lies in the installation/removal method of the cover member 10 and the paper cassette cover plate 14, and the fixing/locking method of the printing mechanism 20. Specifically as follows.

It should be noted that in this embodiment, the first intermediate transmission assembly 63 is configured to include but is not limited to one structure among belt transmission mechanism, gear mechanism, and crank-link mechanism.

In some embodiments, the cover member 10 is rotatably disposed relative to the first housing 11. Specifically, as shown in FIG. 117, the cover member 10 is provided with a first coupling portion 1071, and the first housing 11 is provided with a first coupled portion 1171. The first coupling portion 1071 is configured to rotatably cooperate with the first coupled portion 1171. Further, the first coupling portion 1071 is configured as a rotation shaft, and the first coupled portion 1171 is configured as a hole/groove cooperating with the rotation shaft, or the first coupled portion 1171 is configured as a rotation shaft, and the first coupling portion 1071 is configured as a hole/groove cooperating with the rotation shaft.

In some embodiments, as shown in FIG. 118, the paper cassette cover plate 14 and the second housing 12 are combined by snap-fitting. Specifically, the paper cassette cover plate 14 includes a second snap-fit portion 1411, and the second housing 12 includes a second snapped portion 1215. The second snap-fit portion 1411 is configured to snap with the second snapped portion 1215 to install the paper cassette cover plate 14 to the second housing 12. Further, the second snap-fit portion 1411 has elasticity and can produce elastic deformation.

In some embodiments, as shown in FIG. 119-FIG. 121B, the securing mechanism includes a first snap-fit portion 24151, a first snapped portion 24152, and an elastic component 24153. Further, the first snap-fit portion 24151 is configured to abut against the first snapped portion 24152 to lock/fix the printing mechanism 20.

Further, the first snap-fit portion 24151 includes a first segment 24151*a* and a second segment 24151*b*. The first segment 24151*a* and the second segment 24151*b* are movably combined. For example, the first segment 24151*a* is provided with a second coupling portion 24152*e*, and the second segment 24151*b* is provided with a second coupled portion 24151*f*. The second coupling portion 24152*e* and the second coupled portion 24151*f* are rotatably combined.

Still further, the first segment 24151*a* includes a first abutment portion 24151*c*, and the second segment 24151*b* includes a first abutted portion 24151*d*. The first abutment portion 24151*c* is configured to interact with the first abutted portion 24151*d*. Specifically, when the first segment 24151*a* rotates relative to the second segment 24151*b*, the first abutment portion 24151*c* abuts against the first abutted portion 24151*d* and rotates around the first abutted portion 24151*d* until the first segment 24151*a* abuts against the printing mechanism 20.

Further, the first snap-fit portion 24151 is movably disposed on the printing carriage 21. Specifically, the first snap-fit portion 24151 (specifically the second segment 24151*b*) is provided with a third coupling portion 24151*g*, and the printing carriage 21 is provided with a third coupled portion 2111. The third coupling portion 24151*g* and the third coupled portion 2111 are rotatably combined.

Further, along the front-rear direction, a rear end portion 24151*i* of the first snap-fit portion 24151 abuts against the first snapped portion 24152 to lock/fix the printing mechanism 20.

Further, as shown in FIG. 121A and FIG. 121B, the elastic component 24153 has a natural state and an acting state. In the natural state, the elastic component 24153' is located at the position shown by the dashed line in the figure. In the acting state, the elastic component 24153 applies a downward elastic force to the second segment 24151*b*. The elastic force is transmitted to the front end portion of the first segment 24151*c* via the first abutted portion 24151*d* and the first abutment portion 24151*c*, thereby making the first segment 24151*c* abut against the printing mechanism 20 more tightly, and the printing mechanism 20 is locked/fixed more stably.

When unlocking, the first segment 24151*a* is rotated along the direction r3 (unlocking direction), driving the first abutment portion 24151*c* to rotate until the first abutment portion 24151*c* disengages from abutting against the first abutted portion 24151*d*. At this time, there is a space for downward movement for the first abutted portion 24151*d*, and the elastic component 24153' restores to the natural state.

In some embodiments, when the rear end portion 24151*i* of the first snap-fit portion 24151 rotates along the direction r4 (locking direction, opposite to the direction r3), the rear end portion 24151*i* frictionally abuts against the upper cover 242 of the ink storage portion 24, moving the printing mechanism 20 backward/inward along the front-rear direction to a preset position. When the rear end portion 24151*i* rotates from the locking direction to the unlocking direction along r3, the rear end portion 24151*i* frictionally abuts against the upper cover 242 of the ink storage portion 24, moving the printing mechanism 20 forward/outward along the front-rear direction away from the preset position, facilitating the user to take out the printing mechanism 20.

[Paper Cassette]

Figure 6:
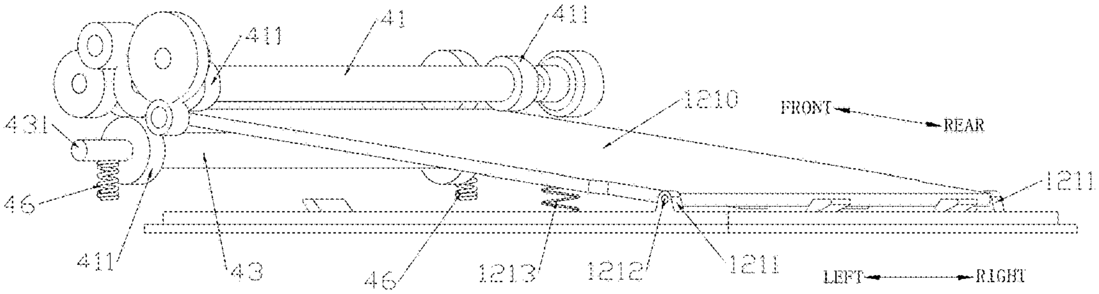
FIG. 6 is an exploded schematic view of a paper feeding mechanism in a portable inkjet photo printer according to the present disclosure.

As shown in FIG. 1 and FIG. 6, a paper cassette 80 is disposed inside the printer for storing the printing medium. The paper cassette 80 includes a paper cassette cover plate (the paper cassette cover plate may also be a part of the housing assembly). The printer further includes a paper pressing mechanism disposed on the paper cassette cover plate. The paper pressing mechanism is configured to press the printing medium to ensure that the paper feeding mechanism can contact the printing medium. Specifically, the paper pressing mechanism at least includes a support member 1210. The support member 1210 is movably disposed relative to the paper cassette cover plate 14. The support member 1210 is configured to support a part of the printing medium. Further, the support member 1210 has a first end (in the front-rear direction, an end close to the paper outlet 122) and a second end (in the front-rear direction, an end far from the paper outlet 122). The support member 1210 is disposed inclined relative to the front-rear direction. Its inclination direction is such that, along the direction from rear to front, the distance between the support member 1210 and the paper cassette cover plate in the up-down direction gradually increases. In other words, in the front-rear direction, the first end is located in front of the second end, and in the up-down direction, the first end is located above the second end. In some embodiments, the paper pressing mechanism further includes a second elastic member 1213. The second elastic member 1213 interacts with the support member 1210. Under the elastic action of the second elastic member 1213, the support member 1210 can move relative to the paper cassette cover plate. More specifically, the second elastic member 1213 is located between the support member 1210 and the paper cassette cover plate. In the front-rear direction, the second elastic member 1213 is disposed on a side far from the connection between the support member 1210 and the paper cassette cover plate. In other words, in the front-rear direction, the second elastic member 1213 is disposed on a side close to the first end, so that the first end of the support member 1210 is far from the paper cassette cover plate in the up-down direction. In other words, the second elastic member 1213 is configured to push the first end of the support member 1210 in a direction away from the paper cassette cover plate. Preferably, the paper cassette cover plate and the support member 1210 are hingedly connected. Specifically, a fulcrum 1212 is disposed on the support member 1210, and a socket portion 1211 cooperating with the fulcrum 1212 is disposed on the paper cassette cover plate. The fulcrum 1212 and the socket portion 1211 cooperate rotatably to realize the rotation of the support member 1210 relative to the paper cassette cover plate. The number of fulcrums 1212 and socket portions 1211 is preferably two, spaced apart in the left-right direction.

In some embodiments, the printer includes a cover member 10 for detachably installing/replacing the ink storage portion 24 (ink cartridge), and a paper cassette cover plate 14 for refilling/replacing the printing medium. The cover member 10 and the paper cassette cover plate 14 are detachably disposed relative to the housing assembly. Specifically, the cover member 10 is located on the upper side of the printer, and the paper cassette cover plate 14 is located on the lower side of the printer. For first-time users, distinguishing the cover member 10 and the paper cassette cover plate 14 presents certain difficulties. To facilitate user distinction between the cover member 10 and the paper cassette cover plate 14, the printer is provided with an identification mechanism MP. The identification mechanism MP is disposed between the cover member 10 and the first housing 11 and/or between the paper cassette cover plate 14 and the second housing 12. Specifically, as shown in FIG. 48A, the identification mechanism MP includes at least one identification protrusion MP1 and at least one correspondingly disposed identification groove MP2. Specifically the identification groove MP2 may be a blind groove and/or a through groove. Preferably, the identification protrusion MP1 is disposed on the second housing 12, and the identification groove MP2 is disposed on the paper cassette cover plate 14. The identification groove MP2 is an arcuate through groove.

In some embodiments, the second elastic member 1213 is a spring or a component made of elastic material.

In some embodiments, as shown in FIG. 76A, the paper pressing mechanism further includes a paper pressing member 1214. The paper pressing member 1214 is disposed on the support member 1210. In the front-rear direction, the paper pressing member 1214 is located at an end far from the paper outlet 122. Specifically, the paper pressing member 1214 can undergo elastic deformation. Preferably, the paper pressing member 1214 is configured as a metal elastic piece or an injection molded part with elasticity. A first abutment position D3 is formed where the support member 1210 and the printing medium 01 abut against each other along the front-rear direction. Compared to the rear end of the printing medium 01, the first abutment position D3 is closer to the front end of the printing medium 01. A second abutment position D4 is formed where the paper pressing member 1214 and the printing medium 01 abut against each other. Compared to the front end of the printing medium 01, the second abutment position D4 is closer to the intermediate position or the rear end of the printing medium 01 in the front-rear direction. With such a configuration, both the front side and the rear side of the printing medium 01 may be supported. This can avoid the situation where the printing medium 01 is deformed on the rear side due to being supported only by the support member 1210 on the front side for a long time, thereby preventing the printing medium 01 from getting stuck and interrupting printing during the process of being transported toward the paper outlet 122 due to the deformation of the rear side of the printing medium 01. Preferably, the abutment position (second abutment position D4) of the paper pressing member 1214 and the printing medium 01 corresponds to the intermediate position of the printing medium 01. More preferably, an angle $\alpha$ formed by the paper pressing member 1214 and the direction from rear to front is greater than an angle $\beta$ formed by the support member 1210 and the direction from rear to front.

Figure 76B:
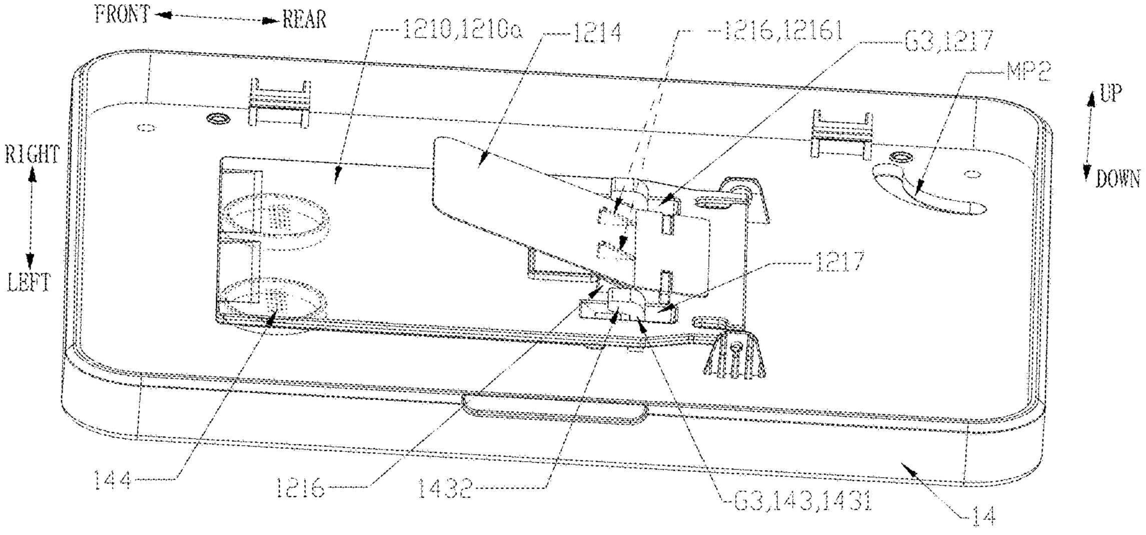
FIG. 76B is a perspective view of a paper cassette cover plate, a support member, and a paper pressing member cooperating with each other in a portable inkjet photo printer according to the present disclosure.

In some embodiments, as shown in FIG. 76A and FIG. 76B, the paper pressing member 1214 may also be integrally formed with the support member 1210. For example, the paper pressing member 1214 is configured as one or more cantilevers. The cantilevers may be configured to have elasticity or not to have elasticity.

In some embodiments, as shown in FIG. 76B, the support member 1210 is further provided with at least one support protrusion 1216 for providing support to the paper pressing member 1214. Specifically, a plurality of support protrusions 1216 are spaced apart along the left-right direction. The support protrusions 1216 protrude from an upwardly facing surface 1210*a* (support member upper surface) of the support member 1210. Preferably, the support protrusion 1216 has a support surface 12161 disposed inclined relative to the front-rear direction. Its inclination direction is such that, along the direction from rear to front, the distance between the support surface 12161 and the support member upper surface 1210*a* in the up-down direction gradually increases. With such a configuration, the support protrusion 1216 can provide certain support to the paper pressing member 1214 capable of elastic deformation, slowing down the speed of plastic deformation of the paper pressing member 1214, and extending the service life of the paper pressing member 1214.

In some embodiments, the paper pressing member 1214 may also be disposed on the paper cassette cover plate 14, or the paper pressing member 1214 is disposed at other positions, as long as it can serve the function of supporting the printing medium 01.

In some embodiments, a guide limiting mechanism G3 is further provided between the support member 1210 and the paper cassette cover plate 14. Specifically, the guide limiting mechanism G3 includes a guide limiting portion 1217 and a guided limiting portion 143. Through the cooperation of the guide limiting portion 1217 and the guided limiting portion 143, the movement range and movement direction of the support member 1210 are restricted. For example, the guide limiting portion 1217 is a through hole or groove formed in the support member 1210, and the guided limiting portion 143 is a protrusion formed protruding upward from the paper cassette cover plate 14. At least a part of the guided limiting portion 143 is located in the guide limiting portion 1217. Specifically, the guided limiting portion 143 includes a first protruding portion 1431 and a second protruding portion 1432 connected to each other. The first protruding portion 1431 connects to the paper cassette cover plate 14. The second protruding portion 1432 is formed protruding forward or backward from the first protruding portion 1431. Along the front-rear direction, the dimension of the guide limiting portion 1217 is greater than the dimension of the guided limiting portion 143.

In some embodiments, the guide limiting portion 1217 and the guided limiting portion 143 may also be interchanged in position.

In some embodiments, the support member 1210 and the paper cassette cover plate 14 are hingedly connected.

In some embodiments, the printer further includes an elastic member 144 disposed between the paper cassette cover plate 14 and the support member 1210. On the one hand, it is configured to reduce noise during printer operation. On the other hand, it is configured to provide upward elastic force to the support protrusion 1216, so that the paper pressing member 1214 can be supported more stably by the support protrusion 1216.

Next, some embodiments of the paper cassette 80 will be described in detail.

Paper Cassette Embodiment 1

Figure 18:
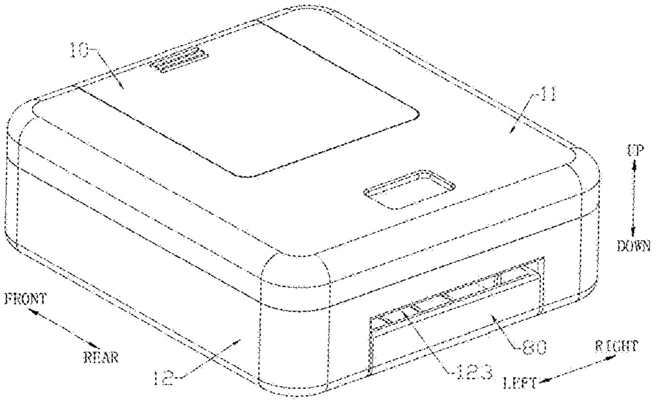
FIG. 18 and FIG. 19 are perspective views of a first embodiment of a paper cassette in a portable inkjet photo printer according to the present disclosure.
Figure 19:
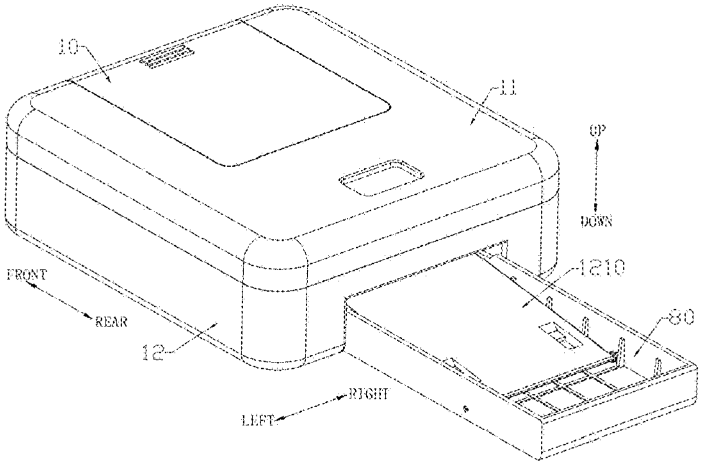

As shown in FIG. 18 and FIG. 19, in this embodiment, the paper cassette 80 is movable relative to the housing assembly of the printer. Preferably, an opening 123 is disposed on the second housing 12 of the housing assembly. The paper cassette 80 is configured to move in the front-rear direction relative to the housing assembly from the opening 123. In this embodiment, the opening 123 is disposed on the rear side of the second housing 12. The paper cassette 80 is configured in a drawer shape, opened backward and closed forward. The paper pressing mechanism is disposed in the paper cassette 80 and can move together with the paper cassette 80 in the front-rear direction.

During use, the user pulls and opens the paper cassette 80 backward to directly put supplementary or replacement printing media into the paper cassette 80, and pushes the paper cassette 80 forward to close it. This makes the operation of replenishing or replacing the printing medium simpler and more convenient.

In some embodiments, the opening 123 is disposed on the left side or right side of the second housing 12.

In some embodiments, the opening direction and closing direction of the paper cassette 80 may also be perpendicular or inclined to the front-rear direction. In other words, the opening direction and closing direction of the paper cassette 80 are not parallel to the front-rear direction.

This embodiment sets the paper cassette 80 in the form of a drawer. During the use of the printer, it is convenient for the user to open the paper cassette 80, thereby facilitating the addition or replacement of printing media.

Paper Cassette Embodiment 2

Figure 20:
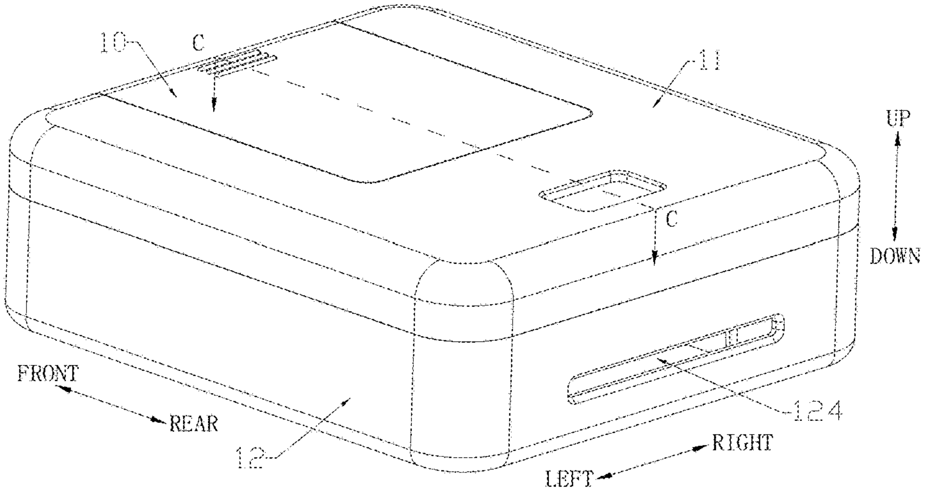
FIG. 20 is a perspective view of a second embodiment of a paper cassette in a portable inkjet photo printer according to the present disclosure.
Figure 21:
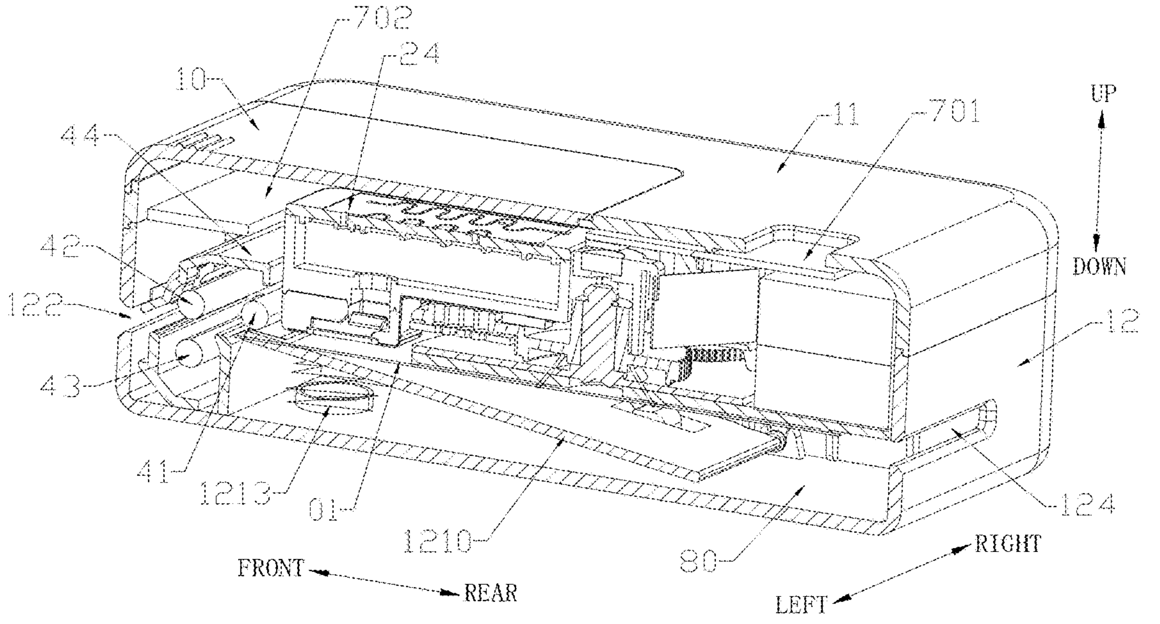
FIG. 21 is a schematic view of the second embodiment of the paper cassette in a portable inkjet photo printer according to the present disclosure, taken along line C-C in FIG. 20.

As shown in FIG. 20 and FIG. 21, different from Paper Cassette Embodiment 1, the paper cassette 80 in this embodiment is immovable relative to the housing assembly. Specifically, in this embodiment, a paper inlet 124 is disposed on the second housing 12. The paper inlet 124 is configured to allow the printing medium 01 to be put into the paper cassette 80. Preferably, the paper inlet 124 is disposed on the rear side of the second housing 12. During use, the user can put the printing medium 01 directly into the paper cassette 80 from the paper inlet 124, making the operation process simpler and more convenient.

In some embodiments, the paper inlet 124 may also be disposed on one of the left side, right side, and upper side of the housing 12.

In some embodiments, the paper inlet 124 may also be disposed at one of the junction of the left side and the upper side, the junction of the rear side and the upper side, and the junction of the right side and the upper side of the housing 12.

In this embodiment, the paper cassette 80 is immovable relative to the housing assembly, which can reduce the number of parts, thereby reducing costs. It can also simplify the assembly process of the paper pressing mechanism. In addition, the paper inlet 124 is disposed on the second housing 12, which can make the printer more beautiful and more convenient to carry. The sealing of the paper cassette 80 is better. In addition, the size of some structures of the paper cassette 80 may be shortened, which is conducive to reducing the overall size of the printer, thereby realizing the miniaturized design of the printer.

Paper Cassette Embodiment 3

Figure 22A:
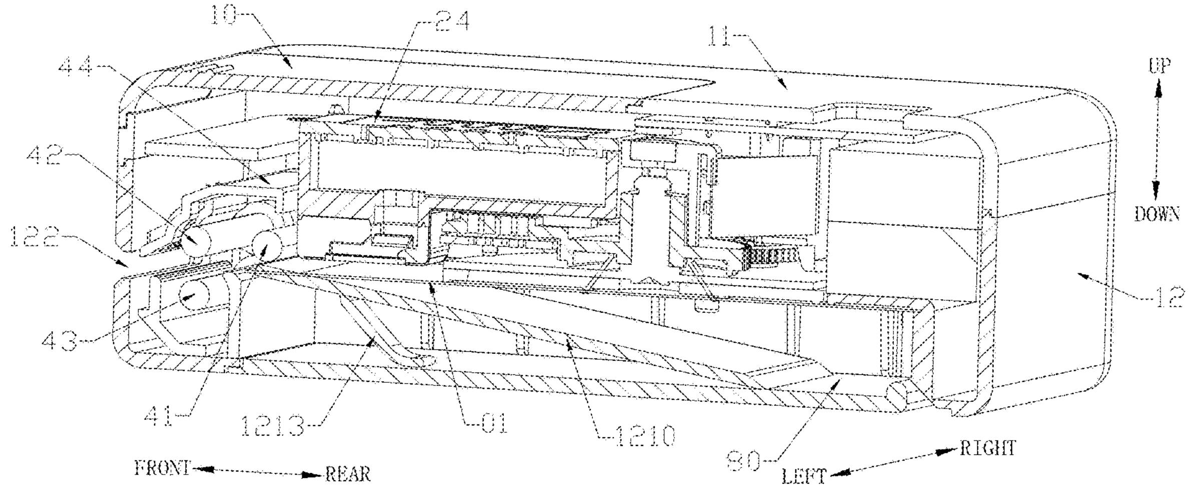
FIG. 22A and FIG. 22B are schematic views of a third embodiment of a paper cassette in a portable inkjet photo printer according to the present disclosure, taken along line C-C in FIG. 20.
Figure 22B:
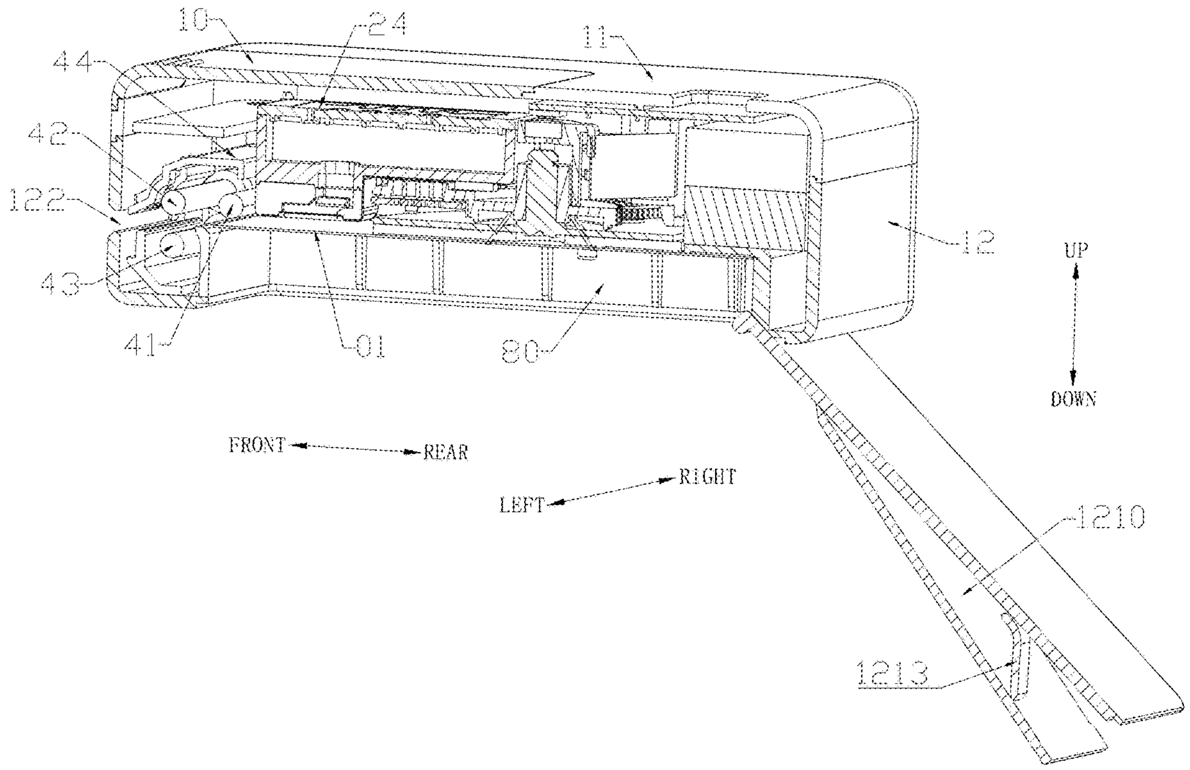

As shown in FIG. 22A and FIG. 22B, in this embodiment, the second elastic member 1213 and the support member 1210 are integrally formed. Specifically, the second elastic member 1213 is a cantilever extending from the side of the support member 1210 facing the paper cassette cover plate toward the direction close to the paper cassette cover plate. The cantilever 1213 has elasticity. Further, the paper cassette cover plate can open downward and close upward. The paper pressing mechanism is formed integrally or separately with the paper cassette cover plate. The paper pressing mechanism can move together with the paper cassette cover plate.

In some embodiments, the second elastic member 1213 may also be integrally formed with the paper cassette cover plate.

In this embodiment, the second elastic member 1213 and the support member 1210 are integrally formed. On the one hand, the number of parts may be reduced, thereby reducing costs. On the other hand, the assembly process of the paper pressing mechanism may be simplified.

In some embodiments, as shown in FIG. 22A and FIG. 22B, when the printing mechanism 20 is located at a predetermined position described later, along the up-down direction, the cover member 10 and/or the operating opening 110, the printing mechanism 20, and the paper pressing mechanism/paper cassette 80 at least partially overlap. With such a configuration, when the printing mechanism 20 needs to be installed or replaced, or when checking whether there is a printing medium in the paper cassette, the cover member 10 can be opened to observe and perform operations through the operating opening 110, which is convenient to use.

In some embodiments, as shown in FIG. 15, FIG. 21, FIG. 76A, along the up-down direction, a rotation center of the printing mechanism for movement along the arcuate trajectory overlaps with the paper cassette 80.

Paper Cassette Embodiment 4

Figure 23:
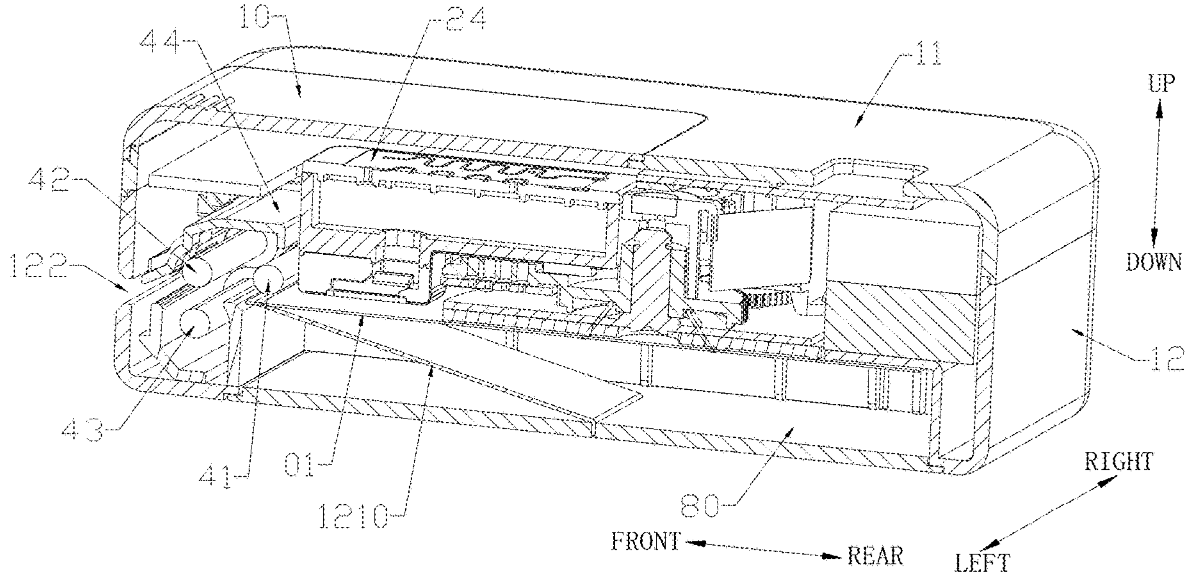
FIG. 23 is a schematic view of a fourth embodiment of a paper cassette in a portable inkjet photo printer according to the present disclosure, taken along line C-C in FIG. 20.

As shown in FIG. 23, different from Paper Cassette Embodiment 3, in this embodiment, the second elastic member 1213 is omitted. The support member 1210 is configured to have elasticity itself. Further, the support member 1210 is directly snapped with the paper cassette cover plate. Still further, the second end of the support member 1210 is snapped with the paper cassette cover plate.

In some embodiments, the support member 1210 may be a metal elastic piece or other elastic material (such as a plastic plate with elasticity).

In this embodiment, the support member 1210 itself has elasticity, so there is no need to separately provide other components with elasticity. On the one hand, the number of parts may be reduced, thereby reducing costs. On the other hand, the assembly process of the paper pressing mechanism may be simplified.

Paper Cassette Embodiment 5

Different from the above paper cassette embodiments, in this embodiment, the paper cassette 80 is detachably disposed relative to the housing assembly. Along the front-rear direction, at least a part of the paper cassette 80 is located behind the printer housing assembly. Along the up-down direction, at least a part of the printer housing assembly is located above the paper cassette 80. Details are as follows.

In some embodiments, along the front-rear direction, at least a part of the paper cassette 80 is located behind the housing assembly.

Figure 129D:
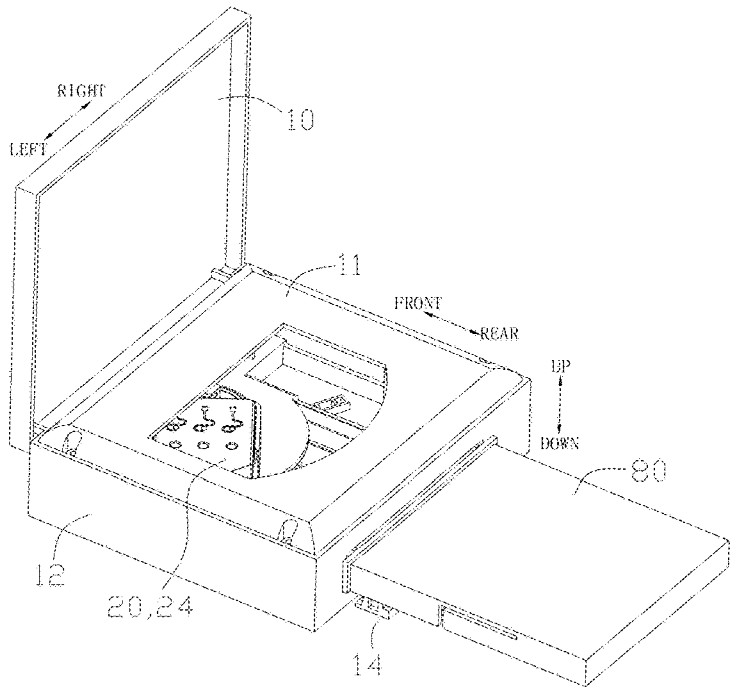
Figure 129E:
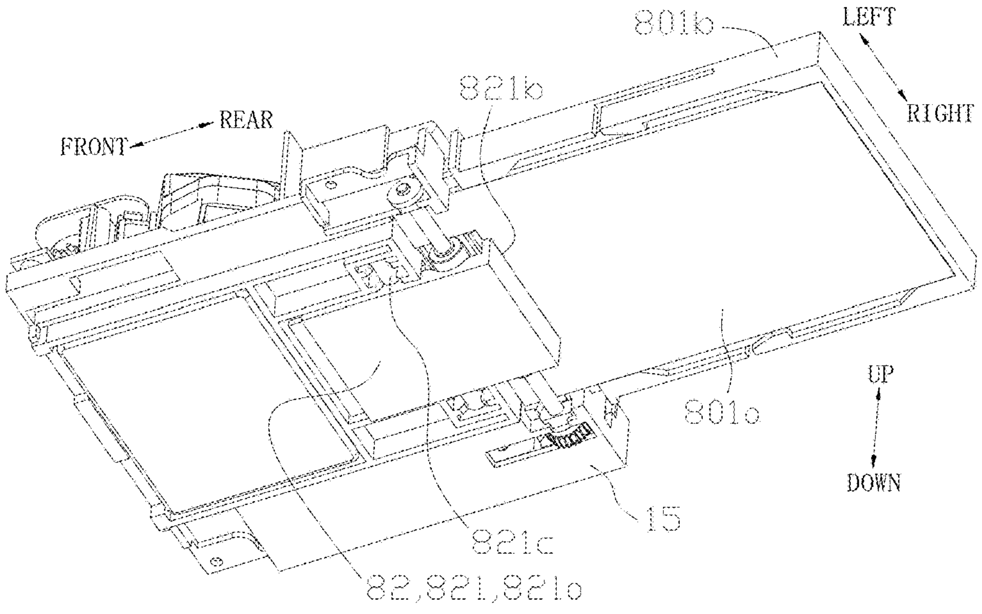

In some embodiments, as shown in FIG. 129E and FIG. 131, a quick-release structure 82 is disposed between the paper cassette 80 and the housing assembly. The quick-release structure 82 may be a magnetic connection, or a snap connection, etc. In this way, the printer can print different sizes/types of printing media by changing different paper cassettes, thereby enhancing the practicality of the printer. Specifically, as shown in FIG. 129A and FIG. 129B, the housing assembly is movably connected with the paper cassette cover plate 14. The paper cassette cover plate 14 can move between a cover closed state (as shown in FIG. 129A) and a cover open state (as shown in FIG. 129B). During use, the user needs to first move the paper cassette cover plate 14 from the cover closed state to the cover open state, and fix the paper cassette 80 to the housing assembly using the quick-release structure 82. For example, the paper cassette cover plate 14 can move between the cover closed state and the cover open state by sliding, rotating, etc. More specifically, as shown in FIG. 132, a paper cassette guide mechanism 802 is also disposed between the paper cassette 80 and the housing assembly.

In some embodiments, as shown in FIG. 129B, FIG. 130, FIG. 131, and FIG. 132, the printer is further provided with a paper pressing roller 4751 and a first paper discharge roller 48. Along the up-down direction, at least a part of the paper pressing roller 4751 is located above the first paper discharge roller 48. Along the front-rear direction, the first paper discharge roller 48 and the paper pressing roller 4751 are located at positions close to the paper inlet 124. Or in other words, along the front-rear direction, the first paper discharge roller 48 and the paper pressing roller 4751 are located at the rear side of the printing area to make the structure compact.

As one implementation, as shown in FIG. 129B, FIG. 130, and FIG. 131, the paper pressing roller 4751 is rotatably disposed relative to the housing assembly. Specifically, the printer is further provided with a second elastic component 4752. The second elastic component 4752 is configured to apply downward pressure to the paper pressing roller 4751. For example, the second elastic component 4752 may be configured as a torsion spring. Further, the paper pressing roller 4751 includes a paper pressing portion 4751*a* having a paper pressing surface 4751*a*1. The paper pressing portion 4751*a*/paper pressing surface 4751*a*1 is configured to press down the printing medium. As the printing medium is gradually consumed, under the action of the downward force applied by the second elastic component 4752, the paper pressing roller 4751 gradually rotates downward so that the paper pressing surface 4751*a*1/paper pressing portion 4751*a* can always press the printing medium tightly. This can prevent multiple sheets of printing medium from entering the printing area simultaneously and causing paper jams, thereby improving the product quality of the printer and the user's experience.

As one implementation, as shown in FIG. 129E and FIG. 131, the quick-release structure 82 is movably disposed on the housing assembly. The quick-release structure 82 includes a pushing member 821 and a first elastic component 822. The pushing member 821 is rotatably disposed relative to the housing assembly to lock and unlock the paper cassette 80. The first elastic component 822 is configured to abut against the pushing member 821 to keep the pushing member 821 in a closed state. Further, the pushing member 821 includes a pushing portion 821*a*, a fourth coupling portion 821*b*, and a rotating portion 821*c*. Specifically, the pushing portion 821*a* and the fourth coupling portion 821*b* are integrally or separately formed. Along the front-rear direction, the pushing portion 821*a* and the fourth coupling portion 821*b* are respectively located on both sides of the rotating portion 821*c*. For example, along the front-rear direction, the pushing portion 821*a* is located on the front side of the rotating portion 821*c*, and the fourth coupling portion 821*b* is located on the rear side of the rotating portion 821*c*. The rotating portion 821*c* is rotatably connected to the housing assembly. The rotating portion 821*c* may be configured as a shaft or a slot/hole. The pushing portion 821*a* is configured to abut against the first elastic component 822. The fourth coupling portion 821*b* is configured to combine with the paper cassette 80. When installing the paper cassette 80, after opening the paper cassette cover plate 14, press the pushing portion 821*a* upward to drive the fourth coupling portion 821*b* to rotate downward to the open state. After installing the paper cassette 80 forward from the paper inlet 124 into position, release the pushing portion 821*a*. Under the elastic action of the first elastic component 822, the pushing portion 821*a* resets downward, thereby driving the fourth coupling portion 821*b* to move upward to combine with the paper cassette 80, thereby locking the paper cassette 80. By setting the quick-release structure 82, the user can quickly change different types/sizes of printing media to meet different printing needs.

In some embodiments, the pushing member 821 further includes a thirteenth limiting portion 821*d*. The thirteenth limiting portion 821*d* is located between the rotating portion 821*c* and the fourth coupling portion 821*b*. As shown in FIG. 129E and FIG. 131, under the action of the first elastic component 822, the pushing portion 821*a* rotates downward around the rotating portion 821*c* and drives the thirteenth limiting portion 821*d* and the fourth coupling portion 821*b* to rotate upward, until the thirteenth limiting portion 821*d* abuts against a thirteenth limited portion 1512 disposed in the printer, the thirteenth limiting portion 821*d* and the fourth coupling portion 821*b* stop rotating, thereby limiting the rotation range of the fourth coupling portion 821*b*. In some embodiments, the thirteenth limited portion 1512 may be disposed on the base 15.

As one implementation, as shown in FIG. 132, the paper cassette guide mechanism 802 is configured to guide the paper cassette 80. Specifically, along the front-rear direction, the paper cassette guide mechanism 802 is disposed at the front end of the paper cassette 80 and includes a paper cassette guide member 8021 having a first paper cassette guide surface 8021*a* and a second paper cassette guide surface 8021*b*. The paper cassette guide member 8021 is configured to interact with the paper pressing roller 4751 and cause the paper pressing roller 4751 to rotate against the action of the second elastic component 4752. Further, along the front-rear direction, the first paper cassette guide surface 8021*a* and the second paper cassette guide surface 8021*b* are connected in sequence from front to rear. The first paper cassette guide surface 8021*a* is set as an inclined surface, and its inclination direction is such that, along the up-down direction, the first front end portion 8021*a*1 of the first paper cassette guide surface 8021*a* is located below the first rear end portion 8021*a*2 of the first paper cassette guide surface 8021*a*. In other words, along the up-down direction, the second paper cassette guide surface 8021*b* is located at the topmost position. The paper pressing roller 4751 is further provided with a guided member 4751*a*. When installing the paper cassette 80, the first paper cassette guide surface 8021*a* is configured to abut against the guided member 4751*a*. As the paper cassette guide surface 8021*a* is driven by the paper cassette 80 to continue moving forward, the paper pressing roller 4751/guided member 4751*a* rotates upward along the first paper cassette guide surface 8021*a* against the action of the second elastic component 4752 and reaches the second paper cassette guide surface 8021*b*, so that the paper cassette 80 can be installed smoothly. After installation is in place, the pushing member 821 combines with the paper cassette 80 and locks the paper cassette 80.

In some embodiments, the paper cassette guide mechanism 802 is also provided with a physical identification function. The physical identification function is similar to the function of the medium type sensor described later. The difference is that the physical identification function is realized through a physical structure, so that the paper cassette 80 adapts to a specific model of printer. For example, the printer is provided with an identification structure corresponding to the paper cassette guide mechanism 802. Specifically, the fit between the paper cassette guide mechanism 802 and the identification structure may be a fit of grooves and protrusions, or may be a fit of holes and shafts, or may be a fit of keys and keyways, etc. With such a configuration, the user may be prompted to install the correct printing medium/paper cassette 80 to avoid the paper cassette/printing medium that does not match the printer being wrongly installed into the printer. It can also improve the efficiency of installing the printing medium/paper cassette 80, thereby improving the user experience. Further, the number of grooves/protrusions, holes/shafts, keyways/keys is one or more.

In some embodiments, as shown in FIG. 131, the paper cassette 80 includes a paper cassette bottom shell 801*a* and a paper cassette covering member 801*b*. A space for containing the printing medium is formed between the paper cassette bottom shell 801*a* and the paper cassette covering member 801*b* and opens toward one side. When the paper cassette 80 is installed to the housing assembly, at least a part of the opening is located within the housing assembly. Specifically, the paper cassette bottom shell 801*a* and the paper cassette covering member 801*b* are detachably connected. The paper cassette covering member 801*b* is movably connected to the paper cassette bottom shell 801*a*. For example, the paper cassette covering member 801*b* may be connected to the paper cassette bottom shell 801*a* by sliding, rotating, snap-fitting, etc.

In some embodiments, as shown in FIG. 131, a paper pressing member (first paper pressing member) 1214 and a second paper pressing member 12142 are disposed inside the paper cassette 80. The first paper pressing member 1214 and the second paper pressing member 12142 are configured to press the printing medium to prevent the printing medium from being unable to be transported along the paper feeding direction due to partial bending. Specifically, along the front-rear direction, the first paper pressing member 1214 is located behind the second paper pressing member 12142. The first paper pressing member 1214 is configured to abut against the rear side of the printing medium. The second paper pressing member 12142 is configured to abut against the front side of the printing medium. More specifically, the first paper pressing member 1214 is configured as an elastic member, such as a spring piece. The second paper pressing member 12142 is also configured as an elastic member, such as a torsion spring. As one implementation, the first paper pressing member 1214 is disposed on the paper cassette covering member 801*b*, and the second paper pressing member 12142 is disposed on the paper cassette bottom shell 801*a*.

Further, the paper cassette 80 and the housing assembly may also be provided with a medium type sensor/identification mechanism described later for identifying different sizes/types of printing media. In addition, the identification mechanism can also identify contents such as: identifying whether the printing medium/paper cassette 80 is installed in place, identifying the authenticity of the printing medium/paper cassette 80, and detecting and changing the printable remaining amount of the printing medium. As one implementation, the identification mechanism includes an identification portion disposed on the printer/housing assembly, and an identified portion disposed on the paper cassette 80 (e.g., an electronic identification device, the electronic identification device may be in the form of a chip/RFID/QR code/conductive identification/optical coupling reflection, etc.). Specifically, taking the electronic identification device being a chip as an example, the content identified by the identification mechanism is described. When the electronic identification device is set as a chip, the identification mechanism can perform the following identifications: 1. Machine installation identification between the printer and the printing medium, judging whether the paper cassette 80 is installed in the correct position by determining whether the electrical connection between the printer and the chip is correct; 2. Anti-counterfeiting identification; 3. Type identification of the printing medium, for example, identifying the type, size, and printing medium capacity of the printing medium; 4. Detecting and changing the printable remaining amount of the printing medium, for example, if the printing medium capacity is 10 sheets of photo paper, after printing 1 sheet of photo paper, the printer will update the printable remaining amount data stored in the chip. At this time, even if the paper cassette is taken out, when printing next time, the paper cassette is electrically connected to the printer again, and the printer can identify that the printable remaining amount of the paper cassette is 9 sheets.

Further, when the electronic identification device is set in the form of a chip, contact pins are disposed on the printer, and a chip is disposed on the paper cassette 80. When the electronic identification device is set in the form of RFID as described below, the printer is provided with an antenna and a reader, and the paper cassette 80 is provided with an electronic tag. When the electronic identification device is set in the form of a QR code, the printer is provided with a device reading portion, and the paper cassette 80 is provided with a recognized portion recording identification information (QR code). When the paper cassette 80 is installed to the printer, the recognized portion is located at a position where the device reading portion can optically read it. When the electronic identification device is set in the form of conductive identification, two conductors are disposed on the printer, and the two conductors are in an open circuit state. Another conductor is disposed on the paper cassette 80. After the paper cassette 80 is installed in place, the two conductors in the printer are conductive, configured to identify that the paper cassette 80 is installed in place. It should be noted that when set in the form of conductive identification, anti-counterfeiting identification cannot be performed. When the electronic identification device is set in the form of optical coupling reflection, the printer is provided with an optical coupling sensor, and specific patterns are provided on the paper cassette 80/printing medium, such as black, white, and black blocks arranged in sequence within the detectable range. The light reflected by different color blocks is different, so the signals obtained by the optical coupling sensor are different, thereby realizing the identification function. Through the setting of the identification mechanism, after the paper cassette 80 is installed, the printer can automatically adjust to the printing mode of the corresponding type/size, without manual calibration, so it is convenient to use, and the user's experience is improved.

Figure 110:
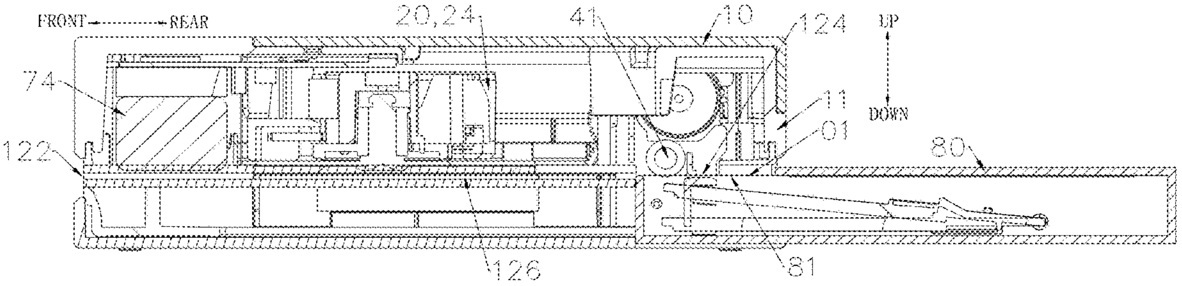

As shown in FIG. 110, the paper cassette 80 is provided with a paper discharge portion 81. The paper discharge portion 81 is disposed opposite to the paper inlet 124. The printing medium can enter the paper inlet 124 from the paper discharge portion 81 and move toward the paper outlet 122 along the paper feeding direction. Further, along the front-rear direction, the paper outlet 122 is close to the front end of the printer, and the paper inlet 124/paper discharge portion 81 is close to the rear end of the printer.

In some embodiments, as shown in FIG. 110, the paper inlet 124 faces downward, and the paper discharge portion 81 faces upward. The paper discharge portion 81 and the paper inlet 124 are opposite in the up-down direction.

In some embodiments, the paper inlet 124 and the paper discharge portion 81 may be set to butt horizontally, in other words, the paper inlet 124 and the paper discharge portion 81 are opposite in the front-rear direction.

In some embodiments, the paper inlet 124 and the paper discharge portion 81 may also be set to be opposite in a direction intersecting the front-rear direction/up-down direction. For example, the paper inlet 124 faces obliquely downward, and the paper discharge portion 81 faces obliquely upward.

Figure 109:
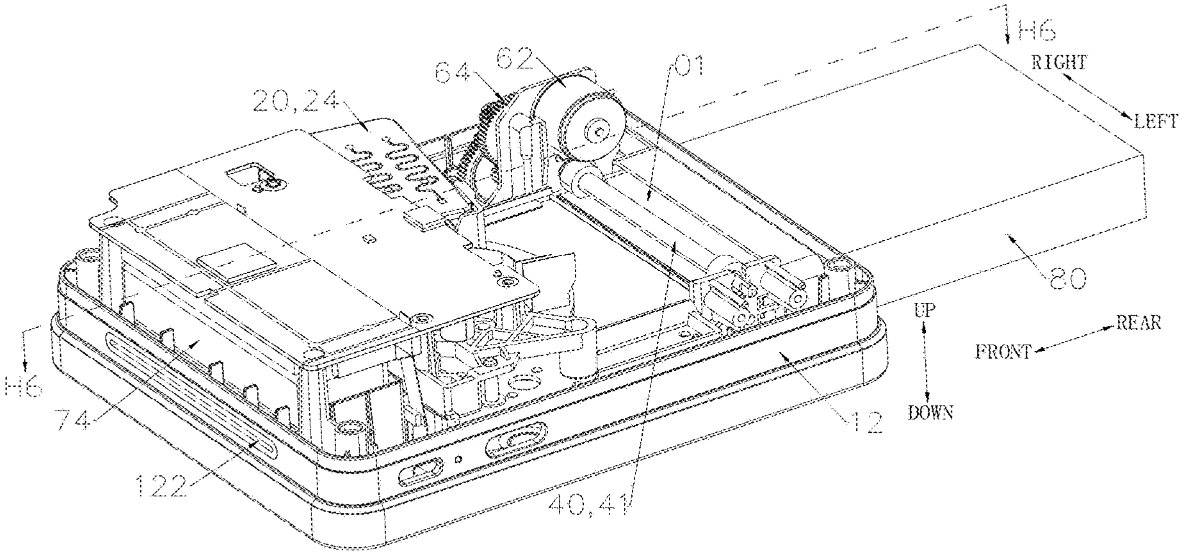

As shown in FIG. 109 and FIG. 110, the paper feeding mechanism 40 is disposed on the rear side inside the printer. In other words, along the front-rear direction, the paper feeding mechanism 40 is located on a side far from the paper outlet 122. Or in other words, along the front-rear direction, the paper feeding mechanism 40 is located on a side close to the paper inlet 124 and connected to the driving assembly. Understandably, the driving assembly is also disposed on the rear side inside the printer. The power supply module 74 is disposed on the front side inside the printer. In other words, along the front-rear direction, the power supply module 74 is located on a side close to the paper outlet 122.

As in some embodiments, along the front-rear direction, the printing area is located on a side far from the paper outlet 122. Or in other words, along the front-rear direction, the printing area is located on a side close to the paper inlet 124.

As shown in FIG. 109 and FIG. 110, the paper feeding mechanism 40 at least includes a first rubber roller 41. The first rubber roller 41 is configured to transport the printing medium along the paper feeding direction. Under the action of the first rubber roller 41, the printing medium enters the paper feeding channel inside the printer sequentially through the paper discharge portion 81, the paper inlet 124, and the printing area from the paper cassette 80, and moves along the paper feeding direction to the paper outlet 122.

In some embodiments, a paper discharge roller/pickup roller is also disposed in the paper cassette 80. After the paper cassette 80 is connected to the housing assembly, the paper discharge roller/pickup roller is transmission-connected to the printer, and then outputs the printing medium in the paper cassette 80.

Obviously, the above embodiments are merely examples for clarity of description, and are not intended to limit the embodiments. For those of ordinary skill in the art, other changes or variations in different forms may be made based on the above description. It is not necessary and impossible to exhaust all embodiments here, and the obvious changes or variations derived therefrom are still within the protection scope of the present disclosure.

[Paper Feeding Mechanism]

As shown in FIG. 3, FIG. 4, and FIG. 6, in this embodiment, the paper feeding mechanism 40 is disposed on the front side inside the printer. In other words, in the front-rear direction, the paper feeding mechanism 40 is located on a side close to the paper outlet 122 and connected to the driving assembly. In other words, in the front-rear direction, the paper feeding mechanism 40 is located in front of the printing mechanism/printing area.

The paper feeding mechanism 40 includes a transmission roller group having multiple rubber rollers (paper discharge rollers 49*a*). Specifically, the transmission roller group includes a first rubber roller 41, a second rubber roller 42, and a third rubber roller 43. The second rubber roller 42 and the third rubber roller 43 abut against each other. The first rubber roller 41 is configured to abut against the support member 1210 and press and transport the printing medium to between the second rubber roller 42 and the third rubber roller 43. The second rubber roller 42 and the third rubber roller 43 continue to transport the printing medium. Along the paper feeding direction, the second rubber roller 42 and the third rubber roller 43 are located downstream of the first rubber roller 41. In other words, in the front-rear direction, the second rubber roller 42 and the third rubber roller 43 are closer to the paper outlet 122 than the first rubber roller 41. In the front-rear direction, the first rubber roller 41 is closer to the printing carriage 21 than the second rubber roller 42 and the third rubber roller 43.

Further, the left and right ends of the first rubber roller 41, the second rubber roller 42, and the third rubber roller 43 are respectively nested with shaft sleeves 411. The first rubber roller 41 abuts against the support member 1210 through the shaft sleeve 411 (an example of the pickup roller 49). The second rubber roller 42 and the third rubber roller 43 abut against each other through the shaft sleeve 411. Still further, the material of the shaft sleeve 411 may be rubber, plastic, or other materials with elasticity, so as to facilitate pressing the printing medium without damaging the printing medium. In the front-rear direction, the first end of the support member 1210 (in the front-rear direction, the end close to the paper outlet 122) abuts against the shaft sleeves 411 at the left and right ends of the first rubber roller 41. The second end of the support member 1210 (in the front-rear direction, the end far from the paper outlet 122) is connected to the paper cassette cover plate (e.g., hinged). Under the elastic force of the second elastic member 1213, the support member 1210 rotates relative to the paper cassette cover plate, so that the first end of the support member 1210 is pushed toward the first rubber roller 41 and abuts against the shaft sleeves 411 at the left and right ends of the first rubber roller 41. Therefore, the printing medium can be clamped between the shaft sleeve 411 and the support member 1210.

The paper feeding mechanism 40 further includes a frame 44 and side plates 45. In the left-right direction, the side plates 45 are disposed on both sides of the frame 44. The transmission roller group is disposed in the frame 44. A second motor 62 and a second intermediate transmission assembly 64 are disposed at the side plate 45. When the second motor 62 starts, the second intermediate transmission assembly 64 transmits the driving force to the transmission roller group. When the first rubber roller 41 (an example of the first paper discharge roller) rotates, the friction between the shaft sleeves 411 at its left and right ends and the support member 1210 transmits the printing medium to between the second rubber roller 42 and the third rubber roller 43. Then, the printing medium is clamped by the second rubber roller 42 and the third rubber roller 43. Under the drive of the second motor 62, the printing medium is transported toward the paper outlet 122, and finally the paper feeding process is completed.

Modification of Frame 44

Figure 152A:
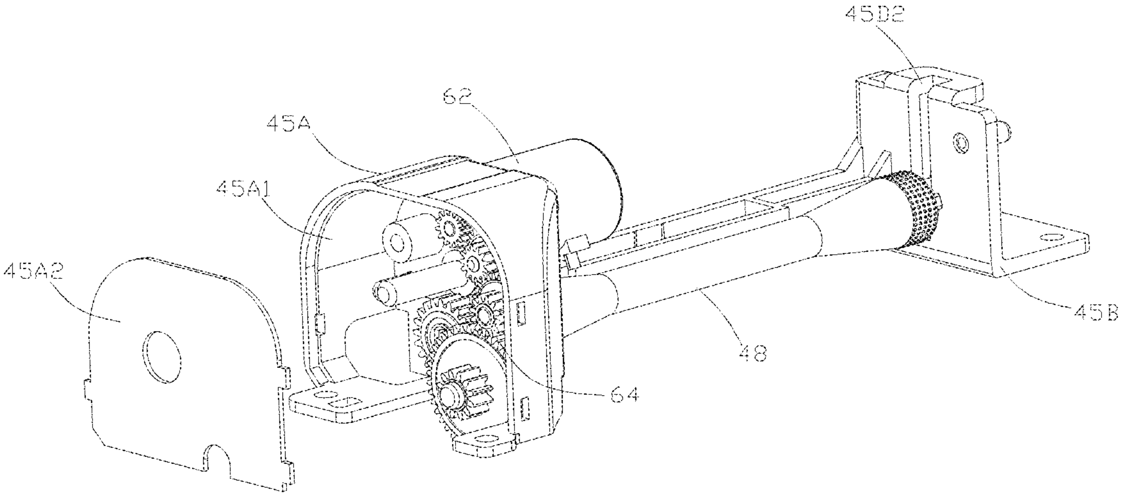
Figure 152B:
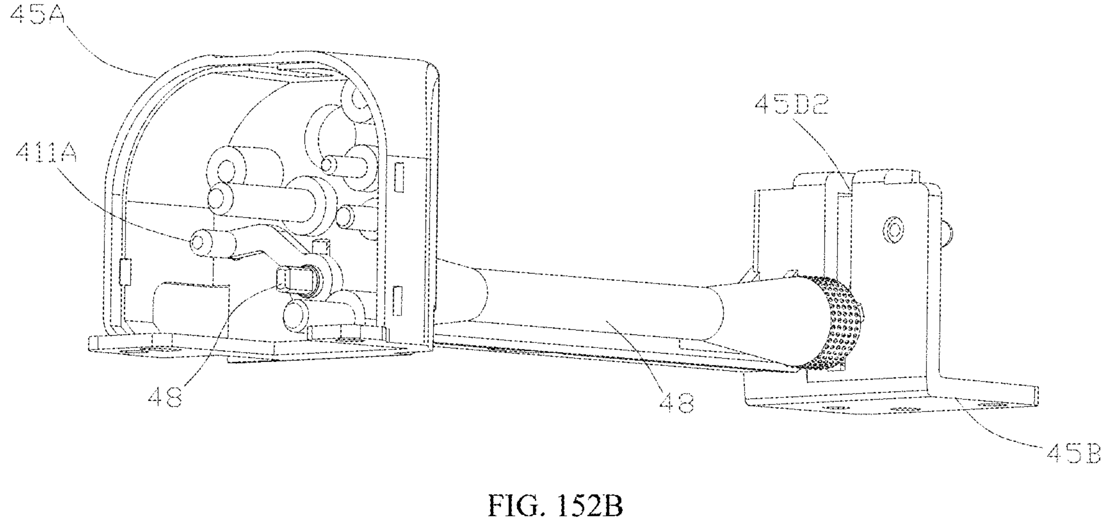
Figure 152C:
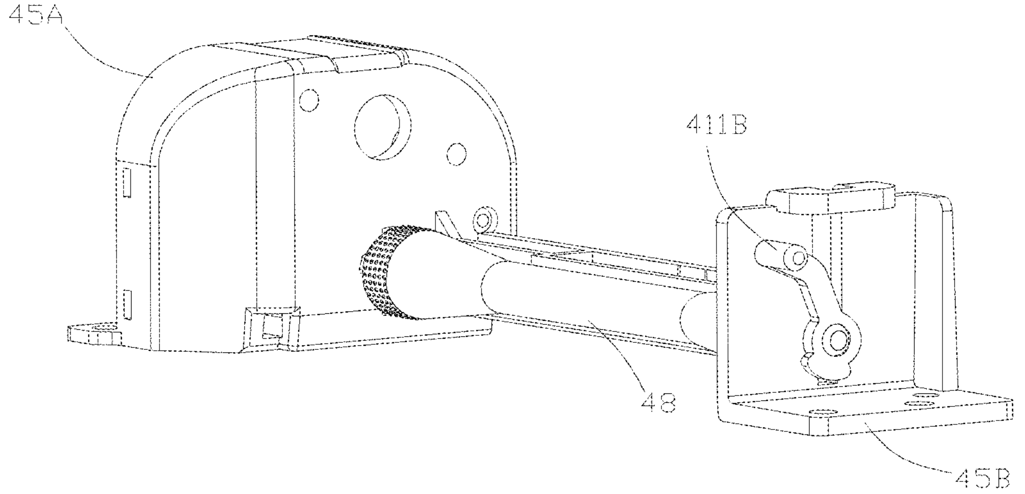
Figure 152D:
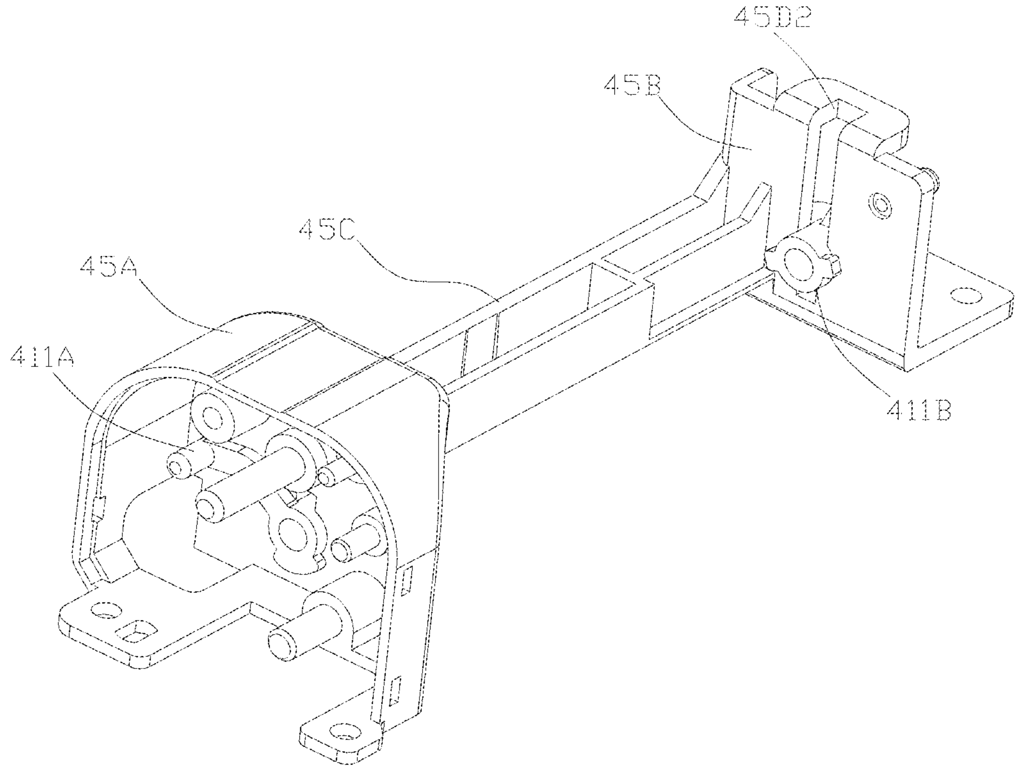

In some embodiments, as shown in FIG. 151 to FIG. 152D, the frame 44 includes a first support portion 45A (an example of the side plate 45) and a second support portion 45B (an example of the side plate 45) disposed opposite to each other at an interval along the left-right direction. The first support portion 45A is located on a side close to the second motor 62, and the second support portion 45B is located on a side far from the second motor 62. The first paper discharge roller 48 is disposed between the first support portion 45A and the second support portion 45B. The second intermediate transmission assembly 64 is installed on a side of the first support portion 45A far from the second support portion 45B. The second motor 62 is disposed on a side of the first support portion 45A close to the second support portion 45B. When the second motor drives, the driving force is transmitted to the first paper discharge roller 48 through the second intermediate transmission assembly, causing the first paper discharge roller 48 to rotate to drive and transport the printing medium toward the paper outlet 122. Specifically, along the up-down direction, the first paper discharge roller 48 is located below the second motor 62, or in other words, along the up-down direction, the first paper discharge roller 48 and the second motor 62 at least partially overlap.

Specifically, the first support portion 45A is provided with a gear cavity and a gear cover plate. The gear cavity is surrounded and formed by a protrusion extending from the first support portion 45A toward a direction away from the second support portion 45B. The gear cover plate is used to cover the gear cavity. The second intermediate transmission assembly 64 is located inside the gear cavity. With such a configuration, the gear cavity and the gear cover plate can provide protection for the second intermediate transmission assembly 64 and prevent external interference.

Specifically, a support connection portion 45C is further provided between the first support portion 45A and the second support portion 45B. More specifically, the support connection portion 45C is provided with a recess 45C1 recessed from bottom to top. The recess 45C1 and the printing support mechanism 30 together form the paper outlet 122. With such a configuration, the installation method of the frame is simplified, and the molding difficulty of the paper outlet is reduced.

Specifically, one of the first support portion 45A and the second support portion 45B is provided with a first roller slot 45D1, and the other one of the first support portion 45A and the second support portion 45B is provided with a second roller slot 45D2. The first roller slot 45D1 is configured as a slot penetrating in the left-right direction, and the second roller slot 45D2 is configured as a slot penetrating in the left-right direction and opening upward. In this embodiment, the first roller slot 45D1 is disposed on the first support portion 45A, and the second roller slot 45D2 is disposed on the second support portion 45B. With such a configuration, when installing the first paper discharge roller 48 to the frame, one end of the first paper discharge roller 48 can be inserted into the first roller slot 45D1 first, and then the other end of the first paper discharge roller 48 enters the second roller slot 45D2 along the upward opening of the second roller slot 45D2, until the first paper discharge roller 48 is placed substantially horizontally.

Further, the shaft sleeve includes a first shaft sleeve 411A and a second shaft sleeve 411B. The first shaft sleeve 411A is disposed in the first roller slot 45D1, and the second shaft sleeve 411B is disposed in the second roller slot 45D2. The two ends of the first paper discharge roller are respectively rotatably disposed in the first shaft sleeve 411A and the second shaft sleeve 411B. The first shaft sleeve 411A and the second shaft sleeve 411B are respectively used to install the first paper discharge roller 48 in the frame 44.

In other embodiments, the second motor 62 may also be cancelled, and the paper feeding mechanism 40 is driven directly by the first motor.

Preferably, observed from the up-down direction, a third elastic member 46 is disposed between the third rubber roller 43 and the frame 44. Further, the third elastic member 46 is located between the rotating shaft 431 of the third rubber roller 43 and the frame 44. Under the elastic action of the third elastic member 46, the fit between the third rubber roller 43 and the second rubber roller 42 becomes tighter, thereby improving transmission efficiency. Preferably, the number of third elastic members 46 is two.

In some embodiments, as shown in FIG. 67-FIG. 76A and FIG. 76B, the paper feeding mechanism 40 at least includes a first rubber roller 41, and eliminates the frame 44. As shown in FIG. 73 and FIG. 74, the paper feeding mechanism 40 further includes a paper discharge guide portion 47. Specifically, the paper discharge guide portion 47 is disposed on the base 15 and is integrally/separately formed with the base. Along the paper feeding direction, the paper discharge guide portion 47 is located at one end close to the paper outlet 122. Further, the paper discharge guide portion 47 includes a guide port 471. The guide port 471/paper discharge guide portion 47 is configured to guide the printing medium to be transported toward the paper outlet 122. Preferably, the number of paper discharge guide portions 47 is two, spaced apart in the left-right direction. In the left-right direction, the distance between the two guide portions 47 is slightly larger than the width of the printing medium, so that the printing medium is more stable when exported.

Figure 108:
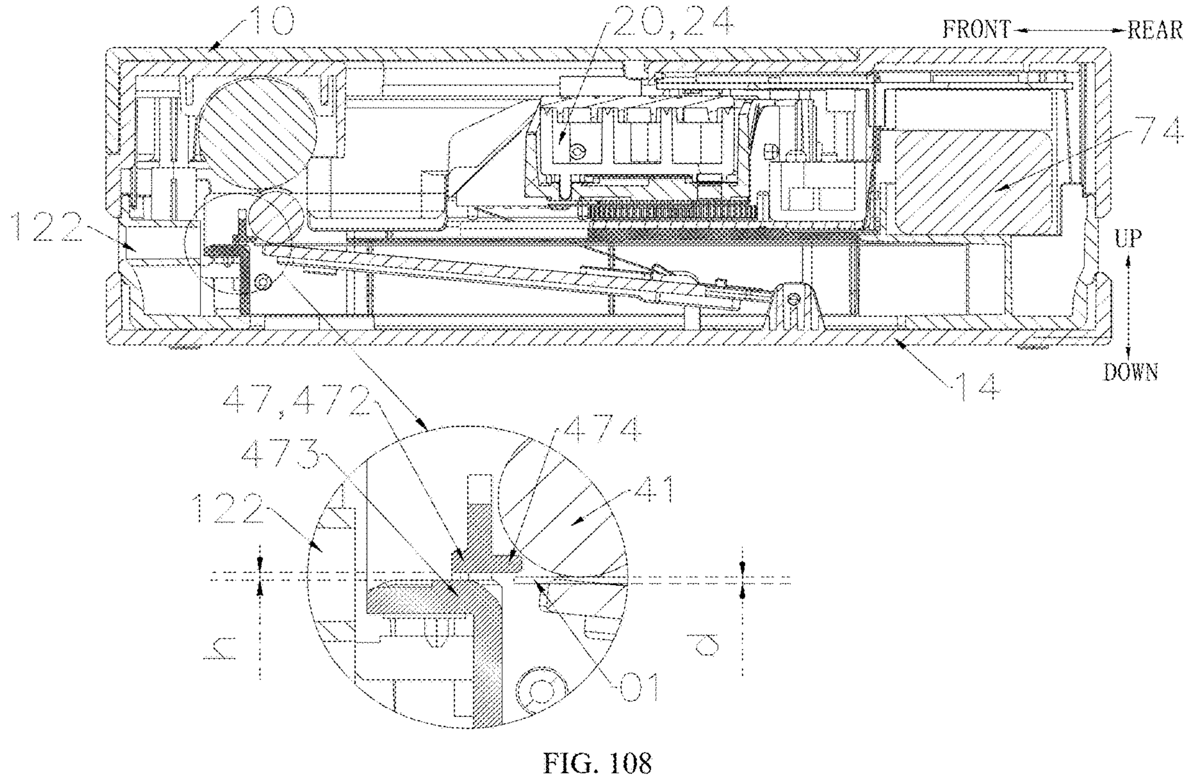

In some embodiments, as shown in FIG. 108, the paper discharge guide portion 47 includes a first guide portion 472 and a second guide portion 473. The first guide portion 472 and the second guide portion 473 are spaced apart along a direction intersecting with the paper feeding direction. Specifically, there is a first gap between the first guide portion 472 and the second guide portion 473. The first gap is configured to allow the printing medium 01 to pass through to guide the printing medium 01 to be transported smoothly toward the paper outlet 122. The first gap has a first interval distance h. Preferably, the first guide portion 472 and the second guide portion 473 are spaced apart in the up-down direction. Further, a single sheet of printing medium 01 has a first thickness d. The first interval distance h and the first thickness d satisfy: $2d>h>d$. In other words, along the paper feeding direction, only one sheet of printing medium 01 is allowed to pass through the first gap between the first guide portion 472 and the second guide portion 473 at a time. This can prevent multiple sheets of printing medium 01 from adhering and entering the first gap at the same time, thereby avoiding paper jams at the paper outlet 122.

In some embodiments, along the up-down direction, the first guide portion 472 may be disposed above the second guide portion 473, or may be disposed below the second guide portion 473. As long as a first gap can be formed between the first guide portion 472 and the second guide portion 473. FIG. 108 shows the situation where the first guide portion 472 is disposed above the second guide portion 473.

In some embodiments, the paper discharge guide portion 47 further includes a third guide portion 474. Along the paper feeding direction, the third guide portion 474 is located upstream of the first guide portion 472 and the second guide portion 473. The third guide portion 474 is configured as a guide protrusion. Along the up-down direction, the third guide portion 474 is located above the second guide portion 473. In other words, specifically, before the printing medium 01 enters the first gap between the first guide portion 472 and the second guide portion 473, the third guide portion 474 is configured to provide a downward force to avoid the printing medium 01 from failing to enter the first gap due to partial bending, thereby avoiding paper jams.

Further, in the up-down direction, at least a part of the paper feeding mechanism 40 is located above the printing medium. In other words, along the up-down direction, at least a part of the paper feeding mechanism 40 is located above the paper cassette 80. Specifically, in the up-down direction, at least a part of the transmission roller group is located above the paper cassette 80. Or in other words, the first rubber roller 41 is located above the paper cassette 80. More specifically, the first rubber roller 41 (an example of the paper discharge roller) is located above the paper cassette cover plate/paper pressing mechanism. Along the front-rear direction, the paper feeding mechanism 40/first rubber roller 41 is located at least partially on the front side of the paper cassette/paper pressing mechanism. The paper feeding mechanism 40 and the paper cassette 80 are misaligned in the up-down direction, or in other words, along the up-down direction, the paper feeding mechanism 40 and the paper cassette 80 partially overlap. With such a configuration, the size of the printer in the front-rear direction can be reduced, thereby effectively reducing the overall volume of the printer.

During use, because the paper feeding mechanism 40 and the paper cassette 80 are misaligned in the up-down direction, at least a part of the paper feeding mechanism 40 is located above the paper cassette 80. Therefore, the printing medium 01 in the paper cassette will be disposed inclined for a long time. According to different usage states of the printer, the end of the printing medium 01 close to the paper outlet 122 will aggravate the bending degree of the printing medium 01 under the pressure of the paper feeding mechanism 40, which will affect the printing quality to a certain extent.

Further, when the printing medium 01 is provided with a tear line, as shown in FIG. 6 and FIG. 76A, the photo paper is installed in the photo printer. Along the front-rear direction, the tear line 010 and/or the blank area is located on one side of the paper cassette close to the paper outlet 122/transmission roller group/the second sensor/paper discharge sensor 711. At the same time, the tear line 010 and/or the blank area is located in front of the inkjet device 25. Along the up-down direction, at least a part of the paper feeding mechanism 40 is located above the tear line 010 and/or the blank area. Preferably, along the up-down direction, the tear line 010 and/or the blank area is located between the first rubber roller 41 and the support member 1210.

With such a configuration, the blank area of the photo paper on the side of the tear line 010 away from the printing area can be used as the part that first contacts the paper feeding mechanism 40 when the printing medium 01 is inclined in the paper cassette. When the printing medium 01 is subjected to the pressure of the paper feeding mechanism 40, the tear line 010 can promote the photo paper to bend at the tear line. That is, the printing area and the blank area may bend with the tear line 010 as the boundary, thereby reducing the bending amplitude of the printing area of the photo paper, and thereby reducing the impact on printing quality caused by excessive bending of the printing medium 01.

In some embodiments, the paper cassette 80 is further provided with a size adjustment mechanism for aligning printing media of different sizes, so as to realize the control module's prediction of different printing medium sizes and execution of corresponding printing programs. Specifically, the size adjustment mechanism includes at least two movably disposed alignment members and an adjustment connecting member for movably connecting the two alignment members. In the left-right direction, the two alignment members are opposite to each other at an interval. In other words, in the left-right direction, the distance between the two alignment members is approximately equal to the size of the printing medium, thereby realizing the position calibration of printing media of different sizes. For example, one alignment member is fixedly connected to the adjustment connecting member, and the adjustment connecting member is configured as a rack structure. The other alignment member is provided with a gear structure meshing with the rack structure. Thus, pushing any one alignment member can simultaneously drive the other alignment member to move synchronously in the opposite direction.

Preferably, the size adjustment mechanism is further provided with a medium size sensor (a part of the sensing module). The medium size sensor is configured to detect the distance between the two alignment members. For example, the medium size sensor is linked with the two alignment members respectively to realize the control module's prediction of different printing medium sizes and execution of corresponding printing programs. Specifically, the medium size sensor may be a common distance sensor; or it may be realized by the cooperation of an elastic member and a pressure sensor. For example, two elastic members respectively abut against the two alignment members. The medium size sensor is connected to the elastic members. When the elastic members undergo different degrees of elastic deformation, the elastic members apply different elastic forces to the medium size sensor. The control module judges the current printing medium size type based on the value output by the medium size sensor.

[Cleaning Mechanism]

For inkjet printers, if the inkjet device/print head 25 (specifically the nozzle therein) does not work for a long time, it is easy to cause the ink components to solidify and clog, affecting the normal image forming of the printing mechanism 20 on the printing medium. Therefore, existing inkjet printers generally need to clean the inkjet device 25 regularly. For example, during cleaning, the inkjet device 25 ejects ink by itself for cleaning, and collects the waste ink formed during cleaning.

Figure 11:
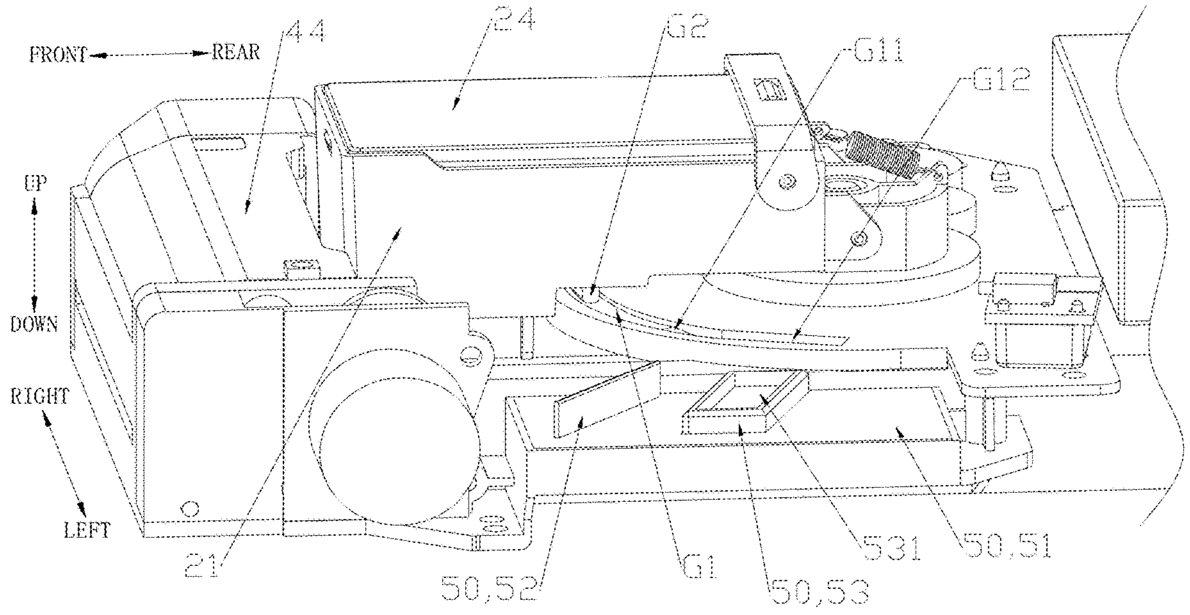
FIG. 11 is a first schematic view of a first embodiment of a guide mechanism in a portable inkjet photo printer according to the present disclosure.

As shown in FIG. 4 and FIG. 11, the printer provided by the present disclosure further includes a cleaning mechanism 50 for cleaning the inkjet device 25. The cleaning mechanism 50 includes a cleaning member 52 for wiping the surface of the inkjet device 25 and a collection portion 51 for collecting waste ink. When the inkjet device 25 needs to be cleaned, the driving assembly drives the printing mechanism 20 to move to a preset cleaning position. At this time, the printing mechanism 20 is located above the collection portion 51. The inkjet device 25 executes a preset cleaning instruction until the cleaning instruction is completed. The inkjet device 25 cleans the solidified ink components by ejecting ink to ensure the image forming quality of the printing mechanism 20 on the printing medium. Optionally, the cleaning mechanism 50 further includes a sealing member 53 for sealing the inkjet device 25.

In some embodiments, the cleaning mechanism 50 is directly or indirectly connected to the base 15. Or in other words, the cleaning mechanism 50 is directly or indirectly disposed on the base 15.

[Cleaning Member]

When the printing mechanism 20 passes the cleaning member 52 under the drive of the driving assembly, the cleaning member 52 abuts against the inkjet device/print head 25 to wipe the inkjet device/print head 25, for example, wiping the orifice plate of the inkjet device/print head 25.

In some embodiments, as shown in FIG. 11, in the up-down direction, the cleaning member 52 can interfere with the inkjet device/print head 25. Specifically, in the up-down direction, the upper surface of the cleaning member 52 is located above the inkjet device 25. In this way, when the inkjet device/print head 25 passes the cleaning member 52 under the drive of the driving assembly, it can create an interference fit with the cleaning member 52. Further, the cleaning member 52 is made of elastic material. In other words, when the inkjet device/print head 25 passes the cleaning member 52 under the drive of the driving assembly, the cleaning member 52 interferes with/abuts against the inkjet device 25 and undergoes elastic deformation. The cleaning member 52 undergoes elastic deformation and applies elastic force to the inkjet device/print head 25, thereby improving the cleaning effect.

Further, the cleaning member 52 is made of a sheet-like elastic material, which may be rubber, silicone, or sealing materials, which is not limited herein.

In some embodiments, the cleaning member 52 can also adopt a non-elastic material structure, such as cloth or mesh, to wipe the inkjet device/print head 25, for example, wiping the orifice plate of the inkjet device/print head 25.

In some embodiments, the cleaning member 52 is a roller having a flexible contact surface. When the printing mechanism 20 passes by, it contacts the flexible contact surface of the roller, and the flexible contact surface wipes the ink on the nozzle 251.

In some embodiments, the cleaning member 52 is set as a porous material (such as sponge).

In some embodiments, the cleaning member 52 may also be set to move relative to the inkjet device 25 to clean the inkjet device 25. Or in other words, when the printing mechanism 20 is in a stationary state relative to the housing assembly, the cleaning member 52 can move relative to the inkjet device 25 and abut against the inkjet device 25 to realize the cleaning of the inkjet device 25. Specifically, the cleaning mechanism 50 further includes a cleaning motor for driving the movement of the cleaning member 52.

Specifically, the cleaning member 52 has different movement trajectories under the drive of the cleaning motor. For example, the cleaning member 52 moves linearly or non-linearly (e.g., curvilinear motion). As another example, the cleaning member 52 may be set to rotate, which is not specifically limited here.

In some embodiments, the cleaning member 52 can also cooperate with cleaning fluid to clean the inkjet device 25. For example, the cleaning member 52 adsorbs cleaning fluid. As another example, the cleaning mechanism 50 further includes a cleaning fluid delivery mechanism for delivering cleaning fluid to the inkjet device 25/cleaning member 52. The cleaning fluid delivery structure is not limited herein.

[Collection Portion]

In some embodiments, the collection portion 51 is set as a collection cavity. The collection cavity is configured to collect waste ink formed by cleaning the inkjet device 25.

In some embodiments, the collection portion 51 is a porous material used to adsorb waste ink formed by cleaning the inkjet device 25.

In this embodiment, the collection portion 51 includes a collection cavity and a porous material at least partially disposed in the collection cavity. In this way, the porous material can better adsorb waste ink. On the one hand, the collection cavity can collect waste ink that the porous material cannot collect. On the other hand, the collection cavity can also limit the porous material.

Specifically, the porous material can use sponge, felt, melt-blown cloth, or fiber cotton, etc., which is not limited herein.

In some embodiments, in the movement direction of the printing mechanism 20, the collection portion 51 is located on one side of the printing area P. Or, in the paper feeding direction, the collection portion 51 is located on a side adjacent to the printing area P.

[Sealing Member]

As shown in FIG. 11, the sealing member 53 is made of elastic material. The sealing member 53 has a sealing cavity 531 for accommodating at least a part of the inkjet device 25. Specifically, the sealing member 53 may be made of rubber, silicone, and other sealing materials, which is not limited herein.

When the printer enters a preset sleep state, the driving assembly drives the printing mechanism 20 to move to a preset sealing position. At this time, the inkjet device 25 enters the sealing cavity 531 of the sealing member 53. At least a part of the sealing member 53 undergoes elastic deformation and isolates the inkjet device 25 from the air outside the sealing cavity 531 to reduce the solidification speed of the ink components on the inkjet device 25, thereby reducing ink loss when cleaning the inkjet device 25.

When cleaning the inkjet device 25, at least the following steps are included:

- Step S1, the printing mechanism 20 moves to the cleaning position under the drive of the driving assembly.
- Step S2, the inkjet device 25 executes a preset cleaning instruction until the cleaning instruction is completed. Specifically, the cleaning instruction is for the inkjet device 25 to eject ink to wash away solid components attached to the inkjet device 25.
- Step S3, the driving assembly drives the printing mechanism 20 to continue moving and pass the cleaning member 52. At this time, the cleaning member 52 abuts against the inkjet device 25 and undergoes elastic deformation.
- Step S4, the driving assembly drives reversely, driving the printing mechanism 20 to pass the cleaning member 52 again. At this time, the cleaning member 52 abuts against the inkjet device 25 and undergoes elastic deformation.
- Step S5, the driving assembly drives the printing mechanism 20 to move to a preset sealing position. At this time, the inkjet device 25 enters the sealing cavity 531 of the sealing member 53. At least a part of the sealing member 53 undergoes elastic deformation to isolate the inkjet device 25 from the air outside the sealing cavity 531.

Further, the control module also has a timing module. The control module compares the timing duration value of the timing module with a preset sleep duration threshold. When the timing duration value is greater than the sleep duration threshold, at least the above step S2 is executed. For example, the sleep duration threshold may be set to one week or two weeks, etc., which is not limited herein.

In other embodiments, the steps S3 and S4 may be performed alternately and repeatedly multiple times, which is not limited herein.

It needs to be explained that the sealing member 53 itself is an elastic material/flexible material. At this time, the edge of the sealing member 53 can also play the role of wiping the nozzle 251. Therefore, the separately provided cleaning member 52 may also be cancelled, and the sealing member 53 can also seal the inkjet device 25/nozzle 251.

As shown in FIG. 127, the cleaning mechanism 50 is disposed on the arcuate trajectory of the printing mechanism 20. And/or, the cleaning mechanism 50 is located on one side of the printing area. For example, along the left-right direction, the cleaning mechanism 50 is located on the left side or the right side of the printing area.

Further, projected along the up-down direction, the shape of the sealing member 53 is roughly rectangular. Specifically, the edge of the sealing member 53 includes a first long side 5311, a second long side 5312, a first short side 5313, and a second short side 5314. Specifically, the first long side 5311 and the second long side 5312 are opposite. The first short side 5313 and the second short side 5314 are opposite. The first long side 5311, the first short side 5313, the second long side 5312, and the second short side 5314 are connected in sequence. In some embodiments, the range of a first included angle b1 between the first long side 5311/second long side 5312 and a straight line Q1 extending along the left-right direction is 8°-13°. In some embodiments, the range of the length c1 of the first short side 5313/second short side 5314 is 4.3 mm-11 mm, and the range of the length c2 of the first long side 5311/second long side 5312 is 10.6 mm-15.6 mm.

Further, the range of a second included angle b2 between the cleaning member 52 and the straight line Q1 is 20°-40°.

Further, the collection portion 51 of the cleaning mechanism 50 has a collection cavity 510. In some embodiments, projected along the up-down direction, the shape of the collection cavity 510 is roughly rectangular. Specifically, the collection cavity 510 has a third long side 5101, a fourth long side 5102, a third short side 5103, and a fourth short side 5104. Specifically, the third long side 5101 and the fourth long side 5102 are opposite. The third short side 5103 and the fourth short side 5104 are opposite. The third long side 5101, the third short side 5103, the fourth long side 5102, and the fourth short side 5104 are connected in sequence. In some embodiments, the length c3 of the third short side 5103 and the fourth short side 5104 is greater than or equal to 16 mm. The length c4 of the third long side 5101 and the fourth long side 5102 is greater than or equal to 20 mm. Preferably, the length c4 of the third long side 5101 and the fourth long side 5102 is 30 mm.

Next, some embodiments of the sealing member 53 will be described in detail.

The sealing member 53 includes a sealing portion 534 and a lifting member. The sealing portion 534 is configured to seal the nozzle 251. The lifting member is configured to lift the sealing portion 534 so that the sealing portion 534 seals the nozzle 251.

Sealing Member Embodiment 1

As shown in FIG. 86, FIG. 87, FIG. 88, FIG. 89A, FIG. 89B, and FIG. 90, in this embodiment, the sealing member 53 is disposed in the collection cavity of the collection portion 51. Specifically, the sealing member 53 includes a sealing portion 534 and a fourth elastic member 535. Along the up-down direction, the sealing portion 534 is located above the fourth elastic member 535.

In this embodiment, the lifting member is specifically the fourth elastic member 535. The fourth elastic member 535 is configured to provide an upward lifting force to the sealing portion 534, so that the sealing portion 534 is lifted along the up-down direction, thereby making the sealing portion 534 abut against the nozzle 251 more tightly, and thus making the sealing effect of the nozzle 251 better.

In some embodiments, the sealing member 53 further includes a second guide member 532 and a second movable member 533. Along the up-down direction from top to bottom, the sealing portion 534, the second movable member 533, the fourth elastic member 535, and the second guide member 532 are arranged in sequence.

In some embodiments, the sealing portion 534 is installed on the second movable member 533. When the printer is dormant, the printing mechanism 20 moves to the preset sealing position, the sealing portion 534 is configured to seal the nozzle 251 in the inkjet device 25, to avoid long-term contact between the nozzle 251 and the air causing the ink on the nozzle 251 to solidify and causing the nozzle 251 to be unable to work normally.

In some embodiments, the second movable member 533 is configured to install the sealing portion 534. Specifically, the second movable member 533 is movably installed relative to the second guide member 532. The second movable member 533 includes a second accommodating portion 5331. The second accommodating portion 5331 is configured to accommodate the sealing portion 534. The second movable member 533 further includes a sixth limiting portion 53321, a seventh limiting portion 53322, and an eighth limiting portion 53323. Along the front-rear direction, the sixth limiting portion 53321 and the seventh limiting portion 53322 are respectively located on the front and rear sides of the second movable member 533. Along the left-right direction, the eighth limiting portion 53323 is located on the right side of the second movable member 533. The sixth limiting portion 53321, the seventh limiting portion 53322, and the eighth limiting portion 53323 are configured to snap with a part of the second guide member 532 to prevent the second movable member 533 from detaching from the second guide member 532. The second movable member 533 further includes a second limiting post 5333. Along the up-down direction, the second limiting post 5333 is opposite to the second accommodating portion 5331. The second limiting post 5333 is configured to cooperate with the fourth elastic member 535 to prevent the fourth elastic member 535 from shifting.

In some embodiments, the second movable member 533 can move along a direction parallel to the up-down direction.

In some embodiments, the fourth elastic member 535 is installed between the second movable member 533 and the second guide member 532. Specifically, the fourth elastic member 535 is configured to directly or indirectly support the sealing portion 534. Along the up-down direction, one end of the fourth elastic member 535 abuts against the second movable member 533/sealing portion 534, and the other end abuts against the second guide member 532. The fourth elastic member 535 is configured to support the second movable member 533/sealing portion 534 upward.

In some embodiments, the sealing portion 534 and the second movable member 533 are integrally formed. In other words, the lifting member (such as the fourth elastic member) 535 directly supports the sealing portion 534.

In some embodiments, the second guide member 532 is disposed in the collection cavity of the collection portion 51. In some preferred embodiments, the second guide member 532 is fixedly disposed in the collection cavity of the collection portion 51. The second guide member 532 includes a sealing cavity 531. The sealing cavity 531 is configured to accommodate at least a part of the fourth elastic member 535, at least a part of the second movable member 533, and at least a part of the sealing portion 534.

In some embodiments, the second guide member 532 is directly or indirectly disposed on the base 15. The second guide member 532 is disposed immovably relative to the base 15. The second guide member 532 has a first side wall 532*a*, a second side wall 532*b*, a third side wall 532*c*, a fourth side wall 532*d*, and a third bottom wall 532*e*. Along the left-right direction, the first side wall 532*a* and the second side wall 532*b* are opposite. Along the front-rear direction, the third side wall 532*c* and the fourth side wall 532*d* are opposite. Along the up-down direction, the third bottom wall 532*e* is opposite to the opening of the sealing cavity 531. The second guide member 532 further includes a third protrusion 53211 protruding relative to the first side wall 532*a*, a fourth protrusion 53212 and a fifth protrusion 53213 both protruding relative to the second side wall 532*b*, a sixth protrusion 53214 protruding relative to the third side wall 532*c*, and a seventh protrusion 53215 protruding relative to the fourth side wall 532*d*. When the second movable member 533 is installed into the sealing cavity 531, a gap is formed between the second movable member 533 and the side walls of the second guide member 532. In this way, when the second movable member 533 moves up and down along the third protrusion 53211, the fourth protrusion 53212, the fifth protrusion 53213, the sixth protrusion 53214, and the seventh protrusion 53215, no negative pressure space will be formed between the second movable member 533 and the second guide member 532, thereby making the movement of the second movable member 533 smoother.

In some embodiments, the second guide member 532 further includes a first guide groove 53231 disposed on the second side wall 532*b*, a second guide groove 53232 disposed on the third side wall 532*c*, and a third guide groove 53233 disposed on the fourth side wall 532*d*. The first guide groove 53231, the second guide groove 53232, and the third guide groove 53233 are configured to guide the second movable member 533 to move along the up-down direction. The first guide groove 53231, the second guide groove 53232, and the third guide groove 53233 all have an upper side surface. The upper side surface is configured to limit the movement range of the second movable member 533 in the upward direction, preventing the second movable member 533 from coming out of the direction. The second guide member 532 further includes a first inclined groove 53221 inclined relative to the second side wall 532*b*, a second inclined groove 53222 inclined relative to the third side wall 532*c*, and a third inclined groove 53223 inclined relative to the fourth side wall 532*d*. When the second movable member 533 is installed to the second guide member 532 along the direction from top to bottom, the first inclined groove 53221 is configured to guide the sixth limiting portion 53321, the second inclined groove 53222 is configured to guide the seventh limiting portion 53322, and the third inclined groove 53223 is configured to guide the eighth limiting portion 53323, so that the second movable member 533 may be installed more smoothly.

In some embodiments, the second guide member 532 further includes a ninth limiting portion 53241 disposed on the third bottom wall 532*e*. The ninth limiting portion 53241 is configured to cooperate with the fourth elastic member 535 to further prevent the fourth elastic member 535 from shifting.

In some embodiments, along the front-rear direction, the sealing member 53 is located behind the cleaning member 52.

In some embodiments, before the nozzle 251 of the printing mechanism 20 is sealed, the fourth elastic member 535 is in a natural state. The second movable member 533 is supported upward by the fourth elastic member 535. Under the support of the fourth elastic member 535 and the second movable member 533, along the up-down direction, the uppermost end of the sealing portion 534 is located above the lowermost end of the nozzle 251. The sealing portion 534/sealing member 53 is in a first state. In the first state, the sealing portion 534 is disengaged from the nozzle 251, and the nozzle 251 is not sealed. When the printing mechanism 20/printer is not working, during the process where the printing mechanism 20 moves toward the sealing position along the arcuate trajectory, the nozzle 251 abuts against the sealing portion 534, causing the sealing portion 534 and/or the fourth elastic member 535 to undergo elastic deformation. Then, the printing mechanism 20 can move to the sealing position. The sealing portion 534/sealing member 53 is in a second state. In the second state, the sealing portion 534 abuts against the nozzle 251, and the nozzle 251 is sealed. When the printing mechanism 20 is at the sealing position, the sealing portion 534 isolates the nozzle 251 from the atmosphere, thereby ensuring the humidity of the nozzle 251 and greatly slowing down the solidification speed of the ink of the nozzle 251. When the printing mechanism 20 leaves the sealing position, the inkjet device 25 disengages from the sealing portion 534. Under the elastic force of the fourth elastic member 535, the sealing portion 534 resets upward with the second movable member 533.

In some embodiments, as shown in FIG. 128, projected along the up-down direction projection, the shape of the second movable member 533 is roughly rectangular. Specifically, the second movable member 533 at least includes a first long side wall 53301, a second long side wall 53302, a first short side wall 53303, and a second short side wall 53304. Specifically, the first long side wall 53301 and the second long side wall 53302 are opposite. The first short side wall 53303 and the second short side wall 53304 are opposite. The first long side wall 53301, the first short side wall 53303, the second long side wall 53302, and the second short side wall 53304 are connected in sequence, and enclose to form a second accommodating portion 5331 for accommodating the sealing portion 534.

Further, the sealing portion 534 may also be configured to adsorb waste ink at the nozzle 251 to prevent waste ink from remaining and solidifying at the nozzle 251 and affecting printer use. In some embodiments, the sealing portion 534 is configured as felt/sponge, etc.

Further, a twelfth limiting portion 53324 is disposed on the inner wall of the second movable member 533. Along the up-down direction, the twelfth limiting portion 53324 is located above the sealing portion 534 to fix the sealing portion 534, thereby preventing the sealing portion 534 from falling off. Further, there are multiple twelfth limiting portions 53324. For example, the twelfth limiting portions 53324 are disposed on at least one of the first long side wall 53301, the second long side wall 53302, the first short side wall 53303, and the second short side wall 53304.

Further, the collection portion 51 is provided with an adsorption structure 511 including at least one adsorption member 5111. The adsorption member 5111 is configured to adsorb residual waste ink on the surface of the inkjet device 25. Further, the adsorption member 5111 is made of porous material, such as felt/sponge. The cleaning member 52 is disposed in the collection portion 51. It may also be said that the cleaning member 52 is disposed in the area of the adsorption member 5111. Or, along the front-rear direction or left-right direction, the cleaning member 52 at least partially overlaps with the adsorption member 5111. Preferably, two adsorption members 5111 are provided, for example, the adsorption members 5111 include a first adsorption member 51111 and a second adsorption member 51112. Along the front-rear direction, the sealing member 53 is located between the first adsorption member 51111 and the second adsorption member 51112.

Further, the sealing member 53 is further provided with a drain portion 5334 communicating with the adsorption member 5111. The waste ink adsorbed by the sealing portion 534 can be adsorbed by the adsorption member 5111 through the drain portion 5334. In the up-down direction, the drain portion 5334 is located below the sealing portion 534. Still further, the drain portion 5334 is configured as a hole/groove communicating the sealing portion 534 and the adsorption member 5111.

Modification 1 of Sealing Member Embodiment 1

In some embodiments, the cleaning mechanism 50 is configured to be detachable relative to the printer. Details are as follows.

Figure 101A:
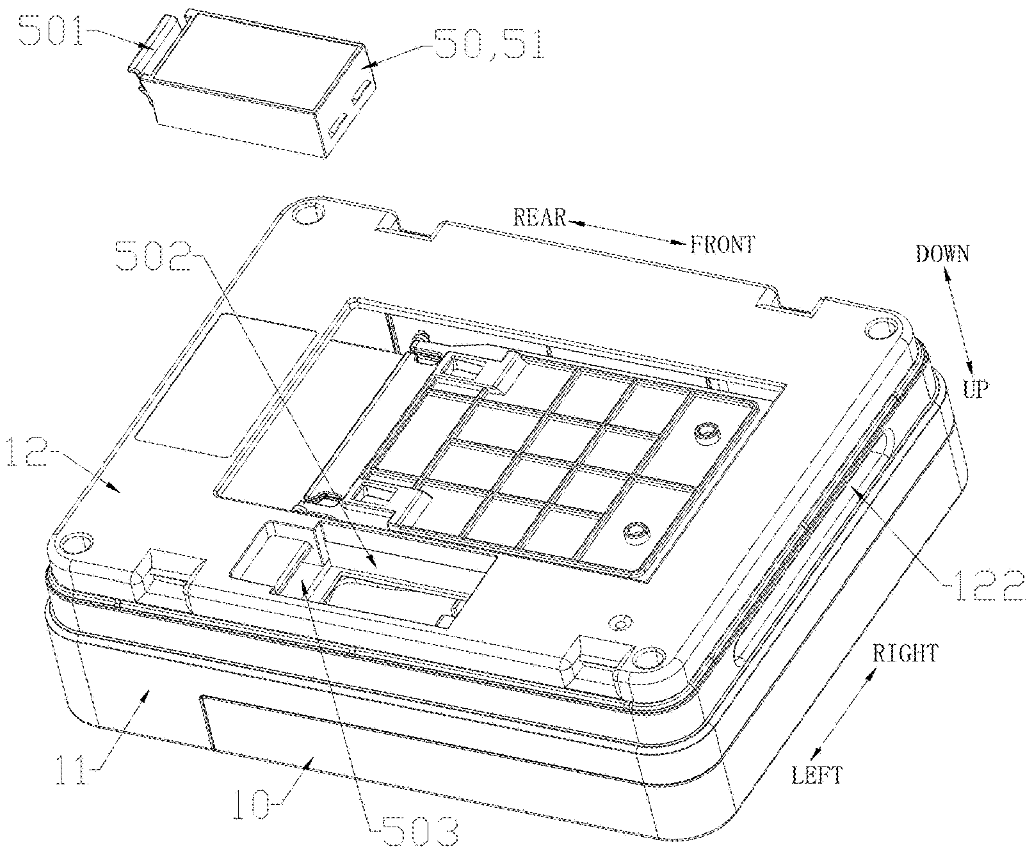
FIG. 101A is a first variation of the first embodiment of the sealing member in a portable inkjet photo printer according to the present disclosure.

As shown in FIG. 101A, the cleaning mechanism 50 further includes a snap portion 501 disposed therein. In some embodiments, the snap portion 501 is connected to the collection portion 51. The snap portion 501 is configured to enable the cleaning mechanism 50 to be installed on and detached from the printer. Further, the snap portion 501 can undergo elastic deformation. When the cleaning mechanism 50 is installed to an installation groove 502 disposed in the printer, the snap portion 501 abuts against the housing assembly (such as the second housing 12) and undergoes elastic deformation, and cooperates with a slot portion 503 disposed in the printer, so that the cleaning mechanism 50 is installed and the cleaning mechanism 50 is fixed.

Modification 2 of Sealing Member Embodiment 1

Figure 101B:
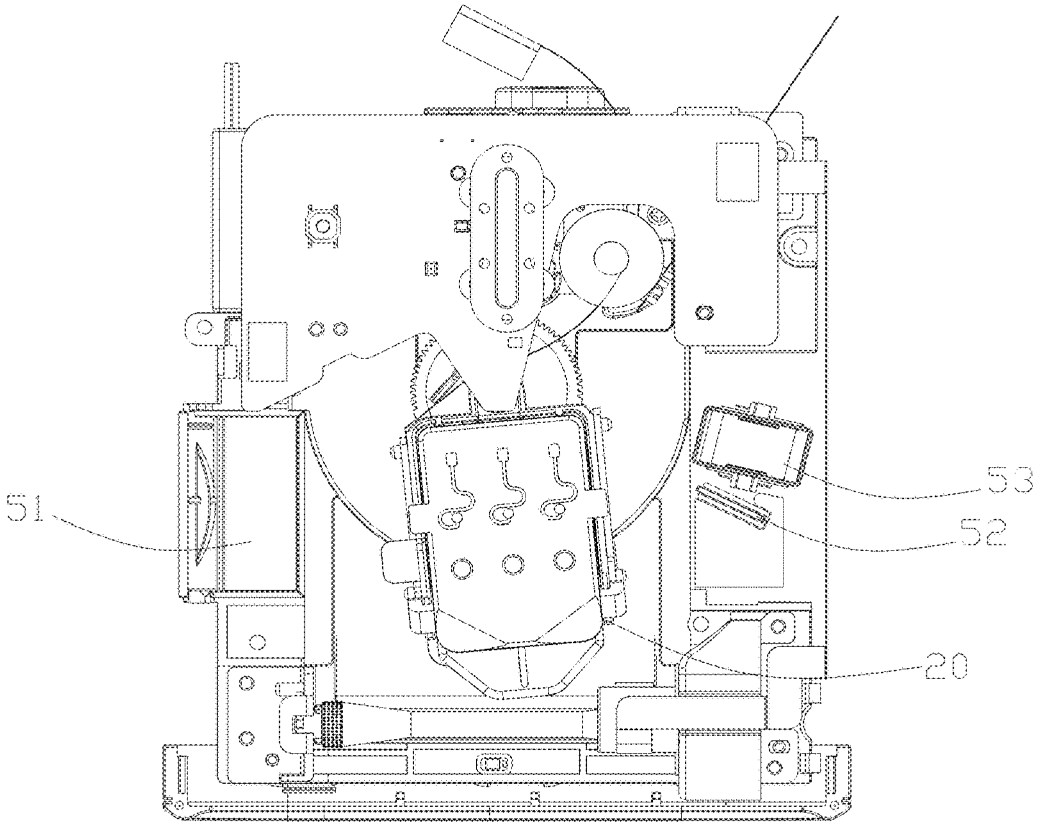
FIG. 101B is a second variation of the first embodiment of the sealing member in a portable inkjet photo printer according to the present disclosure.
Figure 101C:
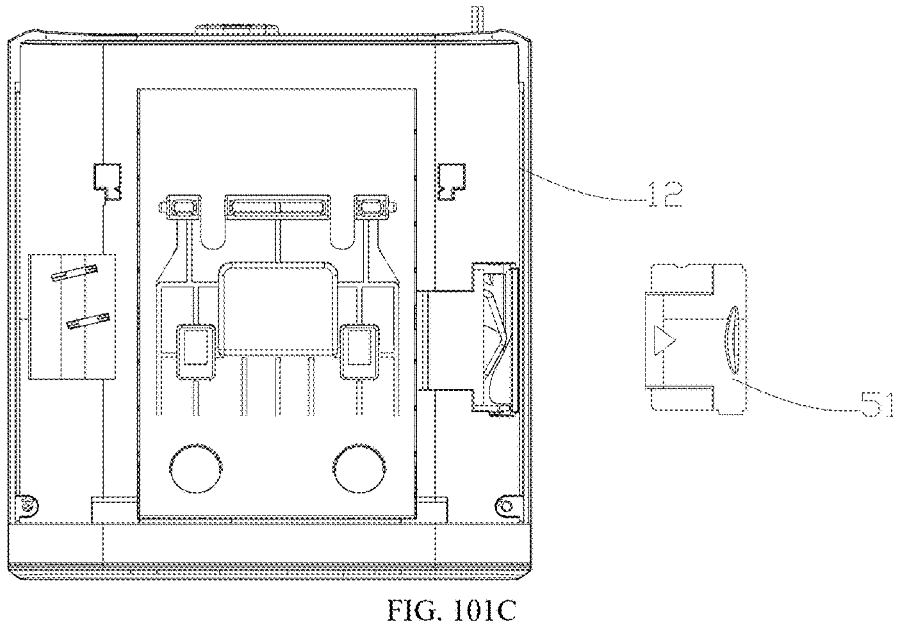
FIG. 101C is the second variation of the first embodiment of the sealing member in a portable inkjet photo printer according to the present disclosure.

In some embodiments, as shown in FIG. 101B and FIG. 101C, the collection portion 51 is disposed on one side of the center "O" of the printing mechanism 20, and the sealing member 53 and the cleaning member 52 are disposed on the other side relative to the center "O" of the printing mechanism 20. With such a configuration, the area of the adsorption member 5111 in the collection portion 51 can be increased, increasing the capacity for absorbing waste ink.

Further, the collection portion 51 can still be detached relative to the printer, but the sealing member 53 and the cleaning member 52 are no longer detached together with the collection portion 51, avoiding the sealing member 53 and the cleaning member 52 from being replaced before reaching their service life, thereby reducing usage costs.

Beneficial Effects

1. By providing the fourth elastic member 535 to apply elastic force to the sealing portion 534, the airtightness of the sealing portion 534 against the nozzle 251 can be improved.
2. The sealing member 53 has a simple structure and occupies less volume, making it suitable for portable inkjet photo printers.
3. The cleaning mechanism 50 is detachably disposed, facilitating self-removal of the cleaning mechanism 50 by users for cleaning. At the same time, the cleaning member 52 and the sealing member 53 can be cleaned to ensure the cleaning effect of the cleaning mechanism 50 on the nozzle 251.
4. The cleaning mechanism 50 is detachably disposed, facilitating the replacement of parts of the cleaning member 52 and the sealing member 53.

Sealing Member Embodiment 2

Parts in this embodiment that are the same as those in Sealing Member Embodiment 1 will not be repeated. The difference between this embodiment and Sealing Member Embodiment 1 is that the lifting member is different. The second guide member 532 can also move along a direction intersecting with the up-down direction. Details are as follows.

In some embodiments, as shown in FIG. 91A, FIG. 91B, FIG. 92, FIG. 93, FIG. 94A-FIG. 94C, FIG. 95, FIG. 96A, and FIG. 96B, the lifting member is specifically a third guide member 54. Further, the lifting member further includes a fourth elastic member 535. The third guide member 54 is configured to guide the sealing portion 534 to move/lift in the up-down direction and in a direction intersecting the front-rear direction. Specifically, when the printing mechanism 20 moves toward the sealing position along the arcuate trajectory, the sealing member 53 can simultaneously lift upward in the up-down direction and move backward along the arcuate trajectory. Specifically, the third guide member 54 has an accommodating space (first accommodating space) 540. The first accommodating space 540 is configured to accommodate at least a part of the sealing portion 534. The third guide member 54 includes a lower rail 541 and an upper rail 542. A guide groove 543 is formed between the lower rail 541 and the upper rail 542. The guide groove 543 is configured to guide the sealing portion 534 to move along a predetermined direction.

In some embodiments, a group of rails is defined including the lower rail 541 and the upper rail 542. The lower rail 541 and the upper rail 542 are set as two groups or three groups. When the lower rail 541 and the upper rail 542 are set as two groups, along the left-right direction, the two groups of lower rails 541 and upper rails 542 are spaced apart relative to the first accommodating space 540. Alternatively, the two groups of lower rails 541 and upper rails 542 are arranged along the movement trajectory of the printing mechanism 20 (or an arc concentric with the movement trajectory of the printing mechanism 20). When the lower rail 541 and the upper rail 542 are set as three groups, wherein two groups are on the side away from the rotation center of the printing mechanism 20, and one group is on the side close to the rotation center of the printing mechanism 20. This arrangement can make the internal structure of the printer compact.

Figure 93:
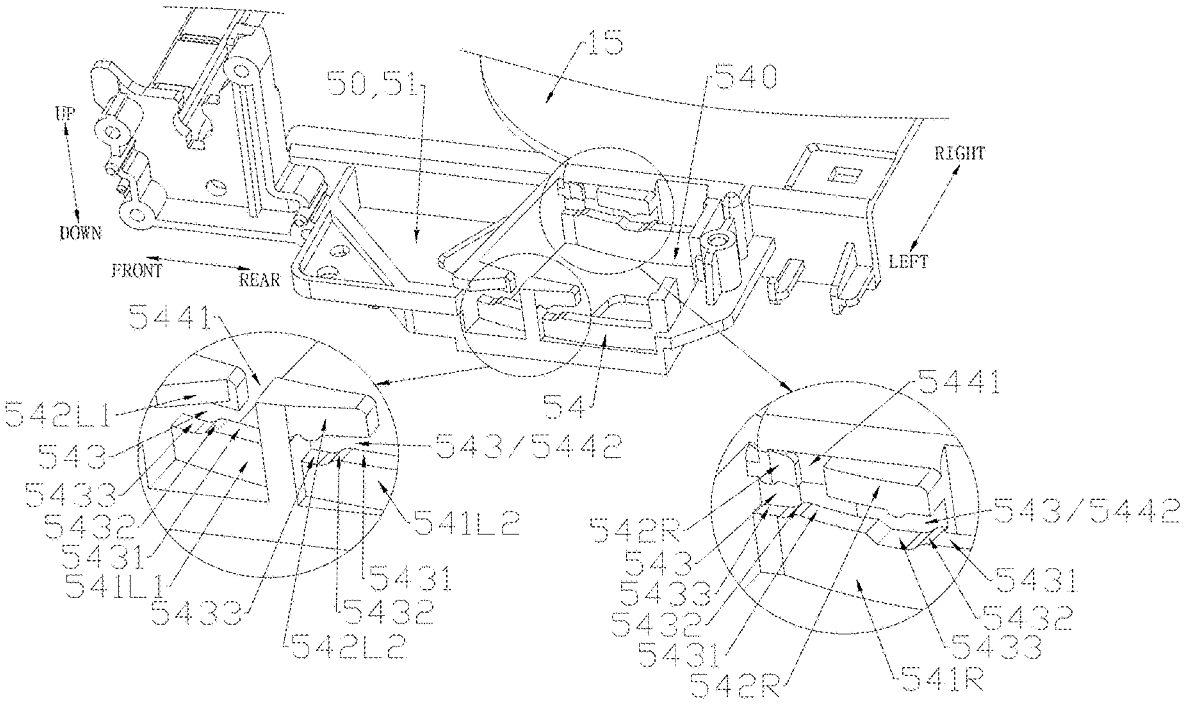
FIG. 93 is a schematic view of a third guide member in the second embodiment of the sealing member in a portable inkjet photo printer according to the present disclosure, with some components hidden.
Figure 94A:
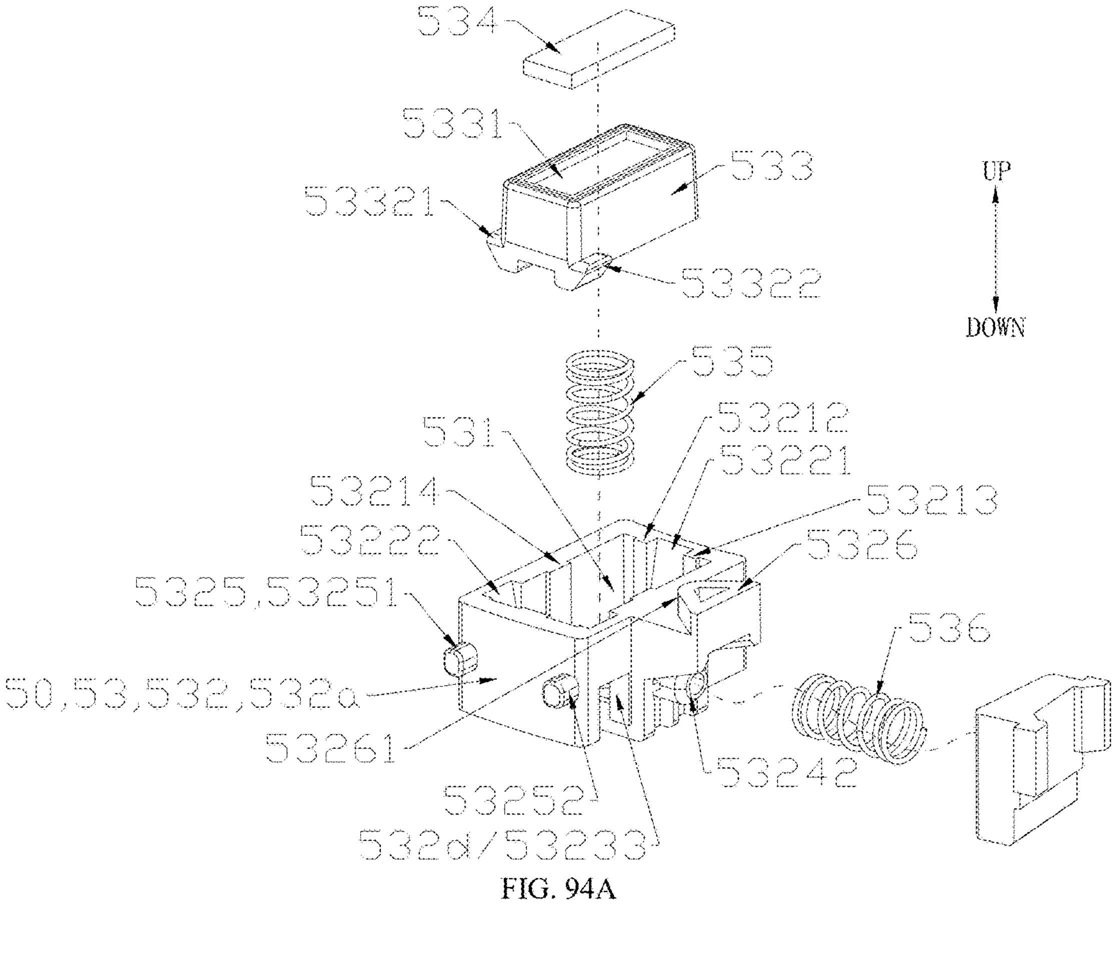
FIG. 94A and FIG. 94B are exploded views of the second embodiment of the sealing member in a portable inkjet photo printer according to the present disclosure, with some components hidden.
Figure 94B:
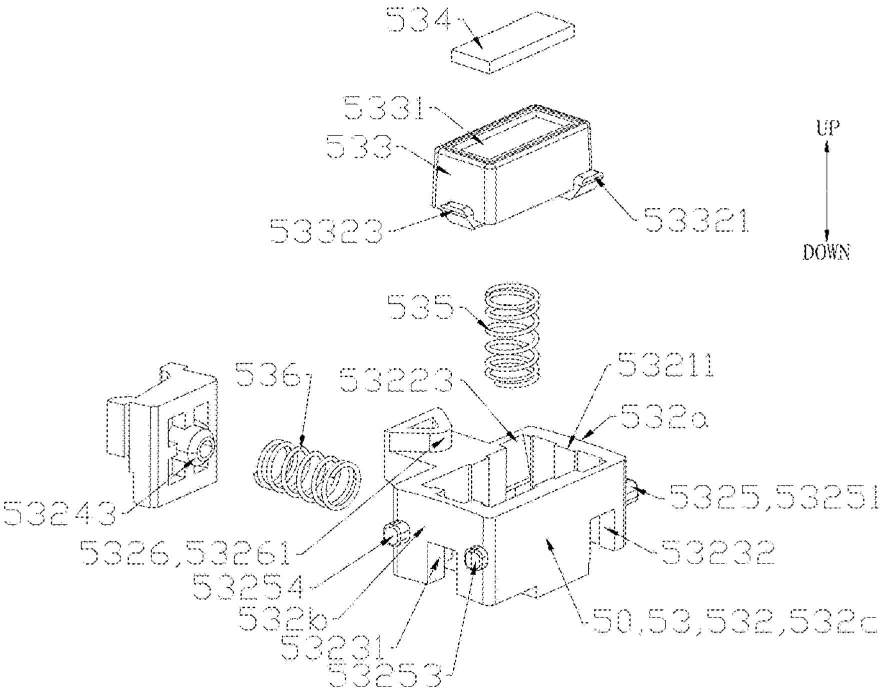
Figure 94C:
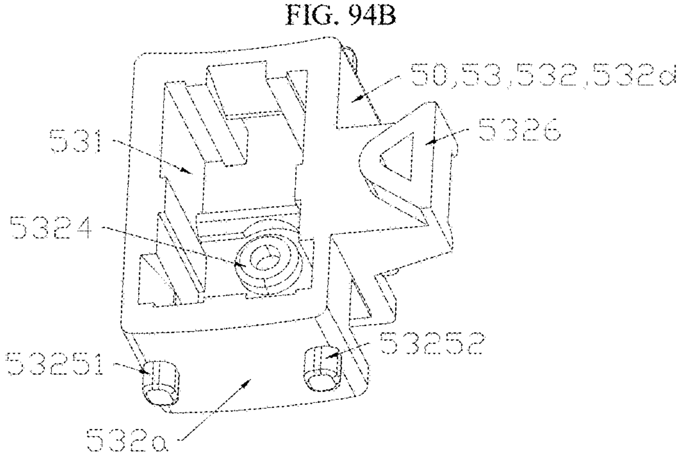
FIG. 94C is a schematic view of a second guide member in the second embodiment of the sealing member in a portable inkjet photo printer according to the present disclosure.
Figure 95:
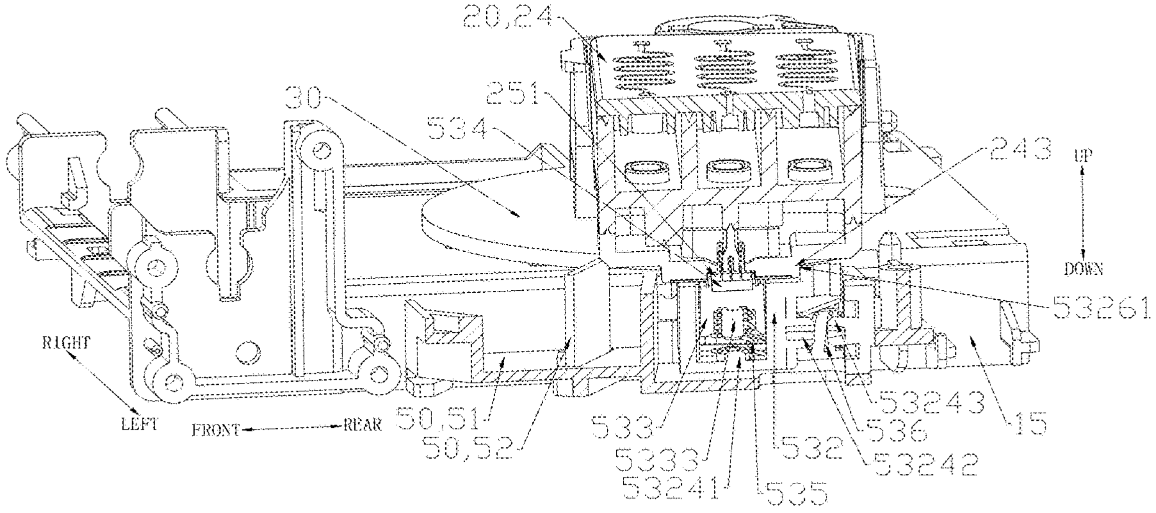
FIG. 95 is a cross-sectional view of the second embodiment of the sealing member in a portable inkjet photo printer according to the present disclosure, with some components hidden, observed from left to right when the inkjet device is sealed by the sealing member.
Figure 96A:
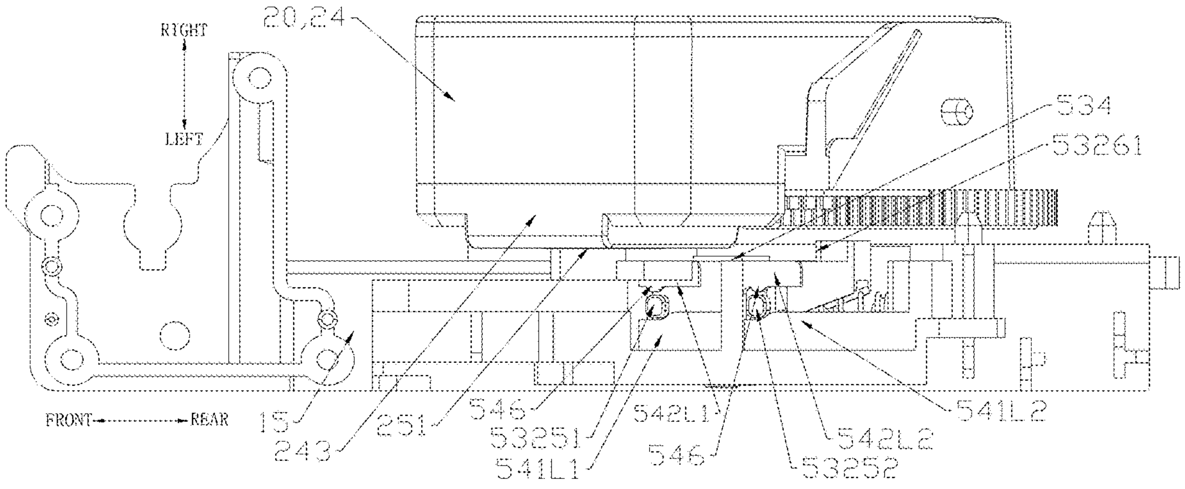
FIG. 96A is a schematic view of the second embodiment of the sealing member in a portable inkjet photo printer according to the present disclosure, with some components hidden, before the inkjet device is sealed.
Figure 96B:
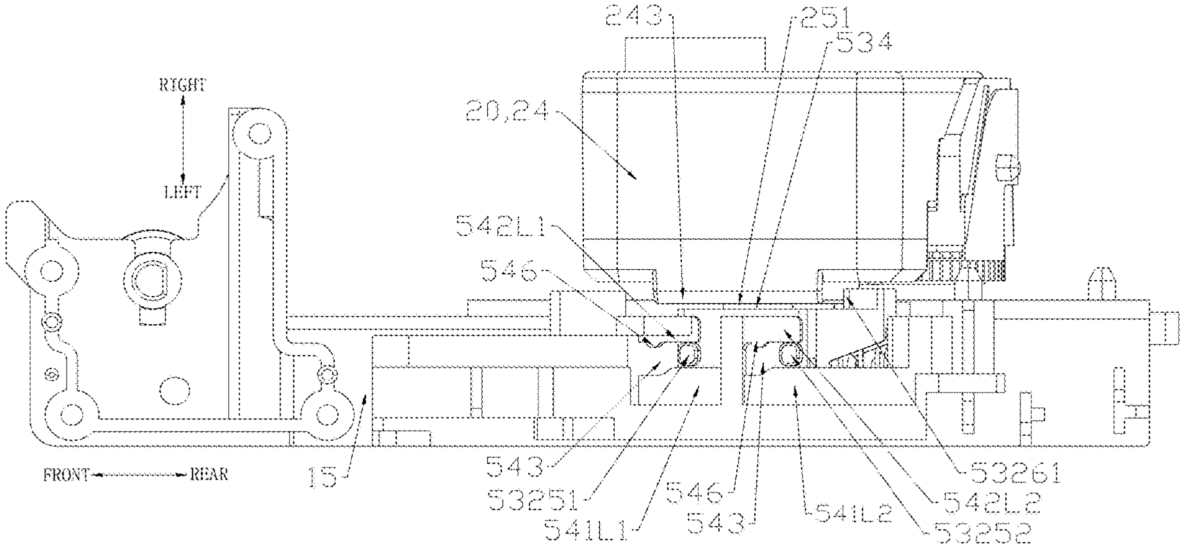
FIG. 96B is a schematic view of the second embodiment of the sealing member in a portable inkjet photo printer according to the present disclosure, with some components hidden, after the inkjet device is sealed.

In some embodiments, when the lower rail 541 and the upper rail 542 are set as three groups, as shown in FIG. 93, the lower rail 541 includes a first side lower rail 541L and a second side lower rail 541R. The upper rail 542 includes a first side upper rail 542L and a second side upper rail 542R. Along the left-right direction, the first side lower rail 541L and the second side lower rail 541R are opposite, and the first side upper rail 542L and the second side upper rail 542R are opposite. Specifically, the first side lower rail 541L further includes a first group of lower rails 541L1 and a second group of lower rails 541L2. The first side upper rail 542L further includes a first group of upper rails 542L1 and a second group of upper rails 542L2. Thus, the first group of rails refers to the first group of lower rails 541L1 and the first group of upper rails 542L1. The second group of rails refers to the second group of lower rails 541L2 and the second group of upper rails 542L2. The third group of rails refers to the second side upper rail 542R and the second side lower rail 541R. Along the front-rear direction, the first group of rails is located in front of the second group of rails. The upper rail 542 is further provided with a first opening 5441, and a second opening 5442 is further provided between the upper rail 542 and the lower rail 541. The first opening 5441 and the second opening 5442 both communicate with the guide groove 543. In some embodiments, along the up-down direction, the first opening 5441 faces upward, and along the front-rear direction, the second opening 5442 faces backward.

In some embodiments, the guide groove 543 has a first step surface 5431, a connection surface 5432, and a second step surface 5433. The connection surface 5432 is configured to connect the first step surface 5431 and the second step surface 5433. Along the front-rear direction, the first step surface 5431 is located behind the second step surface 5433. Along the up-down direction, the first step surface 5431 is located above the second step surface 5433.

In some embodiments, during actual use, the user may turn the printer upside down for printing. At this time, to prevent the sealing member 53 from moving freely due to gravity, the third guide member 54 is further provided with a limiting protrusion 546. The limiting protrusion 546 may be configured to limit the sealing member 53, preventing the printing mechanism 20 from being unable to move smoothly to the sealing position after printing when the printer is in an inverted state.

In some embodiments, the third guide member 54 is disposed in the collection cavity of the collection portion 51 of the cleaning member 50. The third guide member 54 and the collection portion 51 may be integrally formed or separately formed.

In some embodiments, the second guide member 532 is movably disposed in the third guide member 54. The second guide member 532 can move along the up-down direction, and can also move along a direction intersecting the front-rear direction. Specifically, moving along the arcuate trajectory of the printing mechanism 20. Specifically, the second guide member 532 further includes a trigger portion 5326. The trigger portion 5326 is configured to be triggered by the printing mechanism 20, thereby driving the sealing member 53 and the second guide member 532 to move backward along the arcuate trajectory, and at the same time be lifted along the up-down direction, thereby causing the sealing portion 534 to abut against the nozzle 251 to seal the nozzle 251.

In some embodiments, the sealing portion 534, the second guide member 532, and the second movable member 533 are integrally formed. The sealing member 53 further includes a trigger portion 5326 disposed on the sealing portion 534. After the trigger portion 5326 is triggered by the printing mechanism 20, the sealing portion 534 moves along the lifting member (such as the third guide member 54) while simultaneously lifting upward and moving backward.

In some embodiments, the trigger portion 5326 has a trigger surface 53261. The trigger surface 53261 is configured to abut against the printing mechanism 20.

In some embodiments, the second guide member 532 further includes a guide post 5325. The guide post 5325 is configured to cooperate with the guide groove 543 to move under the guidance of the guide groove 543. Specifically, the guide post 5325 includes a first guide post 53251 and a second guide post 53252 disposed on the first side wall 532*a*, and a third guide post 53253 and a fourth guide post 53254 disposed on the second side wall 532*b*. Along the front-rear direction, the first guide post 53251 and the third guide post 53253 are both located in front of the second guide post 53252 and the fourth guide post 53254. Along the left-right direction, the first guide post 53251 and the second guide post 53252 are both located to the left of the third guide post 53253 and the fourth guide post 53254. Further, the first guide post 53251 and the third guide post 53253 enter the guide groove 543 through the first opening 5441. The second guide post 53252 and the fourth guide post 53254 enter the guide groove 543 through the second opening 5442.

In some embodiments, the guide post 5325 and the guide groove 543 may also be interchanged. For example, the guide post 5325 is disposed on the third guide member 54, and the guide groove 543 is disposed on the second guide member 532, as long as the sealing portion 534 can be lifted by the lifting mechanism (such as the third guide member 54) while simultaneously lifting upward and moving backward.

In some embodiments, when the second guide member 532/sealing member 53 is installed to the third guide member 54, the second step surface 5453/lower rail 541 also is configured to support the second guide member 532/sealing member 53.

In some embodiments, the sealing member 53 further includes a fifth elastic member 536. Along the front-rear direction, the fifth elastic member 536 is disposed behind the second movable member 533 to reset the sealing member 53 forward. When the sealing member 53 and the fifth elastic member 536 are installed to the third guide member 54, the fifth elastic member 536 is in a natural state. The sealing member 53 is pushed forward by the fifth elastic member 536, and the sealing portion 534/sealing member 53 is in a first state. In the first state, the sealing portion 534 is disengaged from the nozzle 251, and the nozzle 251 is not sealed. During the movement of the printing mechanism 20 along the arcuate trajectory towards the sealing position, the printing mechanism 20 contacts with the trigger surface 53261/trigger portion 5326, and the triggering force of the printing mechanism 20 to the sealing member 53 is greater than the elastic force of the fifth elastic member 536, thus the sealing member 53 can move backward. The fifth elastic member 536 undergoes elastic deformation. The sealing member 53 is lifted upward while moving backward along the guide groove 543, until the printing mechanism 20 moves to the sealing position. The sealing portion 534/sealing member 53 is in a second state. In the second state, the sealing portion 534 abuts against the nozzle 251, and the nozzle 251 is sealed. At the same time, the fourth elastic member 535 supports the sealing portion 534 upward, making the sealing portion 534 abut against the nozzle 251 more tightly, and the sealing effect of the nozzle 251 is better.

In some embodiments, when the printing mechanism 20 leaves the sealing position, the triggering force of the printing mechanism 20 triggering the sealing member 53 is withdrawn. At this time, the elastic force released by the fifth elastic member 536 is greater than the triggering force. Under the action of the elastic force, the sealing member 53 resets forward.

In some embodiments, the second guide member 532 further includes a tenth limiting portion 53242 disposed on the fourth side wall 532*d*. The tenth limiting portion 53242 is configured to cooperate with one end of the fifth elastic member 536 to prevent the fifth elastic member 536 from shifting.

In some embodiments, the printer is further provided with an eleventh limiting portion 53243. The eleventh limiting portion 53243 is configured to cooperate with the other end of the fifth elastic member 536 to further prevent the fifth elastic member 536 from shifting. Further, the eleventh limiting portion 53243 and the third guide member 54 are separately formed, or the eleventh limiting portion 53243 and the third guide member 54 are integrally formed.

Beneficial Effects

By providing the trigger portion 5326, during the process of the printing mechanism 20 moving toward the sealing position, the sealing member 53 is triggered. Only when the printing mechanism 20 moves to the sealing position will the sealing member 53 seal the nozzle 251. This can avoid the sealing member 53 excessively rubbing against the nozzle 251 and damaging the nozzle 251.

Sealing Member Embodiment 3

In some embodiments, the lifting member is configured as a lever. At this time, the fourth elastic member 535 and the fifth elastic member 536 may not be provided. By the printing mechanism 20 abutting against the trigger portion 5326, the sealing portion 534 is driven to lift, thereby realizing the sealing of the nozzle 251. To improve the sealing effect, an elastic member may be provided. Alternatively, when the printing mechanism 20 is located at the sealing position, under the action of the locking mechanism 90, the printing mechanism 20 is fixed, so that the trigger portion 5326 can also be stably abutted by the printing mechanism 20 to maintain the lifted state of the sealing portion 534.

In some embodiments, when the printing mechanism 20 abuts against the trigger portion 5326, the sealing portion 534 moves in a direction opposite to the movement direction of the printing mechanism 20. That is, the sealing portion 534 moves toward the nozzle 251.

Sealing Member Embodiment 4

In some embodiments, the lifting member is configured as a gear, and the sealing portion 534 is connected to the gear. When the printing mechanism 20 abuts against the trigger portion 5326, as the printing mechanism 20 moves toward the sealing position, the trigger portion 5326 drives the gear to rotate. Under the action of the locking mechanism 90, the printing mechanism 20 is fixed, thereby making the sealing portion 534 abut against and seal the nozzle 251.

[Reset Mechanism]

As shown in FIG. 4, in some embodiments, a reset mechanism is disposed at one end of the printing carriage 21 close to the rotating member 23. Specifically, a first anchoring hole 212 is disposed on one side of the printing carriage 21, and a second anchoring hole 232 is disposed on the rotating member 23. The first anchoring hole 212 and the second anchoring hole 232 are connected via a first elastic member 233. The first elastic member 233 may be a tension spring. In the up-down direction, the first anchoring hole 212 and the second anchoring hole 232 are disposed at different heights/staggered. In other words, in the up-down direction, the first anchoring hole 212 is located above the second anchoring hole 232. The first anchoring hole 212 and the second anchoring hole 232 are staggered in the up-down direction. This allows the first elastic member 233 to apply an upward pulling force along the up-down direction to the printing carriage 21 when the printing mechanism 20 swings from the non-working area to the working area (i.e., printing area), thereby enabling the printing carriage 21 to reset better, and further improving printing accuracy.

[Sensing Module]

The printer receives digital image signals via wired/wireless means. The control module converts the digital image signals into printing signals. The printing signals serve as ink ejection action instructions corresponding to one printing pass of the printing mechanism 20, i.e., executing ink ejection actions on each pixel point of the printing medium. The printing mechanism 20 executes corresponding ink ejection action instructions according to the printing signals, thereby completing the inkjet image forming work on the printing medium.

Every time the printing mechanism 20 completes one or multiple ink ejection actions, the paper feeding mechanism 40 needs to drive the printing medium to advance a certain distance L towards the paper outlet 122. Specifically, the printing mechanism 20 can swing or translate when performing ink ejection actions.

In some embodiments, in order to meet different printing needs, the distance L that the printing medium advances toward the paper outlet 122 may be set to multiple different values according to the printing signal. For example, the image on the printing medium includes two segments. The first segment is the part that requires ink ejection, i.e., the printing/image forming content. The second segment is the part that does not require ink ejection, i.e., the blank part. Depending on the type of printing medium, the blank part may also be other colors besides white, such as black. When advancing the first segment, after the printing medium advances a distance each time, the printing mechanism 20 needs to perform an ink ejection action. When advancing the second segment, the printing mechanism 20 does not need to perform an ink ejection action, and the paper feeding mechanism 40 also does not need to wait for the printing mechanism 20 to idle before advancing. Therefore, the printing speed may be increased.

As shown in FIG. 5, the printer is further provided with a sensing module. The sensing module includes a first sensor 73 and a second sensor (not shown in the figure). The first sensor 73 is configured to detect whether the cover member 10 (as shown in FIG. 1 and FIG. 8) described later is opened. The second sensor is configured to detect whether there is a printing medium. Specifically, the first sensor 73 is installed on the side of the frame 44 opposite to the cover member 10. When the cover member 10 is opened, the first sensor 73 can detect a signal change and then send an instruction to the control module. The control module drives the printing mechanism 20 to move from the working area to the non-working area. According to user habits, when the user opens the cover member 10, it is generally for operations such as adding ink or replacing the printing mechanism 20/ink storage portion 24. Therefore, when the printer identifies that the cover member 10 is opened, it causes the printing mechanism 20 to move to the corresponding opening after the cover member 10 being opened, thereby facilitating user operation. Preferably, at this time, the printing mechanism 20/printing carriage 21 is parallel to the paper feeding direction, or the printing mechanism 20/printing carriage 21 is located in the middle position of the cover member 10 corresponding to the opening. The second sensor is installed at a position close to the paper outlet 122. Further, the first sensor 73 may be a photoelectric sensor, an optical coupler, or a micro switch. The second sensor may be a photoelectric sensor or an optical coupler sensor.

Figure 40:
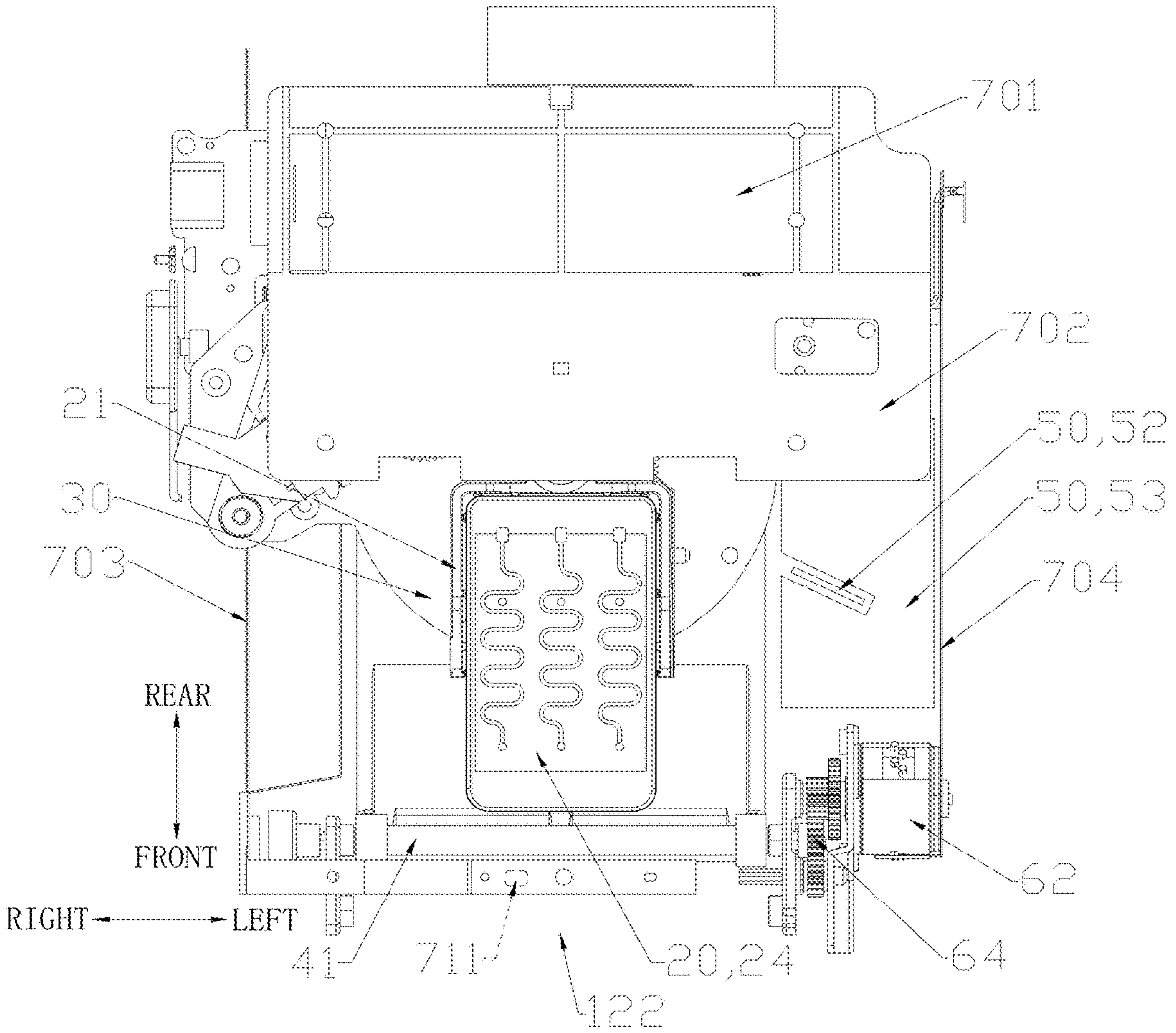
FIG. 40 is a schematic view of a portable inkjet photo printer according to the present disclosure observed from top to bottom with some components hidden.

As shown in FIG. 40 and FIG. 42, in some embodiments, the second sensor may be a paper discharge sensor 711 disposed above the transmission roller group. The paper discharge sensor 711 is located at a position close to the paper outlet 122 and has the function of detecting the position of the front end of the printing medium, ensuring that the printing medium can accurately and alignedly enter the printing area, thereby completing printing. The paper discharge sensor 711 may also be a reflective sensor, i.e., irradiating light onto the printing medium and detecting the position of the front end of the printing medium using light reflection. Alternatively, the paper discharge sensor 711 includes a light emitting portion and a light receiving portion. When the printing medium reaches the detection position, the printing medium is located between the light emitting portion and the light receiving portion. The light emitting portion is configured to emit light, and the light receiving portion is configured to receive light and convert the received light into current/voltage. The control module is preset with different current values/voltage values. The control module judges the position of the printing medium by detecting the magnitude of the received current/voltage and comparing it with the preset current value/voltage value. For example, the light receiving portion can judge different positions of the printing medium by judging when the total luminous flux (amount of light emitted by the light emitting portion) received is ¼ or ½. When the luminous flux received by the light receiving portion is the same as the preset current value/voltage value (which may be 0 or not 0), it is judged that the printing medium has reached the predetermined position, and the printing work may be executed. It should be noted that the light receiving portion converts the received optical signal into an electrical signal, thereby sending the electrical signal to the control module to realize the detection of the printing medium position. By setting the paper discharge sensor 711, after the printer receives the printing information, the control module controls the paper feeding mechanism 40 to transport the printing medium according to the preset printing instruction, so that the printing medium moves from the paper cassette 80 to the printing area. Until the paper discharge sensor 711 detects the printing medium, the paper discharge sensor 711 sends a guide instruction to the control module, and then the control module controls the printing mechanism 20 to execute the inkjet printing action instruction.

In some embodiments, as shown in FIG. 69, FIG. 70, FIG. 72, and FIG. 73, the paper feeding mechanism 40 at least includes a first rubber roller 41, and eliminates the frame 44. In the up-down direction, the paper discharge sensor 711 is disposed on the lower side of the first rubber roller 41/transmission roller group to make the internal structure of the printer compact.

As shown in FIG. 40 and FIG. 42, in some embodiments, the sensing module further includes a first angle sensor 712 disposed at the end of the transmission roller group. For example, in the left-right direction, the first angle sensor 712 may be disposed at the left end or right end of the first rubber roller 41. Specifically, every time the printing mechanism 20 completes one inkjet action, the paper feeding mechanism 40 needs to drive the printing medium to advance a certain distance toward the paper outlet 122. In order to avoid transmission errors such as slipping between the second motor 62 and the second intermediate transmission assembly 64, the first angle sensor 712 needs to detect the rotation angle of the transmission roller group or one of the rubber rollers in the transmission roller group each time.

In some embodiments, as shown in FIG. 68, FIG. 69, FIG. 70, and FIG. 73, in the left-right direction, a first magnetic member 7151 is further disposed at the end of the first rubber roller 41. The first magnetic member 7151 is configured to cooperate with the first angle sensor 712. For example, when the first rubber roller 41 rotates, the rotation angle of the first rubber roller 41 is detected through the change in the magnetic field between the first magnetic member 7151 and the first angle sensor 712.

In some embodiments, the method for the second motor 62 to drive the transmission roller group to rotate includes the following modes:

Mode 1: The second motor 62 outputs driving force according to the printing signal and drives the transmission roller group to rotate by a first angle. The printing medium advances a certain distance. After the first angle sensor 712 detects that the transmission roller group has rotated by the first angle, the first angle sensor 712 outputs a first angle signal and feeds it back to the control module. The control module controls the second motor 62 to stop outputting driving force or execute the next action. After the printing mechanism 20 completes one inkjet action, the second motor 62 outputs driving force again.

Further, after receiving the first angle signal, the control module compares it with a preset angle value. If the first angle is smaller than the preset angle value, the control module controls the second motor 62 to continue outputting driving force until the transmission roller group rotates to the preset angle value. If the first angle is equal to the preset angle value, the control module controls the second motor 62 to stop outputting driving force. If the first angle is greater than the preset angle value, the control module controls the second motor 62 to stop outputting driving force, and corrects the time for the second motor 62 to output driving force, so as to ensure the accuracy of the rotation angle of the transmission roller group driven by the second motor 62, so that the transmission roller group rotates to the preset angle value.

Mode 2: The second motor 62 outputs driving force to drive the transmission roller group to rotate. Until the first angle sensor 712 detects that the transmission roller group has rotated to the preset angle value, the first angle sensor 712 outputs a second angle signal to the control module. The control module controls the second motor 62 to stop outputting driving force or execute the next action.

As shown in FIG. 42, in some embodiments, the sensing module further includes a second angle sensor 714. Specifically, when the printing mechanism 20 swings, the second angle sensor 714 is configured to detect the angle when the printing mechanism 20 swings.

In some embodiments, along the up-down direction, at least a part of the first circuit board 701/second circuit board 702 overlaps with the printing mechanism 20. Further, the second angle sensor 714 is disposed on the first circuit board 701/second circuit board 702. A second magnetic member 7152 is disposed on the printing carriage 21. The second magnetic member 7152 is configured to cooperate with the second angle sensor 714. For example, when the printing mechanism 20 rotates, the detection of the rotation angle of the printing mechanism 20 is realized through the change in the magnetic field between the second magnetic member 7152 and the second angle sensor 714. Preferably, along the up-down direction, the second angle sensor 714 and the second magnetic member 7152 at least partially overlap. Further, the second magnetic member 7152 can rotate with the printing carriage 21.

In some embodiments, the method for the first motor 61 to drive the printing mechanism 20 to swing includes the following modes:

Mode 1: The first motor 61 outputs driving force according to the printing signal and drives the printing mechanism 20 to swing by a second angle. The printing medium advances a certain distance. After the second angle sensor 714 detects that the printing mechanism 20 has swung by the second angle, the second angle sensor 714 outputs a third angle signal and feeds it back to the control module. The control module controls the first motor 61 to stop outputting driving force or execute the next action. After the printing mechanism 20 completes one inkjet action, the first motor 61 outputs driving force again.

Further, the control module receives the third angle signal and compares it with a preset angle value. If the second angle is smaller than the preset angle value, the control module controls the first motor 61 to continue outputting driving force until the printing mechanism 20 swings to the preset angle value. If the second angle is equal to the preset angle value, the control module controls the first motor 61 to stop outputting driving force. If the second angle is greater than the preset angle value, the control module controls the first motor 61 to stop outputting driving force, and corrects the time for the first motor 61 to output driving force, so as to ensure the accuracy of the swing angle of the printing mechanism 20 driven by the first motor 61, so that the printing mechanism 20 swings to the preset angle value.

Mode 2: The first motor 61 outputs driving force to drive the printing mechanism 20 to swing. Until the second angle sensor 714 detects that the printing mechanism 20 has swung to the preset angle value, the second angle sensor 714 outputs a fourth angle signal to the control module. The control module controls the first motor 61 to stop outputting driving force or execute the next action.

In some embodiments, the first angle sensor 712 and/or the second angle sensor 714 may be magnetic angle sensors (Hall angle sensors or magnetic encoders), potentiometric angle sensors, inductive angle sensors, optical encoders, gyroscopes, etc. In this embodiment, the first angle sensor 712 and/or the second angle sensor 714 are preferably magnetic angle sensors (Hall angle sensors).

In some embodiments, the sensing module further includes a medium type sensor for identifying the printing medium. Specifically, the printing medium has a recognized portion that can be recognized by the medium type sensor.

Optionally, the recognized portion is set as a specific pattern located at predetermined position on the printing medium. The specific pattern is set as at least one type. When there are two or more different types of printing media, different specific patterns are respectively set on the different types of printing media. The differences between different specific patterns may be at least one of shape, size, proportion, hardness, and color. The medium type sensor may be set as an optical coupling sensor or an image sensor. During recognition, the medium type sensor detects the specific pattern, and judges whether the printing medium exists and/or the type of the printing medium based on the amount of luminous flux or by comparing the specific pattern with a preset pattern.

Optionally, the recognized portion is set as a conductive structure located at a predetermined position on the printing medium. During detection, the medium type sensor judges whether the printing medium exists and/or the type of the printing medium by judging the electrical connection state with the conductive structure. For example, the type of the printing medium is judged by detecting the magnitude of current/voltage, or multiple conductive structures are provided, and the type of the printing medium is judged by detecting the electrical connection states of the multiple conductive structures. Further, the conductive structure may be at least one of a metal contact pin, a metal sheet, a metal recess, or a metal bump.

Optionally, the printing medium may also be identified by Radio Frequency Identification (RFID). The wireless radio frequency identification is non-contact data communication performed through a reader and a tag. The identification components including an electronic tag, a reader, and an antenna work together. Specifically, the reader emits a radio frequency signal of a specific frequency through the antenna. When the electronic tag enters the magnetic field coverage area of the radio frequency signal, the electronic tag obtains energy through electromagnetic induction to activate and send a signal, or the electronic tag actively sends a signal through a built-in power source. The reader then receives the signal sent by the electronic tag, thereby achieving the purpose of identification.

In some embodiments, when the recognized portion is set as a conductive structure, a contact pin electrically connected to the conductive structure is provided in the printer corresponding to the conductive structure. The medium type sensor can judge whether the printing medium exists and/or the type of the printing medium by judging the electrical connection state between the contact pin and the conductive structure.

In some embodiments, when the printing medium 01 is set as a roll shape, the recognized portion may also be set at a predetermined position of the printing medium 01.

In some embodiments, when the printing medium 01 is set as a roll shape, the recognized portion may also be set at a predetermined position of the paper roller 021. For example, the recognized portion is disposed on the left side and/or right side of the paper roller 021.

In some embodiments, when the printing medium 01 is set as a roll shape, the recognized portion may also be disposed on the installation housing.

In some embodiments, when the printing medium 01 is set as a roll shape, the printing medium 01 may also be identified through wireless radio frequency identification. The identification component of the wireless radio frequency identification includes an electronic tag, a reader, and an antenna. Specifically, the electronic tag is a coil, disposed on the left side and/or right side of the roll portion 012 of the printing medium 01. The reader and the antenna are disposed in the printer. Specifically, the antenna is disposed at a position corresponding to the electronic tag, and identifies, encrypts, etc. the printing medium 01 through wireless radio frequency identification.

In some embodiments, the sensing module further includes a paper cassette sensor for detecting whether there is a printing medium in the paper cassette 80. When there is a printing medium in the paper cassette 80, the paper cassette sensor outputs a first signal. When there is no printing medium in the paper cassette 80, the paper cassette sensor outputs a second signal different from the first signal. The paper cassette sensor may be a photoelectric sensor or an optical coupler sensor.

Figure 84:
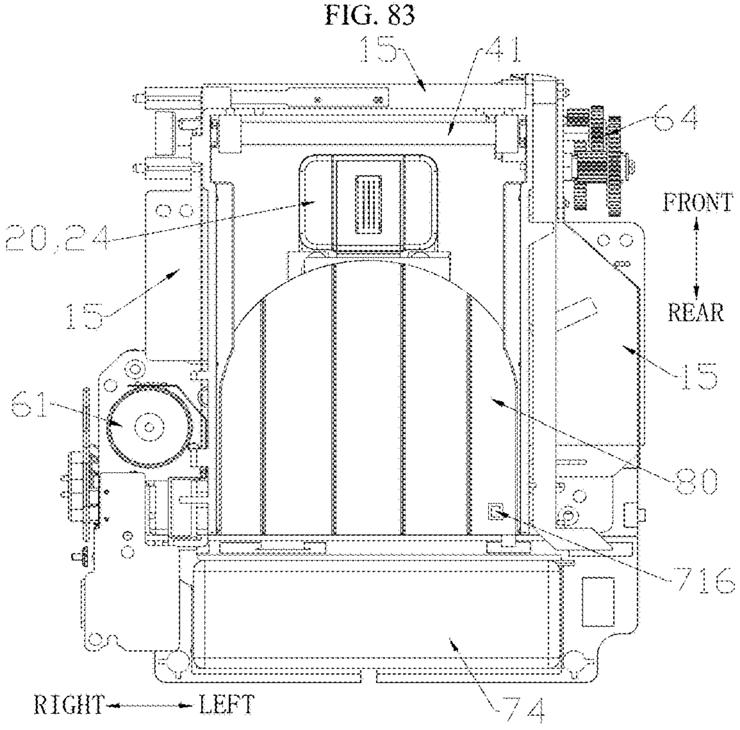
FIG. 84 is a schematic view of a portable inkjet photo printer according to the present disclosure with some components hidden, observed from bottom to top.

In some embodiments, as shown in FIG. 84, the paper cassette sensor 716 is disposed at the left rear of the paper cassette 80.

[Control Module]

As shown in FIG. 40, the control module includes a first circuit board 701 and a second circuit board 702. In some embodiments, the first circuit board 701 and the second circuit board 702 are adjacently disposed. The first circuit board 701 and the second circuit board 702 are configured to electrically connect with the sensors described above to receive the signals output by the sensors. In the front-rear direction, the first circuit board 701 and the second circuit board 702 are located on a side of the printing mechanism 20 far from the paper outlet 122.

As shown in FIG. 21, in some embodiments, the first circuit board 701 and the second circuit board 702 are spaced apart. For example, spaced apart in the front-rear direction. In other embodiments, the first circuit board 701 and the second circuit board 702 may also be integrally formed.

As shown in FIG. 40, in some embodiments, the paper discharge sensor 711 has a first electrical connector 703 electrically connected to the first circuit board 701 and/or the second circuit board 702. The second motor 62 has a second electrical connector 704 electrically connected to the first circuit board 701 and/or the second circuit board 702. The first electrical connector 703 and the second electrical connector 704 are located inside the housing assembly of the printer. In the left-right direction, the first electrical connector 703 is located on the left side or right side of the printing mechanism 20, or the first electrical connector 703 is located on one side of the cleaning mechanism 50. In the left-right direction, the second electrical connector 704 is located on the left side or right side of the printing mechanism 20, or the second electrical connector 704 is located on one side of the cleaning mechanism 50.

As shown in FIG. 41A and FIG. 41B, in some embodiments, the printing mechanism 20 has a third electrical connector 705 electrically connected to the first circuit board 701 and/or the second circuit board 702. A first end 7051 of the third electrical connector 705 is electrically connected to the second communication module 72 disposed on the printing carriage 21. A second end of the third electrical connector 705 is electrically connected to the first circuit board 701 and/or the second circuit board 702. The third electrical connector 705 passes through the left side or right side of the printing carriage 21. Specifically, the third electrical connector 705 is a flexible printed circuit (FPC).

Further, a part of the third electrical connector 705 is pre-positioned by protrusion disposed on the left side/right side of the printing carriage 21. At the same time, the main body portion connecting the first end 7051 and the second end in the third electrical connector 705 is limited by a first limiting portion 213 disposed on the printing carriage 21 and the second limiting portion 326 disposed on the second bracket/limiting bracket 32, preventing the third electrical connector 705 from bending excessively and extending its service life.

In some embodiments, the first circuit board 701and the second circuit board 702 are integrally formed. As shown in FIG. 74, along the up-down direction, at least a part of the first circuit board 701/second circuit board 702 overlaps with the power supply module 74.

Figure 75:
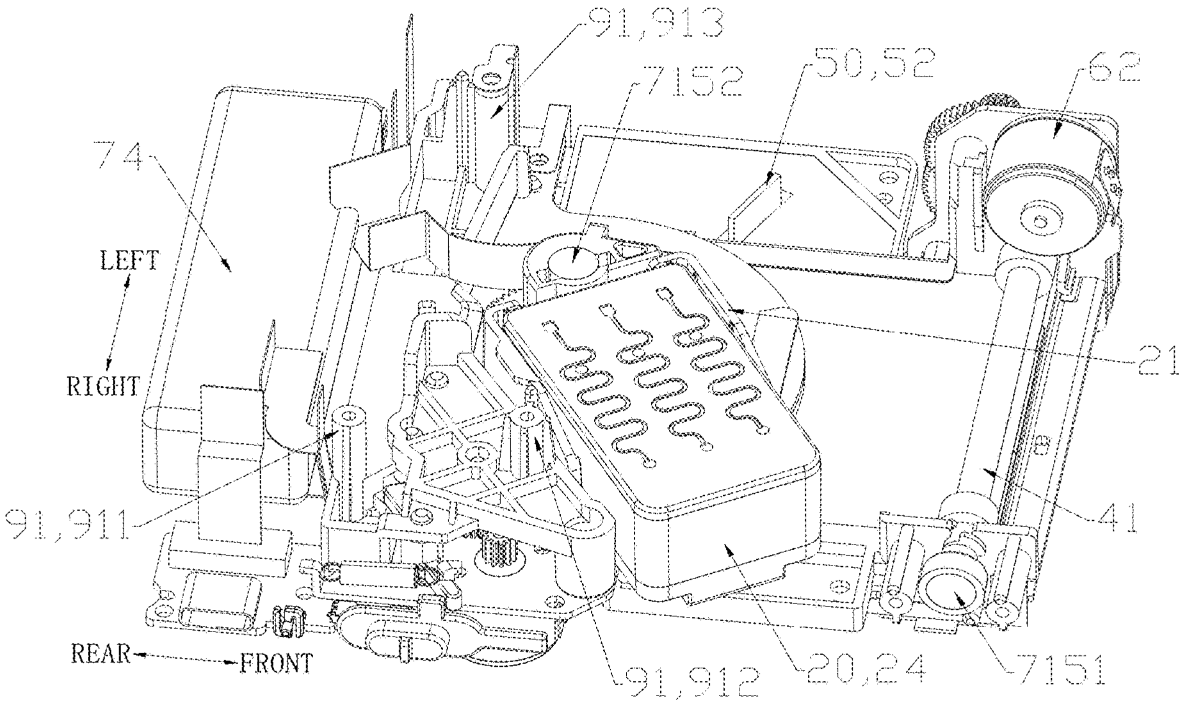

In some embodiments, as shown in FIG. 74 and FIG. 75, at least one fixing portion 91 is disposed between the base 15 and the first circuit board 701/second circuit board 702. The fixing portion 91 is configured to fixedly connect the first circuit board 701/second circuit board 702 with the internal components. Further, along the up-down direction, at least a part of the fixing portion 91 is located above the printing mechanism 20. In the left-right direction, a part of the fixing portion 91 overlaps with the printing mechanism 20, making the internal structure of the printer compact.

Figure 85:
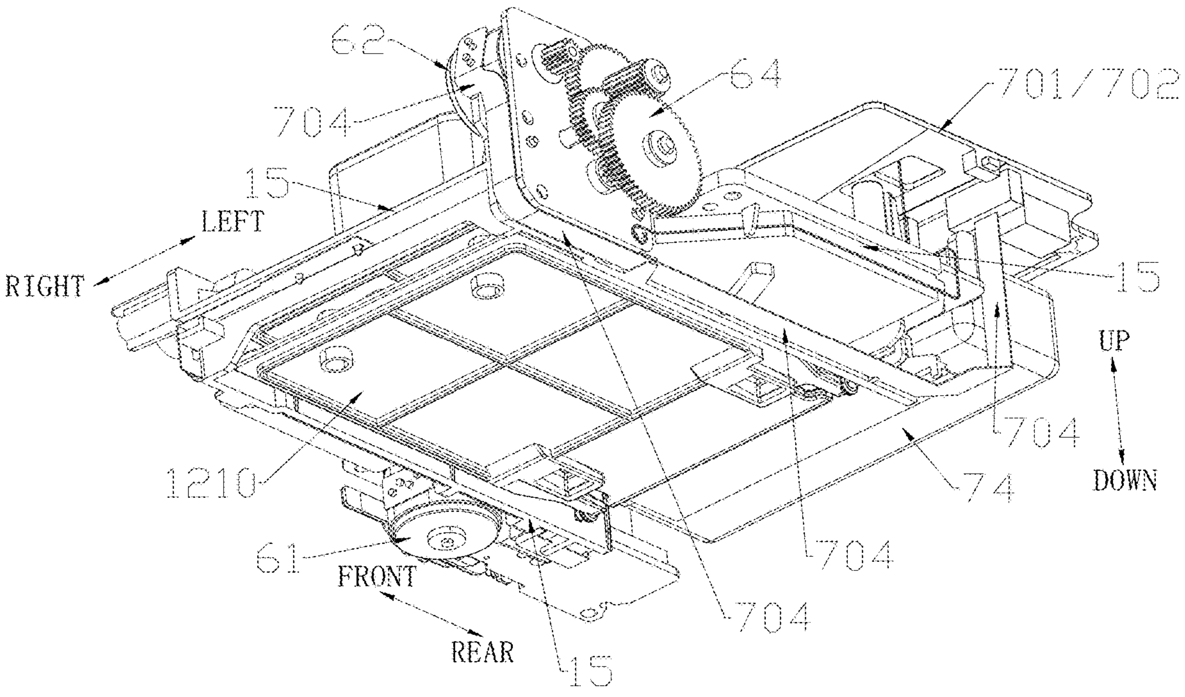
FIG. 85 is a schematic view of a portable inkjet photo printer according to the present disclosure with some components hidden.
Figure 86:
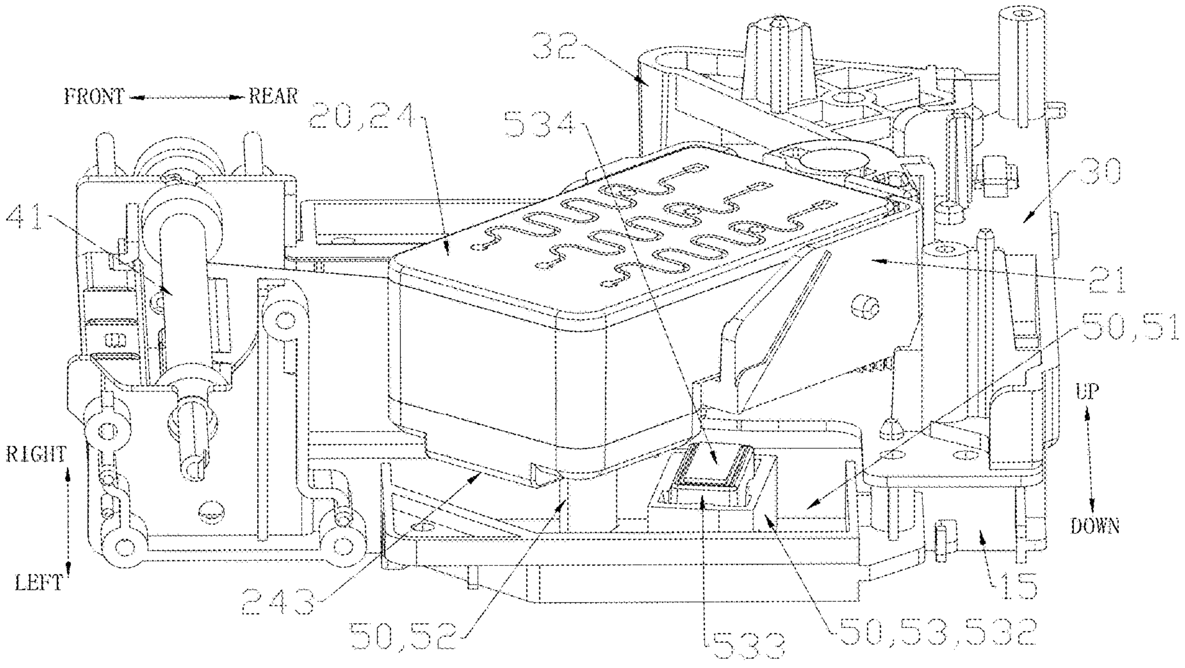
FIG. 86 is a schematic view of a first embodiment of a sealing member in a portable inkjet photo printer according to the present disclosure, with some components hidden, before the inkjet device is sealed by the sealing member.
Figure 87:
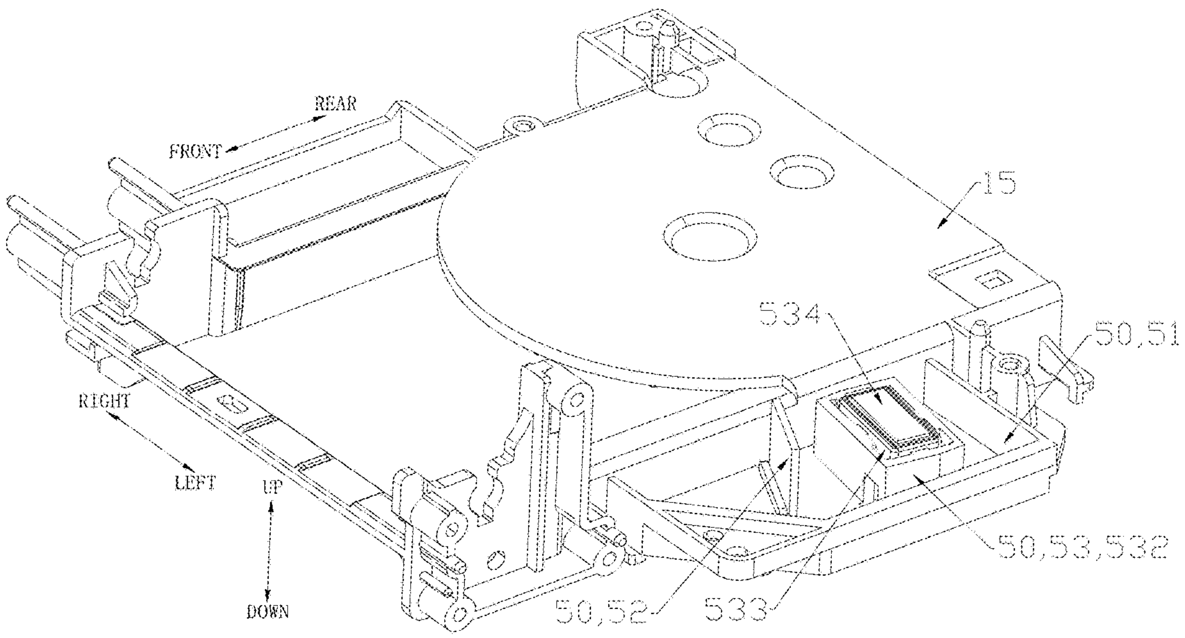
FIG. 87 is a schematic view of the first embodiment of the sealing member in a portable inkjet photo printer according to the present disclosure, with some components hidden, showing a base and the sealing member.
Figure 88:
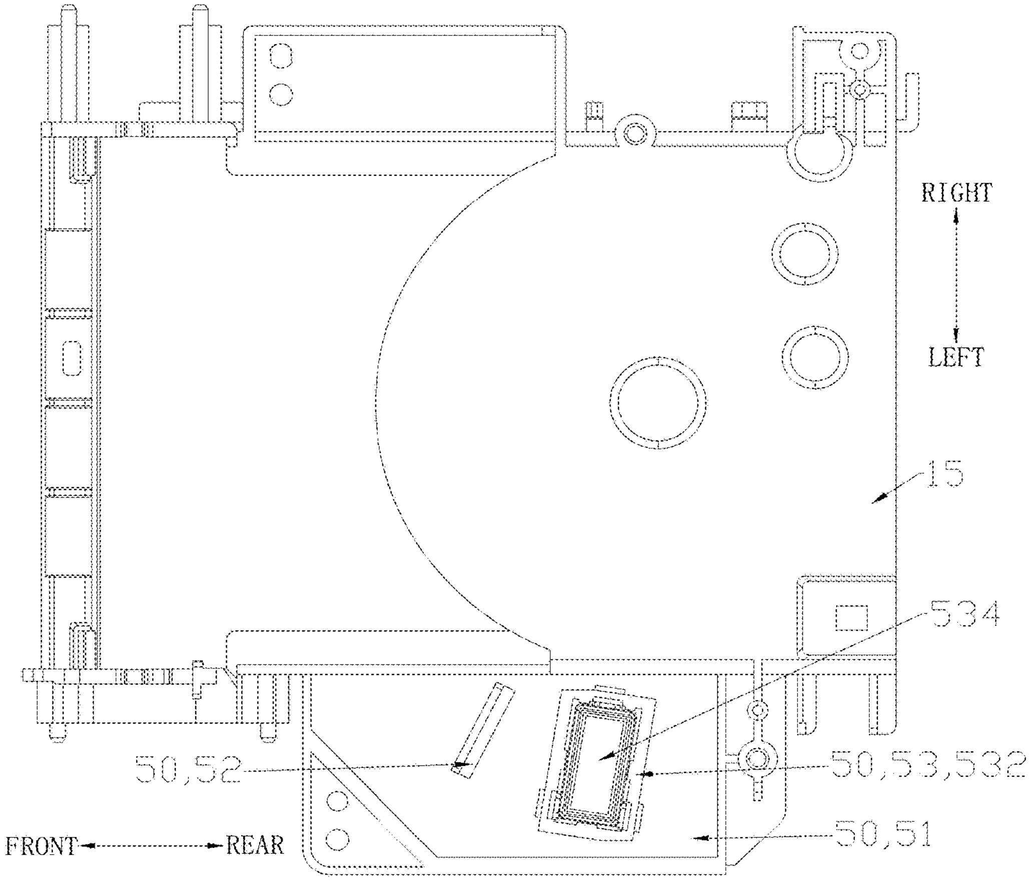
FIG. 88 is a schematic view of the first embodiment of the sealing member in a portable inkjet photo printer according to the present disclosure, with some components hidden, observed from top to bottom.
Figure 89A:
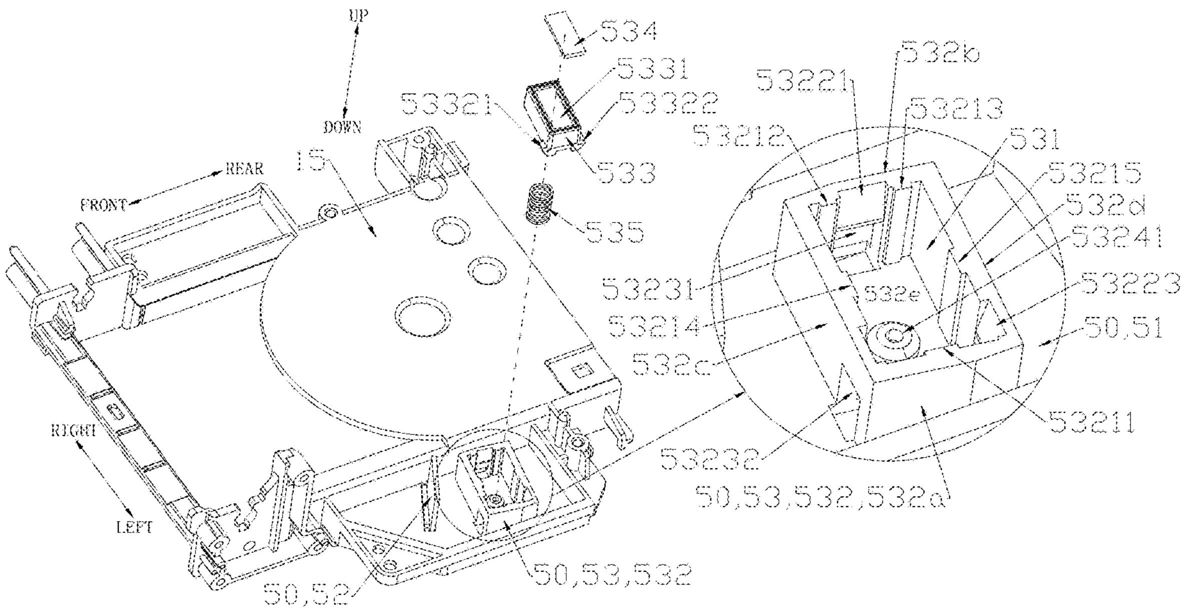
FIG. 89A and FIG. 89B are exploded views of the first embodiment of the sealing member in a portable inkjet photo printer according to the present disclosure, with some components hidden.
Figure 89B:
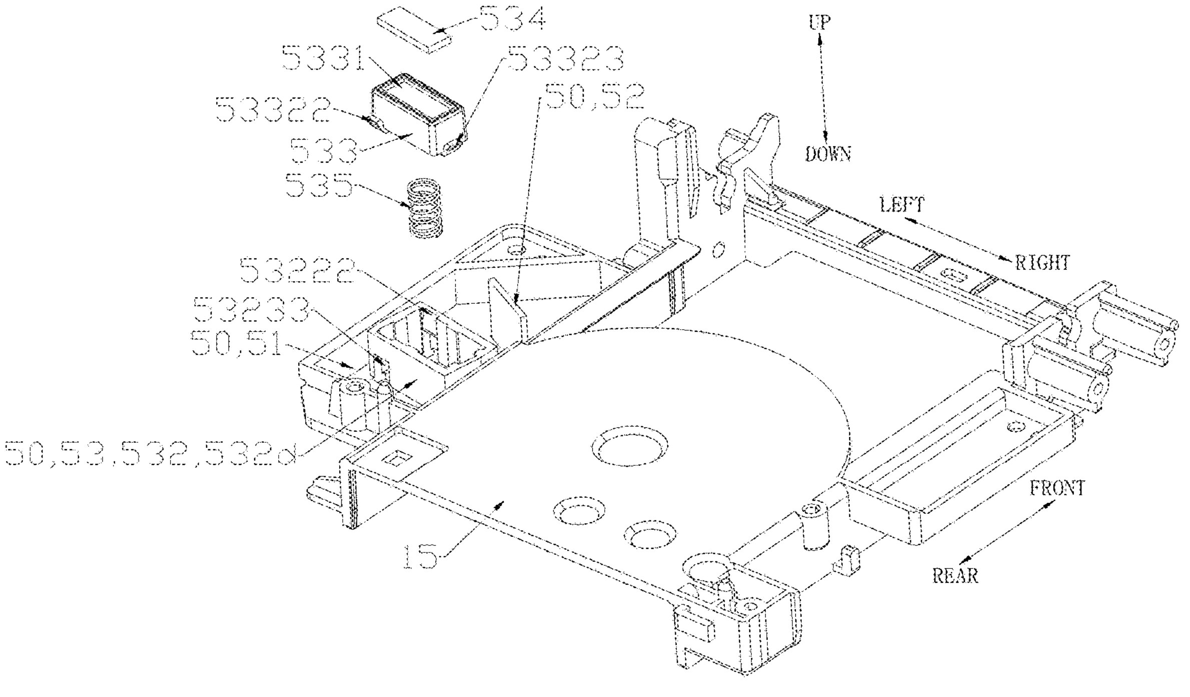
Figure 90:
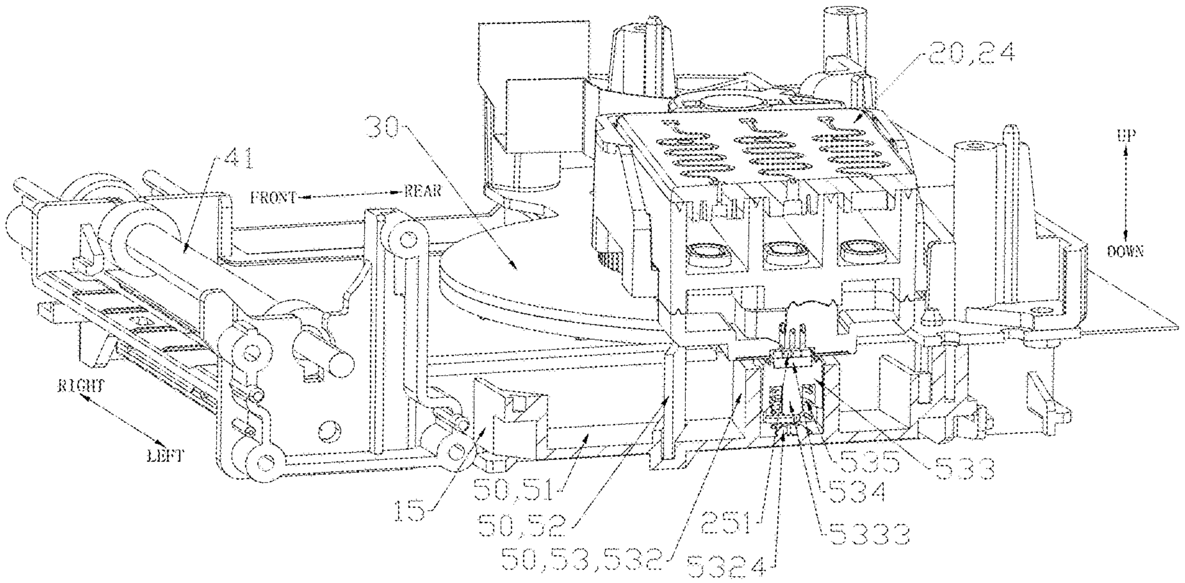
FIG. 90 is a cross-sectional view of the first embodiment of the sealing member in a portable inkjet photo printer according to the present disclosure, with some components hidden, observed from left to right when the inkjet device is sealed by the sealing member.
Figure 91A:
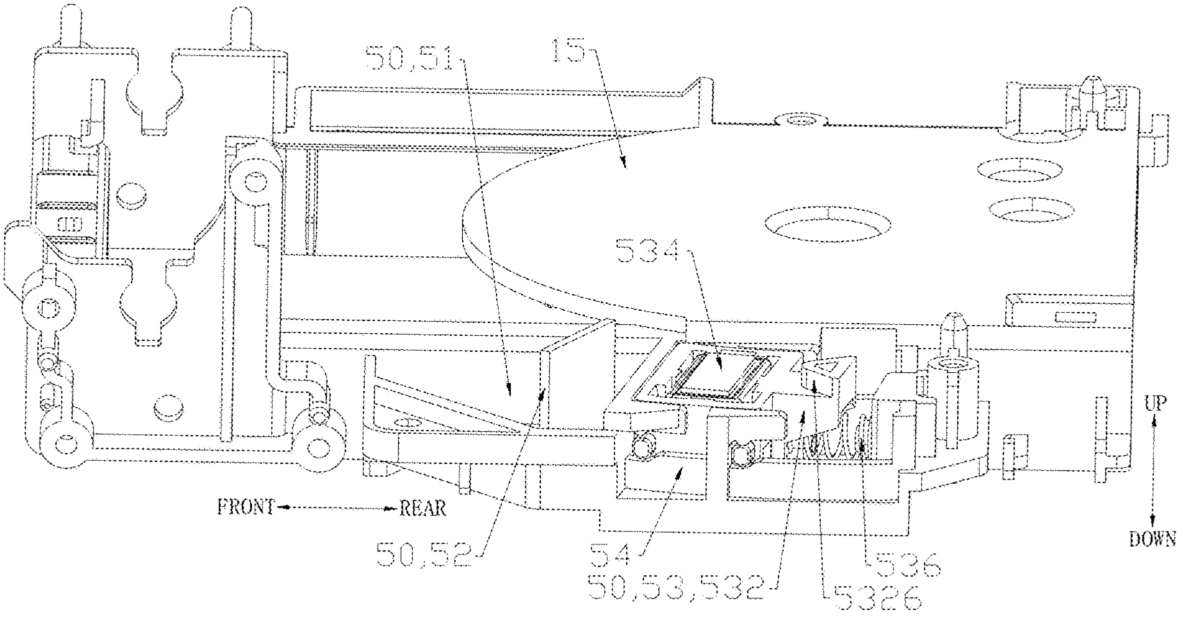
FIG. 91A is a schematic view of a second embodiment of the sealing member in a portable inkjet photo printer according to the present disclosure, with some components hidden, when the sealing member is in a first state.
Figure 91B:
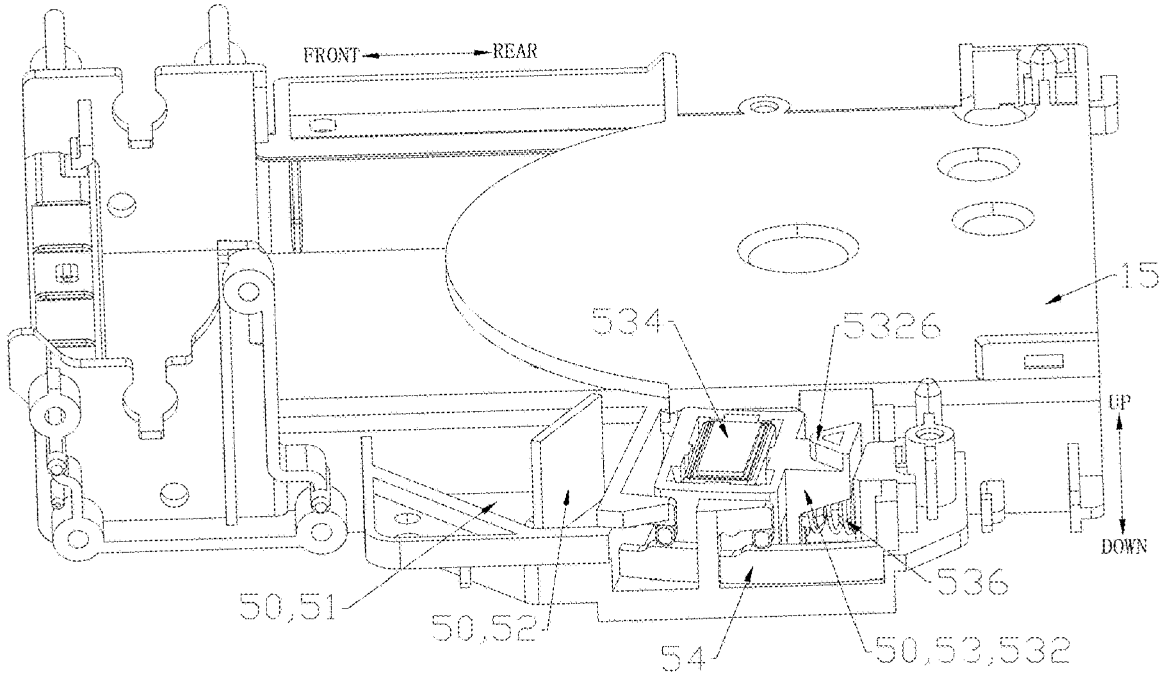
FIG. 91B is a schematic view of the second embodiment of the sealing member in a portable inkjet photo printer according to the present disclosure, with some components hidden, when the sealing member is in a second state.
Figure 92:
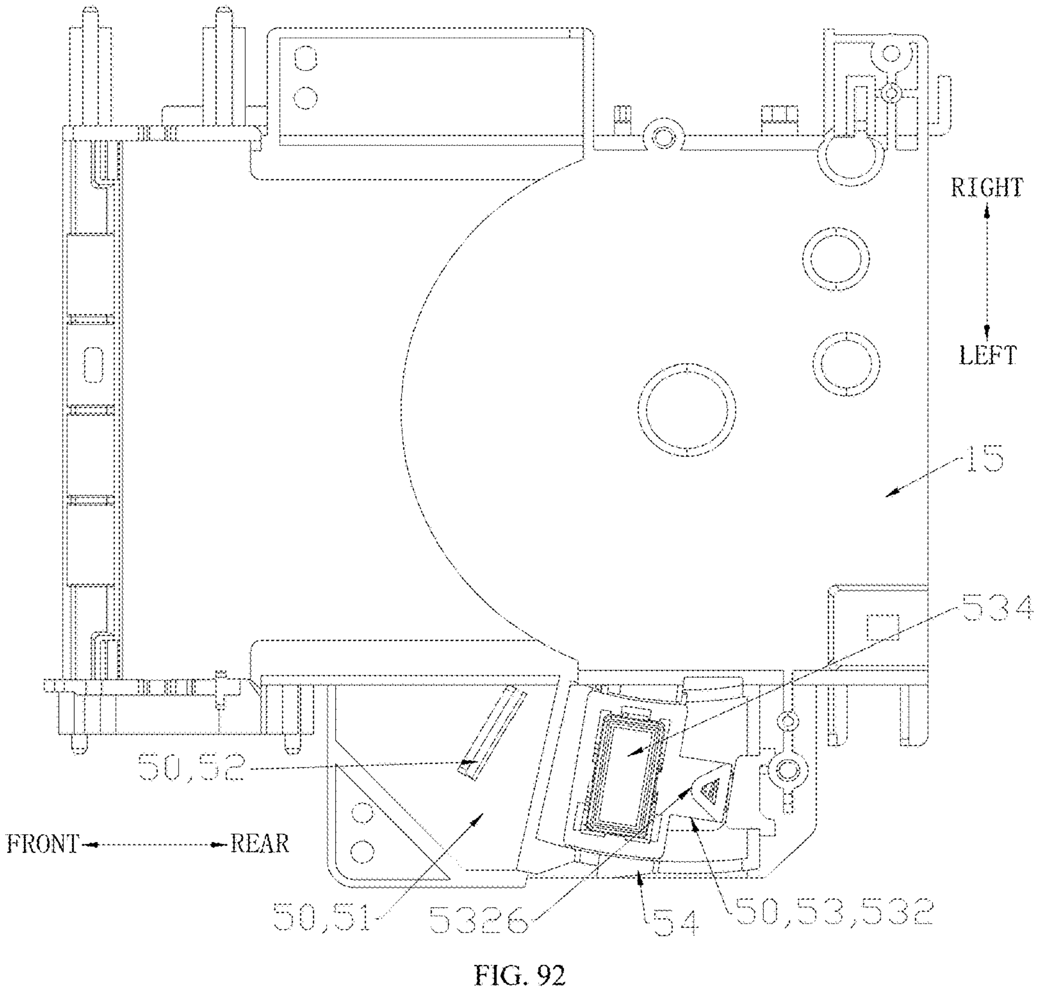
FIG. 92 is a schematic view of the second embodiment of the sealing member in a portable inkjet photo printer according to the present disclosure, with some components hidden, observed from top to bottom.

In some embodiments, as shown in FIG. 85, along the left-right direction, the second electrical connector 704 is disposed on the left side of the internal components. The second electrical connector 704 is specifically a ground wire between the paper feeding mechanism 40/second motor 62 and the first circuit board 701/second circuit board 702.

[Communication Module]

The printer further includes a communication module. The communication module is configured to transmit data between the printer and external devices. The communication module may be a wired communication module and/or a wireless communication module.

When the communication module is a wired communication module, the wired communication module may be Universal Serial Bus (USB), High Definition Multimedia Interface (HDMI), etc.

When the communication module is a wireless communication module, the wireless communication module may be Wireless Local Area Network Wi-Fi (IEEE 802.11), Bluetooth, Zigbee (IEEE 802.15.4), NFC (Near Field Communication), etc.

[Cover Opening Mechanism]

Cover Opening Mechanism Embodiment 1

Figure 9:
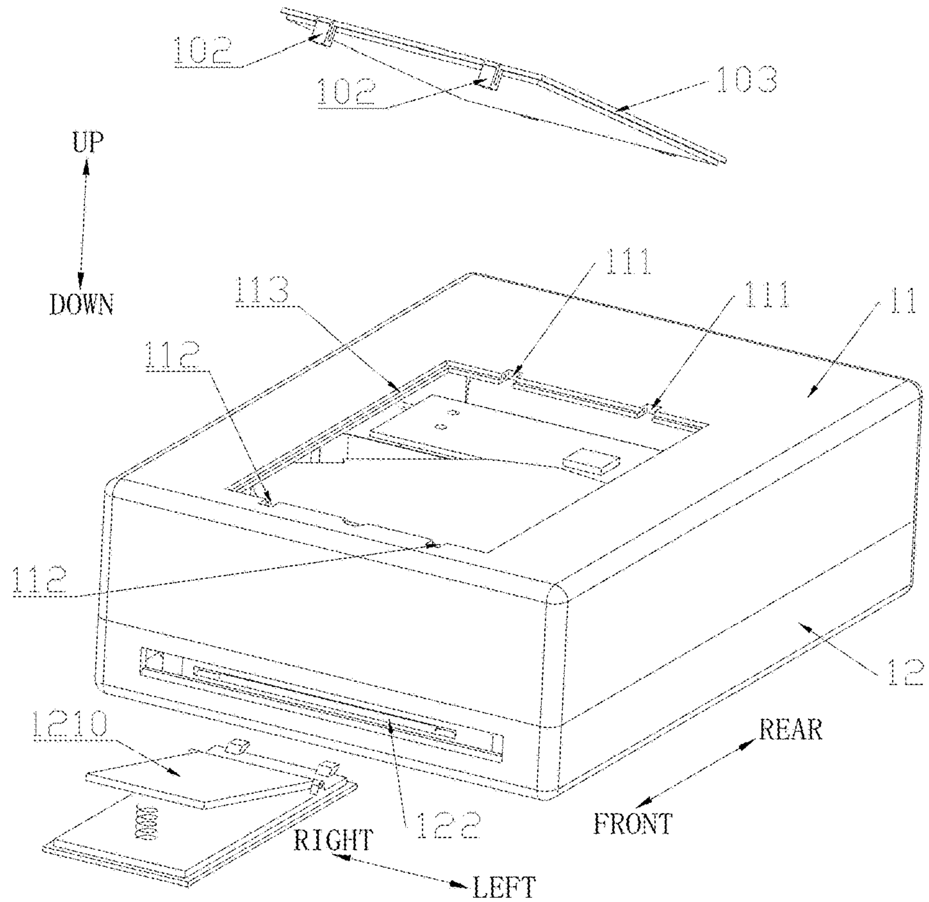

As shown in FIG. 8 to FIG. 9, the housing assembly includes a first housing 11 and a second housing 12. The first housing 11 and the second housing 12 are detachably connected, specifically preferably by snap-fitting. A cover member 10 is disposed on the first housing 11. The cover member 10 is slidably inserted into or hinged to the first housing 11. For example, the cover member 10 is slidably inserted into the first housing 11 along a straight line or an arc. The cover member 10 may also be hinged relative to the first housing 11. When the cover member 10 is inserted into the first housing 11, a sliding groove 113 is provided around the opening disposed on the first housing 11. A protrusion 103 cooperating with the sliding groove 113 is disposed on the cover member 10. The cover member 10 translates and slides until the sliding groove 113 and the protrusion 103 cooperate, thereby realizing cover opening. In other embodiments, the first housing 11 may be provided with a protrusion 103, and the cover member 10 may be provided with a sliding groove 113 cooperating with the protrusion 103, which is not limited herein.

When the cover member 10 is hinged to the first housing 11, the cover member 10 is provided with a support arm 101. A recess 111 is provided on the opening side of the first housing 11. The support arm 101 cooperates with the recess 111 so that the cover member 10 rotates relative to the first housing 11. Along the front-rear direction, a snap member 102 is disposed at one end of the cover member 10 far from the support arm 101. A fastener 112 is disposed on the first housing 11. When the cover member 10 is closed, the snap member 102 and the fastener 112 cooperate with each other to realize cover closing. In other embodiments, the fastener 112 may be disposed on the cover member 10, and the snap member 102 may be disposed on the first housing 11, which is not limited herein.

Cover Opening Mechanism Embodiment 2

Example 1

Figure 44:
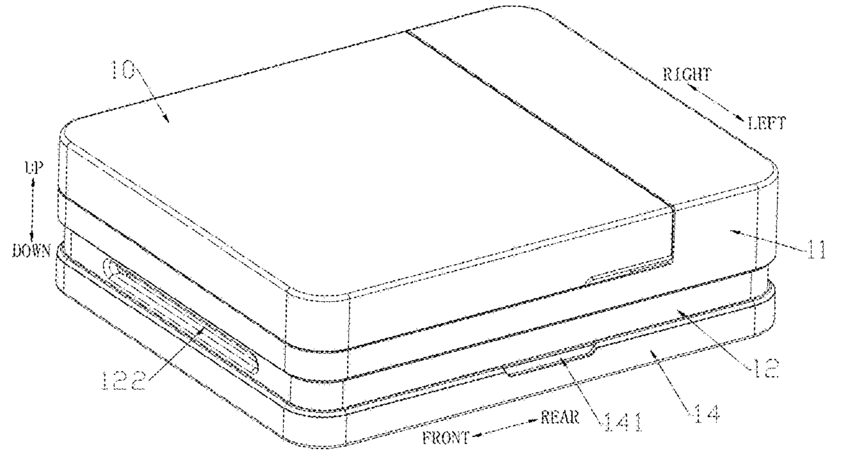
FIG. 44 to FIG. 47 are schematic views of a second embodiment of a cover opening mechanism in a portable inkjet photo printer according to the present disclosure.
Figure 45:
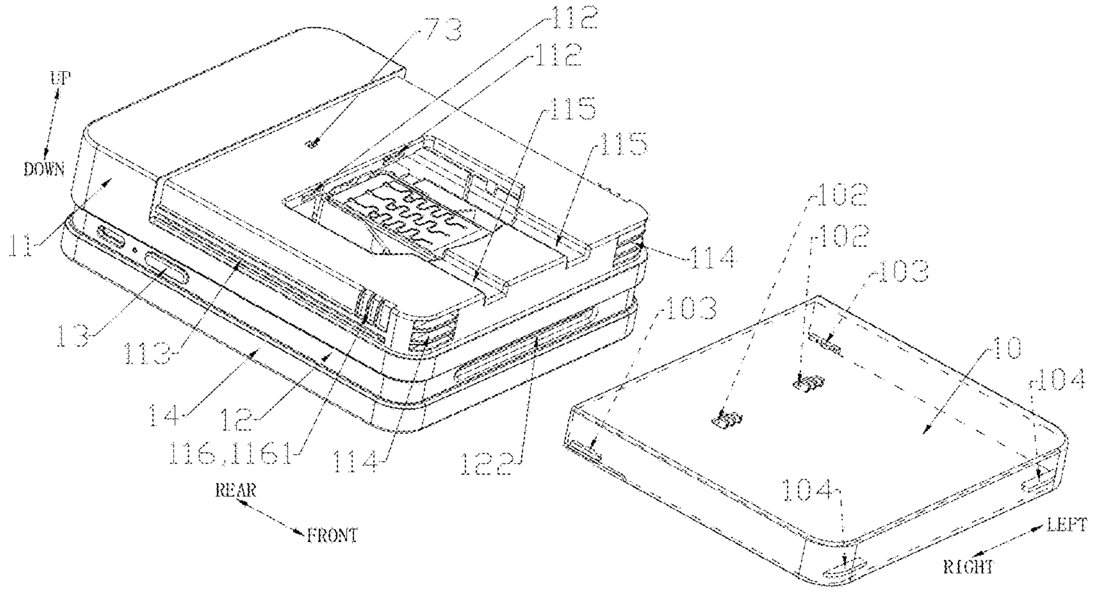
Figure 46:
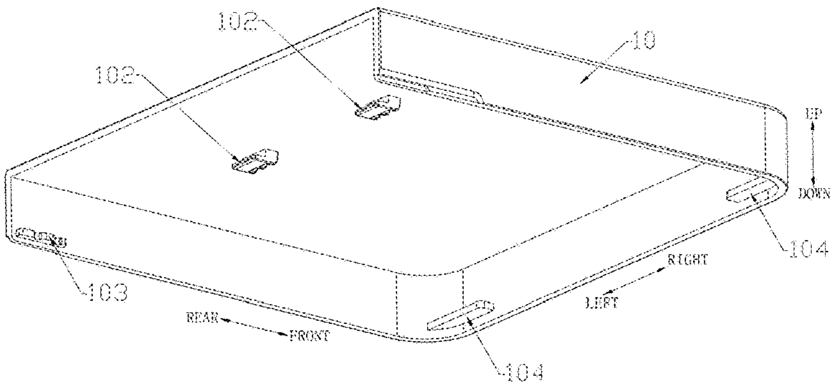

As shown in FIG. 44 to FIG. 46, in some embodiments, the cover member 10 is slidably engaged with the first housing 11. For example, the cover member 10 is slidably engaged with the first housing 11 along a straight line. Further, the cover member 10 slides backward to close and forward to open. Specifically, a sliding groove 113 is disposed on the first housing 11. The sliding groove 113 extends along the front-rear direction. The number of sliding grooves 113 is preferably two, spaced apart in the left-right direction. The two sliding grooves 113 are disposed at the left and right ends of the first housing 11. A protrusion 103 cooperating with the sliding groove 113 is disposed on the cover member 10. The number of protrusions 103 is also two. The sliding groove 113 cooperates with the protrusion 103 to guide the cover member 10 to slide along the front-rear direction. In other embodiments, the sliding groove 113 and the protrusion 103 may be interchanged.

A fastener 112 is further disposed on the first housing 11, and a snap member 102 is further disposed on the cover member 10. When the cover member 10 slides backward, the snap member 102 cooperates (snap-fit) with the fastener 112 to realize the closing of the cover member 10. Specifically, the number of fasteners 112 and snap members 102 may be one or more. In this embodiment, the number of fasteners 112 and snap members 102 is preferably two, so that the cover member 10 is more stably engaged with the first housing 11. In other embodiments, the fastener 112 and the snap member 102 may be interchanged.

Further, a first clearance portion 115 is further disposed on the first housing 11. The first clearance portion 115 is configured to avoid the snap member 102 to prevent interference between the snap member 102 and the first housing 11, thereby making the sliding of the cover member 10 relative to the first housing 11 smoother, which is conducive to the opening and closing of the cover member 10.

A guide recess 114 is further disposed on the first housing 11. A guide protrusion 104 cooperating with the guide recess 114 is disposed on the cover member 10. The guide protrusion 104 is configured to enable the cover member 10 to be correctly engaged with the first housing 11. Specifically, when the cover member 10 is not correctly engaged with the first housing 11, the guide protrusion 104 will interfere with the first housing 11. At this time, the cover member 10 cannot be closed. Therefore, the user may be reminded to correctly close the cover member 10.

In some embodiments, the first sensor 73 for detecting the open/closed state of the cover member 10 may also be disposed on the first housing 11. When the cover member 10 is opened and closed, the first sensor 73 can detect a signal change and then send a signal to the control module. The control module drives the printing mechanism 20 to move between the non-working area and the working area.

Figure 47:
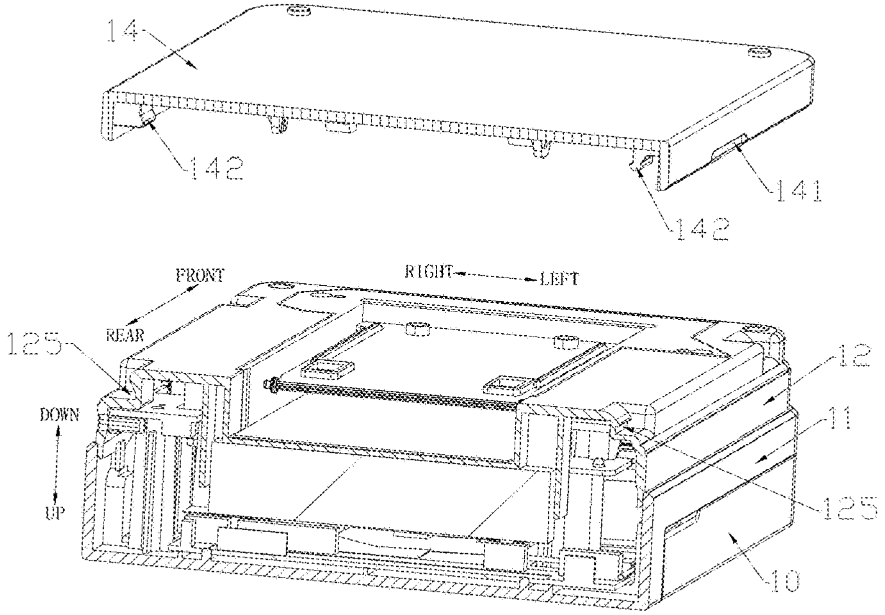

As shown in FIG. 44 and FIG. 47, in some embodiments, a paper cassette cover plate 14 is disposed on the second housing 12. The paper cassette cover plate 14 and the second housing 12 are detachably connected, for example, by snap-fitting. Specifically, a snap slot 125 is disposed on the second housing 12, and a snap buckle 142 is disposed on the paper cassette cover plate 14. The snap buckle 142 cooperates with the snap slot 125 to install the paper cassette cover plate 14 on the second housing 12. Further, the snap buckle 142 is configured as a hook-shaped snap buckle to make the installation of the paper cassette cover plate 14 more stable. In other embodiments, the snap slot 125 and the snap buckle 142 may be interchanged.

In some embodiments, a recess portion 141 is disposed on the paper cassette cover plate 14. The recess portion 141 is configured to open the paper cassette cover plate 14.

In some embodiments, as shown in FIG. 45, FIG. 46, FIG. 62A, and FIG. 62B, a guide portion 116 is disposed on the first housing 11. Preferably, two guide portions 116 are spaced apart in the left-right direction. In other words, the two guide portions 116 are disposed at the left and right ends of the first housing 11. In the up-down direction, the guide portion 116 is located above the sliding groove 113. In the front-rear direction, the guide portion 116 is located at one end close to the guide recess 114. In this embodiment, the guide portion 116 includes a plurality of ribs 1161 extending along the up-down direction. The plurality of ribs 1161 are spaced apart along the front-rear direction. The guide portion 116/ribs 1161 are configured to cooperate with the protrusion 103 disposed on the cover member 10 to guide the upper cover protrusion 103 in the up-down direction, thereby guiding the cover member 10.

Figure 62A:
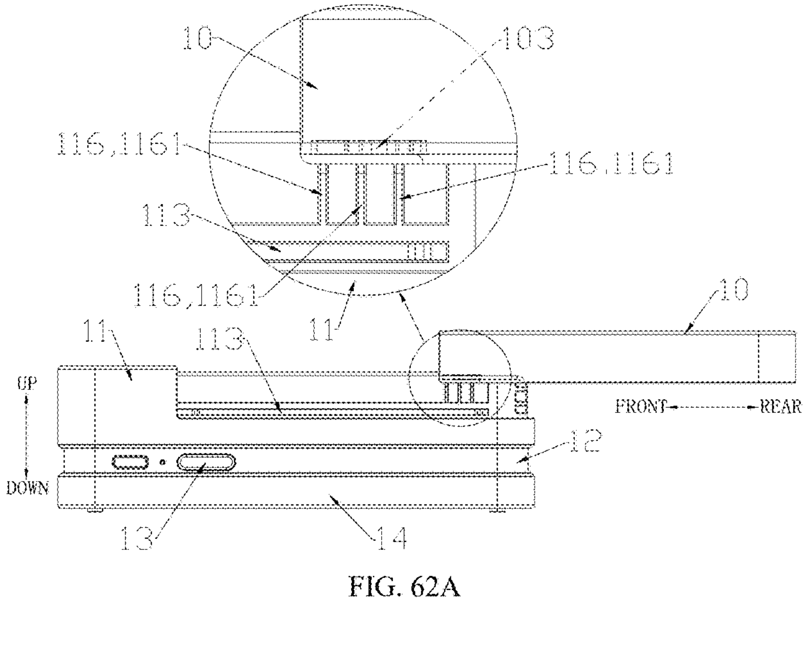
FIG. 62A and FIG. 62B are schematic views of an installation process of a cover member in the second embodiment of the cover opening mechanism in a portable inkjet photo printer according to the present disclosure.
Figure 62B:
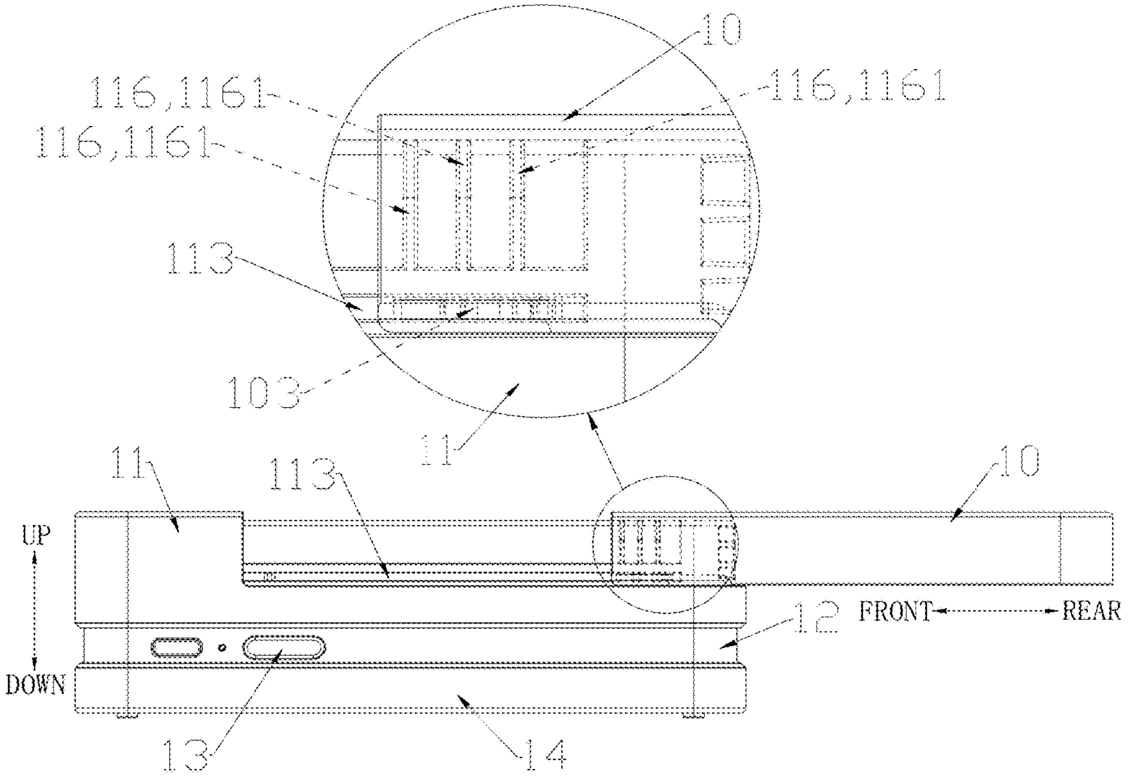

When assembling the cover member 10, as shown in FIG. 62A and FIG. 62B, after the guide portion 116/ribs 1161 cooperate with the protrusion 103, the cover member 10 moves downward along the up-down direction, causing the protrusion 103 to enter the sliding groove 113. At this time, the cover member 10 can be completely installed by moving forward along the front-rear direction, i.e., closing the cover member 10.

Example 2

As shown in FIG. 48B, in some embodiments, the cover member 10 and the first housing 11 are slidably engaged. For example, the cover member 10 is placed on the first housing 11 along the up-down direction, and then slid along the front-rear direction to engage with the first housing 11. The cover member 10 closes forward and opens backward. Specifically, the sliding groove 113 disposed on the first housing 11 is recessed from the side facing the cover member 10 toward the direction close to the second housing 12. The sliding groove 113 extends along the front-rear direction. The sliding groove 113 includes adjacent first and second parts. Along the front-rear direction, in the closing direction of the cover member 10, the first part is located behind (upstream of) the second part. In the left-right direction, the distance of the first part is larger than the distance of the second part. The first part of the cover member 10 is provided with a protrusion (not shown) cooperating with the sliding groove 113. When the cover member 10 closes forward, the protrusion enters the first part of the sliding groove 113 and slides forward, and then engages with the second part of the sliding groove 113.

[Guide Mechanism]

In some embodiments, the printer further includes a guide mechanism for guiding the printing mechanism 20 to ensure that the printing mechanism 20 can move along the specific trajectory. This avoids deformation of the printing mechanism 20 or a part of the driving assembly due to the gravity of the printing mechanism 20 itself, which would cause the printing mechanism 20 to fail to move according to the preset specific trajectory, affecting the image forming quality of the printing mechanism 20 on the printing medium.

Guide Mechanism Embodiment 1

The guide mechanism is disposed inside the printer and located on one side of the printing mechanism 20. The guide mechanism includes a guide portion G1 and a guided portion G2 in contact with each other. There may be sliding friction/rolling friction between the guide portion G1 and the guided portion G2.

Further, the guide mechanism is disposed between the printing mechanism 20 and the housing assembly. In this embodiment, the guide mechanism is disposed between the printing support mechanism 30 and the rotating member 23.

Figure 12:
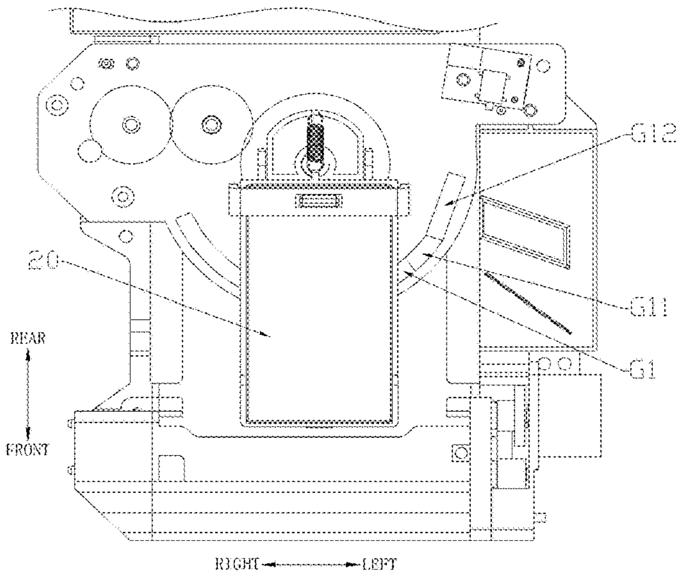
FIG. 12 is a second schematic view of the first embodiment of the guide mechanism in a portable inkjet photo printer according to the present disclosure.

Preferably, the guide portion G1 is configured as a groove structure, and the guided portion G2 is configured as a protrusion structure. The guided portion G2 is disposed on the side of the printing mechanism 20 close to the printing support mechanism 30. The guide portion G1 is disposed on the side of the printing support mechanism 30 close to the printing mechanism 20. The positions of the guide portion G1 and the guided portion G2 may be interchanged. As shown in FIG. 11 and FIG. 12, the guide portion G1 is recessed from the surface of the printing support mechanism 30 close to the printing mechanism 20 in a direction away from the printing mechanism 20. The guided portion G2 is disposed protruding from the surface of the printing mechanism 20 close to the printing support mechanism 30 toward the direction close to the printing support mechanism 30. More preferably, the guided portion G2 may also be configured as a ball (not shown in the figure). The ball is movably connected to the printing mechanism 20.

Further, the guide mechanism may also be disposed between the printing mechanism 20 and the paper feeding mechanism 40.

Further, the guide mechanism may also be disposed between the printing mechanism 20 and the paper cassette 80.

Further, the guide mechanism may also be disposed between the printing mechanism 20 and the driving assembly.

Further, in this embodiment, the guide mechanism further includes a guide inclined surface G11 and a sealing clearance groove G12. In the up-down direction, the sealing clearance groove G12 and the guide inclined surface G11 are located below the guide portion G1. When the printing mechanism 20 is located at the sealing position, the guided portion G2 is located inside the sealing clearance groove G12. The guide inclined surface G11 is located between the sealing clearance groove G12 and the guide portion G1. The uppermost part of the guide inclined surface G11 is connected to the guide portion G1, and the lowermost part of the guide inclined surface G11 is connected to the sealing clearance groove G12.

Still further, the housing assembly is provided with a pushing member. When the printing mechanism 20 moves to the sealing position, the pushing member applies a pushing force to the printing mechanism 20, so that the printing mechanism 20 abuts and seals better with the sealing member 53 at the sealing position, thereby improving the sealing effect.

Guide Mechanism Embodiment 2

Figure 13:
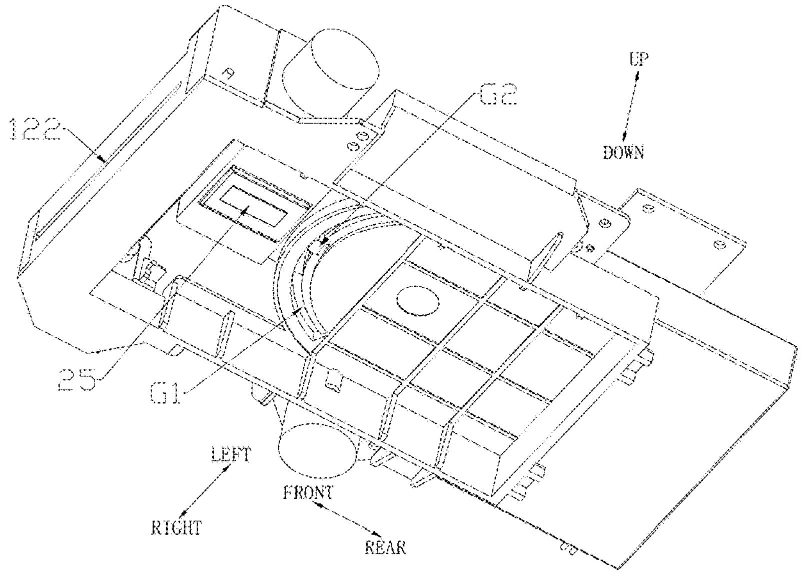
FIG. 13 is a schematic view of a second embodiment of the guide mechanism in a portable inkjet photo printer according to the present disclosure.

As shown in FIG. 13, the difference between Guide Mechanism Embodiment 2 and Guide Mechanism Embodiment 1 is that the guided portion G2 is configured as a hook-like structure. The guide portion G1 is configured as a through-groove structure cooperating with the hook-like structure. In this embodiment, the guided portion G2 is disposed on the printing mechanism 20, and the guide portion G1 is a through-groove structure opened on the printing support mechanism 30.

Guide Mechanism Embodiment 3

Figure 14:
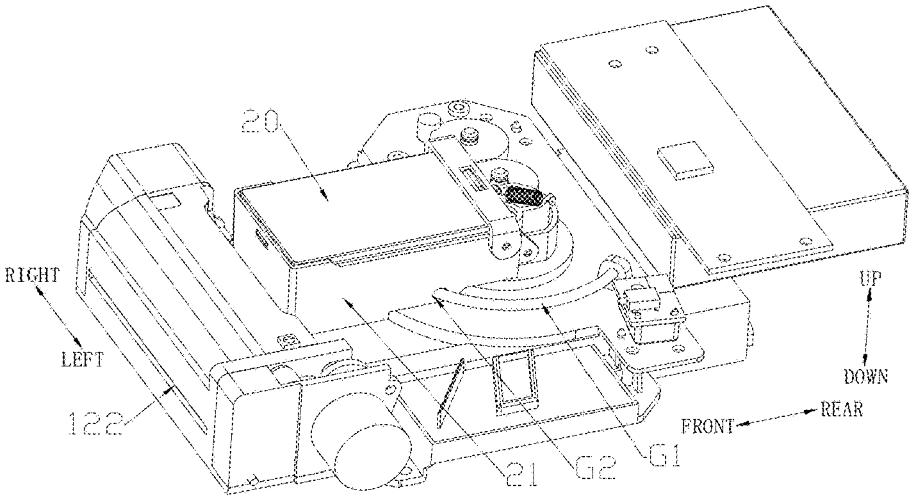
FIG. 14 is a schematic view of a third embodiment of the guide mechanism in a portable inkjet photo printer according to the present disclosure.

As shown in FIG. 14, the difference between Guide Mechanism Embodiment 3 and Guide Mechanism Embodiment 1 is that the guided portion G2 is configured as a through-groove, and the guide portion G1 is configured as a rod-like structure or guide rail structure matching the specific trajectory. In this embodiment, the guided portion G2 is a through-hole/through-groove disposed on the printing carriage 21. The guide portion G1 is a rod-like structure disposed on the printing support mechanism 30. Specifically, the shape of the rod-like structure is configured to be an arc matching the specific trajectory.

One embodiment of a portable inkjet photo printer is described below. The printer has a photographing function. If necessary, the structures described above may also be implemented in the printer of the following embodiment. Details are as follows.

As shown in FIG. 134A, FIG. 134B, and FIG. 134C, the printer is further provided with a camera 831 for photographing. In the up-down direction, the camera 831 faces downward. Specifically, the camera 831 is configured to be exposed downward from the housing assembly. An annular protrusion 832 is further disposed on the lower side of the printer. The annular protrusion 832 is connected to the housing assembly and disposed around the camera 831. In the up-down direction, the annular protrusion 832 protrudes downward from the housing assembly. Further, in the up-down direction, the annular protrusion 832 protrudes downward beyond the camera 831. Still further, the annular protrusion 832 has a horizontally disposed lower end surface 8321. After photographing is completed, the printer may be placed horizontally through the horizontally disposed lower end surface 8321, which is conducive to ensuring the image forming quality of the inkjet printing of the printer. Further, the number of annular protrusions 832 is one or more. When multiple annular protrusions 832 are provided, multiple annular protrusions 832 are spaced apart along the circumferential direction of the camera 831.

In some embodiments, as shown in FIG. 134A, FIG. 134B, and FIG. 135, the cover member 10 is configured to be rotatable relative to the first housing 11. Further, a quick-release member 84 is also disposed between the cover member 10 and the first housing 11. The quick-release member 84 is configured to enable the cover member 10 to be combined to/disengaged from the first housing 11 conveniently and quickly. For example, the quick-release member 84 includes a snap buckle 841 and a snap slot 842. The snap buckle 841 is disposed on the cover member 10 and has elasticity. The snap slot 842 is disposed on the first housing 11. The cover member 10 is locked by the cooperation of the snap buckle 841 and the snap slot 842. By pressing the snap buckle 841, the snap buckle 841 disengages from the snap slot 842, and then the cover member 10 can be rotated to the open state. An operating opening 110 is disposed on the first housing 11. In the up-down direction, at least a part of the operating opening 110 overlaps with the cover member 10. After rotating the cover member 10 upward to the open state, the printing mechanism 20 (specifically the ink storage portion 24 and the inkjet device 25) may be replaced through the operating opening 110. Among them, as shown in FIG. 8, FIG. 45, FIG. 48B, FIG. 129D, and FIG. 135, the operating opening 110 is disposed on the upward-facing surface of the first housing 11. With such a configuration, the overall structural strength of the first housing 11 can be ensured.

In some embodiments, as shown in FIG. 134A, FIG. 134B, and FIG. 136, the printer is further provided with a display component 833, such as a display screen. The display screen 833 is configured to display the picture before shooting and the photo after shooting. Further, as shown in FIG. 148, the display screen 833 is disposed on the cover member 10. In the up-down direction, when the cover member 10 is closed on the first housing 11, the display screen 833 at least partially overlaps with the operating opening 110. Moreover, in the up-down direction, the camera 831 and the display screen 833 are respectively located on opposite sides of the printer/housing assembly. For example, in the up-down direction, the camera 831 is located below the display screen 833. This can make the structure of the printer compact and more convenient to use. Further, as shown in FIG. 135, the operating opening 110 includes a first part close to the paper outlet 122 and a second part far from the paper outlet. Along the front-rear direction, the first part is located in front of the second part. Along the left-right direction, a width of the first part is greater than a width of the second part. When the printing mechanism 20 is in a predetermined position, along the up-down direction, the printing mechanism 20 has overlapping sections with the first part and the second part respectively, and the printing mechanism 20 overlaps with the operating opening 110. With such a configuration, when the printing mechanism 20 moves to the predetermined position, the printing mechanism 20 is located at a middle position of the first part, so that a user can extend fingers into the operating opening at both left and right sides of the printing mechanism 20 to hold and take out the printing mechanism 20. The width of the second part is smaller than the width of the first part, which can not only ensure that the shape of the operating opening allows for installation or disassembly of the printing mechanism 20, but also reduce the area of the operating opening to avoid external influences on the interior of the printer. Preferably, as shown in FIG. 45, FIG. 129D, and FIG. 135, a side of the operating opening 110 close to the paper outlet 122 is arc-shaped.

In some embodiments, as shown in FIG. 134A and FIG. 134B, the printer is further provided with a control component 834. The control component 834 is configured to control the printer to perform operations such as power on/off, shooting, selection, saving, deleting, and printing. For example, the control component 834 includes a first button/shutter 8341 and other buttons 8342. The first button/ shutter 8341 is at least used for taking photos. The other buttons 8342 are set to be at least one.

In some embodiments, as shown in FIG. 135, a first sensor 73 (not shown) is disposed between the cover member 10 and the first housing 11. When the cover member 10 is opened, the first sensor 73 detects that the cover member 10 is opened and outputs a signal. The printing mechanism 20 is driven to move opposite to the operating opening 110 to facilitate the replacement of the printing mechanism 20 (specifically the ink storage portion 24 and the inkjet device 25). Further, the first sensor 73 is disposed on the cover member 10 or the first housing 11.

In some embodiments, as shown in FIG. 134A and FIG. 136, the paper cassette cover plate 14 is disposed on the rear side of the printer/housing assembly. After opening the paper cassette cover plate 14, printing media (e.g., photo paper) may be replenished. In the front-rear direction, the paper cassette cover plate 14 and the paper outlet 122 are respectively located on opposite sides of the printer/housing assembly. Further, the printer is also provided with a paper cassette guide mechanism 802. The paper cassette guide mechanism 802 is configured to guide and limit the printing medium, so that the printing medium can be smoothly transported along the paper discharge direction toward the paper outlet 122. Specifically, the paper cassette guide mechanism 802 is disposed on the paper cassette cover plate 14. For example, the paper cassette guide mechanism 802 extends from the paper cassette cover plate 14 toward the paper outlet 122. Further, the paper cassette guide mechanism 802 is configured as a groove structure.

In some embodiments, a flash light (not shown) is further disposed on the lower side of the printer. Further, the direction of the flash light is the same as the direction of the camera 831. For example, in the up-down direction, the flash light faces downward.

In some embodiments, the printer is further provided with a speaker (not shown). Further, the speaker may be disposed at any position of the housing assembly.

In some embodiments, as shown in FIG. 134B and FIG. 143, the printer further includes a detachably disposed paper cassette 80. Further, the paper cassette 80 is configured to be installed into/inserted into the housing assembly from the side of the housing assembly. For example, the paper cassette 80 is inserted into the printer from the rear side of the printer. When the user needs to add printing media, the paper cassette 80 may be pulled out from the housing assembly/body of the printer.

Detachable Paper Cassette Embodiment 1

In the first embodiment of the detachable paper cassette, as shown in FIG. 144A, FIG. 144B, and FIG. 144C, the paper cassette 80 includes a paper cassette bottom shell 801*a* (an example of the paper cassette cover plate 14), a paper cassette side plate 801*c*, and a storage space 801*d* formed in the paper cassette bottom shell 801*a*. The storage space 801*d* is configured to store printing media. The paper cassette 80 further includes a paper cassette limiting portion 801*a*1. In the up-down direction, the paper cassette limiting portion 801*al* is located above the paper cassette bottom shell 801*a*. The paper cassette side plate 801*c* intersects with the paper cassette bottom shell 801*a*. Preferably, the paper cassette side plate 801*c* is disposed perpendicular to the paper cassette bottom shell 801*a*. For example, the paper cassette side plate 801*c* is disposed facing the front-rear direction. The paper cassette bottom shell 801*a* is disposed facing the up-down direction. The paper cassette bottom shell 801*a* and the paper cassette side plate 801*c* are integrally or separately formed.

As shown in FIG. 144A, FIG. 144B, and FIG. 144C, the paper cassette 80 further includes a pushing component 802 movably disposed relative to the paper cassette bottom shell 801*a* and/or the paper cassette side plate 801*c*. The pushing component 802 is configured to apply an acting force to the printing medium in the paper cassette 80 when the paper cassette bottom shell 801*a* is detached relative to the housing assembly, to prevent the printing medium from slipping out of the paper cassette 80, for example, the pushing component 802 can move along the up-down direction. Further, the pushing component 802 is movably disposed on the paper cassette side plate 801*c*. Specifically, the pushing component 802 includes a pushing main body 802*a*, a first force receiving portion 802*b*, a first pushing portion 802*c*, and a third guided portion 802*d*. Specifically, the first force receiving portion 802*b* is recessed from the pushing main body 802*a*. The first pushing portion 802*c* is connected to the pushing main body 802*a*. The first pushing portion 802*c* also intersects with the pushing main body 802*a*. For example, the first pushing portion 802*c* is perpendicular to the pushing main body 802*a*. In the front-rear direction, the first pushing portion 802*c* is located in front of the first force receiving portion 802*b*. The third guided portion 802*d* is disposed at the end of the pushing main body 802*a* along the left-right direction. Preferably, the number of the third guided portions 802*d* is two. The two third guided portions 802*d* are respectively located at the left and right ends of the pushing main body 802*a*. Optionally, the third guided portion 802*d* extends along the up-down direction.

Further, the paper cassette 80 also includes a clearance portion 801*c*1 disposed in the middle of the paper cassette side plate 801*c*, and a third guide portion 801*c*2 disposed at the end of clearance portion 801*c*1 along the left-right direction. The third guide portion 801*c*2 extends along the up-down direction. The third guide portion 801*c*2 is configured to cooperate with the third guided portion 802*d* to guide the pushing component 802 to move along the up-down direction. Specifically, the third guide portion 801*c*2 is configured as a groove, and the third guided portion 802*d* is configured as a protrusion, or the third guide portion 801*c*2 is configured as a protrusion, and the third guided portion 802*d* is configured as a groove.

As shown in FIG. 144A, FIG. 144B, and FIG. 144C, the paper cassette 80 further includes a limiting component 803. The limiting component 803 is configured to limit the upward movement distance of the pushing component 802, thereby preventing the pushing component 802 from detaching from the paper cassette side plate 801*c*. Further, the limiting component 803 is disposed on the paper cassette limiting portion 801*al*. In other embodiments, the limiting component 803 may also be disposed at other positions.

As shown in FIG. 144A, FIG. 144B, and FIG. 144C, the paper cassette 80 further includes an elastic component 804. The elastic component 804 is located between the pushing component 802 and the paper cassette bottom shell 801*a* to provide a restoring force for upward movement to the pushing component 802. In this embodiment, the elastic component 804 is configured as a spring.

As shown in FIG. 144A, FIG. 144B, and FIG. 144C, the paper cassette 80 further includes a plurality of friction members 805 disposed on the left and right sides of the paper cassette bottom shell 801*a*. When adding printing media, the friction members 805 are located between the printing medium and the paper cassette bottom shell 801*a* to increase the friction between the paper cassette bottom shell 801*a* and the printing medium, further preventing the printing medium from slipping. Optionally, the friction members 805 are configured as protrusions.

After the printing medium is placed in the storage space 801*d*, when inserting the paper cassette 80 into the printer, the user pushes the first force receiving portion 802*b* and applies a downward force. The pushing component 802/first pushing portion 802*c* moves downward and applies a downward force to the printing medium. The elastic component 804 undergoes elastic deformation. The printing medium is clamped by the first pushing portion 802*c*/pushing component 802 and the paper cassette bottom shell 801*a*, which can prevent the printing medium from slipping out of the paper cassette 80. After the paper cassette 80 is installed in place and the first force receiving portion 802*b* is released, under the elastic force of the elastic component 804, the pushing component 802/first pushing portion 802*c* resets upward. When adding or replacing printing media, the user pushes the first force receiving portion 802*b* and applies a downward force. The pushing component 802/first pushing portion 802*c* moves downward and applies a downward force to the printing medium. The printing medium is clamped by the first pushing portion 802*c*/pushing component 802 and the paper cassette bottom shell 801*a*. At the same time, the paper cassette 80 is pulled out from the printer, which can prevent the printing medium from slipping out of the paper cassette 80 and remaining inside the printer. The pushing component 802/first pushing portion 802*c* moves downward as shown in FIG. 144B.

Detachable Paper Cassette Embodiment 2

In the second embodiment of the detachable paper cassette, the paper cassette 80 includes a paper cassette bottom shell 801*a*, a paper cassette side plate 801*c*, a storage space 801*d* formed in the paper cassette bottom shell 801*a*, a pushing component 802, and an elastic component 804. The pushing component 802 is rotatably disposed relative to the paper cassette bottom shell 801*a*/paper cassette side plate 801*c*. The elastic component 804 is preferably a torsion spring.

Specifically, as shown in FIG. 145A, FIG. 145B, and FIG. 145C, the pushing component 802 includes a first side plate 8022*a*, a second side plate 8022*b*, and a third side plate 8022*c*. In the left-right direction, the first side plate 8022*a* and the third side plate 8022*c* are spaced opposite to each other. The second side plate 8022*b* connects the first side plate 8022*a* and the third side plate 8022*c*. Or in other words, the first side plate 8022*a* and the third side plate 8022*c* extend from the left and right ends of the second side plate 8022*b*, respectively. The first side plate 8022*a* and the third side plate 8022*c* intersect with the second side plate 8022*b*. For example, the first side plate 8022*a* and the third side plate 8022*c* are perpendicular to the second side plate 8022*b*. Further, the paper cassette 80 further includes a third guide portion 801*c*2 and a third guided portion 802*d*. Specifically, the third guide portion 801*c*2 is disposed on the paper cassette bottom shell 801*a*/paper cassette side plate 801*c*. The third guided portion 802*d* and the pushing component 802 are formed separately. Still further, the third guide portion 801*c*2 is configured as a groove/hole. The third guided portion 802*d* is configured as a shaft. Specifically, the third guided portion 802*d* has a rotation axis parallel to the left-right direction. Further, the first side plate 8022*a* and the third side plate 8022*c* are respectively provided with a through hole 8022*d*. The third guided portion 802*d* passes through the two through holes 8022*d* and then snaps into the third guide portion 801*c*2, so that the pushing component 802 is installed on the paper cassette bottom shell 801*a*/paper cassette side plate 801*c* and can rotate around the third guided portion 802*d*. Further, the pushing component 802 further includes a handle 8022*e* disposed on the second side plate 8022*b*. When the user needs to add printing media, after pulling the paper cassette 80 out of the printer, pull up the handle 8022*e* to make the pushing component 802 rotate upward, thereby putting the printing medium into the space between the pushing component 802 and the paper cassette bottom shell 801*a*.

Further, the elastic component 804 includes a first end 804*a* and a second end 804*b*. The first end 804*a* is disposed on the third guided portion 802*d*. Specifically, the first end 804*a* is sleeved on the third guided portion 802*d*. The second end 804*b* is connected to the pushing component 802. Still further, the second end 804*b* passes through the second side plate 8022*b* to form the handle 8022*e* in one implementation. When used to pull up the second end 804*b*/handle 8022*e*, the elastic component 804 undergoes elastic deformation. After the addition of printing media is completed, the elastic component 804 applies an elastic restoring force to the pushing component 802. The pushing component 802 rotates around the third guided portion 802*d* and applies force to the printing medium, thereby clamping the printing medium between the pushing component 802 and the paper cassette bottom shell 801*a*, preventing the printing medium from slipping out of the paper cassette 80.

Still further, as shown in FIG. 146, the lower end surface 8022*b*1 of the second side plate 8022*b* is set as an inclined surface to prevent the lower end surface 8022*b*1 from scratching the printing medium when the pushing component 802 rotating. In some embodiments, when adding printing media, the printing media is loaded into the paper cassette 80 from front to back. The side of the printing media abuts against the inclined surface 8022*b*1 and is guided by the inclined surface 8022*b*1 into the storage space 801*d*. At this time, it is not necessary to pull the handle 8022*e*, or the handle 8022*e* may not be provided.

In other embodiments, the third guided portion 802*d* may also be integrally formed with the pushing component 802. Specifically, the third guided portion 802*d* is set as two, and the two third guided portions 802*d* extend from the first side plate 8022*a* and the third side plate 8022*c* along the left-right direction, respectively. In other embodiments, the third guided portion 802*d* disposed separately may also be cancelled, and the third guide portion 801*c*2is configured as a shaft, while the through holes 8022*d* disposed on the first side plate 8022*a* and the third side plate 8022*c* may be regarded as the third guided portion 802*d*.

Detachable Paper Cassette Embodiment 3

In the third embodiment of the detachable paper cassette, as shown in FIG. 147, the paper cassette 80 includes a paper cassette bottom shell 801*a*, a paper cassette side plate 801*c*, a storage space 801*d* formed in the paper cassette bottom shell 801*a*, and a pushing component 802. Specifically, the pushing component 802 is an elastic arm disposed on the paper cassette bottom shell 801*a*. After adding printing media, the pushing component 802 is located between the paper cassette bottom shell 801*a* and the printing medium. Specifically, the pushing component 802 extends obliquely upward from the paper cassette bottom shell 801*a*. For example, the pushing component 802 extends upward and backward from the paper cassette bottom shell 801*a*. The pushing component 802 is configured to apply upward force to the printing medium to prevent the printing medium from slipping out of the paper cassette 80. Preferably, two pushing components 802 are provided, spaced apart in the left-right direction, to keep the printing medium stable. Further, the paper cassette limiting portion 801*al* is configured to restrict the printing medium from continuing to move upward. The printing medium is located between the paper cassette limiting portion 801*al* and the pushing component 802. In other words, the printing medium is clamped by the paper cassette limiting portion 801*al* and the pushing component 802, thereby preventing the printing medium from slipping out of the paper cassette 80.

As shown in FIG. 148, the paper discharge roller 49*a* and the pickup roller 49 of the printer are disposed in the paper cassette 80. In the front-rear direction, the paper discharge roller 49*a*/pickup roller 49 is close to the paper outlet 122. The pickup roller 49 is configured to output the printing medium 01 toward the paper outlet 122. As shown in FIG. 149A, FIG. 149B, and FIG. 150, the pickup roller 49 is disposed at both ends of the paper discharge roller 49*a*. The pickup roller 49 is configured to directly contact the printing medium 01. The paper discharge roller 49 receives rotational driving force and drives the pickup roller 49 to rotate, thereby outputting the printing medium 01.

Further, the printing mechanism 20 performs rotational movement along the arcuate trajectory described above. Along the front-rear direction, the paper discharge roller 49*a* is disposed in front of the printing mechanism 20/printing area. The paper discharge roller 49*a* has at least one pickup roller 49 with a diameter larger than that of the paper discharge roller 49*a*. Along the front-rear direction, when the printing mechanism 20 is located at the aforementioned predetermined position or at a position closest to the paper discharge roller 49*a* (as shown in FIG. 2A, FIG. 15, etc.), there is a gap between the pickup roller 49 and the printing mechanism 20/printing area. The gap range is 1 mm-20 mm, preferably 1 mm-15 mm, to shorten the distance between the pickup roller 49 and the printing area, improve the proportion of the image forming area on the printing medium, and reduce the blank area.

Pickup Roller Embodiment 1

In the first embodiment of the pickup roller, as shown in FIG. 149A and FIG. 149B, a plurality of protrusions are disposed on the pickup roller 49 to increase the friction between the pickup roller 49 and the printing medium, thereby outputting the printing medium more stably.

In some embodiments, the pickup roller 49 may be made of elastic rubber material. After the pickup roller 49 contacts the printing medium, it generates greater friction.

In some embodiments, the paper discharge roller 49*a* and the pickup roller 49 are made of metal material.

In some embodiments, the pickup roller 49 may also be configured as toothed. A plurality of tooth-like protrusions are equidistantly provided on the pickup roller 49 in the axial direction. This method can increase the friction between the pickup roller 49 and the printing medium.

In some embodiments, the pickup roller 49 may also be provided with a plurality of pointed small protrusions. In this way, the friction force is sufficient to transport the printing medium to the paper outlet 122 while avoiding the printing medium from shifting out of the paper path.

Further, as shown in FIG. 149B, in the axial direction of the paper discharge roller, the paper discharge roller 49*a* has a first end 49*a*11 and a second end 49*a*12. The pickup roller 49 includes a first end pickup roller 4911 and a second end pickup roller 4912 disposed on the paper discharge roller 49*a*. The first end pickup roller 4911 is located close to the first end 49*a*11. The second end pickup roller 4912 is located close to the second end 49*a*12. Specifically, the range of the diameter D1 of the first end pickup roller 4911 and the second end pickup roller 4912 is 6.9 mm-7.1 mm, preferably 7 mm. In the axial direction of the paper discharge roller 49*a*, the distance D2 between the first end 49*a*11 of the paper discharge roller 49*a* and the second end 49*a*12 of the paper discharge roller 49*a* is in the range of 74.8 mm-75 mm, preferably 74.9 mm. The range of the minimum distance D3 between the first end pickup roller 4911 and the second end pickup roller 4912 is 24.3 mm-44.5 mm, preferably 24.4 mm or 44.4 mm. The range of the distance D4 between the side of the first end pickup roller 4911 close to the first end 49*a*11 and the first end 49*a*11 is 15.05 mm-15.25 mm, preferably 15.15 mm. The range of the distance D5 between the side of the second end pickup roller 4912 close to the second end 49*a*12 and the second end 49*a*12 is 6.95 mm-7.15 mm, preferably 7.05 mm.

Pickup Roller Embodiment 2

The difference from the first embodiment of the pickup roller is that in the second embodiment of the pickup roller, as shown in FIG. 150, two anti-squeeze portions 4901 respectively connected to the two pickup rollers 49 are disposed on the paper discharge roller 49*a*. Along the axial direction of the paper discharge roller 49*a*/pickup roller 49, the two anti-squeeze portions 4901 are located at a side of the pickup rollers 49 close to middle position of the paper discharge roller 49*a*. When the printing medium is squeezed causing the middle part to warp into an arcuate surface, the anti-squeeze portion 4901 is configured to contact both ends of the arcuate surface, preventing the printing medium from being further squeezed to cause paper jams. Preferably, the anti-squeeze portion 4901 is configured as a conical surface.

In some embodiments, the anti-squeeze portion 4901 may be regarded as a part of the pickup roller 49. Therefore, in the first embodiment of the pickup roller, the minimum distance D3 between the first end pickup roller 4911 and the second end pickup roller 4912 is the minimum distance between the two anti-squeeze portions 4901.

Beneficial Effects

1. The paper cassette is configured to be detachable. When paper is jammed inside the paper cassette, the entire paper cassette may be directly removed from the machine body, exposing the internal structure of the paper cassette. The user can clearly see the paper jam position, quickly remove the jammed paper, and also avoid scratching internal parts of the machine body due to improper operation.
2. When removing the paper cassette or installing the paper cassette, the printing medium is pressed by the pushing component, so that the printing medium is clamped by the pushing component and the paper cassette bottom shell, thereby preventing the printing medium from slipping, and improving the user experience of the printer.
3. Multiple protrusions are disposed on the pickup roller to increase the friction between the pickup roller and the printing medium, thereby making the transportation of the printing medium more stable.
4. When the printing medium is squeezed causing the middle part to warp into an arcuate surface, the anti-squeeze portion set as a conical surface contacts both ends of the arcuate surface, preventing the printing medium from being further squeezed to cause paper jams.

Obviously, the above embodiments are merely examples for clarity of description, and are not intended to limit the embodiments. For those of ordinary skill in the art, other changes or variations in different forms may be made based on the above description. It is not necessary and impossible to exhaust all embodiments here, and the obvious changes or variations derived therefrom are still within the protection scope of the present disclosure.

What is claimed is:

1. A portable inkjet photo printer, comprising:

a housing assembly having a paper outlet;

a paper cassette located inside the housing assembly, wherein the paper cassette is configured to allow a printing medium to be put into;

a printing mechanism configured to eject printing fluid onto the printing medium in a printing area to form an image;

a printing carriage configured to install the printing mechanism;

a driving assembly configured to drive the printing carriage and the printing mechanism to move along an arcuate trajectory; and a paper feeding mechanism configured to transport the printing medium toward the paper outlet along a paper feeding direction;

wherein the housing assembly comprises a first housing and a cover member, an operating opening is disposed on the first housing, the printing mechanism is replaced through the operating opening; and along an up-down direction, at least a part of the operating opening overlaps with the cover member, wherein a side of the operating opening close to the paper outlet is configured as an arc shape.

2. The portable inkjet photo printer according to claim 1, further comprising a paper pressing mechanism configured to press the printing medium; wherein along the up-down direction, the printing mechanism and the paper pressing mechanism at least partially overlap.

3. The portable inkjet photo printer according to claim 2, wherein the paper cassette comprises a paper cassette cover plate, and the paper pressing mechanism comprises a support member movably disposed relative to the paper cassette cover plate, the support member is configured to support a part of the printing medium; and the support member is disposed inclined relative to a front-rear direction.

4. The portable inkjet photo printer according to claim 3, wherein an elastic member is disposed between the paper cassette cover plate and the support member.

5. The portable inkjet photo printer according to claim 3, wherein the paper feeding mechanism comprises a paper discharge roller; along the up-down direction, the paper discharge roller is located above the paper pressing mechanism, and the printing mechanism is located above the paper pressing mechanism; and along the front-rear direction, the paper discharge roller is disposed in front of the printing mechanism.

6. The portable inkjet photo printer according to claim 3, wherein the paper pressing mechanism further comprises a paper pressing member, and the paper pressing member is disposed on the support member.

7. The portable inkjet photo printer according to claim 6, wherein a first abutment position is formed where the support member and the printing medium abut against each other, and compared to a rear end of the printing medium, the first abutment position is closer to a front end of the printing medium; and a second abutment position is formed where the paper pressing member and the printing medium abut against each other, and compared to the front end of the printing medium, the second abutment position is closer to an intermediate position or the rear end of the printing medium in the front-rear direction.

8. The portable inkjet photo printer according to claim 7, wherein along the front-rear direction, the second abutment position corresponds to the intermediate position of the printing medium; and an angle $\alpha$ formed by the paper pressing member and a direction from rear to front is greater than an angle $\beta$ formed by the support member and the direction from rear to front.

9. The portable inkjet photo printer according to claim 7, wherein the paper pressing member is capable of elastic deformation.

10. The portable inkjet photo printer according to claim 3, wherein a guide limiting mechanism is further disposed between the support member and the paper cassette cover plate, the guide limiting mechanism comprises a guide limiting portion and a guided limiting portion, and a movement range and a movement direction of the support member are restricted by cooperation of the guide limiting portion and the guided limiting portion.

11. The portable inkjet photo printer according to claim 3, wherein the paper cassette further comprises a paper cassette bottom shell and a pushing component movably disposed relative to the paper cassette bottom shell, and the pushing component is movable along the up-down direction.

12. The portable inkjet photo printer according to claim 11, wherein the paper cassette further comprises an elastic component located between the pushing component and the paper cassette bottom shell, configured to provide a restoring force for upward movement to the pushing component.

13. The portable inkjet photo printer according to claim 3, wherein along the front-rear direction, the paper outlet is disposed on a front side of the housing assembly; the paper cassette is detachably disposed relative to the housing assembly, and along the front-rear direction, at least a part of the paper cassette is located behind the housing assembly.

14. The portable inkjet photo printer according to claim 1, wherein when the printing mechanism is located at a predetermined position, along the up-down direction, the operating opening, the printing mechanism, and the paper cassette at least partially overlap.

15. The portable inkjet photo printer according to claim 14, further comprising a display component disposed on the cover member, wherein the cover member is configured to be rotatably disposed relative to the first housing, and when the cover member is closed on the first housing, along the up-down direction, the display component and the operating opening at least partially overlap.

16. The portable inkjet photo printer according to claim 14, wherein the operating opening is disposed on an upward-facing surface of the first housing.

17. The portable inkjet photo printer according to claim 14, wherein the operating opening comprises a first part close to the paper outlet and a second part far from the paper outlet; along the front-rear direction, the first part is located in front of the second part; and along a left-right direction, a width of the first part is greater than a width of the second part.

18. The portable inkjet photo printer according to claim 14, wherein along the up-down direction, a rotation center of the printing mechanism for movement along the arcuate trajectory overlaps with the paper cassette.

* * * * *